US012143052B2

United States Patent
Nashiki et al.

(10) Patent No.: US 12,143,052 B2
(45) Date of Patent: Nov. 12, 2024

(54) INDUCTION MOTOR AND CONTROLLER DEVICE THEREFOR

(71) Applicant: Masayuki Nashiki, Aichi (JP)

(72) Inventors: Masayuki Nashiki, Aichi (JP); Hiroyuki Nashiki, Aichi (JP)

(73) Assignee: Hiroyuki Nashiki, Aichi (JP)

( * ) Notice: Subject to any disclaimer, the term of this patent is extended or adjusted under 35 U.S.C. 154(b) by 392 days.

(21) Appl. No.: 17/626,554

(22) PCT Filed: Jul. 14, 2020

(86) PCT No.: PCT/JP2020/027394
§ 371 (c)(1),
(2) Date: Aug. 22, 2022

(87) PCT Pub. No.: WO2021/010404
PCT Pub. Date: Jan. 21, 2021

(65) Prior Publication Data
US 2022/0399838 A1    Dec. 15, 2022

(30) Foreign Application Priority Data

Jul. 16, 2019    (JP) .................. 2019-131298

(51) Int. Cl.
 H02K 3/28     (2006.01)
 H02K 17/16    (2006.01)
 H02P 6/16     (2016.01)
 H02P 25/22    (2006.01)

(52) U.S. Cl.
 CPC ............... *H02P 6/16* (2013.01); *H02K 3/28* (2013.01); *H02K 17/165* (2013.01); *H02P 25/22* (2013.01)

(58) Field of Classification Search
 CPC .. H02P 6/16; H02P 25/22; H02K 3/28; H02K 17/165
 See application file for complete search history.

(56) References Cited

U.S. PATENT DOCUMENTS

2020/0099327 A1    3/2020    Nashiki

FOREIGN PATENT DOCUMENTS

| JP | 06-205570 | 7/1994 |
| JP | 11-41883 | 2/1999 |
| JP | 2010-252628 | 11/2010 |
| JP | 2016-048997 | 4/2016 |
| JP | 2017-184452 | 10/2017 |

OTHER PUBLICATIONS

Hijikata et al., "Larger Torque Production . . . Air-gap Flux Density", IEE Japan, 2016.

*Primary Examiner* — Tulsidas C Patel
*Assistant Examiner* — Mohammed Ahmed Qureshi
(74) *Attorney, Agent, or Firm* — Bauer & Joseph

(57) ABSTRACT

In induction motors, efficiency is improved and a maximum torque is increased. For a magnetic flux density of the stator pole for each phase of an induction motor, a circumferential magnetic flux density distribution is controlled to any distribution state, from a trapezoidal wave-like distribution close to a square wave to a sinusoidal distribution. In particular, motor efficiency in a range of low to medium rotations is improved. The motor structure is designed to reduce the leakage inductance of the rotor windings, and the motor and control thereof are optimized for each other. This increases the maximum torque of the motor more effectively. In addition, the high efficiency of the motor makes it possible to reduce the size of the drive circuit.

20 Claims, 39 Drawing Sheets

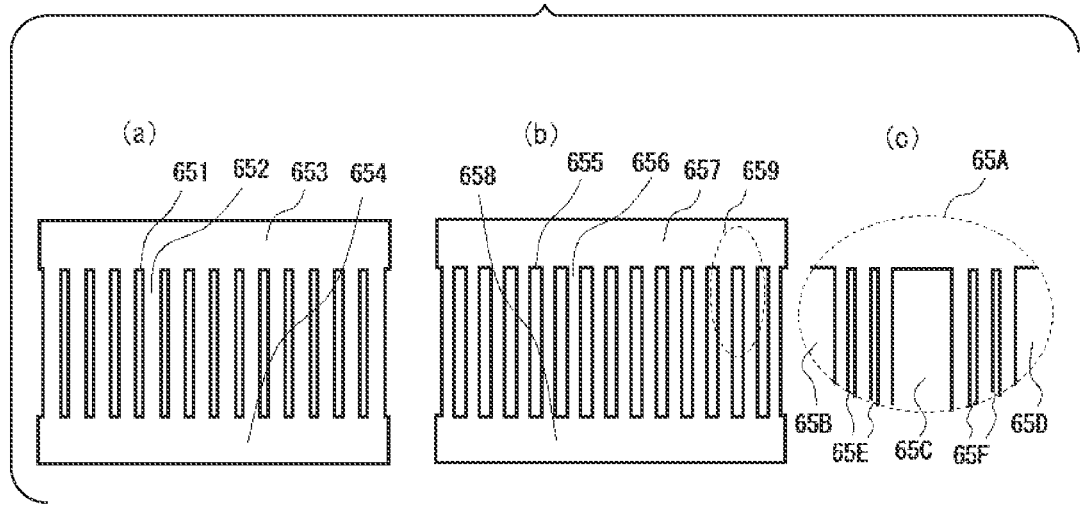
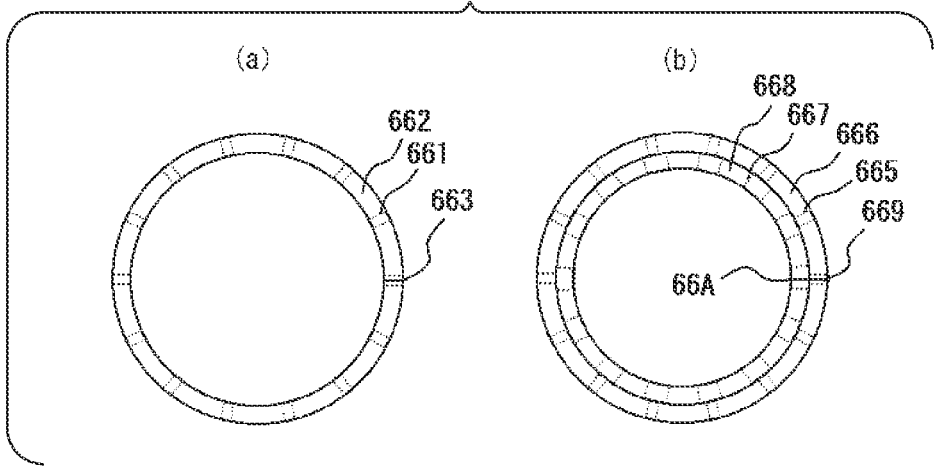

INDUCTION MOTOR AND CONTROLLER DEVICE THEREFOR

CROSS-REFERENCE TO RELATED APPLICATION

This application is based on and claims the benefit of priority from earlier Japanese Patent Application No. 2019-131298 filed on Jul. 16, 2019 the description of which is incorporated herein by reference.

BACKGROUND

Technical Field

The present disclosure relates to motors for driving hybrid and electric vehicles (EVs), motors for home appliances, industrial motors, and their drive circuits and control technologies. In particular, the present disclosure relates to higher power factor, higher efficiency, smaller size, lighter weight, and lower cost of induction motors and their drive circuits, as well as control technology and higher performance of induction motors. The present disclosure also relates to motors that have stator windings and rotor windings, in which a certain current component of the stator and a current component of the rotor face each other through an air gap portion and energize currents in opposite directions. That is, the present disclosure relates to a motor and its control device that energizes and controls stator currents and rotor currents relative to each other.

Background Art

Induction motors can be driven by direct connection to a 3-phase AC, 200 [V], 50/60 [Hz] commercial power source. For this reason, the induction motors have been used in great many applications and are still the primary industrial motor. The motors consume 50% of the electricity consumed, and 3-phase induction motors account for nearly 80% of all motors produced on a capacity basis. In recent years, the Ministry of Economy, Trade and Industry (METI) has recommended high-efficiency motors with IE3 and even IE4 of IEC standards under the so-called "Top Runner" regulation, which is also regulated in many other countries around the world, and competition is intensifying.

Such Ministry of Economy, Trade and Industry-led efforts to reduce power consumption and electricity rates have led to calls for higher efficiency in induction motors. In addition, the use of inverters to drive motors at variable rotation speeds to more suitable speeds is becoming more common. This is due to advances in power element and semiconductor technology, such as IGBTs, and the remarkable development of microprocessors and memory for control. Specifically, IGBTs and other devices are becoming less expensive, and control circuits are becoming faster, more integrated, and less expensive. As a result, complex control can be executed at high speed without concern for arithmetic processing time. In addition, such complex control can be realized without worrying about the cost burden of memory capacity. Thus, technical problems that were difficult to solve in the past can now be solved.

FIG. 88 shows an example of a cross-sectional view of a conventional induction motor. In the figure, 88F is a stator and 88C is a rotor shaft. 881 is an A1 phase stator pole, 882 is an A1/phase stator pole, 883 is a B1 phase stator pole, and 884 is a B1/phase stator pole, 885 is a C1 phase stator pole, and 886 is a C1/phase stator pole. Each of the aforementioned stator poles also serves as a tooth of the stator, and a space between the two teeth constitutes a slot in which windings are placed. 887 and 888 are full pitch windings of AB1 phase to which the coil ends 889 are connected, and their winding pitch is 180°.

In the directions of the current symbols showing windings 887 and 888, the winding 887 is energized from the front side of the drawing paper to the back side thereof, and the winding 888 is energized in the opposite direction thereto. Similarly, the winding shown by a coil end 88A is a full pitch winding of a phase BC1. The winding shown by a coil end 88B is the full pitch winding of a phase CAL. 88D is the multiple teeth of the rotor, which are evenly distributed on the outer circumference. The space between two adjacent teeth constitutes a rotor slot in which the rotor winding is wound. 88E shows one of the rotor windings. For example, the winding 88E is often fabricated using the aluminum die-casting process.

The AB1-phase winding 889, BC1-phase winding 88A, and CA1-phase winding 88 are supplied with a three-phase AC voltage and current. As a result, field fluxes φm rotating at the AC frequency Ff of the applied voltage is generated, and rotor currents Ir are induced in the rotor windings by a slip frequency Fs, which is a difference between the AC frequency ωf and a rotor rotation frequency Fr. Then, a force Fr is generated according to the product of a magnetic flux density B of the field fluxes φm and the rotor currents Ir, and the rotor is driven to rotate by the torque T based on that force. This drive operation is based on a well-known torque generation mechanism in induction motors. The generated force Fr is known as Lorentz force, B and Ir are vector quantities whose directions are indicated by Fleming's left-hand rule. In the current motor technology, the above force is often obtained by a magnetic field analysis using the finite element method. Such a force can be accurately calculated based on, for example, the force derived from Maxwell's stress equation, as shown later in Equations (193) and (194). However, such an analysis is complicated by many divided elements, which makes it difficult to express and describe the equations. Here, the generated force Fr is expressed in terms of Lorentz force.

Next, the unique configuration and action of induction motors will be described, and the differences between induction motors and synchronous motors will be further described. An induction motor has a rotor winding, and the impedance of the rotor winding includes an inductance component. The phase of the rotor current is delayed with respect to the voltage generated in this rotor winding. Since the rotor winding is located on the rotor side, detection of the rotor current is not easy. Unlike permanent magnet synchronous motors, induction motors require a rotor winding. Furthermore, the rotor current causes rotor copper losses.

The following are problems with conventional induction motors. First, the induction motors are assumed to be driven and controlled by sinusoidal voltage and sinusoidal current. FIG. 6 shows an example of induction motor characteristics. In the figure, the horizontal axis shows a slip S. The left end indicates that the speed is 0 and the slip S is 1.0, while the right end indicates that the speed is the same synchronous speed as the power frequency for driving the induction motor. In this example, the slip S is 0, 61 is a stator current Isf, 62 is a torque T, 63 is a power factor $\cos(\theta pf)$, and 64 is an output power and 65 is an efficiency η.

FIG. 5 is a vector diagram of each variable. In this figure, 51 is a field excitation current Isf, 52 is a field flux φm, 53 is an induced voltage of a rotor winding Er, 54 is a rotor current Ir, and θs is a phase difference between the rotor voltage Er and the rotor current Ir. A generated torque T is proportional to the product of the field flux φm and the rotor current Ir. 55 is the stator rotor current component Isr and 56 is the stator current Is. 57 is a stator winding induced voltage Es, 58 is a voltage drop "Is×Rs" across a stator winding resistance Rs, 59 is a leakage reactance drop "Is×Xs", and 5A shows a voltage Vs of the stator winding.

Here, the phase delay θs of the rotor current Ir with respect to the rotor voltage Er has a significant effect on the characteristics of the induction motor. The rotor voltage Er is generated by a slip frequency Fs between the field flux φm and the rotor winding. Therefore, the amplitude of the rotor voltage Er is proportional to the slip frequency Fs, and the frequency of the rotor voltage Er corresponds to the slip frequency Fs. Therefore, in the region where the generated torque T of the induction motor is small, the phase delay θs of the rotor current is small, and the torque generation effect depending on the field magnetic flux φm and the rotor current Ir is preferable. However, as the generated torque T of the induction motor increases, the slip frequency Fs increases. Since this is also related to the leakage inductance of the rotor winding, the phase delay θs becomes larger. Therefore, the torque generation efficiency by the field flux φm and rotor current Ir decreases. A dashed reference code 66 shows ideal torque characteristics when the leakage inductance of the rotor winding is small.

The results of these actions are shown in the characteristics of FIG. 6. As the slip frequency Fs increases, the generation efficiency of torque T decreases from 66 shown by the dashed line. Furthermore, the efficiency of the generation reaches a maximum value, after which the torque rather decreases. Thus, induction motors have the problems of a lower power factor, lower efficiency, and a limited maximum torque as the torque increases. In addition, the induction motors have the problem of high rotor copper loss compared to permanent magnet synchronous motors. As a result, the motors become larger and production costs increase. In addition, the induction motors are assumed to be driven by sinusoidal AC voltages and currents. Therefore, when the total number of voltages and currents is small, such as three phases, the stator tooth width becomes wider in the circumferential direction, resulting in discrete magnetic flux distribution in the circumferential direction, which increases torque ripple and noise. To reduce this discrete problem, the rotor needs to be skewed, resulting in reduced torque.

In some cases, the induction motors are driven by so-called vector control using an inverter. In such cases, the control becomes complicated, because the delay of the rotor current must be taken into account. In addition, when trying to drive an induction motor with sinusoidal AC voltages and currents faithfully in principle, the maximum flux density of the motor is often controlled such that the motor does not reach its magnetic saturation. This tends to reduce the utilization efficiency of soft magnetic material used in the motor.

The induction motors have advantageous features such that the induction motors are robust, easy to control the field flux, which makes constant output control and high-speed rotation control easy, have no drag torque, which occurs with permanent magnets when coasting, and can reduce losses, do not require expensive permanent magnets, are low-cost, and use permanent magnet material. In addition, the induction motors are advantageous in the absence of resource problems associated with rare earth elements, and the fact that it is easy to increase the capacity of induction motors and has an abundant track record. By reducing the aforementioned problems, it is expected to be used in a wide range of applications, including drive applications such as electric vehicles, industrial machinery applications, and home appliance applications.

In particular, an increase in the maximum torque of induction motors can expand their range of applications and also their uses. The small size, light weight, and high output of induction motors are expected to significantly improve their performance in many applications. These applications include transportation, aircraft, and robotics. In such applications, the aforementioned problem of limiting the maximum torque becomes an issue to be solved. This will be explained later in the examples of the present invention.

CITATION LIST

Patent Literature

[PTL 1] JP-H-06-205570 (FIG. 3)
[PTL 2] JP-2018-093695 (FIG. 1)

Non-Patent Literature

[Non PTL1] 2016 IEE Japan, 3-36 (formula 1)

SUMMARY

An example of applications of this induction motor is a motor for the main engine of an electric vehicle. The speed-torque characteristics of the motor for this main engine require high torque at low speeds, high power factor, and high efficiency, which are necessary for hill climbing operation on steep slopes. Improvement of these factors will enable downsizing of the motor and the inverter. Improving efficiency at light loads is also important to improve overall efficiency. Induction motors have excellent field weakening and constant output characteristics at high speeds.

In order to achieve high efficiency of induction motors, this disclosure proposes a technique to control the distribution shape from arbitrary trapezoidal waveforms and other distribution shapes to sinusoidal waveforms. The control is to control magnetic flux distribution, current distribution, etc., which enables such circumferential distribution shapes at will. To realize the distribution shape, represent each variable such as independent currents in multiphase. Interconversion between the free distribution shape and the information discretized to the width of each tooth of the stator is performed. As a method for expressing arbitrary distribution shapes, the magnetomotive force generated by the stator poles of each phase is expressed using virtual concentrated winding windings to define each one separately and flexibly. The values of each variable, such as current, of the full-pitch windings and the virtual concentrated windings described above are expressed, and the interconversion between the full-pitch winding and the concentrated winding is performed. An interconversion formula is proposed. As one method for representing arbitrary distribution shapes, a multiphase fixed real-axis coordinate and a rotation coordinate are used for the interconversion.

Each winding current of each hypothetical rotor winding is equivalently converted to a stator current. The value of each winding current of each rotor winding is obtained based on a voltage equation. A delay of each rotor current is compensated and controlled for the compensation. In the current control for each phase, voltage feedforward control is used to more accurately control the current.

The structure and configuration of the motor is shown to be suitable for the aforementioned purpose and control.

Various forms of motors are possible. In particular, a reduction in the leakage inductance of the rotor winding is necessary to output a large torque. For this purpose, two effects are used, i) one of which is that both the magnetomotive force component generated by the rotor current and the magnetomotive force component generated by the stator current offset the magnetomotive force applied on their outer parts, and ii) the other of which is that the rotor current and the stator current generate circumferential magnetic flux density components in an air gap section including an air gap between the stator and the rotor). By combining this utilization with the aforementioned control, the maximum torque of the motor is increased. That is, the maximum torque of the motor can be increased more effectively through mutual optimization of the motor and control. It also indicates motors that operate at large flux densities that exceed the saturation flux density of the soft magnetic material used. In addition, advances in superconducting winding technology have made it practical, especially in areas where large torque output is required. A repulsive force that occurs between the stator current and the rotor current can also be applied. For a drive circuit that drives the voltage and current of each phase winding, a configuration that can realize the above control is shown. In order to achieve the above-mentioned control more precisely, the magnetic flux detection of each phase and each rotor current is effective.

The disclosure of a first mode provides an induction motor and control device thereof, characterized in the induction motor and control device thereof comprises:
  stator windings SW1, SW2, SW, ..., SW(N1) arranged for each of phases within an electrical angle of 360 degrees in a circumferential direction of a stator;
  magnetic sections G1, MG2, MG3 ... MG(N2) which are circumferential sections located close to an air gap between the stator and a rotor, which are located within an electrical range of 360 degrees, and which shows stator teeth each arranged between the stator windings of each of the phases or circumferential widths corresponding to the stator tooth;
  a plurality of rotor windings RW arranged closely on a surface of a rotor in the rotor, induced currents flowing due to magnetic excitation in the stator;
  a drive circuit DTR which drives voltage and current of the phases supplied to the respective stator windings; and
  a motor control means MCM which obtains values including current command values, and drives the stator windings with the drive circuit DTR,
  wherein
  the control is performed in a state in which a field flux φm near the air gap for each of the magnetic sections, an electromotive force to excite a magnetic flux density of the field flux φm, or excitation current components for excitation including a field magnetic flux excitation are given as individual values for each of the magnetic sections, and
  a rotor current component superposed to each of the stator windings is supplied to the rotor windings of the rotor, wherein the number N1 is an integer greater than or equal to 6 and the number N2 is an integer greater than or equal to 6.

According to this configuration, the induction motor and its drive circuit can be made more efficient and compact.

The disclosure of a second mode provides the induction motor and control device thereof according to the first mode, characterized in that
  a current control is performed by
    setting a magnetic flux density near the air gap of the field flux φm of the stator as a function Dist1 of a target distribution state of arbitrary shape in the circumferential direction,
    changing the function Dist1 to a function Dist2 of circumferentially discrete distribution state, constrained to the magnetic section such as stator tooth of the stator, such that an average value of the magnetic flux density near the air gap in the magnetic section is approximately equal, in rotation control of the field flux φm, and
    controlling the induction motor according to the distribution shape Dist2.

According to this configuration, the induction motor and its drive circuit can be made more efficient and compact.

The disclosure of a third mode provides the induction motor and control device thereof according to the first or second mode, characterized in that
  a compensation flux is added adjacently to a leading portion of the field flux φm in the direction of travel in the air gap of the induction motor to compensate for a delay of the rotor current.

According to this configuration, the induction motor and its drive circuit can be made more efficient and compact.

The disclosure of a fourth mode provides the induction motor and control device thereof according to the first or second mode, characterized in that
  a rotor current command value Irc is substituted into a voltage equation for the rotor current to obtain the voltage Vrc of the rotor windings,
  a magnetic flux density Bgap that is allowed to generate a rotor voltage Vrc is determined, and
  the magnetic flux density Bgap is controlled based on the function Dist1 of the target distribution state of the magnetic flux density in the air gap.

According to this configuration, the induction motor and its drive circuit can be made more efficient and compact.

The disclosure of a fifth mode provides the induction motor and control device thereof according to the first or second mode, characterized in that
  a magnitude φvol of the field flux φm of the stator is determined from the function Dist1 of the distribution state of the magnetic flux density in the air gap of the field flux φm, or, the function Dist2 of the distribution state wichi is discrete in the circumferential direction from the function Dist1, and
  the magnitude φvol of the field flux φm is controlled such that the magnitude φvol does not change rapidly.

According to this configuration, the reactive current in the rotor windings can be reduced.

The disclosure of a sixth mode provides the induction motor and control device thereof according to the first or second mode, characterized in that
  the function Dist1 of the circumferential target magnetic flux density distribution state in the vicinity of the air gap of the field flux φm of the stator is controlled by varying values of the rotor rotational angular velocity ωr or the torque command Tc.

According to this configuration, the induction motor can be driven at high efficiency according to its operating conditions.

The disclosure of a seventh mode provides the induction motor and control device thereof according to the first or second mode, characterized in that
  the stator windings and the magnetic sections of the stator are configured as distributed windings arranged in parallel in the circumferential direction, and a voltage and a current to each phase of the stator windings are driven and controlled.

This configuration reduces the harmonic components of the induction motor, which results in lower torque ripple, lower noise, etc.

The disclosure of an eighth mode provides the induction motor and control device thereof according to the first, second or third mode, wherein each of excitation current components of the filed magnetic flux φm and torque current components is defined N3-phase currents, and a coordinate that rotates with respect to a circumferential rotation position θmn of the field magnetic flux φm is an MN coordinate;

a real coordinate is defined as a real axis coordinate, wherein each of excitation current components of the filed magnetic flux φm and torque current components are fixed as the N3-phase currents; and a coordinate conversion is performed between the MN coordinate and the real axis coordinate such that various or flexibly changeable distribution shape of the N3 phase are controlled, wherein the N3 is an integer of 6 or more.

This configuration makes it easier to control the complex control of induction motors.

The disclosure of a ninth mode provides the induction motor and control device thereof according to the first mode, wherein in the coordinate conversion between each of the variables of the real axis coordinate and each of the variables of the MN coordinate, which are discretized in a circumferential direction for each phase, a value after the coordinate conversion is set as an average value of a circumferential width of each of the variables concerned.

This configuration makes it easier to control the complex control of induction motors.

The disclosure of a tenth mode provides the induction motor and control device thereof according to the first or second mode, wherein the excitation current components or the torque current components are expressed as full-pitch winding current components of the full-pitch windings;

the excitation current components or the torque current components are expressed as concentrated winding current components of hypothetical concentrated windings, if necessary; and the excitation current components or the torque current components are used for the control by converting the full-pitch winding current components and the concentrated winding current components to each other, as required.

According to this configuration, the torque current component of each phase and the excitation current component for each of the aforementioned magnetic sections can be recognized and controlled.

The disclosure of an eleventh mode provides the induction motor and control device thereof according to the first or second mode, wherein the induction motor comprises:

stator windings SW1, SW2, SW3 . . . SW(N4) of the full pitch winding(s) to be placed at each phase within a circumferential electrical angle of 360° of the stator;

each of magnetic sections such that the magnetic section MG1 is between the stator windings SW1 and SW2 of each phase, the magnetic section MG2 is between the stator windings SW2 and SW3, and the magnetic section MG(N4) is between the stator windings SW(N4) and SW1; and a slot SL1 located between the magnetic sections MG (N4) and MG (1), a slot SL1 located between the magnetic section MG (1) and MG (2), a slot SL3 located between the magnetic section MG (2) and MG (3), and a slot SL (N4) located between the magnetic section MG (N4−1) and MG (N4), N4 being an integer of 6 or more;

wherein when a current in the full pitch windings in the slot SL (1) where the stator winding SW1 is would is Iax, a portion of the stator winding SW1 is also located in a slot (N4/2+1) 180° away at an electrical angle, and a reverse direction current (−Iax) is energized in the portion of the winding;

hypothetical concentrated windings CW1, CW2, CW3 . . . CW(N4) are assumed, which form an equivalent function to the full pitch windings, wound on each of the magnetic sections MG1, MG2, MG3 . . . MG(N4), and the number of turns of the full-pitch windings and the hypothetical concentrated windings is Nws/2, and when obtaining the equivalent full pitch winding current values by converting from each current value of the hypothetical concentrated winding to each equivalent full pitch winding current value, the current values of two hypothetical concentrated windings placed in the same slot as the full pitch windings are set to be positive if the direction of the magnetomotive force of the hypothetical concentrated winding coincides with the direction of the magnetomotive force of the full pitch windings and to be negative if the direction of the magnetomotive force of the two windings is opposite, and a sum of the current values of the two concentrated windings is obtained, and similarly, the current value for each full pitch windings is obtained; and when the current values of each of the equivalent hypothetical concentrated windings are obtained by converting from the current values of each of the full pitch windings, the direction of the magnetomotive force generated by the current in the full pitch windings coincides with the direction of the magnetomotive force acting on the magnetic section around the hypothetical concentrated winding, in which the currents are assumed to be positive, and in the opposite direction, the currents are assumed to be negative, and the currents of all the full-pitch windings are added together to obtain ½ of a sum of the currents acting as an equivalent current value of the hypothetical concentrated windings, and similarly, the equivalent current values of the respective hypothetical concentrated windings.

This configuration allows the conversion between each current value of the full pitch winding(s) and each current value of the virtual concentrated winding.

The disclosure of a twelfth mode provides the induction motor and control device thereof according to the first or second mode, wherein when voltage values of each equivalent full pitch windings are obtained by converting from the voltage values of each of the hypothetical concentrated windings, if a direction of the magnetomotive force acting on the magnetic section of the hypothetical concentrated winding coincides with the direction of the magnetomotive force acting on the current in the full pitch windings, the value is set to be positive, and if the direction of the magnetomotive force is opposite, the value is set to be negative, the voltage values of the concentrated windings are added together and ½ of the sum is the equivalent voltage of the full pitch windings, and similarly, the equivalent voltage for each full pitch windings is obtained; and when the voltage values of each of the equivalent hypothetical concentrated windings are obtained by converting from the voltage values of each of the full pitch windings, if the direction of the magnetomotive force exerted by the current in the full pitch windings corresponds to the direction of the magnetomotive force exerted by the current in the hypothetical concentrated winding, the voltages of the two full pitch windings wound in the slots located circumferentially on both sides of the magnetic section related to the hypothetical concentrated winding are assumed to be positive and if a relationship where the direction of the magnetomotive force is in the opposite direction, the voltages are assumed to be negative, the voltage values are added together so as to set an equivalent voltage value of the hypothetical concentrated winding, and similarly, the equivalent voltage values for each hypothetical concentrated winding are obtained.

This configuration allows the conversion between each voltage value of the full pitch winding(s) and each voltage value of the virtual concentrated winding.

The disclosure of a thirteenth mode provides the induction motor and control device thereof according to the first or second mode, wherein a torque command Tc and rotor rotational angular velocity ωr are used as inputs, the slip angular frequency ωs and the distribution shape Dist1 of an arbitrary shape of the magnetic flux density in the air gap section is obtained, or the distribution shape Dist1 of an arbitrary shape of the excitation current component corresponding to said magnetic flux density to control the induction motor current.

According to this configuration, field excitation commands, sliding angular frequency commands, etc., can be performed according to the torque command Tc and the rotor rotation angular speed ωr.

The disclosure of a fourteenth mode provides the induction motor and control device thereof according to the first or second mode, wherein the command values B1c, B2c, B3c, B4c . . . of the magnetic flux density of each stator tooth are obtained from the aforementioned arbitrarily shaped distribution shape Dist1 of the magnetic flux density of the air gap section, and the excitation current component commands Isf1Cc, Isf2Cc, Isf3Cc, Isf4Cc . . . of the aforementioned virtual concentrated windings CW1, CW2, CW3, CW4 . . . of the stator are calculated, which excite these magnetic flux densities.

According to this configuration, the magnetic flux density in the air gap section of each stator pole and its excitation current component can be determined and controlled.

The disclosure of a fifteenth mode provides the induction motor and control device thereof according to the first, second or fourteenth mode, wherein the detected excitation current components Isf1Cd, Isf2Cd, Isf3Cd, Isf4Cd . . . of the hypothetical concentrated winding required to excite each magnetic section are calculated from the magnetic flux density B1d, B2d, B3d, B4d . . . of the air gap section of each magnetic section, and for each phase, the detected excitation current component values Isf1Cd, Isf2Cd, Isf3Cd, and Isf4Cd . . . are subtracted from the field flux excitation current component command values Isf1Cc, Isf2Cc, Isf3Cc, and Isf4Cc . . . to obtain the excitation current component error for each phase (Isf1 Cc-Isf1Cd), (Isf2C-Isf2Cd), (Isf3Cc-Isf3Cd), (Isf4Cc-Isf4Cd) . . . for feedback control.

This configuration allows feedback control of the field excitation current component.

The disclosure of a sixteenth mode provides the induction motor and control device thereof according to the first or second mode, wherein virtual rotor windings RW11, RW12, RW13, and RW14 . . . are placed on the circumference of the rotor, the values of the rotor currents Ir11, Ir12, Ir13, Ir14 . . . flowing in each of said rotor windings RW are calculated based on the voltage equation including the winding resistance and leakage inductance of each rotor winding RW, and the respective values of each of said rotor currents are continuously determined and controlled.

According to this configuration, the rotor current Irn can be calculated.

The disclosure of a seventeenth mode provides the induction motor and control device thereof according to the first, second or sixteenth mode, comprising:

stator windings SW1, SW2, SW3, SW4 . . . , and a rotor provided with rotor windings wound on, wherein virtual rotor windings RW11, RW12, RW13, RW14 . . . are placed on the circumference of the rotor, and rotor currents Ir11, Ir12, Ir13, Ir14 . . . flowing in said hypothetical rotor windings are continuously obtained over time, the circumferential distribution IsrDist of the rotor current component of the stator is determined so that the product of the rotor current Ir11, Ir12, Ir13, Ir14 . . . and the number of turns of the current is negative and of the same magnitude, and rotor current components of windings wound on a stator are controlled based on the circumferential distribution IsrDist.

According to this configuration, the calculated value of the rotor current can be converted to the current value of the stator winding.

The disclosure of an eighteenth mode provides the induction motor and control device thereof according to the first, second or sixteenth mode, comprising:

stator current detection means MCDM to detect each phase current of the stator windings SW1, SW2, SW3, SW4 . . . , wherein the current values for each of the stator windings are detected as Is1Fd, Is2Fd, Is3Fd, Is4Fd . . . , excitation current components Isf1Fd, Isf2Fd, Isf3Fd, Isf4Fd . . . required for excitation of each magnetic section are obtained from the magnetic flux density B1d, B2d, B3d, B4d . . . of the air gap section of each magnetic section, and the excitation current component are subtracted from each of the current values of the stator winding, each rotor current component (Is1Fd-Isf1Fd), (Is2Fd-Isf2Fd), (Is3Fd-Isf3Fd), and (Is4Fd-Isf4Fd) . . . are obtained, and the detected value of rotor current component are applied to the control.

According to this configuration, the rotor current component can be detected.

The disclosure of a nineteenth mode provides the induction motor and control device thereof according to the seventeenth mode, comprising:

the detected values Isr1Fd, Isr2Fd, Isr3Fd, Isr4Fd of the rotor current of each phase are subtracted from the commands Isr1Fc, Isr2Fc, Isr3Fc, Isr4Fc . . . of the rotor current component of each phase of the stator for the feedback control.

According to this configuration, the detected value of the rotor current component can be controlled by feedback control.

The disclosure of a twentieth mode provides the induction motor and control device thereof according to the first or second mode, wherein placing virtual rotor windings RW11, RW12, RW13, and RW14 . . . on the circumference of the rotor, and calculating the values of the rotor currents Ir11, Ir12, Ir13, Ir14 . . . flowing in each of said rotor windings RW based on the voltage equations including the winding resistance and leakage inductance of each rotor winding RW, and subtracting the calculated torque values generated by the rotor currents Ir11, Ir12, Ir13, Ir14 . . . from the torque command Tc to obtain the torque error Ter and the torque error correction ωster to correct the sliding angular frequency ωs.

According to this configuration, the torque error Ter can be determined and the slip angular frequency ωs can be corrected.

The disclosure of a twenty-first mode provides the induction motor and control device thereof according to the first or second mode, wherein differences between the command values Isr1Fc, Isr2Fc, Isr3Fc, Isr4Fc . . . of the rotor current component of the stator windings SW1, SW2, SW3, SW4 . . . of each phase and the detected values Isr1Fd, Isr2Fd, Isr3Fd, Isr4Fd . . . of the rotor current component flowing in the stator windings The difference between the detected values of the rotor current components Isr1Fe, Isr2Fe, Isr3Fe, and Isr4Fe . . . is calculated, and the rotor current error correction ωsier is obtained from each of these rotor current component errors, and the sliding angular frequency ωs is corrected.

According to this configuration, the error of the rotor current component can be determined and the slip angular frequency ωs can be corrected.

The disclosure of a twenty-second mode provides the induction motor and control device thereof according to the first or second mode, wherein placing virtual rotor windings RW11, RW12, RW13, and RW14 . . . on the circumference of the rotor, and calculating the values of the rotor currents Ir11, Ir12, Ir13, Ir14 . . . flowing in each of said rotor windings RW based on the voltage equations including the winding resistance and leakage inductance of each rotor winding RW, and subtracting the calculated torque values generated by the rotor currents Ir11, Ir12, Ir13, Ir14 . . . from the torque command Tc to obtain the torque error Ter and the torque error correction ωster, and differences between the command values Isr1Fc, Isr2Fc, Isr3Fc, Isr4Fc . . . of the rotor current component of the stator windings SW1, SW2, SW3, SW4 . . . of each phase and the detected values Isr1Fd, Isr2Fd, Isr3Fd, Isr4Fd . . . of the rotor current component flowing in the stator windings The difference between the detected values of the rotor current components Isr1Fe, Isr2Fe, Isr3Fe, and Isr4Fe . . . is calculated, the rotor current error correction ωsier is obtained from each of these rotor current component errors, and the slip angular frequency ωs, torque error correction ωster, and rotor current error correction ωsier are added to obtain the corrected slip angular frequency ωs3.

According to this configuration, the torque error correction ωster and rotor current error correction ωsier can be added to the slip angular frequency ωs to control it as a slip angular frequency with corrected error components.

The disclosure of a twenty-third mode provides the induction motor and control device thereof according to the first or second mode, wherein obtaining the induced voltage components Vse1Fc, Vse2Fc, Vse3Fc, Vse4Fc . . . , etc. for each winding, and adding these voltage components as voltage command components for each phase, wherein N2 is an integer of 6 or more.

According to this configuration, the voltage components of each stator winding can be feed-forwarded, which improves the current control accuracy of each phase.

The disclosure of a twenty-fourth mode provides the induction motor and control device thereof according to the first or second mode, wherein information on the distribution state of the field flux φm, the slip angular velocity ωs, and the phase current IsnF under the control conditions of the torque command Tc and the rotor rotation angular velocity ωr is obtained in advance by simulating the induction motor drive or by actually driving the motor, etc., motor control information CIJA is stored in the data memory DMM, from the data memory DMM, the motor control information CIJA of the required field flux φm distribution state, slip angular velocity ωs, and each phase current IsnF according to the command values of torque command Tc and rotor rotational angular velocity ωr are read, and the induction motor using said control information CIJA read out is driven and controlled.

According to this configuration, motor control information can be obtained in advance by simulation or actual motor drive to control the induction motor.

The disclosure of a twenty-fifth mode provides the induction motor and control device thereof according to the first or second mode, comprising a first stator magnetic circuit configuration comprising a first induction motor, and a first rotor; and a second stator magnetic circuit configuration comprising a second induction motor; and a second rotor mechanically coupled to the first rotor; and a toroidal-shaped stator winding that serves as the stator winding of the first induction motor and the stator winding of the second induction motor, wherein the currents are supplied to the stator windings for the control.

According to this configuration, two motors can be combined in the radial or axial direction of the rotor, and the stator can be placed back-to-back to use toroidal-shaped windings to shorten the coil end length, reduce the amount of copper wire, and reduce Joule heat.

The disclosure of a twenty-sixth mode provides the induction motor and control device thereof according to the first or second mode, comprising the rotor windings are located near the surface of the rotor facing the stator, and the rotor windings of each phase are arranged in a circumferential direction.

According to this configuration, the leakage inductance of the rotor winding can be reduced, thus enabling a large torque output.

The disclosure of a twenty-seventh mode provides the induction motor and control device thereof according to the twenty-sixth mode, wherein the stator windings are located near the surface of the stator facing the rotor, and the stator windings of each phase are arranged in the circumferential direction.

The disclosure of a twenty-eighth mode provides the induction motor and control device thereof according to the twenty-sixth or twenty-seventh mode, comprising a soft magnetic material is provided between the circumferential direction of each rotor winding of the rotor to reduce the magnetic resistance from the back yoke of the rotor to the air gap section.

According to this configuration, a soft magnetic material is added and placed in a part of the non-magnetic part, which reduces the burden of the field excitation current in a relatively small torque region and improves the motor efficiency in a small torque region.

The disclosure of a twenty-ninth mode provides the induction motor and control device thereof according to the twenty-sixth, twenty-seventh, or twenty-eighth mode, wherein cylindrical conductor of copper, aluminum, etc., with long, narrow holes or cut surfaces for insulation in the axial direction of the rotor, and a cylindrical rotor winding with circumferentially short-circuited ends in both rotor directions.

According to this configuration, rotor windings can be easily fabricated from conductor plates or rolled plates, and the winding occupancy ratio can be improved.

The disclosure of a thirty mode provides the induction motor and control device thereof, comprising:

stator windings SW1, SW2, SW3 . . . SW(N5) of superconducting windings to be located in each phase of the stator in the circumferential section of the stator in the range of 360° of electrical angle, N5 being an integer of 6 or more;

a circumferential section MG1, MG2, MG3 . . . MG (N6) of stator teeth, or a magnetic section MG1, MG2, MG3 . . . MG (N6) corresponding to the stator teeth and representing a circumferential width, located in the circumferential section near the air gap section between the stator and the rotor, and located in the range of 360° electrical angle, between the stator windings of each phase, N6 being an integer of 6 or more;

a rotor winding RW of a plurality of superconducting windings to be disposed near the surface of the rotor;

a drive circuit DTR that drives the voltage and current of each phase to each of the stator windings, and motor control means MCM, which obtains the current command values, etc. for the stator windings of each phase and drives them with the drive circuit DTR, is provided, wherein the stator current Is is energized in each phase with the current component Isdif involved in the excitation of the field flux φm and the current component Iscom common to the rotor current, and the rotor winding RW is energized in each phase with a current component (−Ircom) in the opposite direction of the stator current component Iscom and the product of the current value and the number of turns of the stator facing each other through the air gap.

According to this configuration, by applying a superconducting winding to a motor structure that does not cause torque saturation, in addition, zero resistance and high current density can be obtained, resulting in a large synergistic effect and realizing high output, compact size, and light weight.

The disclosure of a thirty-first mode provides the induction motor and control device thereof according to the thirty, wherein a resistive element is connected to the superconducting wires.

According to this configuration, by connecting a resistive element of appropriate value to the rotor of the superconducting winding, an extremely high-performance induction motor can be realized as a structure that does not become a superconducting electromagnet, on the contrary.

The disclosure of a thirty-second mode provides the induction motor and control device thereof according to the thirty-first mode, wherein an intermediate connection area placed between the superconducting wires and the resistive element.

According to this configuration, the conductor in the intermediate connection area is made of normal conductor such as copper or aluminum, and the cross-sectional area is made large to keep the heat generation state as small as possible and facilitate cooling of the intermediate connection area even if the temperature cannot maintain superconductivity in the worst case.

The disclosure of a thirty-third mode provides the induction motor and control device thereof according to the twenty-fifth, twenty-seventh, twenty-eighth or thirty mode, wherein a length of the entire circumference of the air gap section is Lgcir, and the thickness of the back yoke on the outer circumference is Lgcir/(6×Pn) or more, with the pole logarithm of the motor as Pn.

According to this configuration, even if the field flux is larger than that of a conventional motor, the back yoke section is less magnetically constrained and can generate a large torque.

The disclosure of a thirty-fourth mode provides the induction motor and control device thereof according to the twenty-sixth or thirty mode, wherein the stator winding is arranged opposite the rotor winding through an air gap, and the periphery of the stator winding is composed of nonmagnetic and magnetic materials with an average specific permeability of 100 or less, and the periphery of the rotor winding is composed of materials with an average specific permeability of 100 or less for nonmagnetic and magnetic materials.

The specific permeability around the winding is low, so the current to excite the magnetic flux is large, but the opposite is true: there is no restriction on the magnetic flux density, and large torque can be generated with a large flux density.

The disclosure of a thirty-fifth mode provides an induction motor and control device thereof, characterized in the induction motor and control device thereof comprises:

stator windings SW1, SW2, SW3 . . . SW (N7) to be located in each phase of the circumferential section of the stator in the range of 360° electrical angle, N7 being an integer of 6 or more;

magnetic sections MG1, MG2, MG3 ... MG (N8), which are circumferential sections near the air gap section between the stator and the rotor and are arranged in the range of 360° electrical angle and represent a circumferential width, N8 being an integer of 6 or more;

a plurality of rotor windings RW to be arranged near the surface of the rotor;

a drive circuit DTR that drives the voltage and current of each phase to each of the stator windings;

motor control means MCM, which obtains the current command values, etc. for the stator windings of each phase and drives them with the drive circuit DTR, wherein the motor has a pole pair number greater than or equal to 2, and generating a radial force component on the rotor by generating an attractive force component and a repulsive force component between the stator and the rotor using the circumferential magnetic flux density component Bcir of the air gap generated by the stator current and the rotor current in each range of 360° in circumferential width at an electric angle, and at the same time, it also acts as a motor by generating a rotational torque in the range of 0° to 720° in electrical angle.

This configuration enables a motor that also serves as a magnetic bearing; in particular, the repulsive force between the stator and rotor can also be utilized.

The disclosure of a thirty-sixth mode provides the induction motor and control device thereof according to the first, thirty, thirty-fourth or thirty-fifth mode, wherein the rotor is arranged on a radially outer side, and the stator is arranged on a radially inner side.

According to this configuration, centrifugal forces generated in the rotor windings can be supported by the strong back yoke of the rotor.

The disclosure of a thirty-seventy mode provides the induction motor and control device thereof according to the first, thirty or thirty-fifth mode, wherein the drive circuit DTR is equipped with two power elements that energize each stator winding with positive current and two power elements that energize each stator winding with negative current, and control is performed such that the current energizing each winding so that they are not mutually limited by each other.

According to this configuration, the voltage and current of each phase winding can be controlled without being affected by other phases.

The disclosure of a thirty-eighth mode provides the induction motor and control device thereof according to the first, thirty, or thirty-fifth mode, wherein the drive circuit DTR is equipped with a power element that energizes each stator winding with a positive current, a power element that energizes each stator winding with a negative current, and a power element that energizes each stator winding with a negative current, and a potential holding means is provided to keep the common terminal connecting one end of each stator winding to a potential between the positive and negative sides of the DC power supply, control is performed such that the currents energizing each winding so that they are not mutually limited by each other.

According to this configuration, the number of power elements can be reduced, voltage and current can be freely supplied to each phase winding, and for short periods of time, twice the normal voltage can be applied to each phase winding.

The disclosure of a thirty-ninth mode provides the induction motor and control device thereof according to the first, thirty or thirty-fifth mode, wherein the magnetic flux in the magnetic sections MG1, MG2, MG3 ... is detected or controlled by detecting information related to the magnetic flux.

According to this configuration, the magnetic flux density and flux in each phase can be detected.

The disclosure of a fortieth mode provides the induction motor and control device thereof according to the first, thirty or thirty-fifth mode, wherein the rotor current flowing in each of the rotor windings of the rotor is detected.

According to this configuration, the rotor current in the rotor winding can be detected.

Effect of the Disclosure

The motor and its controller according to the present disclosure finely control the magnetic flux, current, etc. of each phase. This makes it possible to control trapezoidal wave distributions that are similar to square wave distributions. The motor can be made smaller and lighter by improving motor efficiency, especially at low to medium rotation speeds. In particular, the circumferential distribution can be effectively realized by using a multiphase motor configuration such as 5-phase or 7-phase, or a drive circuit configuration. At the same time, the total capacity of the drive circuit can be reduced, enabling its miniaturization and cost reduction. Also, it is possible to maximize the effect of the magnetomotive force generated by the rotor current and the magnetomotive force generated by the stator current canceling each other out. The maximum torque of the motor can be increased by combining the above control with a configuration that reduces the leakage inductance of the rotor winding. The maximum torque is increased by applying a magnetic flux density greater than the saturation flux density of the soft magnetic material to be used.

BRIEF DESCRIPTION OF THE DRAWINGS

FIG. 65 exemplifies a sheet-shaped conductor plate.

FIG. 66 exemplifies rotor windings provided by laminating sheet-shaped conductor plates in a cylindrical form.

DETAILED DESCRIPTION OF THE PREFERRED EMBODIMENTS

Various embodiments derived from a variety of modes according to the present invention will now be described in this disclosure.

Figure 1:
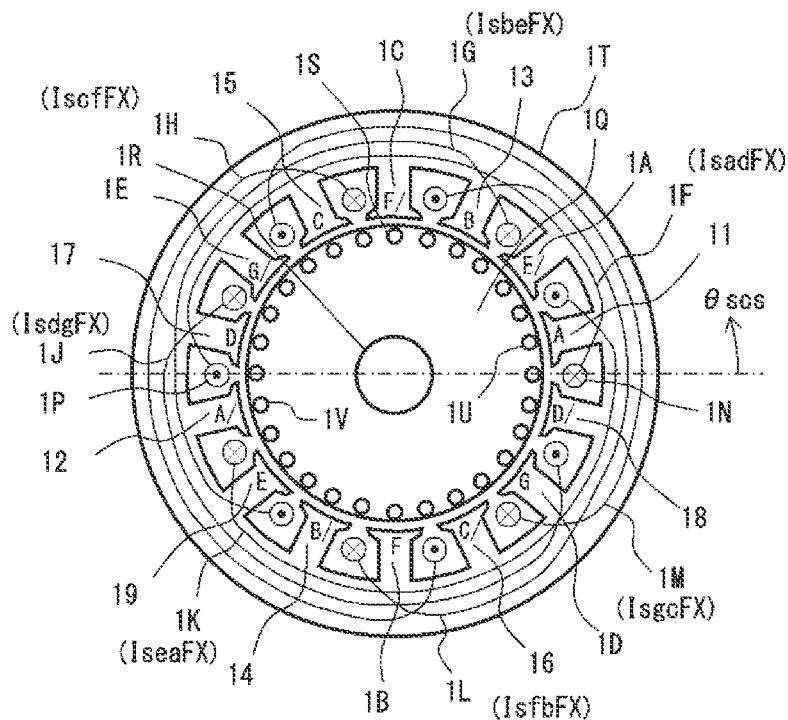
FIG. 1 is a sectional diagram showing a 7-phase induction motor.
Figure 88:
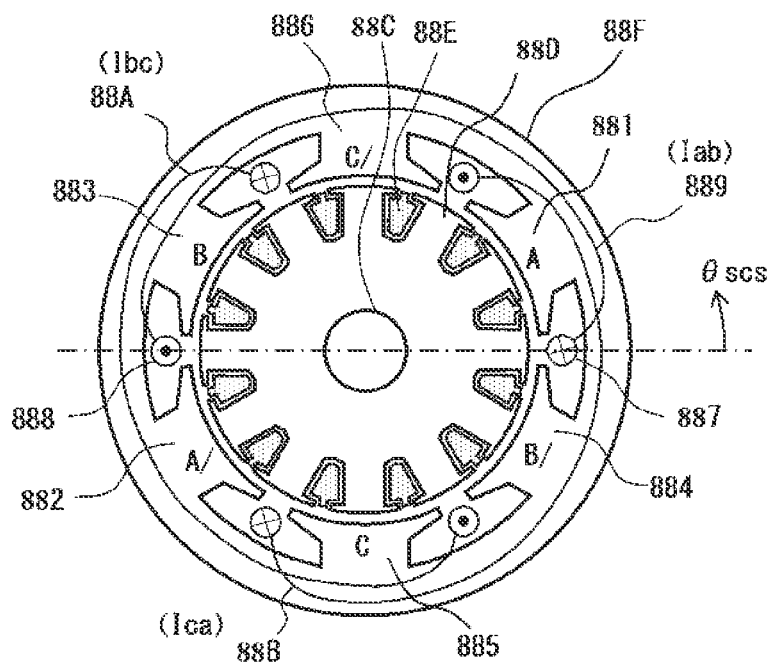
FIG. 88 exemplifies a conventional induction motor.

FIG. 1 shows an example of a cross-sectional view of an induction motor. This motor is a 7-phase, full-pitch winding, concentrated winding, 14-slot, and 2-pole induction motor. 1T is a stator and 1Q is a rotor. 11 is an A2 phase stator pole, 12 is an A/2 phase stator pole. 13 is a B2 phase stator pole, and 14 is a B/2 phase stator pole. 15 is a C2 phase stator pole, and 16 is a C/2 phase stator pole. 17 is a D/2 phase stator pole, and 18 is a D/2 phase stator pole. 19 is an E2 phase stator pole, and 1A is an E/2 phase stator pole. 1B is an F2 phase stator pole and 1C is an F/2 phase stator pole. 1D is a G2 phase stator pole, and 1E is a G/2 phase stator pole. A space between the respective stator poles, i.e., between a space between the stator teeth, constitutes a slot around which each full pitch winding is wound. The external side of each tooth and each slot constitutes a back yoke of the stator. With respect to the names of the parts of the motor, the number of the motor model in FIG. 1 is 2, and the number 2 is added to the end of the name of each phase. The number of the motor model in FIG. 88 is followed by the numeral 1. The phase that differs from the phase A by 180° in electrical angle is designated as the phase A/phase, and the "/" symbol has the meaning of an opposite phase.

Each phase winding is wound in each slot, and each phase winding is indicated by a winding symbol. The directions of the currents are shown by the directions of the winding symbols. 1N is an AD2 phase winding, which passes through its coil end 1F to the AD/2 phase winding shown by 1P, which are wound by full-pitch windings.

The directions of a current Iad in the AD2 phase winding 1N are as shown in the directions of the current symbols. The direction of the current is from the front side of the paper to the back side thereof, while the current direction of the AD/2 phase winding 1P is from the back side of the paper to the front side thereof. The unit of each current is [A]. Similarly, the winding shown by a coil end 1G is a BE2 phase winding. The winding shown by a coil end 1H is a CF2 phase winding, and the energizing current is Icf. The winding shown by coil end 1J is a DG2 phase winding and the energizing current is Idg. The winding shown by a coil end 1K is an EA2 phase winding and the energizing current is Iea. The winding shown by a coil end 1L is a FB2 phase winding and the energizing current is Ifb. The winding shown by a coil end 1M is a GC2 phase winding, and the energizing current is Igc. The number of turns of each full pitch winding is Nws/2 [turns]. The above currents such as Iad is the current energized in each full pitch winding. This current is also the sum of an excitation current component and a rotor current component, which are shown later.

In the rotor 1Q in FIG. 1, the rotor winding RW is located near its outer circumference, and 1S indicates the rotor winding RW in a symbolic way. For example, a rotor winding 1U is opposed to an A2 phase stator pole 11, a rotor winding 1V is opposed to an A/2 phase stator pole 12, so that FIG. 1 shows an example of 28 rotor windings. The number 28 is twice the number of stater slots, which is relatively easy to explain. In practice, the number is chosen to avoid interference with the stator currents and to reduce torque ripples, such as the product of prime numbers. The number of rotor windings is also designed to be as large as possible while considering ease of fabrication. For example, the number of windings can be 30, which corresponds to twice the product of a prime number 3 and a prime number 5, or 33, etc. In addition, to reduce torque ripples, a skew configuration can be adopted in the relative relationship between the stator and rotor windings. The cross-sectional shape of the rotor winding is indicated by a circled symbol, such as 1U and 1V, but in reality, the cross-sectional area of the winding is designed to be large in order to reduce its copper loss.

Figure 52:
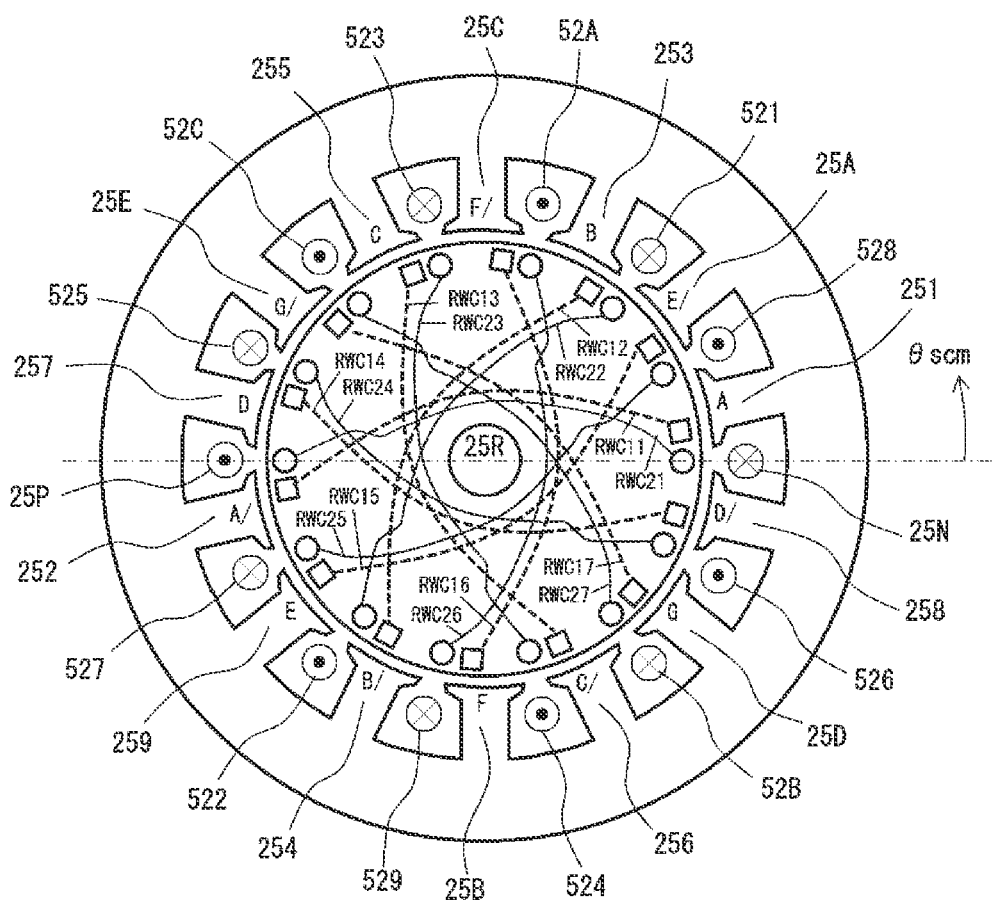
FIG. 52 is a sectional view showing a 7-phase induction motor.

The rotor windings can be constructed using die-cast aluminum for its conductor. It can be configured as a squirrel cage-shaped conductor using copper bars, etc., or as an insulated winding. The aluminum die-cast and squirrel cage configuration is easy to fabricate, but the electrical insulation with the soft magnetic material tends to be imperfect. This causes the problem of unwanted current flow through the soft magnetic body. There is a problem of transverse current, etc. In the present disclosure, as a basic rotor winding configuration, a short-circuited winding with a pitch of 180° of an electrical angle and Nwr/2 [turns] full-pitch windings with short-circuited ends is described. In the case of a two-pole rotor, half the number of full-pitch winding shorts are placed around the circumference of the rotor. FIG. 52, shown below, is an example of seven full-pitch winding rotor windings. In the case of FIG. 1, 14 full-pitch winding wires are arranged on the rotor. The coil ends of the rotor windings are not shown in FIG. 1. A rotor made of die-cast aluminum or a rotor made of squirrel cage conductor can also be used as the rotor of the induction motor.

Figure 4:
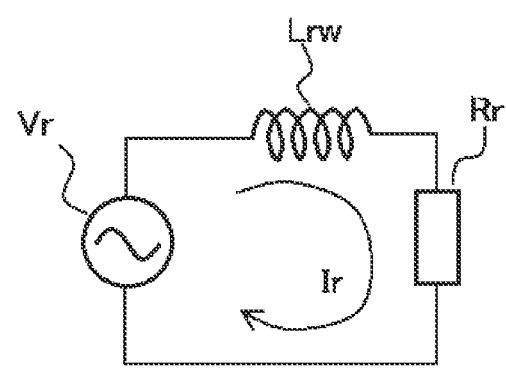
FIG. 4 is an illustration showing an electric circuit model of the rotor windings.

The field flux $\varphi m$ [Wb] created by the stator excitation current component Isf [A] is interlinked to the rotor winding RW, such as 1S. In this interlinkage, because of the slip frequency Fs [Hz], the flux chain number $\psi$ [Wb·turn] of each rotor winding changes in time, resulting in generation of each rotor voltage Vr [V], and at the same time, each rotor current Ir [A] flows. The rotor is modeled as shown in FIG. 4. Each rotor winding RW has a winding resistance Rr [Ω] and a leakage inductance Lrw [H], and a rotor current Ir [A] with an approximate first order delay flows with respect to the rotor voltage Vr flows. As will be explained later, there are supply constraints on the rotor voltage Vr, the characteristics of the delay of the rotor current Ir, and the difficulty of detecting the rotor current, as well as the large temperature coefficient of resistivity of the copper and aluminum wires, which is about 40%/100° C. This complicates the control and drive of induction motors. 1R is a rotor shaft As mentioned above, many motor models, such as shown in FIG. 88 and FIG. 1, are used to illustrate the disclosure. To make it easier to distinguish between these motor models, model numbers 1, 2, 3 . . . , etc. are added at the end of each symbol, such as stator poles and windings, and at the end of each variable, such as each current. For example, the motor in FIG. 88 has model number 1 as described above, and the motor in FIG. 1 has model number 2 as described above.

In the explanation of the disclosure, the current I [A] and voltage V [V] of each winding, the magnetic flux density B [Wb] of an air gap between the stator and rotor, and the strength of the magnetic field [A/m], as shown in the induction motor presented in FIG. 1, are used to explain the control method and other details. It becomes complicated because these variables need to be described for many forms, depending on the control state, components, etc. This section describes how to name these complicated variables and the rules in the specification of the disclosure. In the specification of the disclosure, the difference between upper- and lower-case letters is recognized as different letters, with some exceptions, while the difference between full-width and half-width characters is treated as the same character so that no distinction is made. The sign in each figure is shown in double-byte characters, and each variable is shown in single-byte characters because the number of such variable is often large.

In particular, there are many types of currents that are major control targets. Therefore, they are broadly classified by stator currents or rotor currents. The current content of each phase is broadly divided into an excitation current component and a rotor current component. The types of windings are broadly classified into full-pitch windings or virtual concentrated windings. Coordinates are broadly classified as fixed real-axis coordinates or rotational coordinates. The content and meaning of the current may be a command value, a detected value, a calculated value, an error amount, or etc. A specific example is a symbol of current "IsfbeFXc". In this symbol, "s" refers to a stator current, where if "r" is added, "r" refers to a rotor current. "f" refers to an excitation current component of a field, where "r", if added, otherwise refers to a converted value component of the rotor current. "be" indicates a full-pitch winding current in the phase BE, which shows a variable between phases B and E/. If the above "be" is b, it indicates the phase B. For example, Ib indicates a phase B current of the concentrated winding of the phase B. If the position of "be" or "b" above is n, it refers to each phase current of all phases. "F" indicates that it is the current in a full pitch winding, where "C", if added, otherwise indicates that it is a current a concentrated winding. "X" indicates that it is a fixed coordinate, e.g., the value of the real axis coordinate as shown in the cross-sectional diagram in FIG. 1, where "M", if added, otherwise indicates that it is a rotational coordinate synchronized with the field magnetic flux. The "c" at the end of the name indicates the command value, the "d" at the end of the name indicates that it is a detected value, the "a" at the end of the name indicates that it is a calculated value, and the "e" at the end of the name indicates that it is an error amount. However, if these definitions are less necessary due to the contents of the description, for example, an AD2 phase full-pitch winding current in FIG. 1 is represented as Iad and a hypothetical A2 phase concentrated winding current is represented as Ia, and the unnecessary parts are omitted to simplify the expression.

The rotor current Ir can also be treated as the current in the full pitch winding and the current in the concentrated winding, and an equivalent conversion can be performed. However, since the present disclosure treats it as a full pitch winding current, the expression of the variable names of the rotor current Ir is simpler than those of the stator current. An initial value before solving the voltage equation for the first-order delay is set as Ir1x, and a value solved after a control time Δt has elapsed is set as Ir2x. Furthermore, the estimated rotor current calculated by changing the rotor position by interpolation calculation, etc. to convert to stator current is the expression form of Ir3y.

Figure 5:
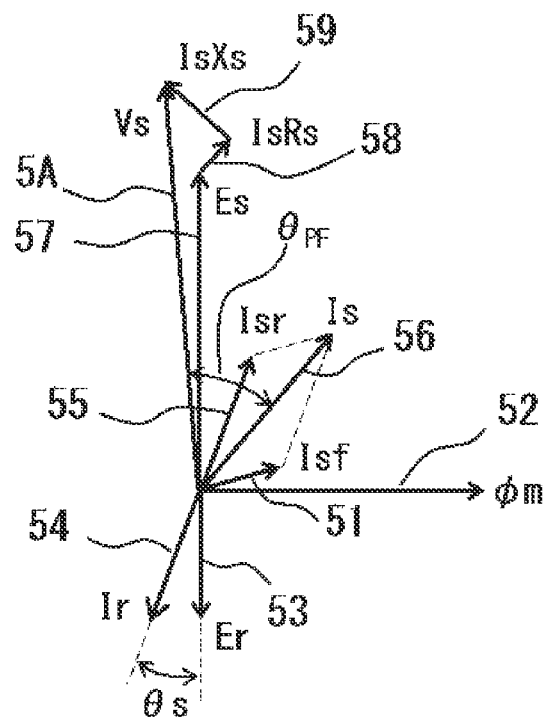
FIG. 5 is an illustration showing vectors according to an induction motor.
Figure 6:
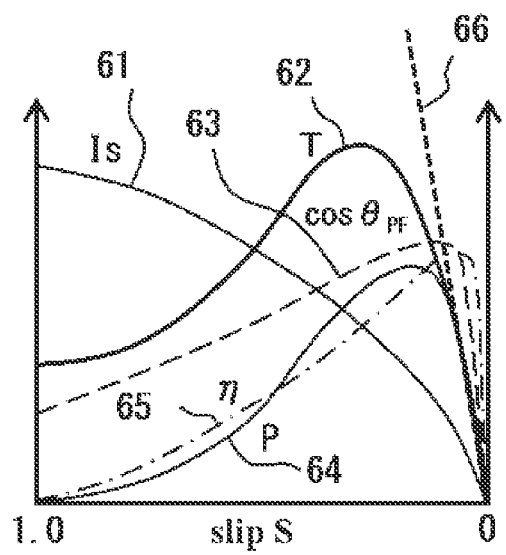
FIG. 6 is an example showing characteristics such as torque, currents, and a power factor of an induction motor.

As stated before, the characteristics of conventional induction motors are shown in FIG. 88 motor configuration, FIG. 5 vector diagram, FIG. 6 example of induction motor characteristics, and furthermore, their basic operations and induction motor problems have been explained. In other words, there are problems of power factor and efficiency reduction, problems of torque reduction due to the need for rotor skew, and problems of magnetic margins due to the need for margins in the properties of magnetic materials constrained by the sinusoidal voltage. In particular, there are problems of low power factor and efficiency and limited maximum torque in the high torque range. The size of the motor is determined by its thermal resistance, which is determined by its efficiency and heat generation in the high torque range. The current capacity of the drive circuit, i.e., the current capacity of the power transistor, is determined by the power factor in the high torque region.

A conventional induction motor drives using inverters can be driven at variable speeds and have constant output control in the high-speed speed range, and are used in many applications. In so-called vector control, the field excitation current component Isf and the torque current component Isr, which is the stator-side component of the rotor current, are separated and controlled, as explained in FIG. 5, and the combined current Is is controlled. Since both current components are controlled on the assumption that they are sinusoidally distributed, vector addition is possible according to sinusoidal AC theory. It features easy arithmetic separation and synthesis of both current components. In actual motor control, control errors in current amplitude and current phase may occur in the composite current Is. In this case, the induction motor operates as if the ratio of Isf and Isr has changed only slightly. Furthermore, in that case, torque fluctuations are small, so the generated torque is considerably insensitive to control errors. In this respect, sinusoidal current control is relatively stable. This is one of the main features of sinusoidal current control.

However, conventional inverter control of induction motors follows the characteristics of 3-phase sinusoidal AC. Therefore, the problems of the aforementioned induction motors remain. In motor applications such as electric vehicles, large torque is required for hill climbing operation, acceleration and deceleration on steep slopes. On the other hand, both the motor and drive circuit must be smaller, lighter, and less expensive. In the motor characteristics in FIG. 6 described above, the torque characteristic 62 must be improved to 66, indicated by the dashed line, and the maximum torque must be increased. improvements in an efficiency η, shown by 65, are also required. The power factor cos(θpf), shown by 63, changes the meaning of the power factor if it is a non-sinusoidal wave, which will be shown later.

This disclosure proposes a motor configuration, control technology, drive circuit, and various detection technologies that enable non-sinusoidal AC and flexible distribution, instead of sinusoidal AC and sinusoidal distribution. Details of the configuration and action will be described below in turn. The purpose of this disclosure is to improve the efficiency near the maximum torque value, to improve the utilization rate of the motor, and to improve the utilization rate of the drive circuit. The purpose also includes increasing the maximum torque. The effect of this disclosure is to reduce the size, weight, and cost of an induction motors, and also to reduce the size, weight, and cost of a drive circuit therefor.

The aforementioned flexible distribution is a trapezoidal wave-shaped magnetic flux density distribution in the circumferential direction, current distribution, etc., and is controlled while optimizing the shape of the distribution according to operating conditions such as rotation speed and torque. One of the flexible distribution shapes is a sinusoidal distribution. The sinusoidal AC has advantages in high-speed rotation and low-noise operation, and can be mixed with conventional control techniques. It is also proposed a control that compensates for the phase delay of the rotor current Ir.

The present disclosure requires several techniques, listed below, to enable non-sinusoidal AC and flexible distribution. A target distribution function is set and stator poles, i.e., discrete distributions divided by the teeth, are controlled by multiphase currents. The target distribution function is controlled by modifying it to an appropriate target distribution function according to the RPM and torque command. The currents in respective multiphases have no relative relationship, can take any value, and can take any discrete value. The stator windings and currents are represented using full pitch windings and full pitch currents, but with virtual concentrated windings and concentrated winding currents. This is because the concentrated windings are easier to express the field magnetic flux for each stator pole. Equivalent conversion of current and equivalent conversion of voltage between full-pitch windings and concentrated windings. The real axis coordinates indicating each fixed stator pole in reality and the rotational coordinates synchronized with the field flux φm referred to MN coordinates are used. Both coordinates shall contain independent, multiphase variables in order to represent a flexible distribution. The real axis coordinates and MN coordinates are coordinate transformed as necessary. Each rotor current is determined using a voltage equation, including a delay of each current. Control is also added to compensate for the delay of each rotor current according to the voltage equation. Voltage feed-forward control is also added. If necessary, current detection, magnetic flux detection, and position detection are performed. Since many equivalent control forms can be realized in the control of induction motors, a representative example will be described. Moreover, recombined examples of each part of the control are possible, and any such examples shall be included in the disclosure. Later, these techniques will be described in turn.

Figure 2:
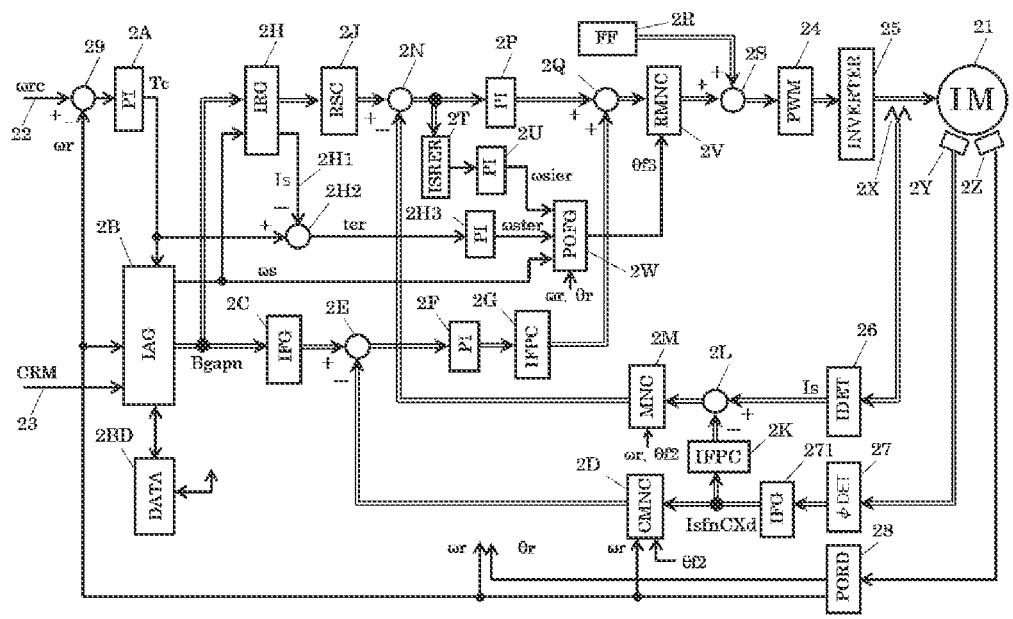
FIG. 2 is a block diagram of control.
Figure 42:
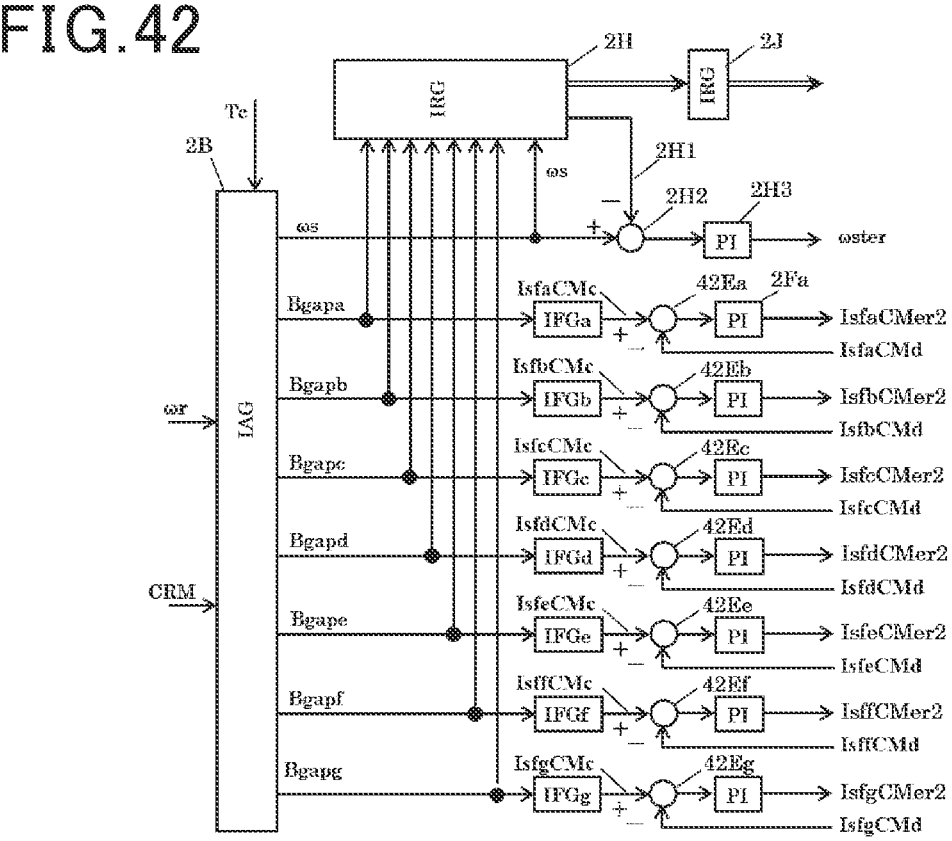
FIG. 42 is a partially detail of the block diagram.

FIG. 2 shows a schematic of the speed control of an induction motor and is an example of a block diagram of the disclosure. In this section, only the overall outline of FIG. 2 will be described in order to explain the individual technologies of the disclosure. The details of the operation of each block in FIG. 2 will be explained sequentially later. The detected value of a rotor angular frequency ωr [rad/sec] is feedback controlled by adder 29 with respect to the angular frequency command ωrc [rad/sec] of a speed command. Furthermore, a torque command Tc is output via a proportional-integral compensator 2A to control the speed of an induction motor 21. The current of the induction motor 21 is controlled by dividing it into a field excitation current component and a rotor current component, which is the torque component, and synthesizing the command components of both currents at a latter stage. A feed-forward component is added to this, pulse width modulated by a PWM controller 24, and voltage and current are supplied to the induction motor 21 by a drive circuit 25 provided with a DC voltage source and power transistors. Of the arrow lines indicating the directions of signal transmission for each variable, a double-line arrow indicates that the variable is a multiphase variable. For example, in the case of a 7-phase motor, the current signals indicated by the double-line arrows contain the current signals for the 7 phases, indicating that the currents in each phase are controlled, respectively, in parallel. FIG. 42 shows the state of control in parallel to each other.

A slightly more specific example of control is to control a field excitation current command component IsfnCMc and a field excitation current detection component IsfnCMd for each phase by feedback control. These signals are the current values of hypothetical concentrated windings in the MN coordinates, which are rotational coordinates. A rotor current command component IsrnFMc and a rotor current detection component IsrnFMd, which are for each phase, are controlled by feedback control. These signals are the current values of full pitch windings and are in the MN coordinates, which are rotational coordinates.

Here, we have described an example in which the current of an induction motor is classified into each current component and controlled separately, as described above. However, there are many possible variants of how to divide, while there are also ways not to divide. The control results are equivalent if each variable is controlled based on either the value of the full pitch windings or the value of the concentrated winding in each part. The control result is equivalent regardless of whether the control is performed with the value of the real axis coordinate, which is a fixed coordinate, or with the value of the MN coordinate, which is a rotational coordinate. They can be converted to each other by the method shown below. Thus, the block diagram in FIG. 2 can be equivalently transformed and applied to many forms.

Figure 3:
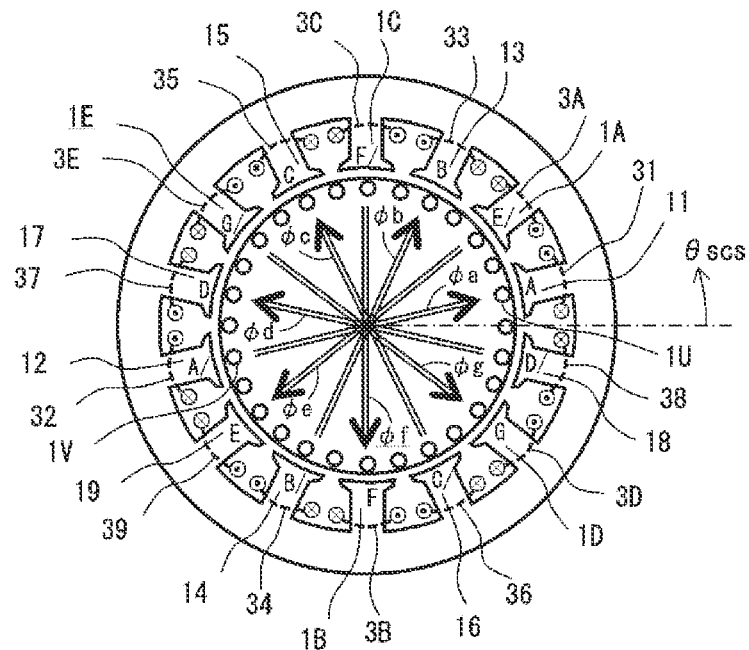
FIG. 3 is a sectional diagram showing a 7-phase concentrated-winding induction motor.

FIG. 3 shows a cross-sectional view of the motor with the full pitch windings of FIG. 1 converted to virtual concentrated winding. The full-pitch winding current flowing in the full-pitch windings is energized to be electromagnetically equivalent to the concentrated winding current in the hypothetical concentrated winding. The concentrated windings 31 and 32 are A2-phase concentrated windings, usually connected in series in opposite directions to carry the A2-phase current Ia. The direction of each current is the direction of the winding symbol in FIG. 3. The number of these turns is Nws/2, and the sum of the turns of the 31 and 32 series windings is Nws[turns]. The winding direction of the winding 32 is the opposite direction of the winding 31, and the aforementioned A2 phase current Ia generates an A2 phase flux component φa [Wb] between the A2 phase stator pole 11 and the A/2 phase stator pole 12 in FIG. 3, shown as double lines with arrows. The flux chain of the concentrated windings 31 and 32 of phase A2 is φa, and the flux chain number is Nws×φa[turn–Wb].

The aforementioned phase A2 current Ia does not excite the flux components of the other phases, there is no electromagnetic interaction with the windings of the other phases, and the mutual inductance between the windings of each phase is zero in a simple model. Then, the relationship between each phase current and the magnetic flux passing through each stator pole is simple, and the virtual concentrated windings and its concentrated windings current are convenient for controlling or expressing the magnetic flux and flux density in induction motors.

Similarly, B2 phase concentrated windings 33 and 34 in FIG. 3 are energized with the B2 phase concentrated winding current Ib to generate a B2 phase flux component φb between a B2 phase stator pole 13 and a B/2 phase stator pole 14. C2 phase concentrated windings 35 and 36 are energized with the C2 phase concentrated winding current Ic to generate a C2 phase flux component φc between a C2 phase stator pole 15 and a C/2 phase stator pole 16. D2 phase concentrated windings 37 and 38 are energized with the D2 phase concentrated winding current Id to generate a D2 phase flux component φd between a D2 phase stator pole 17 and a D/2 phase stator pole 18. E2 phase concentrated windings 39 and 3A are energized with the E2 phase concentrated winding current Ie to generate an E2 phase flux component φe between an E2 phase stator pole 19 and an E/2 phase stator pole 1A. F2 phase concentrated windings 3B and 3C are energized with the F2 phase concentrated winding current If to generate a F2 phase flux component φf between a F2 phase stator pole 1B and a F/2 phase stator pole 1C. G2 phase concentrated windings 3D and 3E are energized with the G2 phase concentrated winding current Ig to generate a G2 phase flux component φg between a G2 phase stator pole 1D and a G/2 phase stator pole 1E.

On the other hand, the relationship between the field excitation current component and the chain flux of each full pitch winding in the induction motor in FIG. 1 above is more complicated than that of each hypothetical concentrated winding in the induction motor in FIG. 3 above. Note that sinusoidal current control using conventional 3-phase AC full pitch windings is widely used in the current market. The full pitch windings have the advantage of a large short-node coefficient of 1.0 and low copper loss in the slot because the winding pitch is 180° at an electric angle, and it is compatible with so-called vector control of sinusoidal waveforms using the rotation coordinates of the dq axis. However, check the action and range of the magnetomotive force of the field excitation current component of the full-pitch windings in FIG. 1 above, and the magnetic flux chained to the full-pitch windings. For example, the current Iad in the AD2 phase winding 1N in FIG. 1 above exerts a magnetomotive force on all stator poles. Since the flux components of all phases are chained to the AD2 phase winding 1N, the However, in the case of control according to the conventional sinusoidal AC theory, each current can be added or subtracted relatively easily by vector addition or subtraction, and the aforementioned problem of complexity can be solved by assuming that the circumferential distribution of magnetomotive force, magnetic flux, etc. is a sinusoidal distribution. In terms of the conventional induction motor and the rotor current component, which is the torque current component of the induction motor in FIG. 1, if the field flux values for each phase are known, the torque is proportional to the product of the rotor current and the flux density of the field flux, which is not difficult to calculate due to the full-pitch winding current. Torque calculation is easier for full-pitch winding current than for the aforementioned short-pitch windings.

In this disclosure, the circumferential magnetic flux distribution is controlled as a trapezoidal waveform shape or other more appropriate distribution shape according to the operating conditions of the motor. Therefore, in order to control the field excitation current component of each stator pole separately for each phase, control by the above-mentioned virtual concentrated winding current of the concentrated winding is preferred because it is easy to understand and feedback control is easy as well. As mentioned above, the full-pitch winding current is easier to control in terms of torque. The block diagram example shown in FIG. 2 whose details will be shown later, is an example in which the field current component is controlled by a virtual concentrated winding current, the torque current component is controlled by a full-pitch winding current, and finally the full-pitch winding current is summed to energize the full-pitch winding a of the induction motor. However, since full-pitch windings and concentrated windings can be selected as appropriate in each part of the control, either is possible, although there is some difficulty in control. The mutual conversion method between the full-pitch winding current and the virtual concentrated winding current is described below. In addition, the method of mutual conversion between the full-pitch winding voltage and the hypothetical concentrated winding voltage is also described below. For example, it is possible to command, detect, calculate, and control most of them with full pitch winding current and voltage.

In order to freely control the circumferential magnetic flux distribution in the circumferential direction of the air gap section, such as trapezoidal wave shape, a larger number of phases of the induction motor is preferable for greater flexibility. The magnetic flux in the air gap section is magnetically regulated and discretized to the circumferential width of each phase stator pole. In the case of concentrated windings, which means full pitch windings and not distributed windings, the angle (360°/(number of phases×2)) is the circumferential resolution. Since there is some confusion in the interpretation of the positive and reverse phases in counting the number of phases, we will later show and explain the concept in the present disclosure in each phase vector in FIG. 81.

For 2-phase, the circumferential resolution is as large as 90° at an electrical angle, making it difficult to draw a trapezoidal corrugated distribution over a width of 180°. In the case of 3-phase, the number of stator poles is 6, and the circumferential resolution is 60° in electric angle, which is a marginal resolution, although it is not impossible to draw a trapezoidal waveform distribution over a width of 180°. The error component with respect to the ideal distribution shape is high. For 4-phase, the number of stator poles is 8 and the circumferential resolution is 45° in electrical angle, allowing 4 elements in a 180° width. On the other hand, if the trapezoidal waveform shape is roughly drawn with an increasing part, a constant part, and a decreasing part with four elements, for example, the error component relative to the ideal distribution shape decreases rapidly. Furthermore, the greater the number of phases, the more precisely they can be controlled, and in particular, prime number phases such as 5-, 7-, and 11-phase are highly effective in canceling out harmonic components that cause torque ripple and other problems. That is, it has the effect of canceling out unwanted harmonic components of magnetic flux and voltage in all circumference, which is very desirable. However, the number of stator poles increases to more than 10.

The example shows an induction motor in FIG. 1 and a 7-phase example in the block diagram in FIG. 2. The 5-phases are explained in FIGS. 43 and 44, etc. and in the respective equations. In order to freely control the magnetic flux distribution in each phase, the control becomes more complex. The greater the number of phases, the greater the computational complexity of the control. However, recent advances in the speed and integration of microprocessors, memory, and other components have eliminated control time problems, control circuit size problems, and cost problems.

Next, the relationship between the full-pitch winding current of the full-pitch windings and the concentrated winding current of the concentrated windings and the mutual conversion equation are explained. The induction motors shown in FIGS. 1 and 3 are point symmetrical in structure with respect to the motor center, and the values of the current-carrying currents of the windings at the point symmetrical positions are negative values of each other. Then, as shown in the figure, the configuration is evenly distributed in the circumferential direction. In such a regular motor configuration, each current and voltage value can be shown by a relatively simple relational expression.

The relationship between each phase current Iad, Ibe, Icf, Idg, Iea, Ifb, and Igc of the full pitch windings in FIG. 1 and each phase current Ia, Ib, Ic, Id, Ie, If, and Ig of the above hypothetical concentrated windings in FIG. 3 can be expressed by the following formula based on the relationship between the currents in each slot. This is a conversion equation from concentrated winding current to full-pitch winding current.

$$Iad = Ia + Id \quad (1)$$

$$Ibe = Ib + Ie \quad (2)$$

$$Icf = Ic + If \quad (3)$$

$$Idg = Id + Ig \quad (4)$$

$$Iea = Ie + Ia \quad (5)$$

$$Ifb = If + Ib \quad (6)$$

$$Igc = Ig + Ic \quad (7)$$

For example, the state in which only the phase A2 current Ia, which is the concentrated winding current, is energized to phase A2 winding 31 and 32 in FIG. 3, energizes Ia to the phase AD2 current Iad in equation (1), which is the full-pitch winding current in FIG. 1. It is electromagnetically equivalent to the state in which Ia is energized to the phase EA2 current Iea in equation (5). In both states, the shape of the coil end is different, but in principle, the current at the coil end has a very small effect on the operation in the motor because of the large magnetic resistance of the surrounding space, so it is ignored. The number of turns of each winding is Nws/2 in any case. The means of performing these current conversions is called a full-pitch winding converter IFPC.

Next, each phase current Ia, Ib, Ic, Id, Ie, If, and Ig of the above hypothetical concentrated windings in FIG. 3 is shown below with each phase current Iad, Ibe, Icf, Idg, Iea, Ifb, and Igc of the above full-pitch windings in FIG. 1. For example, consider the phase A2 magnetomotive force Qa [A·turn] that produces the phase A2 magnetic flux φa [Wb] generated between the phase A2 stator pole 11 and the phase A/2 stator pole 12 in FIG. 3 to be balanced. Positive and negative polarity can be selected from the winding arrangement relationship between FIG. 1 and FIG. 3 for the direction in which the magnetomotive force acts. The currents are shown in brackets near the windings in FIG. 1 for ease of understanding.

$$Qa = (Iad - Ibe - Icf - Idg + Iea + Ifb + Igc) \cdot Nws/2 = Ia \cdot Nws \quad (8)$$

$$Qb = (Iad + Ibe - Icf - Idg - Iea + Ifb + Igc) \cdot Nws/2 = Ib \cdot Nws \quad (9)$$

$$Qc = (Iad + Ibe + Icf - Idg - Iea - Ifb + Igc) \cdot Nws/2 = Ic \cdot Nws \quad (10)$$

$$Qd = (Iad + Ibe + Icf + Idg - Iea - Ifb - Igc) \cdot Nws/2 = Id \cdot Nws \quad (11)$$

$$Qe = (-Iad + Ibe + Icf + Idg + Iea - Ifb - Igc) \cdot Nws/2 = Ie \cdot Nws \quad (12)$$

$$Qf = (-Iad - Ibe + Icf + Idg + Iea + Ifb - Igc) \cdot Nws/2 = If \cdot Nws \quad (13)$$

$$Qg = (-Iad - Ibe - Icf + Idg + Iea + Ifb + Igc) \cdot Nws/2 = Ig \cdot Nws \quad (14)$$

As mentioned above, in equation (8), the phase A2 flux φa [Wb] in FIG. 3 is excited by the phase A2 current Ia that energizes the virtual concentrated windings 31 and 32. 31 and 32 are connected in series, the total number of turns is Nws, and the phase A2 magnetomotive force Qa is Ia·Nws [A·turn]. The currents in the other concentrated winding windings do not generate a magnetomotive force in the direction of the phase A2 flux φa. In addition, it can be said to follow Ampere's law of integration around the circumference, which is not contrary to it.

The aforementioned phase A2 magnetomotive force Qa [A·turn] needs to be supplemented. Equations (1) and (14) describe the current in the stator winding, but the induction motor is also energized by the rotor current. Therefore, the magnetic flux generated inside the induction motor is the magnetomotive force [A·turn] of each part, which is the sum of the magnetomotive forces of all currents [A·turn], which generates magnetic flux in each part. More specifically, the rotor current Ir of the induction motor and the stator-side rotor current component Isr are controlled so that the magnitude of the current [A·turn] is the same and the direction of the current is opposite. Therefore, the total magnetomotive force [A·turn] of both Ir and Isr currents is controlled to be zero, and the excitation current component Isf on the stator side excites the field flux φm. For example, said phase A2 flux φa is not generated in proportion to said phase A2 magnetomotive force Qa [A·turn]. The above equations (1) and (14) are simply equivalent conversions of both currents so that the magnetomotive force generated by the full-pitch winding current and the magnetomotive force generated by the concentrated winding current are electromagnetically equal, and are not related to the size of the field flux φm or other factors.

Next, in the case of full pitch windings shown in FIG. 1, the current in each winding is related to the phase A2 magnetomotive force Qa [A·turn]. This equation (8) is explained as compare with FIG. 3. The AD2 phase current Iad in a AD2 phase winding 1F provides a magnetomotive force Iad·Nws/2[A·turn] to the magnetic circuit of the A2 phase flux φa [Wb] from the A2/phase stator pole 12 to the A2 phase stator pole 11. The number of turns of the AD2 phase winding 1F is Nws/2 [turns]. Similarly, the BE2 phase current Ibe in a BE2 phase winding 1G gives a magnetomotive force Ibe-Nws/2[A·turn] to the magnetic circuit of the A2 phase magnetic flux φa [Wb] from the A/2 phase stator pole 12 to the A2 phase stator pole 11, but its magnetomotive force direction is opposite, so the positive and negative signs are negative. Similarly, the CF2 phase current Icf in a CF2 phase winding 1H has a negative positive sign because its magnetomotive force direction is opposite. The DG2 phase current Idg in a DG2 phase winding 1J has a negative positive sign because its magnetomotive force direction is opposite. The EA2 phase current Iea in a EA2 phase winding 1K has a positive negative sign because its magnetomotive force direction is in the same direction. The FB2 phase current Ifb in a FB2 phase winding 1L has a positive negative sign because its magnetomotive force direction is in the same direction. The GC2 phase current Igc in a GC2 phase winding 1M has a positive negative sign because its magnetomotive force direction is in the same direction. As shown above, equation (8) is the sum of the magnetomotive forces of all full-pitch winding currents, which is equal to the magnetomotive force of the A2 phase current Ia energizing the hypothetical concentrated windings 31 and 32 of phase A2 in FIG. 3.

For equations (9) to (14) for each phase after phase B2, the positive and negative signs can be similarly determined in the direction of the magnetomotive force for each full-pitch winding current to obtain an electromagnetically equivalent relationship. Then, equations (8) through (14) are rewritten to become equations (15) through (21) below. This is a conversion equation from a full-pitch winding current to a virtual concentrated winding current.

$$Ia=(Iad-Ibe-Icf-Idg+Iea+Ifb+Igc)/2 \quad (15)$$

$$Ib=(Iad+Ibe-Icf-Idg-Iea+Ifb+Igc)/2 \quad (16)$$

$$Ic=(Iad+Ibe+Icf-Idg-Iea-Ifb+Igc)/2 \quad (17)$$

$$Id=(Iad+Ibe+Icf+Idg-Iea-Ifb-Igc)/2 \quad (18)$$

$$Ie=(-Iad+Ibe+Icf+Idg+Iea-Ifb-Igc)/2 \quad (19)$$

$$If=(-Iad-Ibe+Icf+Idg+Iea+Ifb-Igc)/2 \quad (20)$$

$$Ig=(-Iad-Ibe-Icf+Idg+Iea+Ifb+Igc)/2 \quad (21)$$

These equations are valid for any current value, even for sinusoidal waveforms. The means of performing these current conversions is called a concentrated winding converter IRFPC.

Next, the relationship between the voltage of the full pitch windings in FIG. 1 and the voltage of the hypothetical concentrated windings in FIG. 3, and their interconversion equations are explained. The voltage names of the full pitch windings in FIG. 1 are as follows, respectively; Vad for the voltage in the AD2 phase winding at coil end 1F, Vbe for the BE2 phase winding at coil end 1G, Vcf for the voltage of the CF2 phase winding at coil end 1H, Vdg for the voltage of the DG2 phase winding at coil end 1J, Vea for the voltage of the EA2 phase winding at coil end 1K, Vfb for the voltage of the FB2 phase winding at coil end 1L, and Vgc for the voltage of the GC2 phase winding at coil end 1M. The number of turns of each winding is Nws/2 [turns]. The direction of the voltage is the direction of the winding symbol in FIG. 1.

The voltage of the hypothetical concentrated windings in FIG. 3 is Va, which is the voltage of the A2 phase windings 31 and 32, connected in series in opposite directions so that the current and voltage directions are in the same direction. The sum of the number of turns with 31 and 32 is Nws[turn]. The direction of the voltage is the direction of the winding symbol in FIG. 3. Similarly, the voltage at 33 and 34 in the B2 phase winding is Vb, the voltage at 35 and 36 in the C2 phase winding is Vc, the voltage at 37 and 38 in the D2 phase winding is Vd, the voltage at 39 and 3A in the E2 phase winding is Ve, the voltage at 3B and 3C in the F2 phase winding is Vf, and the voltage at 3D and 3E in the G2 phase winding is Vg.

The voltage at full pitch windings in FIG. 1 can be obtained from Faraday's law of electromagnetic induction as the product of the number of turns Nws/2 and the time rate of change of the chain flux, which is the following formula as compare with each flux component in FIG. 3.

$$Vad=Nws/2 \cdot d(\varphi a+\varphi b+\varphi c+\varphi d-\varphi e-\varphi f-\varphi g)/dt \quad (22)$$

$$Vbe=Nws/2 \cdot d(-\varphi a+\varphi b+\varphi c+\varphi d+\varphi e-\varphi f-\varphi g)/dt \quad (23)$$

$$Vcf=Nws/2 \cdot d(-\varphi a-\varphi b+\varphi c+\varphi d+\varphi e+\varphi f-\varphi g)/dt \quad (24)$$

$$Vdg=Nws/2 \cdot d(-\varphi a-\varphi b-\varphi c+\varphi d+\varphi e+\varphi f+\varphi g)/dt \quad (25)$$

$$Vea=Nws/2 \cdot d(\varphi a-\varphi b-\varphi c-\varphi d+\varphi e+\varphi f+\varphi g)/dt \quad (26)$$

$$Vfb=Nws/2 \cdot d(\varphi a+\varphi b-\varphi c-\varphi d-\varphi e+\varphi f+\varphi g)/dt \quad (27)$$

$$Vgc=Nws/2 \cdot d(\varphi a+\varphi b+\varphi c\varphi e-\varphi f+\varphi g)/dt \quad (28)$$

Each voltage of the hypothetical concentrated windings in FIG. 3 is obtained as the product of the number of turns Nws and the time rate of change of the chain flux, and is expressed as follows. Then, substituting equations (22) to (28), we can obtain the conversion equation from the full-pitch winding voltage to the hypothetical concentrated winding voltage.

$$Va=Nws \cdot d\varphi a/dt=Vad+Vea \quad (29)$$

$$Vb=Nws \cdot d\varphi b/dt=Vbe+Vfb \quad (30)$$

$$Vc=Nws \cdot d\varphi c/dt=Vcf+Vgc \quad (31)$$

$$Vd=Nws \cdot d\varphi d/dt=Vdg+Vad \quad (32)$$

$$Ve=Nws \cdot d\varphi e/dt=Vea+Vbe \quad (33)$$

$$Vf=Nws \cdot d\varphi f/dt=Vfb+Vcf \quad (34)$$

$$Vg=Nws \cdot d\varphi g/dt=Vgc+Vdg \quad (35)$$

Equations (22) to (28) can be obtained as conversion equations from virtual concentrated winding voltage to full-pitch winding voltage by replacing them with virtual concentrated winding voltage.

$$Vad=(Va+Vb+Vc+Vd-Ve-Vf-Vg)/2 \quad (36)$$

$$Vbe=(-Va+Vb+Vc+Vd+Ve-Vf-Vg)/2 \quad (37)$$

$$Vcf=(-Va-Vb+Vc+Vd+Ve+Vf-Vg)/2 \quad (38)$$

$$Vdg=(-Va-Vb-Vc+Vd+Ve+Vf+Vg)/2 \quad (39)$$

$$Vea=(Va-Vb-Vc-Vd+Ve+Vf+Vg)/2 \quad (40)$$

$$Vfb=(Va+Vb-Vc-Vd-Ve+Vf+Vg)/2 \quad (41)$$

$$Vgc=(Va+Vb+Vc-Vd-Ve-Vf+Vg)/2 \quad (42)$$

As described above, the full pitch windings and the hypothetical concentrated windings can be converted to and from each other, and the induction motor can be controlled in a more easily controllable manner, as shown in the block diagram in FIG. 2. In the present disclosure, the field excitation current component Isf of the induction motor stator and the rotor current component Isr of the stator are separately controlled, and a full-pitch winding current and a virtual concentrated winding current can be selected and controlled for each. Others include the rotor current Ir, and the rotor current Ir is treated as a full-pitch winding current, but it can also be treated and controlled as a concentrated winding current by considering a virtual concentrated winding in the rotor.

Figure 7:
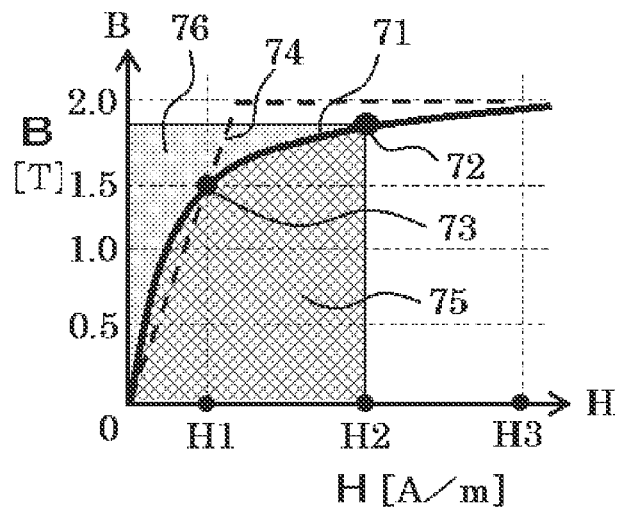
FIG. 7 is a characteristic showing a strength and a magnetic flux density of a magnetic field.

Next, the magnetic properties of soft magnetic materials used in induction motors, such as those shown in FIG. 1, are described. These are the excitation characteristics of the electromagnetic steel plates that make up the teeth and back yoke of the stator rotor. An example of its magnetic properties is shown in FIG. 7, 71 with the horizontal axis as the magnetic field strength H [A/m] and the vertical axis as the magnetic flux density B [T]. For silicon steel sheets, the characteristic of the specific magnetic permeability μj usually decreases as the magnetic flux density B approaches 2.0 [T]. The example of characteristic 71 is the operating point of an electromagnetic steel plate with a magnetic flux density of 1.5 [T], a magnetic field strength H1 of 800 [A/m], and a specific permeability μj of 1500 at the operating point 73. The vacuum permeability $\mu_0$ is 4n/10,000,000.

In the one-pole pair with two poles stator configuration shown in FIG. 1, the magnetic path length of the back yoke through which the magnetic flux of each phase passes is half the circumference of the stator, and because it is longer, its magnetic resistance is also larger. FIG. 1 shows a 2-pole, 1-pole pair configuration for ease of explanation, but in a practical motor design such as 50 kW, it is expected to have multiple poles, such as 8-pole and 4-pole pairs, and the back yoke length will be reduced to ¼ of the original length. Now, under that assumption, assume that the magnetic path length Ltb of one round of phase A2 flux φ2 passing through the A2 phase stator pole 11 and the A/2 phase stator pole 12 is 0.2 [m]. Assuming that the air gap length Lgap is 0.0005 [m], let us consider the magnetomotive force [A-turn] to excite the magnet to 1.5 [T] at the operating point 73 in FIG. 7. Assuming the magnetomotive force Qtb in the electromagnetic steel section and the magnetomotive force Qgap in the air gap section, the following equations are obtained.

$$Qtb = H1 \times Ltb = 800 \times 0.2 = 160 [A \cdot \text{turn}] \quad (43)$$

$$Qgap = \quad (44)$$
$$B/\mu_0 \times Lgap \times 2 = 1.5/(4n/10{,}000{,}000) \times 0.0005 \times 2 = 1193 [A \cdot \text{turn}]$$

In this operating point example, the magnetomotive force Qtb of the electromagnetic steel section is 160 [A-turn] and the magnetomotive force Qgap of the air gap section, 1193 [A-turn], is larger and more dominant.
In the commercialized motor, the magnetic path length is shortened by multipolarization, and the width of the back yoke section is increased to provide more space. This allows the magnetic resistance of the back yoke section to be relatively negligible compared to the magnetic resistance of the air gap section, according to rough calculations The description of this disclosure assumes nonlinear, real magnetic properties as shown in FIG. 7. However, in the explanation of the areas where the nonlinearity is not so important, it is explained as if it were the simplified linear magnetic characteristic 74 shown by the dashed line in FIG. 7. Also, as shown in equations (43) and (44), it is explained as if the magnetic resistance in the air gap area is dominant. In many cases, it is possible to think in terms of a simplified motor model, where the motor excitation current component and the magnetic flux density in the air gap section are proportional, and then compensate later in the actual control. The area of 76 in the upper left corner of FIG. 7 shows the magnetic energy per unit volume [J], which acts as reactive power and comes and goes between the DC power supply voltage Vpw and the induction motor during control, synchronized with the field excitation. The area of the 75 regions in the lower right of FIG. 7 is referred to as the coenergy, or associated energy.

Next, the circumferential target distribution function Dist1 of the air gap section magnetic flux density and the discrete distribution function Dist2, which is discretized to discrete values constrained by the tooth widths of the teeth, the stator poles, are explained. The target distribution function Dist1 used in this disclosure is the ideal circumferential distribution function targeted by the control. The target distribution function Dist1 of the magnetic flux density is defined as the circumferential angle of the center of the field flux φm in the cross-sectional view of the induction motor, e.g., in FIG. 1, with the origin on the right side of the paper and the circumferential angle of the center of the field flux φm in the direction θscs=0. The discrete distribution function Dist2 is a circumferentially discrete distribution function constrained by the stator tooth width. It also shows the radial magnetic flux density in the air gap section near each tooth, which is a controllable flux distribution that can in principle be realized and controlled by the current in each slot. The value of the magnetic flux density for each part of the discrete distribution function Dist2 is the value of the magnetic flux density representative of that tooth, such as the average magnetic flux density for that tooth, or the value of the target distribution function Dist1 for the stator rotation angle position θcs in the middle of that tooth.

In this disclosure, the appropriate discrete distribution function Dist2 value is calculated and transformed each time according to the control state such as rotational position and rotational speed to be close to the target distribution function Dist1. This conversion makes it possible to control the current and voltage of each phase in reality. One of the features of this disclosure is to control the magnetic flux density distribution in the circumferential direction of the induction motor as a more appropriate distribution shape through flexible multiphase control, as described above. As a result, induction motors achieve higher efficiency and maximum torque. In order to achieve a flexible magnetic flux density distribution shape, it is preferable for the induction motor to be more multiphase, and an example of a 7-phase induction motor is shown in FIG. 1 from this perspective.

Figure 8:
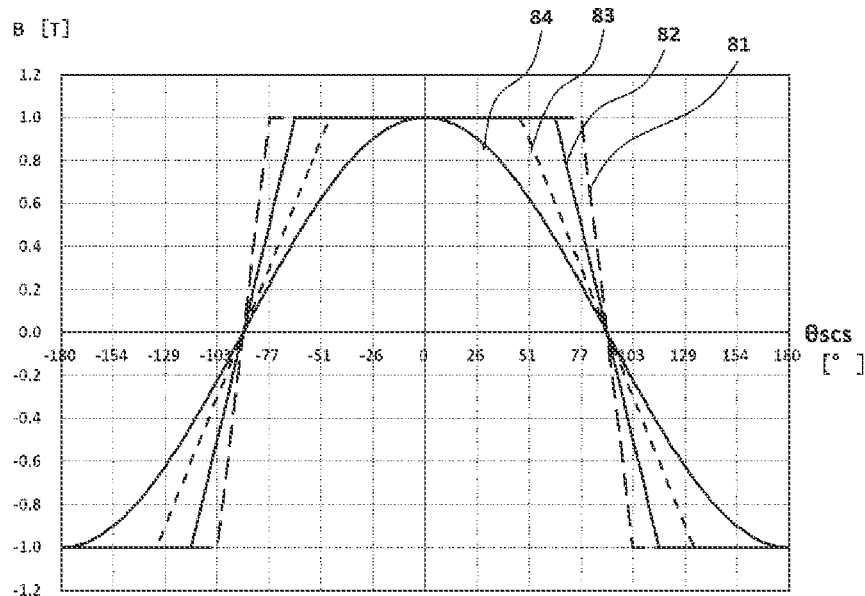
FIG. 8 is an example showing a target distribution function Dist1 of the magnetic flux density.
Figure 41:
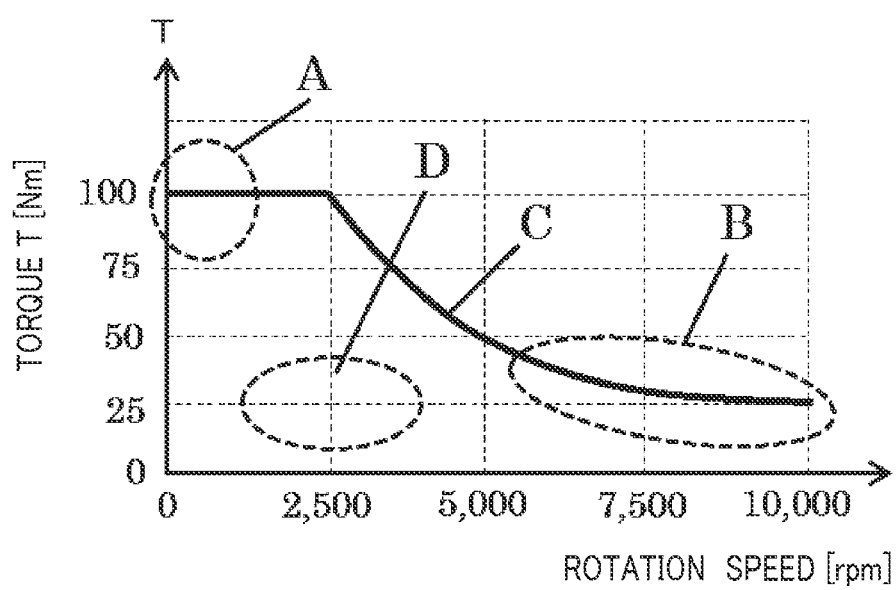
FIG. 41 exemplifies a characteristic showing the number of rotations and torque of a motor.

One of the objectives of the present disclosure is to reduce the size and cost of induction motors and their drive circuits. 81, 82, 83, and 84 in FIG. 8 show examples of the target distribution function Dist1, which shows the magnetic flux density distribution in the air gap section near each tooth. 81, 82, and 83 are all trapezoidal waveforms, but the slope of the change section is different. 84 is sinusoidal waveform shape. If the changing portion of the trapezoidal waveform shape is made steeper, it approaches a square wave. Here, we consider the characteristics of the generated torque and rotor copper loss in the case where the magnetic flux density distribution of the induction motor is assumed to be a square wave distribution and the rotor current distribution is also synchronously a square wave distribution. Compared to a sinusoidal rotor current distribution with a sinusoidal magnetic flux density distribution, simply assuming the amplitude is the same, the square wave shape doubles the torque and doubles the rotor copper loss. For comparison, if the sinusoidal current is doubled to double the torque, its rotor copper loss is quadrupled. As a result of this relative comparison, if the magnetic flux density and current have the same amplitude, the square wave has twice the torque compared to the sine wave. In the copper loss comparison for the same torque, the square wave has ½ the relative copper loss. Therefore, the result of the comparison under these conditions shows that the square wave drive can increase the efficiency of the induction motor and halve the current capacity of the drive circuit. Then, the induction motor and drive circuit can be made lower cost, smaller, and lighter. Note that driving an induction motor with a current close to a square wave can only be achieved at very low speeds, and there are various other drive limitations. Some examples of drive conditions are described below. Also shown later in FIG. 41 are examples of motor output characteristics and applications.

An example of the specific shape of the target distribution function Dist1 is a trapezoidal waveform as shown in 82 in FIG. 8. 82 shows, for example, the radial magnetic flux density distribution [T] in the air gap section of the induction motor in FIG. 1, where the maximum flux density on the vertical axis is 1.0 [T]. The horizontal axis in FIG. 8 is the circumferential angle θcs, from −180° to −90°, 0°, 90°, 180° and all 360°. In FIG. 1, θcs=−180° is the left end of the air gap section, −90° is the bottom of the paper, 0° is the right end of the paper, 90° is the top of the paper, and 180° is the left end. 84 in FIG. 8 is an example of the characteristics of the target distribution function Dist1 when the magnetic flux density is a sinusoidal distribution. If the maximum flux density in FIG. 8 is 1.0 [T], the maximum flux density of the teeth approaches 2.0 [T], the maximum flux density of the electromagnetic steel sheet, because slot space is required.

The trapezoidal waveform shape of the target distribution function Dist1 in FIG. 8 can be a trapezoidal shape with a tight slope, as shown in FIG. 8.81, because when the induction motor is in the low-speed rotation region, there is a time margin between the increase and decrease of the excitation current that excites the field magnetic flux φm. Conversely, at high rotational speeds, the shape should be a trapezoidal shape with a gentle slope, as shown in FIG. 8.83. Then, at higher rotational speeds, the waveform becomes sinusoidal, as shown in FIG. 8 at 84. In areas such as constant output control at high speed rotation, where field weakening is performed, the amplitude of the magnetic flux density is controlled by decreasing it. At this time, the frequency of the excitation current Isf that excites the field flux φm increases and its amplitude decreases.

These target distribution functions Dist1 in FIG. 8 have a part that varies continuously in the circumferential direction, and it is difficult to realize such a flux distribution shape in an ordinary induction motor. For example, ideally, the tooth width should be extremely small and the number of phases should be increased to wind each phase winding into many individual slots. The currents for many phases must be created and energized, which complicates the drive circuit. Therefore, in reality, the motor and drive circuit have a limited number of phases, so a discrete-valued discrete distribution function Dist2 is created as a command value according to control conditions and states, and control is performed accordingly. The target distribution function Dist1 is the basis for the discrete distribution function Dist2, which is the original function before discretization.

Figure 9:
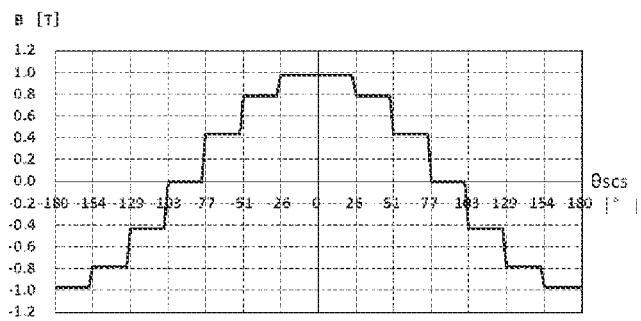
FIG. 9 is an example showing a discrete distribution function Dist2 of a sinusoidal magnetic flux density.

Next, an example of the discrete distribution function Dist2 is shown and explained. FIG. 9 shows an example of radial magnetic flux density in the air gap section of each tooth, the 14 stator poles in FIG. 1, for the sinusoidal target distribution function Dist1 shown in FIG. 8 at 84. The vertical and horizontal axes in FIG. 9 are the same as in FIG. 8. This is an example where the magnetic flux passing through each tooth is discrete and the magnetic flux density is uniform within the width of each tooth. The sinusoidal excitation current component of the seven phases in each slot results in such a staircase-like magnetic flux distribution. The stator rotation angle position θcs in FIG. 9 from 0° to 360°/14=25.7° is the magnetic flux density Ba of A2 phase stator pole 11 in FIG. 1. Similarly, θcs from 51.4° to 77.1° is the magnetic flux density Bb of the B2 phase stator pole 13, θcs from 102.9° to 128.6° is the magnetic flux density Bc of the C2 phase stator pole 15, θcs from 154.3° to 167.1° is the magnetic flux density Bd of the D2 phase stator pole 17, θcs from 205.7° to 218.6° is the magnetic flux density Be of the E2 phase stator pole 19, θcs from 257.1° to 270.0° is the magnetic flux density Bf of the F2 phase stator pole 1B, and θcs from 308.6° to 321.4° is the magnetic flux density Bg of the G2 phase stator pole 1D. Then, as mentioned above, the magnetic flux density of the opposite stator poles at 180° ahead is negative with the same magnitude. For example, the magnetic flux density of the A/2 phase stator pole 12 is −Ba.

Note that when the induction motor is controlled by conventional 3-phase sinusoidal AC, the number of teeth is 6 during an electrical angle of 360°, and the staircase distribution is more than twice as coarse as in FIG. 9. However, if the rotation is at some high speed, the magnetic flux density of each tooth changes as the field magnet rotates, acting in an averaged manner to produce an effect similar to a sinusoidal distribution, and is used in practical applications as a control for sinusoidal voltage and sinusoidal current. The same effect is then obtained in the control of the staircase-shaped magnetic flux density distribution in FIG. 9 for the motor in FIG. 1, which acts averagely during rotation and operates close to sinusoidal voltage and sinusoidal current during rotation.

Next, an example of the relationship between the magnetic flux distribution in FIG. 9 and the energized state in FIG. 1 is described. Let us assume that the rotor is fixed so that it does not rotate, the slip frequency Fs of the field flux is 5 [Hz], and the slip angular frequency ωs=31.416 [rad/sec]. Simplify the motor model by assuming that the magnetic resistance of the electromagnetic steel sheet section is zero, and the air gap length Lgap is 0.5 [mm], the circumferential opening width of the slot opening is 0 [mm], and the field flux component φm at the air gap is assumed to pass in the radial direction. The following seven-phase sinusoidal excitation current components of the following equation are energized to the 7 full pitch windings that excite the 14 stator poles in FIG. 1. It corresponds to the full-pitch winding current in equations (1) through (7). The variable names of the currents shall be added with the aforementioned signs so that their prime characteristics can be recognized. For example, IsfadFX, where sf represents the excitation current component of the stator current, ad represents the AD phase, F represents full-pitch windings, and X is the value of the real axis coordinate shown below. The 2 in AD2 phase is used as a symbol for the motor model, and the motor model symbol is not included in each variable name.

$$IsfadFX = Io \cdot \sin(\omega t) \tag{45}$$

$$IsfbeFX = Io \cdot \sin(\omega t - 2 \times 360°/7) \tag{46}$$

$$IsfcfFX = Io \cdot \sin(\omega t - 2 \times 360°/7) \tag{47}$$

$$IsfdgFX = Io \cdot \sin(\omega t - 3 \times 360°/7) \tag{48}$$

$$IsfeaFX = Io \cdot \sin(\omega t - 4 \times 360°/7) \tag{49}$$

$$IsffbFX = Io \cdot \sin(\omega t - 5 \times 360°/7) \tag{50}$$

$$IsfgcFX = Io \cdot \sin(\omega t - 6 \times 360°/7) \tag{51}$$

Figure 10:
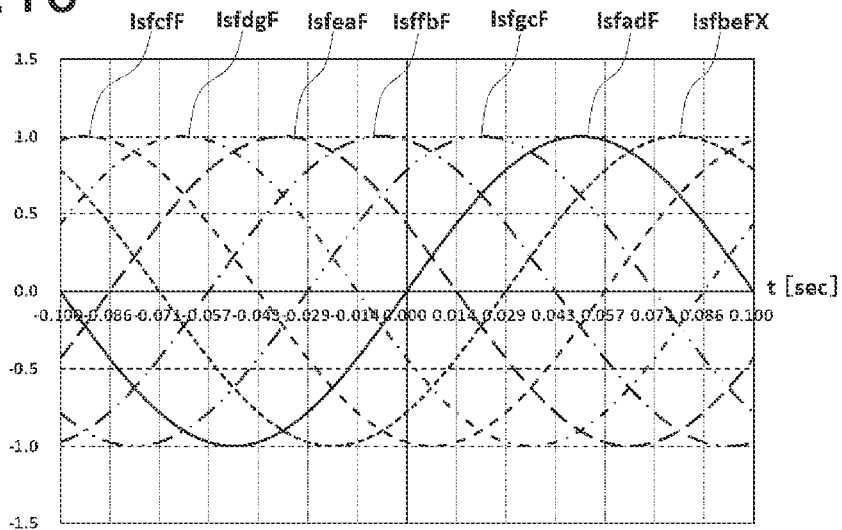
FIG. 10 shows a sinusoidal current for a 7-phase full-pitch winding.

Each of these currents, with Io set to 1.0, results in each of the current waveforms in FIG. 10. The horizontal axis is time t [sec]. Here, the number of windings of each full pitch winding is Nws/2.

Figure 11:
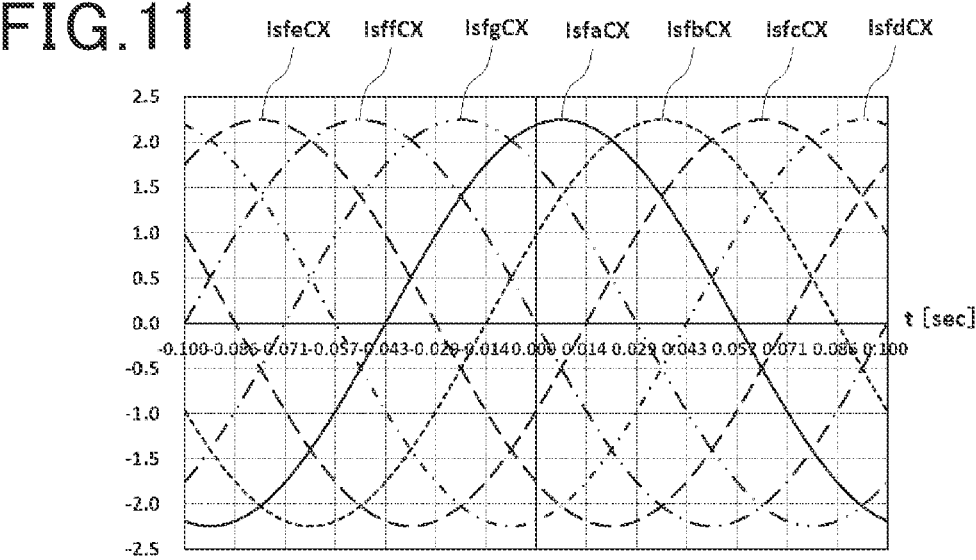
FIG. 11 shows a sinusoidal current for a 7-phase concentrated winding.

Also, when equations (45) to (51) are converted to virtual concentrated winding currents using the conversion equations (15) to (21) for concentrated winding, the following equations are obtained. As mentioned above, in each variable name of current, for example, aC in IsfaCX stands for concentrated windings by C and phase A2 by a. Each of these current waveforms is shown in FIG. 11. Note that the magnetomotive force of the full-pitch winding current is applied to all stator poles, so the amplitude value of the excitation current component of the hypothetical concentrated windings is relatively 2.24698 times larger. The phase of the AD2 phase current IsfadFX in the full-pitch winding differs from that of the A2 phase current IsfaCX in the concentrated winding by (90°−360°/28)=(3×360°/14) =77.14286°. The number of turns of each concentrated winding is Nws/2.

$$IsfaCX = 2.247 \times Io \cdot \sin(\omega t + 3 \times 360°/14) \quad (52)$$

$$IsfbCX = 2.247 \times Io \cdot \sin(\omega t + 360°/14) \quad (53)$$

$$IsfcCX = 2.247 \times Io \cdot \sin(\omega t - 360°/14) \quad (54)$$

$$IsfdCX = 2.247 \times Io \cdot \sin(\omega t - 3 \times 360°/14) \quad (55)$$

$$IsfeCX = 2.247 \times Io \cdot \sin(\omega t - 5 \times 360°/14) \quad (56)$$

$$IsffCX = 2.247 \times Io \cdot \sin(\omega t - 7 \times 360°/14) \quad (57)$$

$$IsfgCX = 2.247 \times Io \cdot \sin(\omega t - 9 \times 360°/14) \quad (58)$$

The state of θcs=0 for the 84 characteristics in FIG. 9 has a magnetic flux density of 1.0 [T], and the time t of the equations (45) to (51) is 0 [sec]. The direction of that field flux φm is in the direction of θcs=0 in FIG. 1, that is, on the right side of the paper, in the direction of the AD2 phase winding 1N. Next, the values of the specific excitation current components of each phase, i.e., Io, are determined in this state. Under the above assumptions, the air gap section magnetic flux density Bgap=1.0 [T] and the magnetic field strength of the air gap section Hgap [A/m] are related by the following equation. $\mu_0$ is the vacuum permeability.

$$Bgap = \mu_0 \times Hgap \quad (59)$$

Now consider the path of the A2 phase flux φa passing from the A/2 phase stator pole 12 to the A2 phase stator pole 11 in the cross section of the concentrated winding in FIG. 3. Since the excitation current [A·turn] of the two windings of the concentrated winding is balanced by the magnetomotive force acting on the two air-gap sections, the following approximate formula is obtained.

$$2.247 \times Io \times Nws/2 \times 2 = Hgap \times Lgap \times 2 \quad (60)$$

$$Io = (Bgap/\mu_0) \times Lgap \times 2/(2.247 \times Nws) \quad (61)$$

$$= 354.1/Nws[A]$$

For example, if the number of turns Nws/2 of each full pitch winding is 40 [turns], the value of Io in equations (45) to (51) is 4.427 [A]. The above is an example of finding the value of each phase excitation current component that realizes the discrete distribution function Dist2 in FIG. 9. However, this is an example of rough estimation of values, and the magnetic circuit model was simplified by assuming the magnetic resistance of the soft magnetic material part to be 0. The aforementioned A2 phase magnetic flux φa [Wb] is the product of the A2 phase magnetic flux density Bgapa of the air gap section of 11 and the area of 11 [m2], since the magnetic flux passes through the A2 phase stator pole 11 in FIGS. 1 and 3. For example, the A2 phase flux φa in FIGS. 1 and 3 is expressed as following equation. Mr is the radius of the rotor, and Wm is the axial effective length of the induction motor. Also, the same is true for the magnetic fluxes of the other phases.

$$\varphi a = Bgapa \times 2\pi \cdot Mr/14 \times Wm \quad (62)$$

Figure 12:
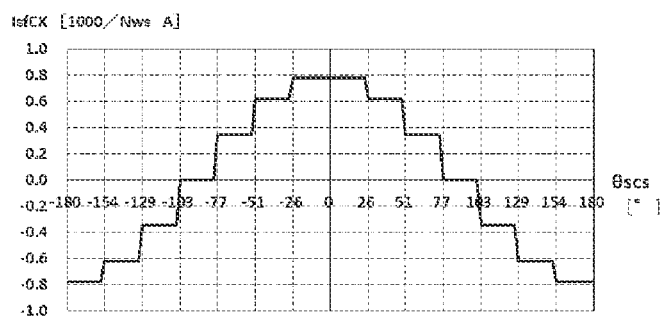
FIG. 12 exemplifies an excitation current for a 7-phase sinusoidal concentrated winding.

Next, the discrete distribution function Dist2 of the excitation current of the hypothetical concentrated winding shown in equations (52) to (58) at time t=0 is shown in FIG. 12. The horizontal axis is the stator rotation angle position θcs and the vertical axis is the concentrated winding excitation current [1000/Nws×A]. However, as shown in FIG. 3, each winding is discretely placed into each slot, and the current is actually discretely arranged. The t=0 value of the hypothetical A2 phase concentrated winding current IsfaCX that energizes the A2 phase concentrated winding 31 in FIG. 3 reads the average value Iave from 0° to 360°/14 of θscs in FIG. 12, and the A2 phase stator pole 11 shall be interpreted as supplying the magnetomotive force (Iave×Nws/2) [A·turn] generated by its current to its angular range. The range of θcs from 0° to 360°/14 is the circumferential width of the A2 phase stator pole shown in FIG. 3. Thus, in the case of concentrated windings, FIG. 12 is the excitation current component distribution, but it is also meant to be the magnetomotive force distribution.

Similarly, the t=0 value of the hypothetical B2 phase concentrated winding current IsfbCX that energizes the B2 phase concentrated winding 33 shall read the average value of θcs in FIG. 12 from 2×360°/14 to 3×360°/14. The t=0 value of the current IsfcCX in the C2 phase concentrated winding winding 35 shall read the average value of θcs in FIG. 12 from 4×360°/14 to 5×360°/14. The t=0 value of the current IsfdCX in the D2 phase concentrated winding 37 shall read the average value of θcs in FIG. 12 from 6×360°/14 to 7×360°/14. The t=0 value of the current IsfeCX in the E2 phase concentrated winding 39 shall read the average value of θcs in FIG. 12 from −6×360°/14 to −5×360°/14. The t=0 value of the current IsffCX in the F2 phase concentrated winding 3B shall read the average value of θcs in FIG. 12 from −4×360°/14 to −3×360°/14. The t=0 value of the current IsfgCX in the G2 phase concentrated winding 3D shall read the average value of θcs in FIG. 12 from −2×360°/14 to −360°/14.

Figure 13:
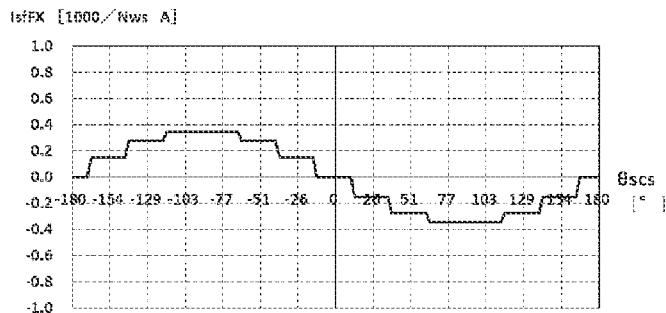
FIG. 13 exemplifies an excitation current for a 7-phase sinusoidal full-pitch winding.

Next, the excitation current components of the full-pitch winding shown in equations (45) to (51) are shown in FIG. 13 as the discrete distribution function Dist2 at time t=0. The horizontal axis is the stator rotation angle position θcs and the vertical axis is the full-pitch winding excitation current [1000/Nws×A]. Again, each winding is discretely placed into each slot, and the current is actually discretely arranged. Since the magnetomotive force of a full-pitch winding current is generated in all circumferential directions in FIG. 1, the interpretation and expression of the magnetomotive force of the concentrated winding current in FIG. 12 is difficult because the magnetomotive force of multiple phase currents is superimposed and applied, and the expression in terms of magnetomotive force in FIG. 13 is complicated. The excitation current component distribution of the full-pitch winding current in FIG. 13 is defined again with respect to the circumferential position of the current and the magnitude of the current.

The circumferential position θcs of the full-pitch winding current shown in FIG. 13 is 0° for the AD2 phase winding 1F, as shown in FIG. 1. The range in FIG. 13 is from −360°/28 to +360°/28, and the magnitude of an excitation current component IsfadFX is set to an average of the range. Similarly, the BE2 phase winding in FIG. 13 is located at 4×360°/28 in 1G in FIG. 1, and its range in FIG. 13 is from 3×360°/28 to 5×360°/28, and the magnitude of this excitation current component IsfbeFX is an average over that range. Similarly, the CF2 phase winding 1H is at 8×60°/28, and its range is from 7×360°/28 to 9×360°/28, and the magnitude of this excitation current component IsfcfFX is an average over that range. The DG2 phase winding 1J is at 12×360°/28, and its range is from 11×360°/28 to 13×360°/28, and the magnitude of this excitation current component IsfdgFX is an average of that range. The EA2 phase winding 1K is at -12×360°/28 and its range is from -13×360°/28 to -11×360°/28, and the magnitude of this excitation current component IsfeaFX is an average value over that range. The FB2 phase winding 1L is at -8×360°/28 and its range is from -9×360°/28 to -7×360°/28, and the magnitude of this excitation current component IsffbFX is an average value over that range. The GC2 phase winding 1M is at -4×360°/28, and its range is from -5×360°/28 to -3×360°/28, and the magnitude of this excitation current component IsfgcFX is an average of that range.

In FIGS. 12 and 13, the current range and average values are explained. This is the target distribution function as shown in FIG. 8. When dealing with a fixed current position, the circumferential position of the current and the value of the current need only be determined. However, rotating the field flux position in CCW as the rotor rotates will rotate the target distribution function in CCW, which requires changing the flux shared by each stator pole in FIG. 1. If the target distribution function is sinusoidal, such as 84 in FIG. 8, and is a function that is easy to formulate, it can be expressed by equations (45) to (58) and time t. However, in the case of a magnetic flux density distribution that is difficult to formulate, and when the respective windings are discretely arranged in the circumferential direction, it is necessary to determine the range of each current's share of the excitation current component. In terms of how the average value is taken, a simple average is acceptable, but a weighted average according to the target distribution function can control the induction motor more precisely. Later examples of rotating the field flux position to CCW, such as in FIGS. 20, 21, and 22 for 82 shown in FIG. 8, will be discussed in terms of current range and average values.

Figure 14:
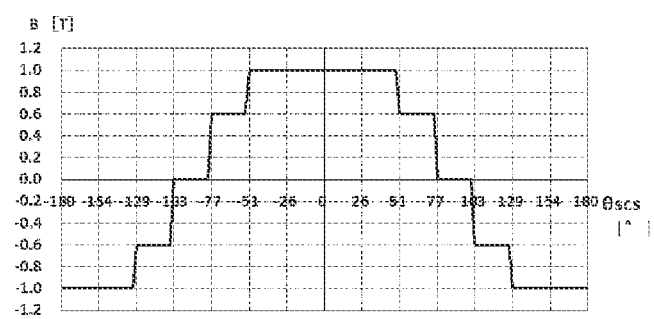
FIG. 14 exemplifies a distribution of 7-phase trapezoidal-wave magnetic flux density.

Next, a discrete distribution function Dist2 of the magnetic flux density is shown in FIG. 14, which transforms the target distribution function Dist1 shown by in FIG. 8, which has a trapezoidal waveform shape and can drive the induction motor in FIG. 1. FIG. 14 shows an example for time t=0. Then, examples of each phase excitation current component realizing the magnetic flux density distribution in FIG. 14 are described for the hypothetical concentrated winding and for the full pitch winding in FIG. 1. If the target distribution function Dist1 has a trapezoidal waveform shape distribution such as 81, 82, and 83, it cannot be easily expressed in a mathematical expression with an excitation current component such as the sine waveform shape of equation (45) in 84. The discrete distribution function Dist2 shown in FIG. 14 shows the magnetic flux density in the air gap area near each tooth in FIG. 1 and FIG. 3 in a staircase form for each of the 14 teeth. The method for finding the excitation current components for each phase that realizes the magnetic flux density for each of these 14 teeth is different from the method for finding the excitation current components for the sinusoidal discrete distribution function Dist2 shown in the example in FIG. 9. The following method should be a method to obtain the excitation current even if the magnetic flux density of 14 pieces, 7 types, and 7 phases have nonlinear relationship values by taking average values or other methods. The excitation current that realizes the discrete distribution function Dist2 of the sinusoidal distribution shape of magnetic flux density in FIG. 9 can also be obtained by the following method instead of the aforementioned method described in FIGS. 12 and 13.

The example of 14 magnetic flux densities shown in FIG. 14 in staircase form is shown by a curve 83 in FIG. 8, where the curve 83 at the center of each tooth. Such a value is representative of the magnetic flux density for that tooth. That is, the flux density values representing each tooth are created from the values of the curve 83 that are the target distribution function Dist1, and the discrete distribution function Dist2 in FIG. 14 is created. And the magnetic flux distribution in FIG. 14 is the magnetic flux density in the air gap section (i.e., a section including the air gap between the stator and rotor) near each tooth in FIG. 1. Comparing FIG. 14 with FIG. 1, an A2-phase flux density Ba is 1.0 [T], a B2-phase flux density Bb is 0.6 [T], a C2-phase flux density Bc is -0.6 [T], a D2-phase flux density Bd is -1.0 [T], an E2 phase flux density Be is -1.0 [T], an F2 phase flux density Bf is 0 [T], and a G2 phase flux density Bg is 1.0 [T].

The magnetic flux density value for each phase obtained here is an example of the magnetic flux distribution when the field flux φm is directed from the left side of the paper to the right side in FIG. 1. When the field flux φm is rotated in the counterclockwise direction CCW from that state, the magnetic flux density of each phase changes. The relationship between its rotational coordinates and the real axis coordinates, which are the fixed stator poles shown in FIG. 1, will be explained later.

The current to excite each of the aforementioned flux densities in FIG. 14 is controlled by obtaining a virtual concentrated winding current using the virtual concentrated winding model in FIG. 3.

Before finally energizing each winding in FIG. 1, the current is converted to full-pitch winding current using equations (1) to (7). A phase A2 excitation current component IsfaCX that excites 1.0 [T] of the phase A2 magnetic flux density Ba is approximated as follows.

$$IsfaCX \times Nws/2 \times 2 = Hgapa \times Lgap \times 2 \tag{63}$$

$$IsfaCX = (Bgapa/\mu_0) \times Lgap \times 2/Nws = 795.8/Nws [A] \tag{64}$$

Equation (63) shows an equational relationship between the magnetomotive force [A×turn] due to IsfaCX and the strength of the magnetic field Hgapa [A/m] at the air gap. A value Lgap is set to be 0.0005 [m]. Note that the A2 phase flux density Ba is replaced here by Bgapa. Similarly, a phase B2 excitation current component IsfbCX is 477.5/Nws [A], a phase C2 excitation current component IsfcCX is -477.5/Nws [A], a phase D2 excitation current component IsfdCX is -795.8/Nws [A], a phase E2 excitation current component IsfeCX is -795.8/Nws [A], an F2 phase excitation current component IsfCX is 0/Nws [A], and a G2 phase excitation current component IsfgCX is 795.8/Nws[A]. These calculations are based on the assumption that the induction motor in FIG. 1 has a target structure and target electromagnetic action with respect to the motor center point, and a simple motor model with zero magnetic resistance of the magnetic material. The circumferential opening width of the slot aperture is assumed to be 0 [mm] by simple modeling, and the magnetic flux in the air gap section is assumed to pass in the radial direction.

Figure 15:
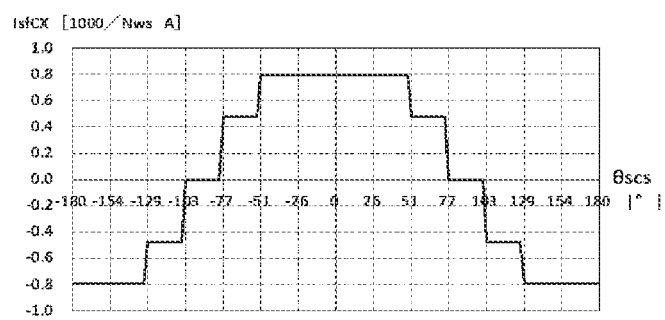
FIG. 15 exemplifies an expiation current of a 7-phase trapezoidal-wave concentrated winding.

Each of these phase excitation current components can be represented as the current distribution in FIG. 15, for example at time t=0. The horizontal axis is the stator rotation angle position θcs and the vertical axis is the concentrated winding excitation current [1000/Nws×A]. The excitation current components in FIG. 15 can be viewed as follows. For example, the t=0 value of the excitation current component IsfaCX of the hypothetical phase A2 concentrated winding 31 in FIG. 3, which energizes the phase A2 concentrated winding 31, is the value of IsfaCX is calculated by reading the average value Iave from 0° to 360°/14 of θcs in FIG. 15 and calculating the electromotive force (Iave×Nws/2) generated by the current on the phase A2 stator poles 11 to that angular range. and shall be interpreted as supplying the unit

[A·turn]. The range of θcs from 0° to 360°/14 is the circumferential width of the A2 phase stator poles shown in FIG. 3. Thus, in the case of a concentrated winding, FIG. 15 shows the excitation current component distribution, but it is also meant to be the magnetomotive force distribution.

Similarly, the value of the excitation current component IsfbCX of the hypothetical phase B2 concentrated winding that energizes the concentrated winding 33 of phase B2 shall read an average value from 2×360°/14 to 3×360°/14 of θcs in FIG. 15. The value of the current IsfcCX in the concentrated winding 35 of phase C2 shall read an average value of θcs from 4×360°/14 to 5×360°/14 in FIG. 15 The value of the current IsfdCX in the concentrated winding 37 of phase D2 shall read the average value of θcs from 6×360°/14 to 7×360°/14 in FIG. 15. The value of the current IsfeCX in the concentrated winding 39 of phase E2 shall be read as an average value of θcs from −6×360°/14 to −5×360°/14 in FIG. 15. The value of the current IsffCX in the concentrated winding 3B of phase F2 shall be read as the average value of θcs from −4×360°/14 to −3×360°/14 in FIG. 15. The value of the current IsfgCX in the concentrated winding 3D of phase G2 shall be read as an average value of θcs from −2×360°/14 to −360°/14 in FIG. 15.

Figure 16:
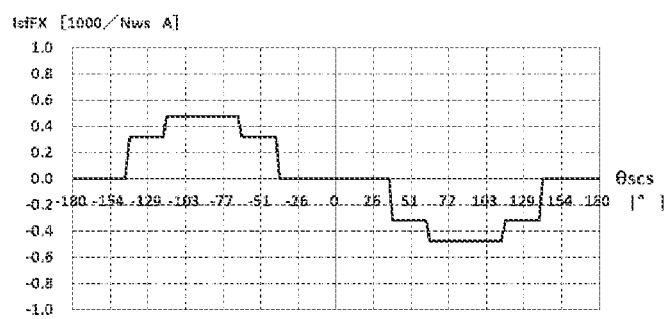
FIG. 16 exemplifies an expiation current of a 7-phase trapezoidal-wave full-pitch winding.

Next, an example of converting these hypothetical concentrated winding currents to full-pitch winding currents using equations (1) to (7) is shown in FIG. 16 and explained. The AD2-phase excitation current component IsfadFX [A] is obtained from equation (1) as follows.

$$\text{IsfadFX}=\text{IsfaCX}+\text{IsfdCX}=795.8/Nws+(-795.8/Nws)=0 \quad (65)$$

Similarly, the AD2-phase excitation current component Isfad, AD2-phase excitation current component Isfad, AD2-phase excitation current component Isfad, AD2-phase excitation current component Isfad, AD2-phase excitation current component Isfad, and AD2-phase excitation current component Isfad [A] is obtained by the following formulae.

$$\text{IsfbeFX}=\text{IsfbCX}+\text{IsfeCX}=-318.3/Nws \quad (66)$$

$$\text{IsfcfFX}=\text{IsfcCX}+\text{IsffCX}=-477.5/Nws \quad (67)$$

$$\text{IsfdgFX}=\text{IsfdCX}+\text{IsfgCX}=0 \quad (68)$$

$$\text{IsfeaFX}=\text{IsfeCX}+\text{IsfaCX}=0 \quad (69)$$

$$\text{IsffbFX}=\text{IsffCX}+\text{IsfbCX}=477.5/Nws \quad (70)$$

$$\text{IsfgcFX}=\text{IsfgCX}+\text{IsfcCX}=318.3/Nws \quad (71)$$

The discrete distribution function Dist2 of the excitation current components, which realizes the magnetic flux density distribution FIG. 14, is obtained and is shown in FIG. 16. The currents are each of equations (65) through (71), and the current distribution shown in FIG. 16 is each phase excitation current component of the full pitch windings in FIG. 1. This is an example of the magnetic flux distribution with the center position of the field flux φm in FIG. 14 oriented in the direction of its rotational position θcs=0, and the field flux φm in FIG. 14 is directed from the left side of the paper to the right side. If the field flux φm rotates and moves, it is necessary to calculate each excitation current for each phase according to its rotational position θcs.

Each of these phase excitation current components can be represented as the current distribution in FIG. 16, for example at time t=0. The horizontal axis is the stator rotation angle position θcs and the vertical axis is the full-pitch winding excitation current [1000/NwsxA]. In FIG. 16, each winding is also discretely placed into each slot, and the current is actually discretely arranged. Since the magnetomotive force of a full-pitch winding current is generated in all directions in FIG. 1, it cannot be simply interpreted and expressed as in the magnetomotive force of a concentrated winding current in FIG. 15. Since the magnetomotive force of multiple currents is superimposed and applied to each tooth, the full-pitch winding current in FIG. 16 requires the calculation of the magnetomotive force applied to each tooth to be added together as in equations (15) to (21).

The circumferential position θcs of the full-pitch winding current is shown in FIG. 16. The AD2 phase winding 1F shown in FIG. 1 is located at 0°, and its range in FIG. 16 covers from −360°/28 to +360°/28, and the magnitude of this excitation current component IsfadFX corresponds to the average value over that range. Similarly, the BE2 phase winding in FIG. 16, which is 1G in FIG. 1, is located at 4×360°/28, and in FIG. 16, its range covers from 3×360°/28 to 5×360°/28, and the magnitude of this excitation current component IsfbeFX corresponds to an average value over that range. Similarly, the CF2 phase winding 1H is located at 8×360°/28, and its range covers from 7×360°/28 to 9×360°/28, and the magnitude of this excitation current component IsfcfFX is the average of the range. The DG2 phase winding 1J is located at 12×360°/28, and its range covers from 11×360°/28 to 13×360°/28, and the magnitude of this excitation current component IsfdgFX corresponds to an average value of that range. The EA2 phase winding 1K is located at −12×360°/28, and its range covers from −13×360°/28 to −11×360°/28, and the magnitude of this excitation current component IsfeaFX corresponds to an average value of that range. The FB2 phase winding 1L is located at −8×360°/28, covering a range from −9×360°/28 to −7×360°/28, and the magnitude of this excitation current component IsffbFX corresponds to an average value over that range. The GC2 phase winding 1M is located at −4×360°/28, covering a range from −5×360°/28 to −3×360°/28, and the magnitude of this excitation current component IsfgcFX corresponds to an average value over that range.

Figure 17:
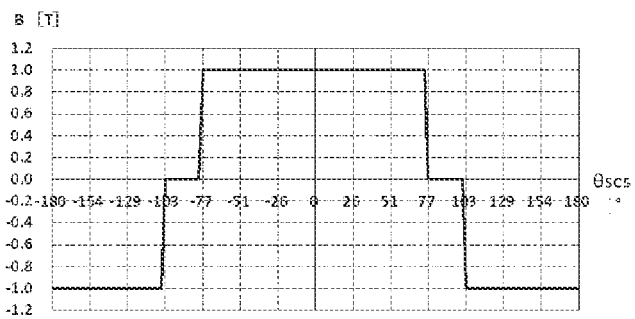
FIG. 17 exemplifies a distribution of 7-phase trapezoidal-wave magnetic flux density.

Next, the target distribution function Dist1 of 82 in FIG. 8, which is similarly trapezoidal waveform shaped, is transformed to enable the induction motor in FIG. 1 to be driven. The discrete distribution function Dist2 of the magnetic flux density is shown in FIG. 17. FIG. 17 shows an example for time t=0. Then, each phase excitation current component is explained. The calculation method is the same as in FIG. 14. The value of 82 located in the center of each tooth is used as the flux density representative value for that tooth. The A2 phase flux density Ba is 1.0 [T], B2 phase flux density Bb is 1.0 [T], C2 phase flux density Bc is −1.0 [T], D2 phase flux density Bd is −1.0 [T], E2 phase flux density Be is −1.0 [T], F2 phase flux phase F2 flux density Bf is 0 [T], and phase G2 flux density Bg is 1.0 [T].

Here, the values of each magnetic flux density are 2.0 and −2.0, which are the extremes. However, as the field flux φm rotates, these flux density values change to various values between 1.0 and −1.0 according to the characteristics 83 in FIG. 8. Since the magnetic flux density for each phase acts in an averaged manner during rotor rotation, when being averaged over time, an average magnetic flux density for each phase is the magnetic flux distribution 83 in FIG. 8.

The current that excites each of the aforementioned flux densities in FIG. 17 can be obtained as a virtual concentrated winding current using the virtual concentrated winding model in FIG. 3. The phase A2 excitation current component IsfaCX, which excites 1 [T] of the phase A2 magnetic flux density Ba, is according to the equations (63) and (64) and is the following value.

$$\text{IsfaCX}=(Bgap/\mu_0)\times Lgap\times 2/Nws=795.8/Nws[A]$$

Similarly, the phase B2 excitation current component IsfbCX is 795.8/Nws [A], the phase C2 excitation current component IsfcCX is −795.8/Nws [A], the phase D2 excitation current component IsfdCX is −795.8/Nws [A], the phase E2 excitation current component IsfeCX is −795.8/Nws[A], the F2 phase excitation current component IsfCX is 0/Nws[A], and the G2 phase excitation current component IsfgCX is 795.8/Nws[A].

Figure 18:
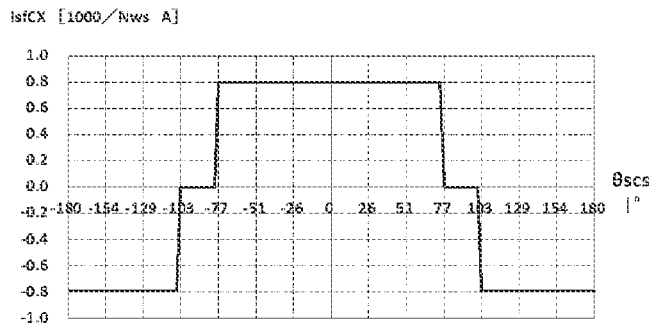
FIG. 18 exemplifies an excitation current to a 7-phase trapezoidal-wave concentrated winding.

Each of these phase excitation current components can be represented as the current distribution in FIG. 18, for example at time t=0. The horizontal axis is the stator rotation angle position θcs and the vertical axis is the concentrated winding excitation current [1000/NwsxA]. The t=0 value of the excitation current component IsfaCX of the hypothetical A2 phase concentrated winding 31, which energizes the A2 phase concentrated winding in FIG. 3, is interpreted such that an average value Iave from 0° to 360°/14 of θcs in FIG. 18 is read, and a magnetomotive force (Iave×Nws/2) (unit [A-turn]) generated by the current in phase A2 stator pole 11 is supplied The range of θcs from 0° to 360°/14 is the circumferential width of the A2 phase stator poles shown in FIG. 3. Thus, in the case of a concentrated winding, FIG. 18 is the excitation current component distribution, but it is also meant to be the magnetomotive force distribution.

Similarly, the value of the excitation current component IsfbCX of the hypothetical phase B2 concentrated winding that energizes the 33 concentrated winding of phase B2 is read as an average value from 2×360°/14 to 3×360°/14 of θcs in FIG. 18. The value of the current IsfcCX in the concentrated winding 35 of phase C2 is read as an average of the θcs in FIG. 18 from 4×360°/14 to 5×360°/14. The value of the current IsfdCX in the concentrated winding 37 of phase D2 is read as the average of the θcs in FIG. 18 from 6×360°/14 to 7×360°/14. The value of the current IsfeCX in the concentrated winding 39 of phase E2 is read as the average value of θcs in FIG. 18 from −6×360°/14 to −5×360°/14. The value of the current IsffCX in the concentrated winding 3B of phase F2 is read as the average of the values of θcs from −4×360°/14 to −3×360°/14 in FIG. 18. The value of the current IsfgCX in the concentrated winding 3D of phase G2 is read as the average value of θcs in FIG. 18 from −2×360°/14 to −360°/14.

Next, these hypothetical concentrated winding currents are converted to full-pitch winding currents using equations (1) to (7). The AD2 phase excitation current component IsfadFX is obtained from equation (1) as follows IsfadFX=IsfaCX+IsfdCX=795.8/Nws+(−1591.5/Nws)=0

In the same way as the above, the respective excitation current components can be obtained as below.

IsfbeFX=IsfbCX+IsfeCX=0/Nws,

IsfcfFX=IsfcCX+IsffCX=−795.8/Nws,

IsfdgFX=IsfdCX+IsfgCX=0,

IsfeaFX=IsfeCX+IsfaCX=0,

IsffbFX=IsffCX+IsfbCX=795.8/Nws,

IsfgcFX=IsfgCX+IsfcCX=O/Nws[A]

Figure 19:
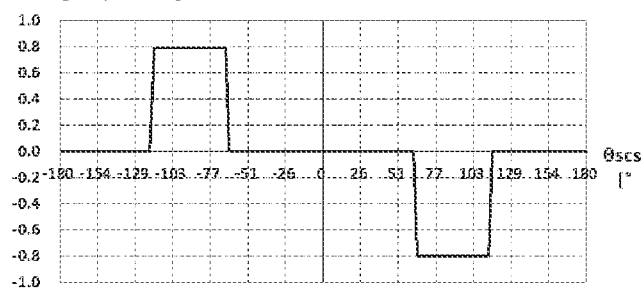
FIG. 19 exemplifies an excitation current to a 7-phase trapezoidal-wave full-pitch winding.

Each of these phase excitation current components can be represented as the current distribution in FIG. 19, for example at time t=0.
The horizontal axis is the stator rotation angle position θcs and the vertical axis is the full-pitch winding excitation current [1000/NwsxA]. In the same way as the above, in FIG. 19, each winding is discretely placed into each slot, and the current is actually discretely arranged. Since the magnetomotive force of a full-pitch winding current is generated in all directions in FIG. 1, it cannot be simply interpreted and expressed as in FIG. 18, the magnetomotive force of a concentrated winding current. The magnetomotive forces of multiple full-pitch winding currents are superimposed and applied to each tooth. Therefore, in the full-pitch winding current shown in FIG. 19, the calculation of the magnetomotive force applied to each tooth must be added up as in equations (15) to (21).

At the circumferential position θcs of the full-pitch winding current in FIG. 19, the AD2 phase winding 1F shown in FIG. 1 is located at 0°. This AD2 phase winding 1F covers the range from −360°/28 to +360°/28 in FIG. 19, and the magnitude of this excitation current component IsfadFX corresponds to the average value over that range. Similarly, the BE2 phase winding in FIG. 19, which corresponds to 1G in FIG. 1, is located at 4×360°/28 and covers the range from 3×360°/28 to 5×360°/28 in FIG. 19, and the magnitude of this excitation current component IsfbeFX corresponds to the average value over that range. Similarly, the CF2 phase winding 1H is located at 8×360°/28 and covers the range from 7×360°/28 to 9×360°/28, and the magnitude of this excitation current component IsfcfFX corresponds to the average value over that range. The DG2 phase winding 1J is located at 12×360°/28 and covers the range from 11×360°/28 to 13×360°/28, and the magnitude of this excitation current component IsfdgFX corresponds to the average value over that range. The EA2 phase winding 1K is located at −12×360°/28 and covers the range from −13×360°/28 to −11×360°/28, and the magnitude of this excitation current component IsfeaFX corresponds to the average value over that range. The FB2 phase winding 1L is located at −8×360°/28 and covers the range from −9×360°/28 to −7×360°/28, and the magnitude of this excitation current component IsffbFX corresponds to the average value over that range. The GC2 phase winding 1M is located at −4×360°/28 and covers the range from −5×360°/28 to −3×360°/28, and the magnitude of this excitation current component IsfgcFX corresponds to the average value over that range.

Next, consider the case where the field flux φm advances 90° from the stator circumferential position θcs=0° to CCW and rotates to θcs=90°. In this case, a magnetic flux density distribution in FIG. 20, a distribution of the hypothetical concentrated winding excitation current components in FIG. 21, and full-pitch winding excitation current components in FIG. 22 are explained. In each figure, the stator circumferential position θcs for each value shifts 90° to the right side of the paper. The target distribution function is shown by a curve 82 in FIG. 8 and is the same as the target distribution functions in FIGS. 17, 18, and 19. The above FIGS. 20, 21, and 22 may be drawn or obtained directly from both the target distribution function 82 in FIG. 8 and the field flux φm which is set at θcs=90° in the stator circumferential direction.

When θcs=90° is given to the field flux φm, the magnetic flux density distribution changes from FIG. 17 to FIG. 20, and the magnetic flux density distribution moves 90° to the right on the paper. Similarly, the distribution of the hypothetical concentrated winding excitation current component shifts 90° to the right in the paper, from FIG. 18 to FIG. 21. At this time, the range of phase A2 stator pole 31 in FIG. 3 is from θcs=0° to 360°/14, so that in FIG. 21, phase A2 concentrated winding current IsfaCX has a step in the middle of it at 360°/28, and an average value thereof is (0+1591.5)/2/Nws=397.9/Nws [A]. In the example of FIG. 18, no step was generated in the range of each winding, but as the field excitation of the induction motor progresses and the field flux φm rotates on the paper surface of FIGS. 1 and 3, the step in FIG. 17 moves in the circumferential direction and, naturally, within the circumferential range of each stator pole.

Figure 21:
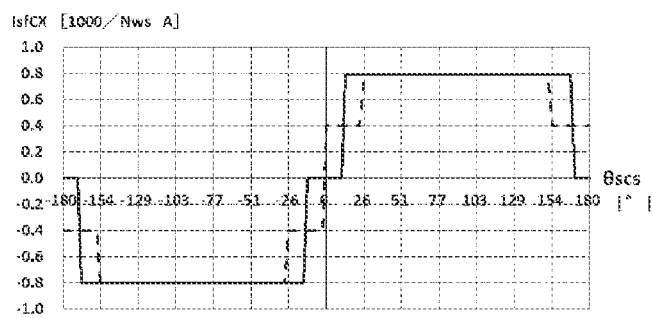
FIG. 21 exemplifies an excitation current to a 7-phase trapezoidal-wave concentrated winding.
Figure 22:
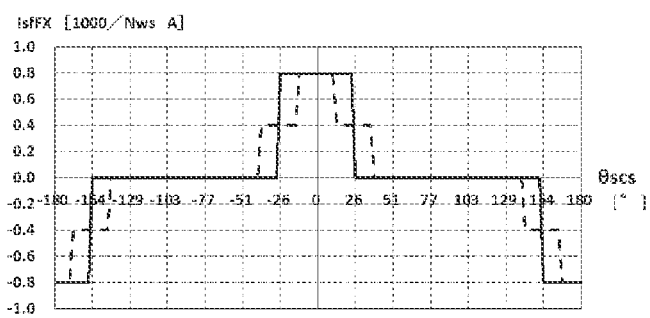
FIG. 22 exemplifies an excitation current to a 7-phase trapezoidal-wave full-pitch winding.

Similarly, the values of the hypothetical phase B2 concentrated winding current IsfbCX energizing the concentrated winding 33 of phase B2 are shown in FIG. 21, is from 2×360°/14 to 3×360°/14 of θcs, which is 795.8/Nws [A]. The value of the current IsfcCX in the concentrated winding 35 of phase C2 is from 4×360°/14 to 5×360°/14 of θcs in FIG. 21. The value is 795.8/Nws [A]. The value of the current IsfdCX in the concentrated winding 37 of phase D2 is shown in FIG. 21, taking the average value of θcs from 6×360°/14 to 7×360°/14, (1591.5+0)/2×Nws=397.9/Nws [A]. The value of the current IsfeCX in the concentrated winding 39 of phase E2 is from −6×360°/14 to −5×360°/14 of θcs, in FIG. 21, and −795.8/Nws [A]. The value of the current IsffCX in the concentrated winding 3B of phase F2 is from −4×360°/14 to −3×360°/14 of θcs, in FIG. 21, and −795.8/Nws [A]. The value of the current IsfgCX in the concentrated winding 3D of phase G2 is from −2×360°/14 to −360°/14 of θcs in FIG. 21, and is −795.8/Nws [A]. As a result, averaging over the range of each phase results in the dashed line characteristic shown in FIG. 21. For example, if the number of turns Nws/2 of each concentrated winding is 40 [turns], the value of the above concentrated winding current IsfcCX=795.8/Nws [A] for phase C2 is 9.95 [A].

Next, the distribution of the full-pitch winding excitation current components in FIG. 22, where these hypothetical concentrated winding currents are converted to full-pitch winding currents using Equations (1) to (7), is explained. At the circumferential position θcs of the full-pitch winding current in FIG. 22, the AD2 phase winding 1F is at 0°, as shown in FIG. 1. The value of the excitation current component IsfadFX is 795.8/Nws [A]. Similarly, the BE2 phase winding in FIG. 22, which corresponds to 1G in FIG. 1, is located at 4×360°/28 and takes the range from 3×360°/28 to 5×360°/28 in FIG. 22, where the value of the excitation current component IsfbeFX is zero.

Similarly, the CF2 phase winding 1H is at 8×360°/28 and takes the range from 7×360°/28 to 9×360°/28, and the value of this excitation current component IsfcfFX is 0. The DG2 phase winding 1J is at 12×360°/28, taking the range from 11×360°/28 to 13×360°/28, and the value of this excitation current component IsfdgFX is (0-1591.5/Nws)/2=−397.9/Nws. The EA2 phase winding 1K is at −12×360°/28 and takes its range from −13×360°/28 to −11×360°/28, and this excitation current component IsfeaFX is (−1591.5/Nws+0)/2=−397.9/Nws. The FB2 phase winding 1L is at −8×360°/28 and takes the range from −9×360°/28 to −7×360°/28, and the value of this excitation current component IsffbFX is 0. The GC2 phase winding 1M is at −4×360°/28 and takes its range from −5×360°/28 to −3×360°/28, and the value of this excitation current component IsfgcFX is 0. As a result, the averaged values in the vicinity of each full-pitch winding line show the characteristics of the dashed line in FIG. 22. For example, if the number of turns Nws/2 of each full pitch winding(s) is 40 [turns], the value of the above full-pitch winding current IsfadFX=795.8/Nws [A] for the AD2 phase is 9.95 [A].

Figure 23:
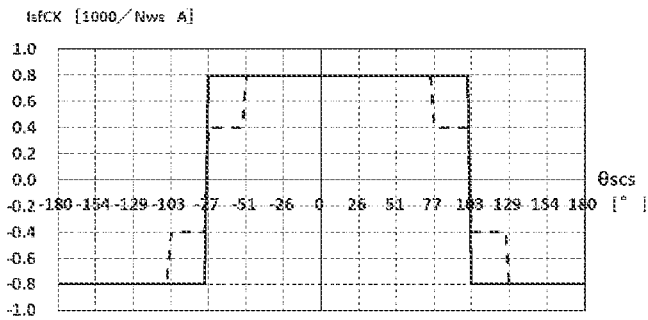
FIG. 23 exemplifies an excitation current to a 7-phase trapezoidal-wave concentrated winding.

Next, in the case of the target distribution function Dist1 shown by 83 in FIG. 8, its discrete distribution function Dist2 and the excitation current components of each phase can be obtained using the same method. Here, in the case of the algorithm where the value of 81 located in the center of each tooth is the representative value for that tooth in the discrete distribution function Dist2, the discrete distribution function Dist2 for 81 is the same as the discrete distribution function Dist2 for 82. This occurs when the trapezoidal shape is steep, and the discrete distribution function Dist2 of the magnetic flux density in 81 is the same as that in 82, FIG. 17. However, there are obvious shape differences between 81 and 82, which are the target distribution functions Dist1, and as the field flux φm progresses and rotates, those differences appear in the flux density distribution and the concentrated winding current distribution. When the magnetic flux density distribution is 81, if the field flux φm advances ½ tooth width, or 12.86°, in the CCW, the current distribution in the hypothetical concentrated winding windings will be a solid-line distribution shown in FIG. 23. Similarly, in the case of 82, the distribution has the dashed line shape shown in FIG. 23, and the difference is clear.

In FIGS. 18, 19, 21, 22, and 13 above, the current distribution at that moment is a convenient distribution diagram to recognize and analyze the state of affairs at that moment. For example, the relationship between the excitation current component and the field flux φm can be checked. However, it is difficult to understand the time course of the field flux φm and excitation current components, as well as the average action and effect. It is easy to understand the control state of the field flux φm and excitation current components during rotation by observing them in MN coordinate, which is the rotation coordinates shown below. While the rotor is rotating, the relevant teeth shift at high speed, so they act in a mean value manner and the electromagnetic action approaches the target distribution function Dist1 in FIG. 8.

The same value is obtained by rotating the target distribution function Dist1 and then obtaining the discrete distribution function Dist2 at that rotated position. The average magnetic flux density of each tooth and each stator pole may be determined at the stage of obtaining the magnetic flux density distribution shown in FIG. 20. The former method is explained here for the convenience of the rotational coordinates and other calculations shown later. Furthermore, control methods that do not use rotational coordinates are also possible, and the calculation method can be selected within the intent of the disclosure and shall be included in the disclosure. The method of taking averages can also be varied, such as simple averaging, weighted averaging, etc.

The above explanation includes several examples of setting the target distribution function Dist1, obtaining the discrete distribution function Dist2 of magnetic flux density, obtaining the hypothetical concentrated winding excitation current component, obtaining the full-pitch winding excitation current component, and so on. As a result, it can be confirmed that the magnetic flux density distribution and the distribution of the hypothetical concentrated winding excitation current coincide in the aforementioned method, and thus, it is an easy method to convert the magnetic flux distribution into the excitation current. It is also shown that the hypothetical concentrated winding excitation current can be easily converted to the full pitch winding(s) current of the induction motor by the current conversion formula. It was then shown that the distribution of full-pitch winding excitation current in FIG. 19 is visually simple when the magnetic flux distribution is simple, as shown in FIG. 17, and conversely, when the magnetic flux distribution is irregular and complex, the calculation to find the value of full-pitch winding excitation current is complex. As a whole, these various examples show that the aforementioned method of calculating the excitation current can be used to determine the excitation current components that should be energized by a constant algorithm for any magnetic flux density distribution. The target distribution function Dist1 should store the distribution shapes related to the induction motor speed Nr [rpm], output torque T [Nm], power supply voltage Vpw [V], and control mode command CRM such as high-efficiency operation. This allows the induction motor to be operated and controlled while optimizing the shape and size of the distribution according to these operating conditions. Specific examples of control are described below.

Next, the real axis coordinates and MN coordinates used in the present disclosure will now be explained. The real axis coordinate is a coordinate that represents the actual motor state, as shown in the cross-sectional diagram in FIG. 1, and the state is represented by the names of the parts and variables and their values in FIG. 1 above. The MN coordinate is a coordinate such that the circumferential rotation angle θcs of the field flux φm in real axis coordinates is 0°, and is a coordinates that rotates and moves synchronously with the field flux φm. In the case of an induction motor, these are not the rotational coordinates that synchronize with the rotor rotation. In particular, the present disclosure is not limited to a sinusoidal distribution, but represents any distribution shape. When representing the circumferential distribution of the air gap of a concrete induction motor, it represents the distribution state of multiphase magnetic flux density, multiphase magnetic flux, multiphase each-phase current, etc., which are discrete-valued values by stator poles and slots. Thus, for example, in a controllably steady state, the field flux on the MN coordinate is almost fixed.

The value of the circumferential rotation angle θcs of the field flux φm in the real axis coordinate is set as θmn. Therefore, the difference of the rotation angle between the real axis coordinate and the MN coordinate is θmn, which is indicated by a value in the range of 0° to 360°. On the other hand, the circumferential rotation angle of the field flux φm is represented by θf as a variable and shall indicate values greater than 360° or even negative values. Thus, if θf has a value in the range of 0° to 360°, θf=θmn. The circumferential angle in MN coordinates shall be indicated by θscm.

Next, the characteristics of the aforementioned MN coordinates will now be explained. The fundamental wave components of variables such as magnetic flux and current synchronized with the field flux in real axis coordinates are alternating current. However, the fundamental wave components of the aforementioned AC variables can be expressed in amplitude and phase on the MN coordinates, which are rotational coordinates. Therefore, the amplitude can be treated like the DC component, which is represented by discrete values for each virtual stator pole in MN coordinates, and the magnetic flux density, excitation current component, rotor current component, each voltage component, and torque can be treated as DC components. In MN coordinates, magnetic flux density, etc., is treated as a discrete, multiphase magnetic flux density distribution, making it easy to represent and control arbitrary distribution shapes such as trapezoidal shapes. It is also easy to grasp the state and changes of these variables.

Feedback control of each current and other variables can be performed with DC components, and proportional-integral control (PI control) can be effectively used for feedback error amounts. Then, not only transient errors can be reduced by proportional-integral control and proportional-integral compensation, but also steady-state errors can be reduced and made highly accurate. In other words, frequency characteristics are improved. PID control, including differential compensation, can also be used. In real-axis coordinates, each current is an AC value, and their main component is the rotation frequency. And in real axis coordinates, as the rotation frequency increases, the gain of the feedback control loop of the proportional-integral control decreases with respect to the frequency region of the main component of the current, which causes a problem that the control error of each current becomes larger. When each current is controlled in MN coordinates, which are rotational coordinates, each phase current component is treated as a DC value even in the high-speed rotation region, and proportional-integral compensation is performed, so there is less problem with large control errors in each current in the high-speed rotation region. The same is true for feedback control of the magnetic flux density or magnetic flux in each phase in a configuration that is a variation of FIG. 2.

In particular, when the full pitch windings configuration is converted to virtual concentrated winding configuration and controlled in MN coordinates, feedback control of the magnetic flux density and excitation current component for each phase can be performed and proportional integral compensation can be effectively utilized. This has advantages in terms of control, and is also superior in terms of controlling arbitrary magnetic flux distribution states, as it is easy to grasp and control the phenomenon electromagnetically. Specifically, the block diagram example in FIG. 2 will be shown later. In general, conventional dq-axis coordinates are assumed to be a sinusoidal distribution and are treated in a special way, with non-sinusoidal waves being indicated by harmonic components.

Next, motor configurations and their names in real and MN coordinates are explained. The motor configuration includes phases, stator poles, full pitch winding(s), virtual concentrated winding windings, and rotor windings. The aforementioned phases A2, B2, etc. are indicated in real-axis coordinates by adding an X at the end, as in phase A2X, phase B2X, etc., and in MN coordinates by adding an M at the end, as in phase A2M, phase B2M, etc. However, when there is no need to distinguish between real axis coordinates and MN coordinates, the above X and M are omitted.

Next, the names of the various variables in the real axis coordinates and MN coordinates are explained. Variables include stator current I [A], stator voltage V [V], air gap section magnetic flux (p [Wb], air gap section magnetic flux density B [T], electromotive force Q [A−turn] acting on the entire circumference of the relevant magnetic path, magnetic field strength H [A/m] in the air gap section, and rotor current [A], rotor winding resistance R [Ω], inductance L [H] of the rotor winding, the detected value of each current Id [A], and the detected value of each magnetic flux density Bd [T]. Among them, there are two types of stator current I and stator voltage V: concentrated winding and full-pitch winding. As we have already used variables such as IsfadFX and IsfaCM in the current of the induction motor in FIG. 1, F at the end of the variable indicates full-pitch winding and C indicates concentrated winding. The X at the end of a variable indicates the real-axis coordinate, and M indicates the MN coordinate. As shown above, variable names exist in combination, and since there are many of them, each individual variable name will be explained each time it is used in the specification. The names of components such as the A2X phase stator poles 11 in FIG. 1 include the model number 2. However, variable names such as IsfadFX will include sf for stator excitation current, X for real axis coordinates, F for full-pitch winding line, and ad for AD2 phase, but will not include the motor model number 2 in the variable name IsfadFX.

Figure 20:
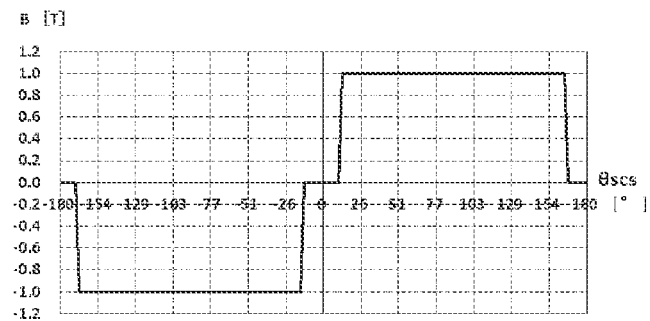
FIG. 20 exemplifies a distribution of 7-phase trapezoidal-wave magnetic flux density.

Next, specific examples of magnetic flux density distribution in real-axis coordinates are shown in FIGS. 17, 20, etc., above, which show the magnetic flux density distribution in the air gap section of the induction motor of FIG. 1 in a linear form on the horizontal axis. The figure is an expanded figure. As mentioned above, FIG. 17 is the discrete distribution function Dist2, which is a discrete-valued version of the 82 target distribution function Dist1 of FIG. 8 in the width of the stator poles. The circumferential angle of the center of the field flux φm in FIG. 17 is in the direction of θcs=0, which is the left and right center position of the paper in FIG. 17. In real axis coordinates, the field flux direction θcs=0 in FIG. 17 is the origin, and the field flux direction is controlled by moving the field flux direction to the left and right of the paper surface in FIG. 17. In the paper plane of FIG. 1, the field flux direction is controlled by rotating the field flux direction with the rotation angle position of θcs=0 as the origin. For example, for the A2X phase stator poles 11 in FIG. 1, θcs ranges from 0° to 25.7° in the display of FIG. 17. When the field flux is expressed as a time function, it is controlled with time t=0 as the origin.

In real axis coordinates, the position of the field flux φm is the position of the horizontal axis θcs on the paper in FIG. 17, and is controlled by moving it left and right on the paper. For example, under simple conditions with the rotor fixed in rotation, when the slip frequency fs is 5 [Hz] and time t advances from 0 [sec] to 0.05 [sec], the stator rotation angle position θcs of the field flux φm advances from 0° to 360°×0.05/(⅕)=90°. In the state of magnetic flux density distribution in real axis coordinates, the field flux φm moves 90° to the right of the paper from the state of t=0° in FIG. 17 to the state of FIG. 20. In FIG. 1, the field flux φm turns 90° to CCW from the state where the field flux φm faces to the right on the paper surface, and the field flux φm turns to the state where the field flux φm faces to the upper direction on the paper.

The following is an example of the distribution state of each excitation current component in real-axis coordinates. As described above, in the case of the field flux distribution shown in FIG. 17, the excitation current components of the hypothetical concentrated winding are shown in FIG. 18 and those of the full-pitch winding are shown in FIG. 19. The excitation current components of the full-pitch winding are shown in FIG. 19. In the case of the field flux distribution shown in FIG. 20 with a phase advance of 90°, the excitation current components of the hypothetical concentrated winding are shown in FIG. 21 and those of the full-pitch winding are shown in FIG. 22. The excitation current components of full-pitch winding are shown in FIG. 22.

Figure 24:
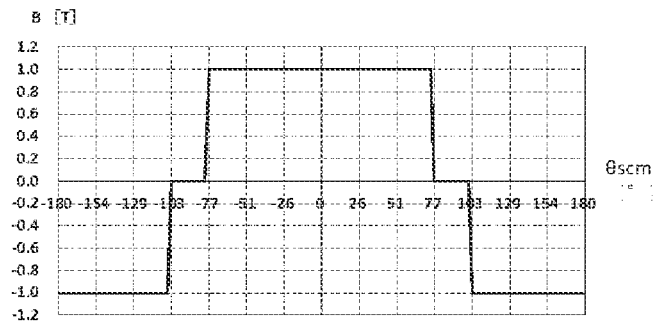
FIG. 24 exemplifies an excitation current to a 7-phase trapezoidal-wave concentrated winding.

Next, an example of a distribution diagram in MN coordinates is described. As described above, in MN coordinates, the direction of the field flux φm does not change in MN coordinates because the direction of the field flux φm is the coordinate axis. In real-axis coordinates, the distribution shapes of various variables such as magnetic flux density when the direction of the field flux φm is θcs=0 match the distribution shapes of MN coordinates. The distribution state of the magnetic flux density in FIG. 17 in real-axis coordinates is shown in FIG. 24 and the rotation angle θmn of the field flux φm in MN coordinates. The circumferential angle in the MN coordinate of FIG. 24 is θscm.

Figure 25:
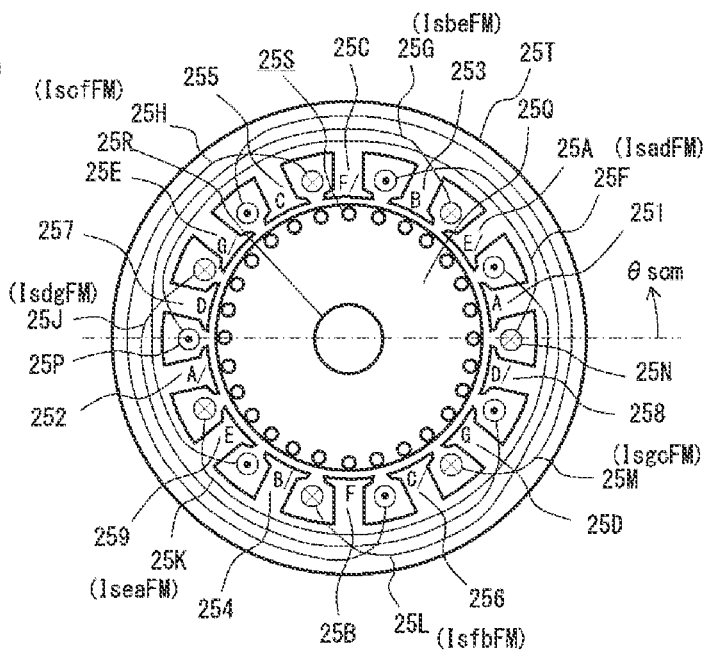
FIG. 25 is a section view showing a 7-phase induction motor on the MN coordinate.

From this state of MN coordinates, the field magnetic flux φm rotates 90° to CCW on FIG. 1 is shown in FIG. 24 and MN coordinates with the information of rotation angle θmn=90°. Even if the field flux φm rotates, the magnetic flux density distribution diagram remains the same because the rotational coordinates indicate the field flux φm as the center. An example of FIG. 1 on real axis coordinates as a motor cross-sectional diagram on MN coordinates is shown in FIG. 25. The induction motor in FIG. 25 is not real and is a virtual motor on rotational coordinates. The sign indicating each part is changed, and the circumferential rotation angle θcs in FIG. 1 is changed to θscm in FIG. 25. The name of the variable that energizes each winding is expressed differently. For example, IsadFX for the AD2 phase current in FIG. 1, which is appended in parentheses, should be IsadFM.

However, each stator pole on MN coordinates, which are rotational coordinates, is different from each stator pole on real axis coordinates. A coordinate transformation MNC from real axis coordinates to MN coordinates is necessary. For example, if the rotation angle θmn in MN coordinates is an integer multiple of the stator pole width, 2×360°/14=51.4°, then as can be seen from the configuration arrangement in FIG. 1 and FIG. 25, the B2X phase stator pole in real axis coordinates 13 corresponds to phase A2M stator pole 251 in MN coordinates. Similarly, phase F/2X stator pole 1C corresponds to phase E/2M stator pole 25A in MN coordinates. Similarly, C2X phase stator pole 15 corresponds to B2M phase stator pole 253 in MN coordinates, G/2X phase stator pole 1E corresponds to F/2M phase stator pole 25C, D2X phase stator pole 17 is C2M phase stator pole 255 in MN coordinates, A/2X phase stator phase A/2X stator pole 12 is phase G/2M stator pole 25E in MN coordinates, phase E2X stator pole 19 is phase D2M stator pole 2 57, B/2X phase stator pole 14 is phase A/2M stator pole 252 in MN coordinates, F2X phase stator pole 1B is phase E2M stator pole 259 in MN coordinates, phase C/2X stator pole 16 is phase B/2M stator pole 2 in MN coordinates 54, G2X phase stator pole 1D is F2M phase stator pole 25B in MN coordinates, D/2X phase stator pole 18 is phase C/2M stator magnetic pole 256 in MN coordinates, phase A2X stator magnetic pole 11 is phase G2M stator magnetic pole 2 in MN coordinates E/2X phase stator pole 1A corresponds to phase D/2M stator pole 258 in MN coordinates. As described above, if the rotation angle θmn in the MN coordinate is an integer multiple of the stator pole width, the rotation position of each stator pole simply changes, which is simple. The above outlines the relative relationship. However, of course, it is usually the case that the rotation angle θmn of the MN coordinate is not an integer multiple of the stator pole width, but a fractional multiple.

The stator poles in the MN coordinate whose rotation angle θmn is a fractional multiple of the stator pole width Pst should be calculated so that they correspond positionally to a part of each of the two adjacent stator poles in the real axis coordinate and share in proportion to their ratio. For example, for magnetic flux density, if the rotation angle θmn of the MN coordinate is 1.3 times the stator pole width Pst, i.e., θmn=1.3×360°/14=33.4 [°], then the A2M phase stator pole of the MN coordinate in FIG. 25 is the B2X stator pole of the MN coordinate in FIG. 1 corresponds to 30% of the CW side of the B2X phase stator pole 13 and 70% of the CCW side of the E/2X phase stator pole 1A in real axis coordinates. corresponds to 70% of the CW side. Therefore, when calculated as a simple average, the magnetic flux density BaM of phase A2M stator pole 251 in MN coordinates is the magnetic flux density of phase B2X stator pole 13 in real axis coordinates BbX and 70% of the magnetic flux density BE/X of the phase E/2X stator pole 1A. Thus, even if the rotation angle θmn of the MN coordinate is a fractional multiple of the stator pole width Pst, it can be converted from the real axis coordinate to the MN coordinate. The distribution state of the concentrated winding excitation current component and the full-pitch winding excitation current component can also be converted from real axis coordinates to MN coordinates in the same way.

In the conversion of MNC from real axis coordinates to MN coordinates, since the rotor is rotating, the field flux φm rides over many stator poles and rotates, and the magnetic flux in each phase of MN coordinates has the effect of approaching the initially intended target distribution function Dist1 due to the effect of averaging. In addition, since the averaging effect mentioned above is reduced at low speed rotation, the control can be made more precise by the averaging method. Specifically, a weighted average value can be taken by considering the target magnetic flux distribution inside each tooth according to the target distribution function Dist1, as shown in FIG. 8, and devising a way to bring the magnetic flux distribution inside the tooth closer to the target distribution function Dist1. In this way, various methods of conversion from real axis coordinates to MN coordinates can be devised. As mentioned above, in MN coordinates, each variable such as the field excitation current used for motor control can be treated as a DC quantity. In particular, when a virtual concentrated winding is controlled in MN coordinates, the magnetic flux density and excitation current components are feedback controlled for each phase, and proportional integral The control can be done by effectively utilizing proportional-integral compensation. It has advantages in terms of control, and in terms of controlling arbitrary magnetic flux distribution conditions, it is easy to grasp and control electromagnetic phenomena.

Next, the conversion method RMNC from MN coordinates to real axis coordinates is explained. The specific method of conversion method RMNC is the reverse of the conversion method MNC described above. The method is the same. Naturally, the stator poles to be converted are interchanged. For example, if the rotation angle θmn of the MN coordinates is 1.3 times the stator pole width, i.e., θmn=1.3×360°/14=33.4 [°], then the A2X phase stator pole 11 of the real axis coordinates in FIG. 1 becomes 25, the G2M phase stator pole 25D in the MN coordinate of FIG. 25 corresponds to 30% of the CCW side of the G2M phase stator pole 25D and the D/2M phase stator pole 25 8 corresponds to 70% of the CW side. Thus, when calculated by simple averaging, the magnetic flux density BaX of phase A2X stator pole 11 in real axis coordinates is equal to the magnetic flux density of phase G2M stator pole 25D in MN coordinates BgM and 70% of the magnetic flux density Bd/M of phase D/2 stator pole 258 in MN coordinates. Thus, even if the rotation angle θmn of the MN coordinates is a fractional multiple of the stator pole width, it can be converted from MN coordinates to real axis coordinates. The distribution state of the concentrated winding excitation current component and the full-pitch winding excitation current component can also be converted from MN coordinates to real axis coordinates in the same way.

In the conversion method RMNC, the weighted average value can also be taken, as described above. In the conversion method RMNC from MN coordinates to real axes coordinates, after various control operations are performed in MN coordinates, they are converted to the real axes coordinates of the actual induction motor shown in FIG. 1. It can be effectively used to control the magnetic flux and current of each phase of the motor.

The symbols and variable names for each part of the shape of the induction motor in FIG. 1, some of which are already in use, are described here in summary. The rotor radius is Mr [m] and the axial effective length of the rotor is Wm [m]. Multiple full-pitch winding rotor windings are arranged circumferentially, and the number of turns of each winding is Nwr/2. Each rotor winding is assumed to be electrically insulated from each other. However, since each rotor current remains the same even if one part of each rotor winding is interconnected with each other, for example, star-connected rotor windings, etc., are also included.

The number of turns Nwr/2 of the full pitch winding(s) of each phase of the rotor winding can be selected according to the type of winding, the convenience of the slot shape, etc., and the usage of the rotor winding, etc. The number of turns Nwr/2 is equivalent in electric circuit. The number of rotor windings arranged in the circumferential direction of the rotor can be selected according to the type of rotor windings, manufacturing convenience, and other factors, although the more the number of rotor windings, the finer the characteristics. If the number of turns of the full-pitch winding rotor winding Nwr/2 is set to 1 [turn] and the rotor axial ends of the rotor windings are mutually connected between each rotor winding, each rotor current remains the same and is electromagnetically equivalent. And the condition is the same and equivalent to the well-known aluminum die-cast winding of the rotor, the cage winding composed of copper bars, etc. connected to each other. Although any winding can be used in the present disclosure, for the sake of explanation, we will mainly use an example where the number of turns Nwr/2 of each full-pitch winding rotor winding is 1 [turn].

The above-mentioned aluminum die-cast winding differs from the insulated rotor winding in terms of characteristics in that the resistance at the coil ends at both ends of the rotor winding is not negligible and that lateral current flows. Although there are differences in characteristics, the motor can be used as an induction motor subject to the present disclosure by making modifications to account for the differences. It is also possible to make improvements to reduce the electrical resistance of the short-circuit rings at both ends, such as aluminum die-cast windings, and to reduce the lateral flow.

The number of rotor windings in the rotor is not limited here. The number of turns of each full-node rotor winding is Nwr/2=1 [turn], the leakage inductance of each rotor winding is Lrw [H], the resistance of each rotor winding is Rr [Ω], the induced voltage of those rotor windings is Vr [V], and the current of those rotor windings is Ir [A].

The number of turns of the full-pitch winding(s) of one phase in the stator of FIG. 1, which is placed between 180° opposite slots, is Nws/2 [turns]. The full-pitch winding current is IsFX [A], and of IsFX, the excitation current component of the full-pitch winding(s) is IsfFX [A] and the rotor current component of the full-pitch winding(s) is IsrFX [A]. The full-pitch winding induced voltage is VsFX[V]. The excitation current component of the full-pitch winding(s) of each phase of the stator is IsfFX[A], which is converted to a virtual concentrated winding and expressed as the excitation current component of the concentrated winding of each phase IsfCX[A]. The magnetic flux density in the air gap between the stator and rotor is Bgap [T], and the thickness of the air gap is Lgap [m].

The full-pitch winding excitation current of phase AD2 is IsfadFX [A], where the subscript "ad" represents the phase. When all phases are indicated instead of a specific phase, the subscript ad indicating the phase is omitted and IsfFX[A] is used. In a block diagram showing the entire control of an induction motor, such as that shown in FIG. 2, when control is shown for the current of each phase, the subscript n is added in the sense of each phase and IsfnFX[A] is used. This subscript rule shall also be applied to the magnetomotive force Q[A-turn], magnetic field strength H[A/m], magnetic flux density at the air gap Bgap[T], magnetic flux φ[Wb], voltage V[V], torque [Nm], and power P[W]. The slip frequency is Fs [Hz], the slip angular frequency ωs is [rad/sec], and the speed of the rotor winding is VELr [m/sec]. One control sample time in induction motor control is assumed to be Δt=0.0002 [sec].

Next, the magnetic flux density Bgap in the air gap section between the stator and rotor and its excitation current component are explained. For example, assume that the rotor winding 1U facing the A2 phase stator pole 11 and the rotor winding 1U facing the A/2 phase stator pole 12 in FIG. 1 and the rotor winding 1U facing the A/2 phase stator pole 12 in FIG. 1. The magnetic flux density and its excitation current around the rotor winding 1V opposite the phase A2 stator pole 11 and the phase A/2 stator pole 12 in FIG. 1 are discussed. Since it is difficult to obtain the excitation currents around 1U and 1V for each full pitch winding(s) shown in FIG. 1, a hypothetical concentric current is used to calculate the currents around the rotor windings 1U and 1V. Therefore, we will consider the hypothetical concentrated winding wire structure shown in FIG. 3, which is equivalent to FIG. 1. The A2-phase magnetic flux component φa and its magnetic flux density Bgapa shown in FIG. 3 are the result of the virtual A2-phase concentrated winding 31 and the virtual A/2-phase concentrated winding 32 in series. The phase A2 concentrated winding excitation current component IsfaCX, which is connected in series with the virtual phase A2 concentrated winding 31 and the virtual phase A/2 concentrated winding 32 and energized, excites the phase A2 concentrated winding.

The number of turns of each of 31 and 32 is Nws/2, and the total number of turns when connected in series is Nws, and the air gap length Lgap=0.0005 [m]. The magnetic resistance of the air gap section of the teeth and back yoke is ignored because it is small compared to the magnetic resistance of the air gap section, and the motor model is simplified and explained here. From the configuration in FIG. 3 and equations (59), (63), and (64), the excitation current component IsfaCX and the A2 phase magnetic flux The relationship between the excitation current component IsfaCX and the phase A2 magnetic flux density Bgapa is as follows.

$$IsfaCX = 2 \times (Bgapa \times Lgap)/(\mu 0 \times Nws) \quad (72)$$

For example, if the number of turns of the concentrated winding is 40 [turns] and the phase A2 magnetic flux density Bgapa is 1 [T], IsfaCX is 9.95 [A]. Similarly, the excitation current components for each phase can be obtained once the magnetic flux density distribution, which is the command value for induction motor control, is determined. The virtual concentrated winding excitation current components can then be obtained by performing a full-pitch winding transformation as described above to obtain the full-pitch winding excitation current components.

Next, the relationship between the slip angular frequency ωs [rad/sec], the rotor winding voltage Vr, and the rotor current Ir, that is, the torque current component, is explained. The induced voltage Vr [V] of the rotor winding, the current Ir [A] of the rotor winding, and the rotor windings 1U and 1V in FIGS. 1 and 3 are full pitch winding(s) RW1. Assuming that the aforementioned rotor windings 1U and 1V are full-pitch winding rotor windings RW1, as shown in FIG. 3, the magnetic flux density of the A2-phase stator Assume that the magnetic flux density is the phase A2 flux density Bgapa of the phase A2 stator pole 11 as shown in FIG. 3. As described above, 14 full-pitch winding rotor windings are arranged on the circumference, each winding is electrically insulated from each other, the number of turns of each rotor winding is simplified to Nwr/2=1 [turn], the resistance of each full-pitch winding rotor winding is Rr [Ω], respectively, and the leakage inductance of each rotor winding is The equivalent circuit of one full-pitch winding rotor winding is shown in FIG. 4.

As described above, the field flux φm is specified by an arbitrary flux distribution and is excited by the hypothetical concentrated winding excitation current component in FIG. 3, as described above. Then, given the relative speed VELr [m/sec] of each rotor winding and field flux φm, that is, the aforementioned slip angular frequency ωs [rad/sec] in the CCW direction, the induced voltage Vr1 [V] of rotor winding RW1 is generated. Since it is a relative velocity VELr, it is independent of the angular velocity of rotation ωr [rad/sec] of the rotor, for example, the field flux φm moves to CCW at ωs when the rotor is fixed, or the rotor is moving to CCW at ωs when the field flux φm is fixed. At this time, the effective length of the rotor winding is twice the effective length of the rotor, Wm [m], because it is a full-pitch winding, and the number of turns of the rotor winding in each slot of the rotor is 1 [turn], so the induced voltage Vr1 of rotor winding RW1 is equal to the flux The induced voltage Vr1 of rotor winding RW1 is given by the following equation from the magnetic flux density Bgapa and winding speed VELr.

$$Vr1 = Nwr/2 \times VELr \times Bgapa \times Wm \times 2$$

$$Vr1 = Nwr/2 \times VELr \times Bgapa \times Wm \times 2 = \omega s \cdot Mr \times Bgapa \times Wm \times 2 \quad (73)$$

The voltage direction of the induced voltage Vr1 is the voltage generated from the back side of the paper to the front side of the rotor winding 1U. The other full-pitch winding rotor windings RWn have the same relationship as in equation (73).

However, equation (73) assumes that the magnetic flux density Bgapa of phase A2 magnetic flux φa in FIG. 3 and a constant value of field magnetic flux φm are in relative motion with rotor winding RW1 at the slip angular frequency ωs. Assuming also that the magnitude of the field flux φm varies, the chain flux of the rotor winding RW1 is φr1, which can be expressed as the induced voltage Vr1 in (74) from Faraday's law of electromagnetic induction.

$$Vr1 = Nwr/2 \times d\varphi r1/dt \quad (74)$$

The magnetic flux φr1 of the rotor winding RW1, which is composed of the above rotor windings 1U and 1V, is (φb+φc+φd), which chains from downward to upward on the paper surface in FIG. 3. −φe−φf−φg) and part of the phase A2 magnetic flux φa. Since the magnitude of the field flux φm is not always constant, equation (74) is a stricter definition of the induced voltage Vr1 of the rotor winding RW1 than equation (73), but the chain flux of the rotor winding RW1 can be calculated as φr1 is more difficult to calculate.

As an example of concrete control, assuming that the calculation is performed every control sampling time Δt, the induced voltage Vr1 of rotor winding RW1 can be calculated by transforming (74) into the following equation.

$$Vr1 = Nwr/2 \times \Delta\varphi r1/\Delta t \quad (75)$$

$$= Nwr/2 \times (\varphi r13 - \varphi r11)/\Delta t \quad (76)$$

The magnetic flux φr13 is the chained magnetic flux of the rotor winding RW1 during the current control, and the magnetic flux φr11 is the chained magnetic flux of the rotor winding RW1 during the previous control. (When calculating the induced voltage of each rotor winding in equation (76), the chain magnetic flux of each rotor winding should be calculated and obtained for each control sampling time Δt. At this time, the discrete distribution function Dist2 of the rotor rotation position θr, the field flux position θf, and the magnetic flux density is required. The magnetic flux chained to each rotor winding can be calculated.

The discrete distribution function Dist2 of the magnetic flux density can be substituted for the target distribution function Dist1. The magnetic flux of each stator pole or, if the magnetic flux density is detected, it can also be calculated using the magnetic flux detection value. When the field flux φm is a constant value and torque control is performed with a slip angular velocity ωs, the induced voltage Vr1 of the rotor winding RW1 can be calculated by the first equation (73). If the time variation of the magnitude of the field flux φm is larger than the circuit time constant of the rotor winding and the time variation is gradual, the calculation related to the time variation of the field flux φm can be simplified.

Next, since we are studying the relationship between the field flux φm and the relative speed between the field flux φm and the rotor winding, the rotor winding voltage Vr, and the rotor winding current Ir, we assume the angular speed of rotation of the rotor ωr=0 [rad/sec] to simplify the motor model. The voltage equation of the rotor winding is roughly the differential equation of the following equation, since the rotor current Ir [A] acts with the rotor winding leakage inductance Lrw [H] and the rotor winding resistance Rr, and the rotor current Ir has a first order delay characteristic.

$$Vr=Lrw \cdot dIr/dt+Ir \cdot Rr \tag{77}$$

(Equation (77) allows the rotor currents of each phase in various control conditions to be specified and obtained for each rotor winding.

The voltage Vr induced in the rotor winding RW1, which is the left side of equation (77), can be calculated by any of equations (73), (74), (76), etc., and is induced by the field flux φm. On the other hand, the aforementioned leakage inductance Lrw[H] on the right side of equation (77) is the leakage inductance related to the leakage flux φrw generated around the slot of the rotor winding and the coil end of the rotor winding. For example, assume that the rotor windings 1U and 1V in FIGS. 1 and 3 are full-pitch winding rotor windings RW1 as described above. Assume that the number of turns of the rotor winding is N. If the number of turns of the rotor winding is Nwr/2, the flux chain crossing number ψrw[turn×Wb] related to the leakage flux φrw[Wb] of this rotor winding can be expressed as follows.

$$\psi rw=Lrw \cdot Ir=Nwr/2 \cdot \varphi rw \tag{78}$$

The voltage component related to the above leakage inductance Lrw[H] can also be transformed into the following equation.

$$Lrw \cdot dIr/dt=Nwr/2 \cdot d\varphi rw/dt \tag{79}$$

The above leakage flux φrw is also an obscure flux component such as scattered along the rotor windings.

And Lrw·dIr/dt on the right side of equation (77) is the voltage related to the leakage flux φrw on the right side of equation (79), which is a voltage related to a different magnetic flux component than the left side. The magnitudes of these φm and φrw are quite different. Although the leakage flux φrw of this rotor winding is not a large value, it has a large effect on the operation of the induction motor because each rotor current Ir is a current with a first-order delay of the time constant T=Lrw/Rr because the rotor winding is a winding that is shorted with the leakage inductance Lrw [H] and the rotor winding resistance Rr.

The leakage inductance Lsw and leakage flux φsw of each stator winding cannot be ignored as motor characteristics, but equations (22) to (42) are for the field flux φm, and Each leakage flux φsw of each stator winding is ignored. The stator winding resistance Rs is also an important parameter that generates motor copper loss, but since it is on the stator side of the induction motor, the voltage drop related to Lsw, φsw, and Rs can be easily compensated by the drive circuit, and adverse effects such as control response delay can be absorbed. In this disclosure, Lsw, φsw, and Rs are positioned as separate issues and are not mentioned.

Next, the torque T[Nm] and output power [W] of the induction motor are explained. The torque Trn of each rotor winding is given by The force generated by each winding is Frn [N]. Lorentz force, and each direction can be checked by Fleming's left-hand rule. The torque Trn of each is obtained, and the total of them is the torque T[Nm] of the induction motor.

$$Frn=Bgapn \cdot Irn \cdot Wm \times 2 \tag{80}$$

$$Trn=Frn \times Mr=Bgapn-Irn-Wm \times 2 \times Mr \tag{81}$$

$$T=\Sigma Trn \tag{82}$$

Multiplying the torque T by the angular speed of rotation of the rotor, ωr [rad/sec], gives the output power of the motor, P [W].

$$P=T \times \omega r \tag{83}$$

Although the rotor current Ir can be obtained using equations (73) and (77), etc., the value of the rotor resistance Rr used here varies with temperature, and this can be a factor in control error in induction motor control. However, the value of the rotor resistance Rr used here varies with temperature, which is a factor of control error in induction motor control. Copper and aluminum both have a large temperature coefficient of resistivity, and the resistance value changes by about 40%/100° C. Therefore, the temperature change of the rotor has a large impact on the control accuracy of the induction motor. Countermeasures include: measuring the rotor current to avoid temperature effects; measuring the rotor temperature and correcting the rotor resistance to reduce control errors; measuring the rotor resistance by applying a pulse voltage from the stator side or by other means; and estimating or learning the rotor The rotor resistance can be estimated or learned from the operation of the control circuit, motor operation, and other factors. Any of these methods can be applied to the present disclosure.

Next, based on equations (73), (77), and (80), an example of a method for calculating the slip angle frequency ωs in the initial stage of sampling control of an induction motor is given below. The following is an example of a method for calculating the slip angular frequency ωs. It is because the rotor current Ir is a differential equation as shown in the voltage equation in equation (77) above, and the rotor current Ir is a first-order delay response, so the rotor voltage Vr in equation (73), and and the sliding angular frequency ωs cannot be specified without regard to the time history. This is one way to calculate the slip angular frequency ωs as a countermeasure. As will be explained in detail later in the induction motor speed control example in FIG. 2, in the initial stage of the above control, the target distribution function Dist1 or the discrete distribution function Dist2 of the magnetic flux density based on the torque command Tc based on the speed error and the rotational angular speed ωr of the rotor are obtained. The first term on the right side of equation (77) can then be ignored, and the outline calculation can proceed by replacing the hypothetical rotor current Irx with only the stationary term in the following equation.

$$Irxn = Vrn/Rr \qquad (84)$$

Note that at this time, the value of Irxn in equation (84) is often slightly larger than the value in equation (77) because the leakage inductance Lrw in equation (77) is ignored. To reduce this error, the value of Irxn in equation (84) may be modified by estimating the calculation error from the past slip angular frequency ωs, etc. That is, this value of Irxn may be corrected to a smaller value according to the slip angular frequency ωs and the rotor rotation angular frequency ωr.

Now, in the case of the motor in FIG. 1 and FIG. 3, there are 28 rotor windings on the circumference, and assuming all section windings, 14 rotor full-pitch winding wires are arranged. The number of turns Nwr/2 of each rotor winding is assumed to be 1 [turn]. 1U rotor winding is RW1, and RW1 to RW14 in the order of CCW, and each of these rotor currents is Irx1 to Irx14, and the flux density in each rotor winding section is Bgap1 to Bgap14, and the torque of each winding is assumed to be Tr1 to Tr14. The magnetic flux density corresponding to each rotor winding is obtained from the target distribution function Dist1 to Bgap1 to Bgap14. 1U rotor winding from position RW1 to 180° to CCW, Bgap1 to Bgap14 at 14 locations in each rotor winding. This is the magnetic flux density at the air gap indicated by the 14 values. The magnetic fluxes φa, φb, φc, φd, φe, φf, φg [Wb] for each phase shown in FIG. 3 are expressed in different ways.

The torque Tr1 generated by the rotor winding RW1 can be expressed by the following equation from equations (81), (84) and (73).

$$Tr1 = Bgap1 \cdot Ir1 \cdot Wm \times Mr \times 2$$
$$Tr1 = Bgap1 \cdot Vr1/Rr \cdot Wm \times Mr \times 2 = \qquad (85)$$
$$Bgap1 \cdot \omega s \cdot Mr \times Bgap1 \cdot Wm \times 2/Rr \cdot Wm \times Mr \times 2 =$$
$$4 \times (Bgap1 \cdot Mr \cdot Wm)2 \times \omega s/Rr$$

The same is true for the torque components Tr2, Tr3, . . . Tr13, and Tr14 generated by the other rotor windings. The motor torque T can be expressed from equations (81) and (82) as $$T = \Sigma Trn = (Bgap1^2 + Bgap2^2 + \ldots + Bgap13^2 + Bgap14^2) \times 4 \times (Mr \cdot Wm)^2 \times \omega s/rr \qquad (86)$$

Assuming that the motor torque T in equation (86) is the torque command value Tc described above, the slip angular frequency ωs can be obtained as the following equation.

$$\omega s = \tfrac{1}{4} \times Tc \times Rr/\{(Bgap1^2 + Bgap2^2 + \ldots + Bgap13^2 + Bgap14^2) \times (Mr \cdot Wm)^2\} \qquad (87)$$

The above is an example of how to set the slip angular frequency ωs in the initial stage of the induction motor speed control example in FIG. 2. The subsequent values of the rotor current can be calculated and controlled according to the voltage equation in equation (77), as shown later. The value of the rotor current is a continuation from the past value.

This method of initializing the slip angular frequency ωs ignores the transient term in the transient and stationary terms of equation (77). Therefore, the initial value of the slip angular frequency ωs tends to be calculated rather small, but since the induction motor is speed-controlled and part of the speed feedback control loop, this effect can be absorbed by the feedback control. The value of ωs in equation (87) can also be corrected by estimating the calculation error based on the most recent past slip angular frequency and other factors. Another method is to reduce the transient term in equation (77) by adding a magnetic flux for delay compensation to reduce the current delay caused by the circuit time constant of the rotor winding, which will be explained later. Another method to reduce the response delay of the rotor current is to cancel the response delay as a transfer function by activating differential compensation in the proportional, integral, and derivative PID compensator functions that determine the torque command value to the extent that the aforementioned response delay is reduced. In this case, it is a matter of setting the PID compensator.

Next, examples of specific characteristics and waveform shapes when an induction motor operates according to the rotor winding voltage equation in equation (77) are described. Then, the specific concept of increasing torque by the present disclosure and examples of waveform shapes will be explained. Note that it is difficult to clarify the differences in the improvement of characteristics, such as an increase in torque, only by a qualitative explanation of the improvements. Therefore, a model shape of an induction motor is set up to show both qualitative explanations of improvements and quantitative explanations such as numerical comparisons of torque increases, etc. The motor model is configured as shown in FIG. 1, where the rotor radius Mr is 0.075 [m] and the effective length Wm in the rotor axial direction is 0.1 [m]. As described above, the stator is wound with full pitch windings with 7 phases and 14 slots. Even if the rotor winding has a configuration in which a shorting plate is placed at the coil end as described above, if the resistance of the shorting plate is extremely small, equivalently, the rotor winding configuration is assumed to be 28 slots with 14 pairs of full pitch windings. The number of turns of each of those rotor windings is assumed to be 1 [turn], the winding resistance Rr of each rotor winding is 0.002 [Ω], and the leakage inductance Lrw of each rotor winding is 0.00005 [H].

Next, an example of calculation for the rotor current flowing in the rotor windings shown in FIG. 1 is described. Several conditions are set and the rotor current Ir [A] under these conditions. First, assume that the rotor windings 1U and 1V in FIG. 1 are full-pitch winding wires and electrically insulated from the other rotor windings as described above. The field flux excitation of the induction motor is assumed to be excited and driven to CCW, and as a simpler drive mode, the field flux φm is rotated to CCW at a slip frequency Fs [Hz] with the rotor fixed and the rotor speed at zero. Furthermore, that state is equivalent to the state in which the rotor is rotated in the opposite direction CW at the sliding frequency Fs [Hz] with the field flux φm fixed for the aforementioned rotor windings 1U and 1V. Therefore, the operating model of the rotor current Ir is considered by replacing it with the state of the rotor winding 1U and 1V.

That is, in other words, the state in which the field flux φm is rotated to CCW at the slip frequency Fs [Hz] with the rotor fixed in the real axis coordinate is, of course, the state in which the field flux φm is fixed and the rotor is rotated to CW in the opposite direction at the slip frequency Fs [Hz] in the MN coordinate, which is the rotation coordinate.

Here, the inventors will also review the main physical quantities of induction motors and their relationship to each other. The excitation current component Isfa [A] of the hypothetical concentrated winding and the magnetic flux density Bgap [T] of the air gap section are shown in the simplified motor model by equations (63) and (64). The slip frequency Fs [Hz] or slip angular frequency ωs [rad/sec], Bgap [T] and rotor voltage Vr [V] are shown in equation (73). The rotor voltage Vr [V] and rotor current Ir [A] are shown in equation (77). The torque Trn [Nm] of a certain rotor winding, Bgap [T] of that winding section, and the rotor current Ir [A] are shown in equation (81). These variables are mutually related to each other in a series. Therefore, the operation of this induction motor should be treated and described in terms of one of the variables, but if the reference variable changes for each phenomenon to be expressed, it becomes complicated and confusing. Therefore, in this specification, the values of each of the aforementioned variables will be obtained and described mainly based on the magnetic flux density Bgap at the air gap. The rotor current component that should be energized by the stator current will be explained later.

Again, with the field flux φm fixed and the rotor rotating in the opposite direction CW at the slip frequency Fs [Hz], the aforementioned rotor windings 1U and 1V, the rotor voltage Vr [V] is shown in equation (73). The rotor current Ir is calculated according to equation (77), and the control software, which calculates the rotor current every minute of the control sampling time Δt, calculates it as follows.

$$\Delta Ir = (Vr - Ir \cdot Rr) \times \Delta t / Lrw \quad (88)$$

$$Ir = Ir + \Delta Ir \quad (89)$$

Note that (88) is an approximate formula for equation (77) because it is expressed in terms of minute changes. Also, equation (89) is not an equation but a replacement equation in the interrupt process for each control sampling time Δt, which is often used in software, in the sense that (ΔIr is added to Ir up to now to make the new Ir). As a result of these calculations, the rotor current Ir becomes a current value with a first-order delay with respect to the rotor voltage Vr according to the differential equation in equation (77). The distribution of the field flux φm is the sinusoidal wave shown in FIG. 8.84 with its maximum flux density set to 1 [T], and the slip frequency Fs is 5 [Hz]. The case of an ideal sinusoidal magnetic flux distribution, which is the target distribution function Dist1, is explained here.

As a general and model condition for induction motors, it is assumed that the mutual inductance between the rotor and stator windings is sufficiently large to supply the stator winding with the stator current component Isr [A], which is the same magnitude as the product of the rotor current Ir [A] and its number of turns Nwr/2 [turns], energized in the opposite direction. If the number of turns of the stator winding at this time is Nws/2 [turn], the following formula is obtained.

$$Ir \cdot Nwr/2 = -Isr \cdot Nws/2$$

In this state, the field current component Isf of the stator and the rotor current component Isr induce the rotor current Ir. At this time, the magnetomotive force [A×turn] of the stator rotor current component Isr and the rotor current Ir are also in a mutually canceling relationship. Here, the field flux φm is excited by the field current component Isf of the stator. Although the expression is a roundabout one, these relationships are similar to the relationship between the primary excitation current component, the secondary current flowing to the load, and the secondary current component flowing to the primary in a transformer connected to a constant-voltage power supply. At this time, the magnetomotive force of the secondary current and the secondary current component flowing into the primary cancels each other out in the iron core of the transformer.

Figure 26:
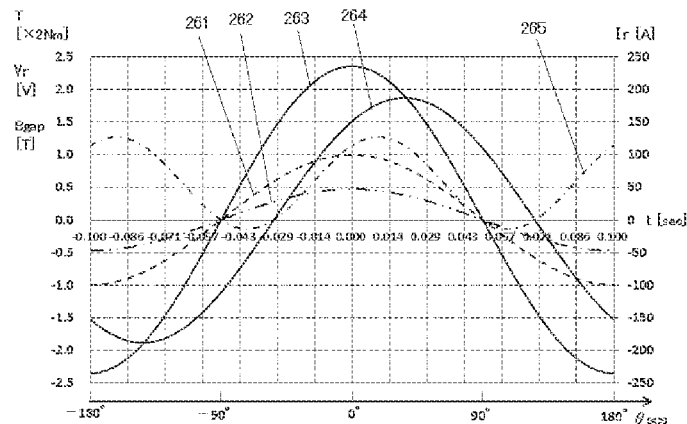
FIG. 26 exemplifies a rotor current, torque and others when driven sinusoidally.

FIG. 26 shows an example of various characteristics, such as rotor current, calculated with spreadsheet software under the above conditions. The horizontal axis of the paper in FIG. 26 is time t [sec], with a horizontal axis width of 0.2 sec with the left end at −0.1 [sec] and the right end at 0.1 [sec], which is one cycle of 5 [Hz]. As mentioned above, the rotor rotates to CW with the field flux φm fixed. The lower part of FIG. 26 shows, for reference, the converted angle of rotation of the induction motor. 261 shows a magnetic flux density Bgap in the air gap section where the rotor windings 1U and 1V shown in FIG. 1 pass through, with a maximum value of 1 [T]. The shape of the time axis of the magnetic flux density 261 in FIG. 26 is naturally proportional to the shape of the magnetic flux density distribution in FIG. 1, since it assumes a fixed field flux φm. As mentioned above, the magnetic flux distribution in FIG. 1 is the 84 sinusoidal distribution in FIG. 8.

In FIG. 26, there is an inconsistency in the aforementioned distribution state of the magnetic flux density Bgap, ignoring the magnetic discreteness of the teeth. The 84 sinusoidal distributions in FIG. 8 are the target distribution function Dist1, which is a continuous-like ideal sinusoidal distribution shape. On the other hand, the 7-phase induction motor shown in FIG. 1 is circumferentially discrete and cannot actually produce an ideal sinusoidal distribution shape because the 14 stator poles generate the magnetic flux density Bgap in the air gap section. Therefore, in FIG. 26, the motor is many times multiphase than the 7-phase motor of FIG. 1, and the field excitation current components are also many times more multiphase than in equation (45) to equation (51). In short, FIG. 26 shows an example of rotor currents Ir, etc. flowing in rotor windings 1U and 1V when the magnetic flux distribution in the air gap section of FIG. 1 assumes an ideal sinusoidal distribution.

The angular frequency ω [rad/sec] in equation (45), etc., is usually the following equation.

$$\omega = \omega r + \omega s \quad (90)$$

$$\omega r = 2\pi \cdot Fr \quad (91)$$

$$\omega s = 2\pi \cdot Fs \quad (92)$$

In the equations, ωr is the rotor rotation angular frequency [rad/sec], Fr is the rotation frequency [Hz], ωs is the slip angular frequency [rad/sec], and Fs is the slip frequency [Hz]. As a result, since the example in FIG. 26 is an example in which the field flux φm is fixed in the circumferential direction, the desired field flux distribution is given to the spreadsheet software input on the assumption that the desired field flux distribution is excited and generated by each field excitation current component, and FIG. 26, the rotor current Ir, torque T, etc. are calculated. Of course, it is also possible to calculate by setting ωr to 0 and ωs to 2π×5 [rad/sec] as the fixed rotor, and rotating the field flux φm to CCW, in which case the calculation results of the rotor current Ir, etc. will be the same values.

The distribution state of the field flux φm in FIG. 26 is the 84 flux density distribution in FIG. 8, and in FIG. 1, the field flux φm passes from the left side of the paper to the right. In this state, the rotor is rotated at a negative slip frequency Fs. In other words, the rotor is rotated CW.

261 in FIG. 26 is the magnetic flux density acting on the aforementioned rotor windings 1U and 1V, and 262 is the voltage Vr [V] generated according to equation (73). 263 is the hypothetical rotor current Ir [A] when the leakage inductance Lrw is 0 [H] in equation (77), and the amplitude is 235.6 [A]. 264 is the rotor current Ir [A] according to the differential equation in equation (77), with an amplitude of 187.4 [A], and compared to 263, the amplitude is reduced to 79.5% and the phase is delayed by 36°, a first-order delay value. Note that this 264 shows the calculated steady waveform when the rotor continues to rotate at the negative slip frequency Fs. 265 is the value of the torque T according to equation (81). The period of this torque is 180°. The average value of the torque generated by the rotor windings 1U and 1V is 1.136 [Nm]. At this time, the average value of the rotor copper loss is 35.1 [W]. Then, the total torque average of the induction motor in FIG. 1 is the torque generated by the rotor current of the 14 full-pitch winding rotor windings according to equation (82), which is 15.903 [Nm].

This torque value will be explained in comparison with the example of trapezoidal wave-shaped magnetic flux density distribution, etc. described below. For induction motors modeled simply as described above, once the magnetic flux density distribution and slip angular velocity ωs are determined, each current value, torque, power, etc. can be calculated by the method described above. As described below, the magnetic flux density distribution shape is not limited to a sinusoidal shape, but any shape of magnetic flux density distribution can be generated, and the current, torque, etc. can be calculated and controlled. However, it is necessary to accurately energize the stator side windings with the current values to be calculated. We will explain those individual techniques later. As a result, it is possible to increase the average torque, increase the peak torque, improve efficiency, reduce the size of the induction motor, and reduce the size of the drive circuit.

Figure 27:
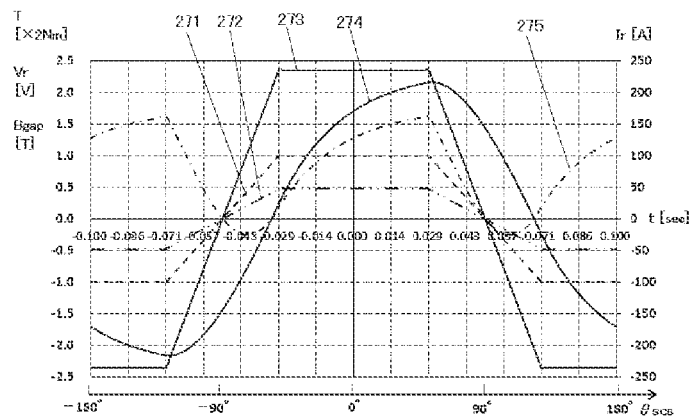
FIG. 27 exemplifies a rotor current, torque and others when driven by a trapezoidal wave.

Next, the characteristics of rotor current Ir, torque T, etc. in the case of the target distribution function Dist1 shown by 83 in FIG. 8 are shown and explained in FIG. 27. The drive conditions, etc. in FIG. 27 are the same as those in FIG. 26 above. Instead of fixing the rotor and rotating the field flux φm at a sliding frequency Fs to CCW, the rotor is rotated at a sliding frequency Fs to CW with the field flux φm fixed. The rotor current Ir [A], torque [Nm], etc. are calculated under these conditions. 271 in FIG. 27 shows the Bgap magnetic flux density in the air gap section through which the rotor windings 1U and 1V pass, and the horizontal axis is shown as time t [sec]. The maximum value is set to 1 [t]. The slip frequency Fs is set to 5 [Hz]. The time waveform is trapezoidal in shape, and the time of change of Bgap is ⅕×3/14=0.0428 [sec] wide, and the interval where the magnetic flux density is constant at 1 [T] is ⅕×4/14=0.0571 [sec] wide. This field flux φm is excited by the stator excitation current, and 83 in FIG. 8 is an example of a hypothetical ideal trapezoidal wave flux density distribution.

272 in FIG. 27 is the voltage Vr [V] generated in said rotor windings 1U and 1V according to equation (73). 273 is the voltage Vr[V] generated in the rotor windings 1 and 1V according to equation (77). 273 is the rotor current Ir [A] when the leakage inductance Lrw is assumed to be 0 [H] and the amplitude is 235.6 [A]. The amplitude is 215.8 [A], and compared to 273, the amplitude is reduced to 91.6%, the phase is delayed, and the trapezoidal shape becomes a distorted waveform shape. Also, 274 shows the stationary waveform when the rotor continues to rotate at a negative slip frequency −Fs. 275 is the torque according to equation (81), and the average value of the torque generated by the above rotor windings 1U and 1V is 1.592 [Nm]. The average value of the rotor copper loss is 49.16 [W]. The total average torque of the induction motor in FIG. 1 is 14 times 22.288 [Nm], according to equation (82).

Now consider how torque in different energization modes can be compared. Compared to the average torque of 1.136 [Nm] for the 265, the average torque of 1.592 [Nm] for the 275 is increased. Under the condition of the maximum magnetic flux density value of 1[T], the average torque increased by 40.1% compared to the sinusoidal wave shown in FIG. 26, confirming the effect of the torque increase. Since the copper loss also increases at this time, from the viewpoint of motor loss and temperature rise, the slip frequency Fs is investigated so that the rotor copper loss is the same value, and the torque at the same rotor copper loss is compared at that time to evaluate the torque increase rate.

Figure 28:
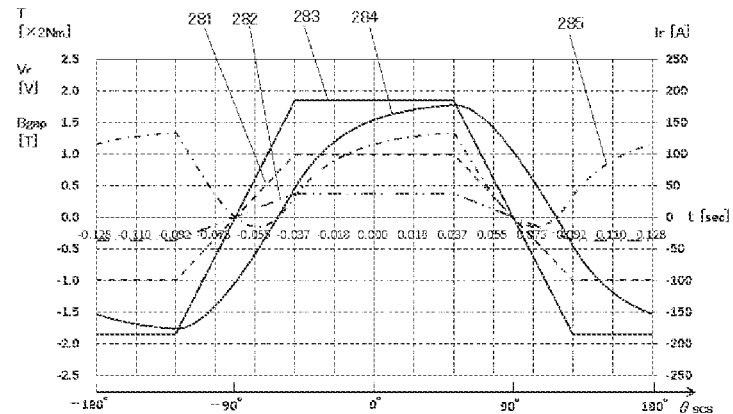
FIG. 28 exemplifies a rotor current, torque and others when driven by a trapezoidal wave.

FIG. 28 shows the characteristics of the slip frequency Fs of 5 [Hz] in FIG. 27 reduced to 3.9 [Hz], and equal to the average rotor copper loss of 35.1 [W] for the sinusoidal distribution in FIG. 26. The time axis changes. 281 in FIG. 28 is the magnetic flux density Bgap in the air gap section through which the rotor windings 1U and 1V in FIG. 1 pass, with a maximum value of 1 [T]. 282 is the voltage Vr [V]generated in the rotor windings 1U and 1V according to equation (73), which is a small value since Fs is 3.9 [Hz]. 283 is the rotor current Ir [A] when the leakage inductance Lrw is assumed to be 0 [H] in equation (77), and the amplitude is small at 183.8 [A]. 284 is the rotor current Ir [A] according to the differential equation in equation (77) with an amplitude of 177.2 [A]. 285 is the torque T [Nm] according to equation (81), and the torque generated by the rotor windings 1U and 1V. The average value is 1.454 [Nm]. The average value of the rotor copper loss is 35.1 [W].

Compared to the average torque value of 1.136 [Nm] at sinusoidal wave in FIG. 26, the torque T increased by 28% for the trapezoidal wave-shaped magnetic flux density distribution in FIG. 28, compared to the same rotor copper loss condition. Therefore, it was confirmed that the trapezoidal wave of 83 can output more torque than the sinusoidal wave of 84 when compared with the target distribution function Dist1 of magnetic flux density shown in FIG. 8. Also, compared to the 274 rotor current waveform in FIG. 27, the 2 The rotor current waveform of 84 approaches a trapezoidal shape. When the slip frequency Fs is reduced from 5 [Hz] to 3.9 [Hz], the effect of reducing the amplitude of the rotor current and, conversely, the effect of improving the rotor current waveform can be confirmed. In the region where the torque is small and the slip frequency Fs is small, the phase delay of the rotor current relative to the magnetic flux density distribution is reduced and torque is generated according to formula (81), thus reducing the adverse effects of the phase delay.

Figure 29:
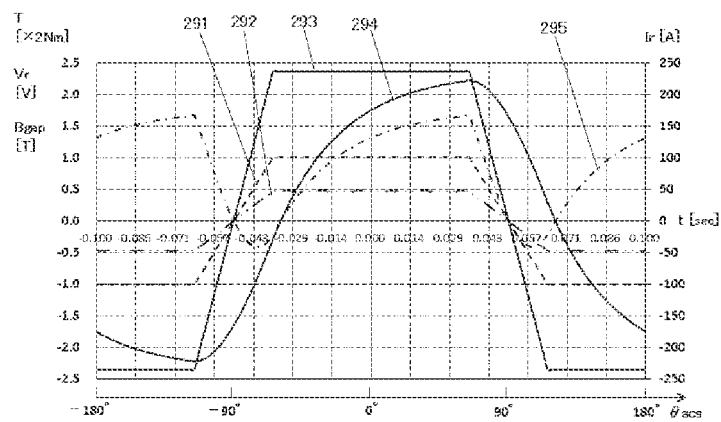
FIG. 29 exemplifies a rotor current, torque and others when driven by a trapezoidal wave.
Figure 82:
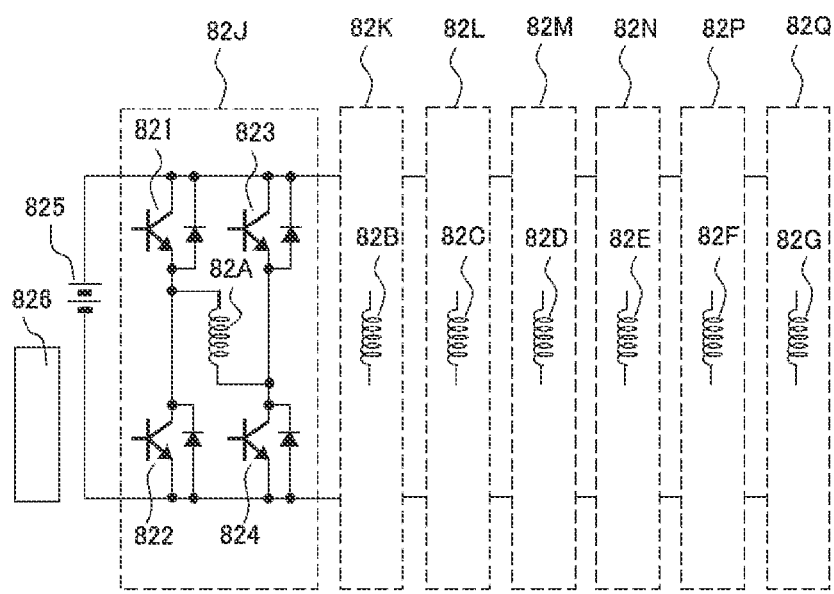
FIG. 82 exemplifies a 7-phase AC drive circuit with less current supply limitations.

Next, the characteristics of the rotor current Ir, torque T, etc. in the case of the target distribution function Dist1 shown in FIG. 8 82 are shown in FIG. 29 and explained. The drive conditions, etc. in FIG. 29 are the same as those in FIG. 26 above. The 291 in FIG. 29 is the same as that in FIG. 1, where the rotor windings 1U and 1 The magnetic flux density Bgap of the air gap section through which the rotor windings 1U and 1V of FIG. 1 pass, and the horizontal axis is shown as time t [sec]. The maximum value is set to 1 [t]. The slip frequency Fs is set to 5 [Hz]. The time waveform is trapezoidal in shape, and the change time of Bgap is ⅕×2/14=0.0287 [sec] wide, and the interval where the magnetic flux density is constant at 1 [T] is ⅕×5/14=0.07143 [sec] wide. This field flux φm is excited by the stator excitation current, and 83 in FIG. 8 is an example of a hypothetical ideal trapezoidal wave flux density distribution.

292 in FIG. 29 is an example of the above rotor windings 1 according to equation (73). U, and the voltage Vr[V] generated in 1V. 293 is the voltage Vr[V] generated in the rotor winding 1V according to equation (77). 293 is the rotor current Ir [A] when the leakage inductance Lrw is assumed to be 0 [H] and the amplitude is 235.6 [A]. The amplitude is 221.6 [A] and the amplitude is reduced to 94.1% compared to 293, the phase is delayed, and the trapezoidal shape becomes a distorted waveform shape. Also, 294 shows the stationary waveform when the rotor continues to rotate at a negative slip frequency −Fs.29 5 is the torque T [Nm] according to equation (81), and the torque generated by the rotor windings 1U and 1V. The average value is 1.754 [Nm]. The average value of the rotor copper loss is 54.1 [W]. This is an increase of 54.4% compared to the average torque value of 1.136 [Nm] during the sinusoidal wave shown in FIG. 26.

Figure 30:
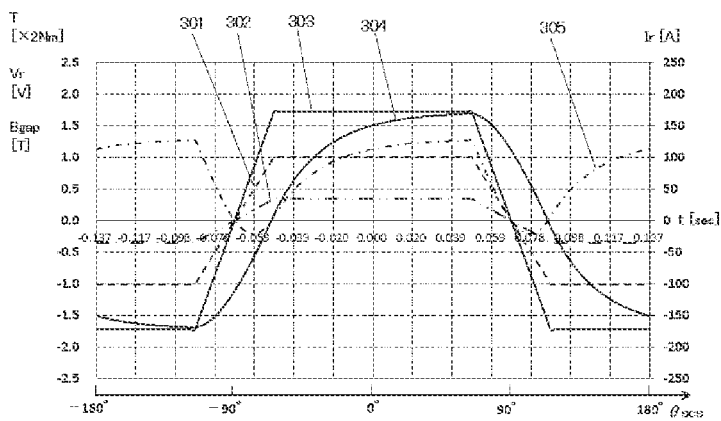
FIG. 30 exemplifies a rotor current, torque and others when driven by a trapezoidal wave.

Next, FIG. 30 shows the average rotor copper loss of the sinusoidal distribution of FIG. 26 with the slip frequency Fs of 5 [Hz] in FIG. 29 reduced to 3.65 [Hz]. The time axis changes. The time axis changes. In FIG. 30, 301 shows the magnetic field at the air gap through which the rotor windings 1U and 1V of FIG. 1 pass. 302 is the magnetic flux density Bgap at the air gap through which the rotor windings 1U and 1V of FIG. 1 pass, with the maximum value set at 1 [T]. 302 is the voltage Vr [V] generated in the rotor windings 1U and 1V according to equation (73), which is a small value since Fs is 3.65 [Hz]. 3 is the rotor current Ir [A] when the leakage inductance Lrw is assumed to be 0 [H] in equation (77), and the amplitude is small at 172.0 [A]. 3 04 is the rotor current Ir [A] according to the differential equation in Eq. (77) with an amplitude of 165.2 [A]0.30 5 is the torque T [Nm] according to equation (81), and the torque generated by the rotor windings 1U and 1V. The average value is 1.556 [Nm]. The average value of the rotor copper loss is 35.2 [W].

Compared to the average torque value of 1.136 [Nm] at sinusoidal wave in FIG. 26, the torque T increased by 37% for the trapezoidal wave-shaped flux density distribution in FIG. 30, compared to the same rotor copper loss condition. This is a further improvement over the 28% increase in FIG. 28. Thus, compared with the target distribution function Dist1 of magnetic flux density shown in FIG. 8, the trapezoidal wave characteristic of 82 is a sine wave of 84 and a trapezoidal wave of 83 trapezoidal wave, which can output a larger torque than the trapezoidal wave of 3. Also, compared to the rotor current waveform of 294 in FIG. 29, the rotor current waveform of 3 in Figure pm 04 rotor current waveform approaches a trapezoidal shape. When the slip frequency Fs is reduced from 5 [Hz] to 3.65 [Hz], the effect of the rotor current amplitude being reduced and, conversely, the effect of the rotor current waveform being improved can be confirmed.

As described above, when the target distribution function Dist1 of the magnetic flux density has the sine waveform shape of 84, the trapezoidal waveform shape of 83, and the trapezoidal waveform shape of 8 in FIG. 8, and the trapezoidal waveform shape of 8 The trapezoidal waveform of 8.2 was explained. The induction motor can be controlled with a more appropriate magnetic flux density distribution depending on the control mode such as speed, torque, and low-loss control. The sine waveform shape shown by 84 in FIG. 8 is suitable for high-speed rotation drive because the current change rate can be smaller and the current waveform can be smooth. On the other hand, in the high torque range of low-speed rotation, the trapezoidal wave characteristic of 81 shown in FIG. 8, which is closer to a square wave, is suitable for high motor efficiency and downsizing, as well as for downsizing the drive circuit.

Figure 31:
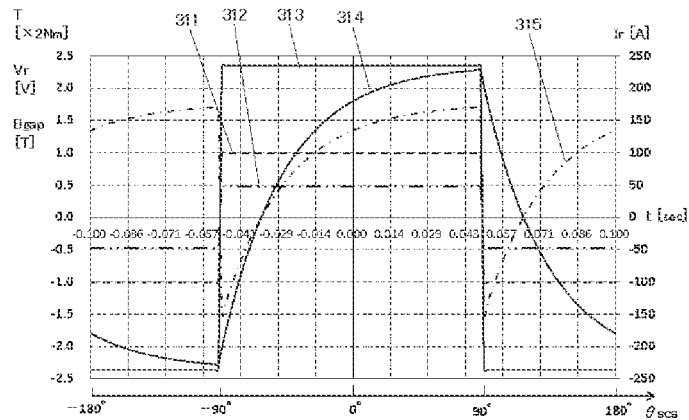
FIG. 31 exemplifies a rotor current, torque and others wen driven by a rectangular wave.

Next, the characteristics of rotor current Ir, torque T, etc. are shown in FIG. 31 and explained for the rectangular wave shape, which is the shape in which the gradient portion of the trapezoidal wave shape shown in FIG. 8 is increased to the extreme limit. Although rectangular wave driving is not realistic in some aspects due to concerns about overcurrent and torque pulsation, it is meaningful to know the characteristics of the extreme values of the trapezoidal waveform. The square wave in FIG. 31 is a hypothetical ideal square wave distribution shape, similar to the other target distribution function Dist1 of magnetic flux density in FIG. 8. The driving conditions, etc. in FIG. 31 are the same as in FIG. 26 above. The 311 shown in FIG. 31 is the same as in FIG. 1, where the rotor windings 1U and 1 The magnetic flux density Bgap at the air gap through which the rotor windings 1U and 1V of FIG. 1 pass is shown on the horizontal axis as time t [sec]. The maximum value is set to 1 [t]. The slip frequency Fs is set to 5 [Hz].

312 in Figure qn is the voltage Vr [V] generated in the rotor windings 1U and 1V according to equation (73). 313 is the rotor current Ir [A] when the leakage inductance Lrw is assumed to be 0 [H] in equation (77), and the amplitude is 235.6 [A]. 314 is the rotor current Ir [A] according to the differential equation in equation (77) with an amplitude of 228.1 [A]. compared to 313, 314 decreases in amplitude to 96.8%, phase lags, and the rectangular shape becomes a distorted waveform shape. 314 shows the stationary waveform when the rotor continues to rotate at a negative slip frequency −Fs. 31 5 is the torque T [Nm] according to equation (81), and the torque generated by the rotor windings 1U and 1V. The average value is 1.921 [Nm]. The average value of the rotor copper loss is 58.87 [W]. This is an increase of 69.1% compared to the average torque value of 1.136 [Nm] at sinusoidal wave in FIG. 26.

Figure 32:
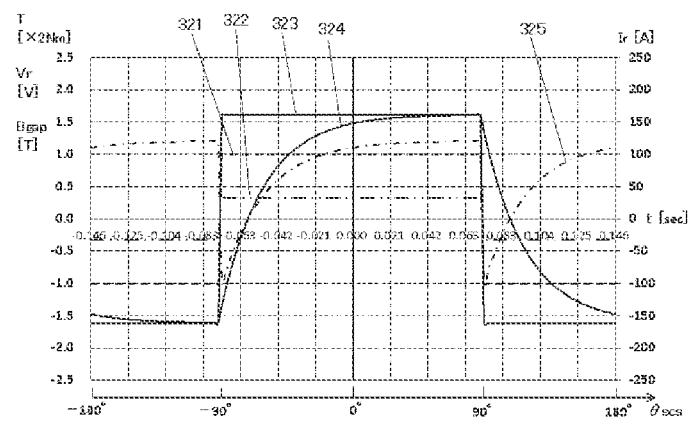
FIG. 32 exemplifies a rotor current, torque and others wen driven by a rectangular wave.

Next, FIG. 32 shows the rotor copper loss for the sinusoidal distribution of FIG. 26, with the slip frequency Fs of 5 [Hz] in FIG. 31 reduced to 3.425 [Hz]. This characteristic is equal to the average value of 35.1 [W]. The time axis changes. 321 in FIG. 32 shows the magnetic field in the air gap section through which the rotor windings 1U and 1 322 is the magnetic flux density Bgap in the air gap section through which the rotor windings 1U and 1V of FIG. 1 pass, with the maximum value set at 1 [T]. 322 is the voltage Vr [V] generated in the rotor windings 1U and 1V according to equation (73), which is a small value since Fs is 3.425 [Hz]. 3 is the rotor current Ir [A] when the leakage inductance Lrw is assumed to be 0 [H] in equation (77), and the amplitude is small at 161.4 [A]0.3 24 is the rotor current Ir [A] according to the differential equation in Eq. (77) with an amplitude of 160.6 [A]0.32 5 is the torque T [Nm] according to equation (81), and the torque generated by the rotor windings 1U and 1V. The average value is 1.664 [Nm]. The average value of the rotor copper loss is 35.1 [W].

Compared to the average torque value of 1.136 [Nm] at sinusoidal wave in FIG. 26, the torque T increased by 46.5% for the rectangular wave shape magnetic flux density distribution in FIG. 32, under the same rotor copper loss conditions. This is a further improvement over the 28% increase in FIG. 28 and the 37% increase in FIG. 30. Thus, compared with the target distribution function Dist1 of magnetic flux density shown in FIG. 8, it is confirmed that the rectangular characteristics output a larger torque that those of sinusoidal waves 84, and trapezoidal waves 83, 82. Also, compared to the rotor current waveform shown by 294 in FIG. 31, the rotor current waveform 304 shown in FIG. 30 approaches a rectangular shape. When the sliding frequency Fs is reduced from 5 [Hz] to 3.425 [Hz], the effect of the rotor current amplitude being reduced and, conversely, the effect of the rotor current waveform being improved can be confirmed.

From the above results, the adverse effects of the phase delay can be reduced in the region where the torque is small and the slip frequency Fs is small, because the phase delay of the rotor current relative to the magnetic flux density distribution is reduced and torque is generated according to formula (81). When controlling an induction motor with these trapezoidal and rectangular wave-shaped magnetic flux density distributions, the current capacity and withstand voltage of the power elements in the drive circuit do not increase, especially in the low-speed rotation region. Therefore, the drive circuit can be made smaller by the amount of torque increase. This is the result of more effective utilization of each power element and improved utilization of each power element. The same is true for induction motors. By using trapezoidal waveform and rectangular waveform magnetic flux density distribution, torque increases with the same rotor copper loss, indicating that induction motors can be downsized by the drive method. Furthermore, each of the aforementioned current waveforms is not ideal and there is room for improvement. Further improvement is possible through compensation techniques for current phase lag, which will be discussed later.

Figure 33:
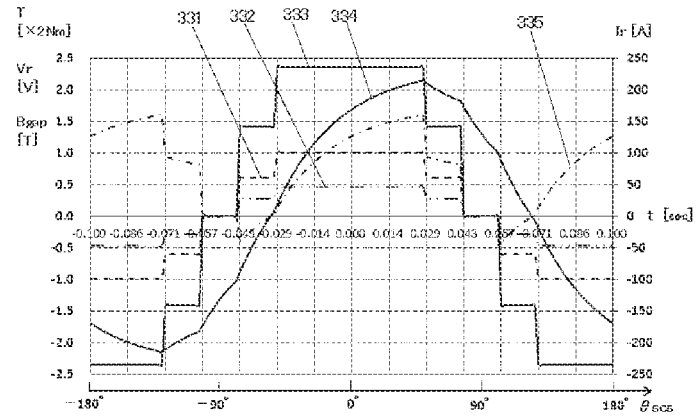
FIG. 33 exemplifies a rotor current, torque and others when driven by a trapezoidal wave.

Next, for the case where the circumferential distribution of magnetic flux density is not an ideal functional distribution but a discrete distribution for each tooth of the stator, the method of obtaining the magnetic flux density Bgap[T] for each tooth, the rotor current Ir[A], its torque Trn[Nm], the total torque T[Nm] of the induction motor, etc. is shown in FIG. 33 is shown and explained. To generate the field flux φm by energizing the stator windings that wind each slot of the induction motor shown in FIG. 1, it is necessary to convert from the target distribution function Dist1, which is the ideal distribution, to the discrete distribution function Dist2, which represents the realistic magnetic flux density for each tooth. Once the discrete distribution function Dist2 of the field flux φm can be calculated, the field excitation current component IsfnCX [A] of the virtual concentrated winding winding for each phase and tooth can be obtained for each tooth, as in Equation (64). The field excitation current components Then, the field excitation current component IsfnFX [A] of each phase of the full pitch windings in FIG. 1 can be obtained by performing the full-pitch winding transformation using equations (1) to (7). The field excitation current components In these equations, the number of turns of each winding is set to Nws/2. The block diagram example in FIG. 2, which will be explained later, shows an example of commanding with the concentrated winding excitation current component, detecting the concentrated winding equivalent excitation current component, and feedback control.

In FIG. 33, a reference 331 shows an example of the air gap section through which the rotor windings 1U and 1 The magnetic flux density Bgap of the air gap section through which the rotor windings 1U and 1V of FIG. 1 pass is shown on the horizontal axis in time t [sec]. The maximum value is set to 1 [t]. The slip frequency Fs is set to 5 [Hz]. And the magnetic flux density distribution Bgap [T] of 331 is the same as in FIG. 8, where the 83 trapezoidal target distribution function Dist1 is transformed to the discrete distribution function Dist2 It is the same as in FIG. 14, which was transformed. The excitation current component realized by excitation of the magnetic flux density distribution Bgap[T] of 331 is the same as that in FIG. 15 above. The current of concentrated winding winding or the current of full pitch windings in FIG. 16. The drive conditions, etc. in FIG. 33 are the same as those in FIG. 26 above.

A reference 332 shown in FIG. 33 indicates the voltage generated in the aforementioned rotor windings 1 Vr [V] is the voltage generated in U and 1V. 331 has a staircase shape in proportion to the magnetic flux density distribution Bgap [T]. 333 is the rotor current Ir [A] when the leakage inductance Lrw is assumed to be 0 [H] in equation (77), and the amplitude is 235.6 [A]. 334 is the rotor current Ir [A] according to the differential equation in equation (77), with an amplitude of 213.9 [A]. The shape of the rotor current Ir [A] in 334 is a broken line due to the phase lag and the staircase flux density. However, the time constant of the rotor circuit Lrw/Rr is 0.00005/0.002=0.025 [sec], resulting in a relatively smooth current waveform. Also, 334 shows the stationary waveform when the rotor continues to rotate at the negative slip frequency −Fs. 335 is the torque T [Nm] according to equation (81), and the torque generated by the rotor windings 1U and 1V. The average value is 1.491 [Nm]. The average value of the rotor copper loss is 46 [W]. In this case, the torque of the entire induction motor shown in FIG. 1 is 1.491×14=20.874 [Nm].

Here, the magnetic flux density distribution calculated from the ideal trapezoidal shape, which is the target distribution function Dist1 of 83 in FIG. 8, and the discrete, which is converted to the discrete distribution function Dist2, is shown in FIG. 27 and the discrete Comparing FIG. 33 calculated from the magnetic flux density distribution in FIG. 14, it can be seen that the magnetic flux density distribution and voltage become and change in a staircase shape, but there is no significant difference in the rotor current. The average torque in FIG. 27 was 1.592 [Nm], so the torque in FIG. 33 is 6.3% lower. In this example, the discrete distribution function Dist2 resulted in a slightly smaller torque value, but it is not a significant difference from the value calculated with the target distribution function Dist1.

The above explanation describes the rotor current, torque, etc. when the rotor rotates at a slip frequency Fs to CW with a fixed field flux. In reality, since the rotor rotates, the frequency of each phase supplied to the stator increases with the rotation speed, and the voltage Vxy of each phase winding increases and changes in proportion to the field flux φm and frequency. At this time, however, the voltage, current, and torque on the rotor side are qualitatively dependent on the magnetic flux density distribution and slip frequency, and do not differ significantly from the characteristics described above. The output power P [W] of the induction motor is from equation (80) to equation (83).

The magnetic flux of the teeth of each stator pole, the current in each phase, and the voltage in each phase are discrete in the circumferential direction, and each magnetic flux density is the aforementioned discrete distribution function Dist2, which is a discontinuous value. However, as the rotor speed increases from 0, the phase of the field flux φm acting on each tooth of the stator changes at high speed, and the aforementioned discontinuity fades and gradually acts as an average value. And in particular, the rotor current Ir has a smoothing effect because it is the first-order delay current in equation (77), and as a result, the induction motor operation approaches the operation of the aforementioned target distribution function Dist1 in FIG. 8, with less pulsation of various kinds of characteristics The stator current, stator current, stator current, stator current, stator current, stator current, and stator current are all in the same order.

The specific methods of creating stator current and stator voltage are described below. The specific control method is also described below.

As mentioned above, in relation to the magnetic flux distribution in FIG. 1, we first explained the outline and trends of typical characteristics such as rotor current and torque using the ideal sinusoidal and trapezoidal waves shown in the target distribution function Dist1 in FIG. 8. Then, an example was given of calculating the excitation current components that should be energized to each winding in FIG. 1 from the discrete magnetic flux density distribution shown in FIG. 14, which was converted to the discrete distribution function Dist2, to calculate the torque. In actual induction motor control, as in the above example, current command values for each phase are obtained according to various magnetic flux distribution shapes, and are calculated and controlled sequentially according to rotor rotation.

The main purpose of a first mode is explained here. While conventional field magnetic fluxes were treated as a single group such as a sinusoidal distribution, the first mode treats the circumferential magnetic flux density of the air gap surface of the field magnetic flux by discretizing it for each tooth, and is a method of independently controlling each of the multiple discretized magnetic flux density distributions. Specifically, the aforementioned discrete distribution function Dist2 in the circumferential direction of the air gap surface is obtained, and the excitation current components for each phase are obtained, commanded and controlled. Then, the stator winding configuration, stator wave configuration, rotor winding configuration, DRIVE CIRCUIT, and motor control means related to them are provided. Some of their specific configurations and control methods are described below. Here, we have not yet described the method of energizing the stator current. In order to realize flexible control of the distribution state, many techniques are required, as described sequentially.

As a result of the above configuration and control method, the magnetic flux density distribution in the circumferential direction of the air gap surface can be flexibly controlled, and the rotor current can be controlled to become a current waveform effective for torque generation. It is also possible to reduce the current capacity and size of the drive circuit.

Although the above example of controlling the magnetic flux density distribution of the air gap section is described as the target of the target distribution function Dist1 and the discrete distribution function Dist2, it is not limited to the magnetic flux density distribution. In terms of control, for example, it can be replaced by the distribution of the magnetic field strength H [A/m] at the air gap surface, or the distribution of the magnetomotive force Q [A], or the current distribution in the stator winding. They shall also be included in the present disclosure. Although the induction motor simplified model assumes that the magnetic resistance other than the air gap section is 0 and is explained in the induction motor simplified model, it is also possible to calculate the magnetic resistance of each section other than the air gap section by having a value of magnetic resistance. That is, the magnetic resistance values can be calculated from the characteristics shown in FIG. 7, for example. Although the calculation becomes more difficult, the model can be an approximation since it is limited to the magnetoresistance around the stator teeth. They shall also be included in the present disclosure. The examples of the first mode will be explained again later.

Next, we will explain how to further improve the waveform of the rotor current of an induction motor to increase torque and improve efficiency. In addition to the magnetic flux density distributions indicated by 81, 82, 83, 84, etc. in FIG. 8, an arbitrarily shaped magnetic flux density distribution is partially added. As a result, its additional flux φadd [Wb] improves the waveforms of the rotor currents. It is because the rotor current Ir shown in FIG. 26, FIG. 27, FIG. 29, etc. causes a phase delay with a time constant, which is a rotor circuit time constant T=Lrw/Rr, which is 0.00005/0.002=0.025 [sec], according to equation (77), resulting a decrease in the average torque. This can be used as a method to compensate for and improve part of that phase delay and increase the average torque.

Figure 34:
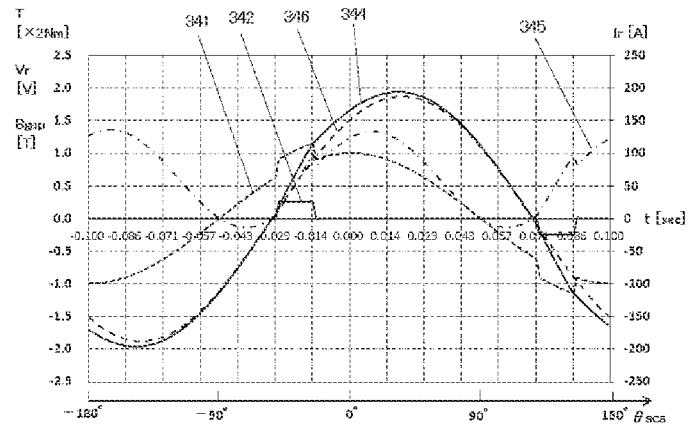
FIG. 34 exemplifies a rotor current, torque and others when driven by a sinusoidal wave.

FIG. 34 shows an example of the characteristics of the target distribution function Dist1 of the sinusoidal magnetic flux density shown in FIG. 8.84 with the compensating additional magnetic flux φadd [Wb] added to compensate for the phase delay of the rotor current Ir. Wb] to compensate for the phase delay of the rotor current Ir. The characteristic before the addition of φadd is shown in FIG. 26 above for the sinusoidal magnetic flux density distribution in 84. The driving conditions, etc. in FIG. 34 are the same as in the previous FIG. 26. Each characteristic in FIG. 34 is the magnetic flux density Bgap at the air gap section through which the rotor windings 1U and 1V in FIG. 1 pass, the rotor current Ir, and torque, and the horizontal axis is shown as time t [sec]. The slip frequency Fs is assumed to be 5 [Hz].

342 in FIG. 34 is a characteristic that shows an example of the magnetic flux density component to be added. At the stator circumferential position θcs [°] in FIG. 1, an additional magnetic flux φadd [Wb] of +0.25 [T] is added between −51.4 [°] and −25.7 [°] and between +128.6 [°] and +154.3 [°]. This is an example of an additional flux φadd [Wb] of −0.25 [T]. Since the rotor windings 1U and 1V in FIG. 1 pass through this section while rotating, the time axis shown in FIG. 34 The component of 342 is +0.25 [T] from −0.0286 [sec] to −0.0143 [sec] and +0.0714 [sec] to +0. The magnetic flux density component is −0.25 [T] from 0857 [sec]. 341 in FIG. 34 is the characteristic 261 of the sinusoidal magnetic flux density distribution in FIG. 26, and is the characteristic of the magnetic flux density at the location where the rotor winding passes through, shown on the time axis.

346 in FIG. 34 is the rotor current 264 of FIG. 26, and is shown for comparison. 344 is the magnetic flux density at 341, where the (7 (3) and the rotor current Ir [A], which is energized according to the voltage equation in Eq. (77). 344 is the aforementioned Compared to 346, it can be seen that the current is partially increasing. 345 is the current flowing through the field flux according to equation (81) is the torque generated by the field flux φm and the current Ir in the rotor winding according to equation (1), and its average value is 1.278 [Nm]. The total torque average of the induction motor in FIG. 1 is 14 times 17.892 [Nm] according to formula (82). And the torque average of 1.278 [Nm] in FIG. 34 with the added flux φadd [Wb] is 12.5 [%] higher than the torque average of 1.136 [Nm] in FIG. 26 with no addition configuration.

Figure 35:
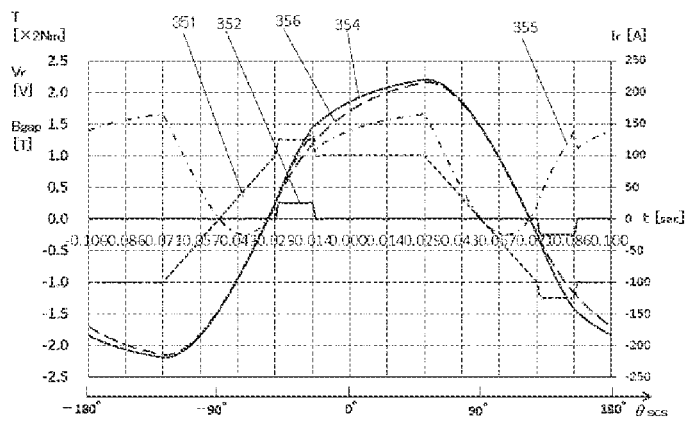
FIG. 35 exemplifies a rotor current, torque and others when driven by a trapezoidal wave.

Next, FIG. 27 above is shown as the characteristic of the target distribution function Dist1 of the ideal trapezoidal magnetic flux density distribution shown by 83 in FIG. 8. An additional magnetic flux φadd [Wb] can be added to this characteristic. An example of the characteristics of this addition is shown in FIG. 35. The driving conditions, etc. in FIG. 35 are the same as those in FIGS. 26 and 34 explained above. The slip frequency Fs is set to 5 [Hz].

A component 352 shown on the time axis in FIG. 35 is a magnetic flux density Bgap [T] obtained when the rotor windings 1U and 1V pass through the aforementioned additional magnetic flux φadd [Wb] while rotating. This component 352 is the same example as 342 in FIG. 34 above.

The component indicated by 352 above is added to 271, which is the characteristic of the ideal trapezoidal magnetic flux density distribution in FIG. 27. A reference 351 in FIG. 35 shows the added characteristics. In this characteristic, the magnetic flux density at the location through which the rotor winding passes is indicated on the time axis. A reference 356 in FIG. 35 shows the rotor current 274. This is shown for comparison. References 354 and 351 indicate the magnetic flux density.

The rotor current Ir [A] is energized based on the voltage generated according to equation (73) and further according to the voltage equation in equation (77). Compared to 356 above, it can be confirmed that the current of 354 is partially increased. A reference sign 355 indicates the torque generated by the field flux φm and the current Ir in the rotor winding according to equation (81), and its average value is 1.754 [Nm]. The total average torque of the induction motors in FIG. 1 is generated according to equation (82) and is 14 times higher, and is 24.563 [Nm]. And the average torque value of 1.754 [Nm] in FIG. 35 with the additional flux φadd [Wb] is increased by 10.2 [%] compared to the average torque value of 1.592 [Nm] in FIG. 27 without the addition.

Figure 36:
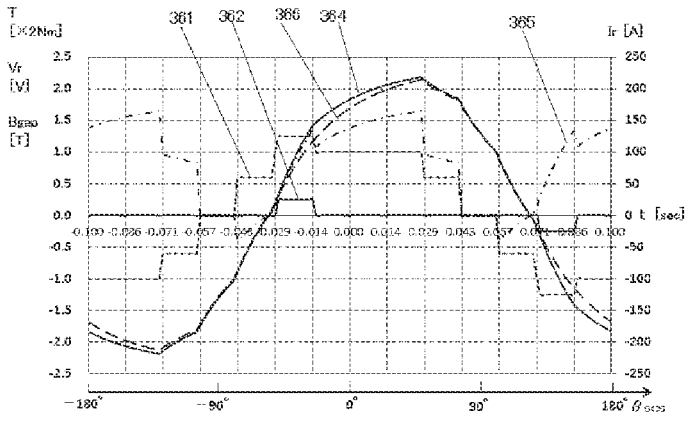
FIG. 36 exemplifies a rotor current, torque and others when driven by a trapezoidal wave.

Next, FIG. 36 is an example of the characteristics of the magnetic flux density distribution shown in FIG. 14 as an example of the characteristics of the discrete distribution function Dist2, with the additional magnetic flux φadd [Wb] added. It is shown in contrast to the characteristics of the target distribution function Dist1 of the ideal trapezoidal-shaped magnetic flux density distribution in FIG. 35. The driving conditions and other conditions in FIG. 36 are the same as those in FIGS. 26, 34, and 35 above. The slip frequency Fs is set to 5 [Hz].

The components 362 shown on the time axis in FIG. 36 are the rotor windings 1U and 1V are the components of the magnetic flux density Bgap [T] when 1V passes through the aforementioned additional magnetic flux φadd [Wb] while rotating. Note that this 362 is the same example as 342 in FIG. 34 above and 352 in FIG. 35 above. 361 in FIG. 36 is the characteristic of the discrete trapezoidal magnetic flux density distribution 271 shown in FIG. 33, to which the components of 362 above are added and added together, and is the characteristic of the magnetic flux density at the location through which the rotor winding passes on the time axis. 366 shown in FIG. 36 is the rotor current 334 and is shown for comparison. A reference 364 is the magnetic flux density of 361, and is caused by the voltage is generated according to equation (73) and 364 is the rotor current Ir [A], which is energized according to the voltage equation in equation (77). Compared to the current 366, it can be confirmed that 365 is a partially increased current. 365 is the torque generated by the field flux φm and the current in the rotor winding Ir [A] according to equation (81), and its average value is 1.651 [Nm]. The total torque average of the induction motor in FIG. 1 is 14 times 23.114 [Nm]according to formula (82). And the torque average of 1.651 [Nm] in FIG. 35 with the added flux φadd [Wb] is 10.7 [%] higher than the torque average of 1.491 [Nm] in FIG. 33 with no addition. There is no significant difference compared to the ideal trapezoidal distribution of the target distribution function Dist1 in FIG. 35, and a similar torque increase effect can be obtained.

The above FIGS. 34, 35, and 36 show that in order to compensate for the torque reduction due to the phase delay of the rotor current, an additional magnetic flux φadd [Wb] is Wb] to compensate for the reduction in torque due to the phase delay of the rotor current. In the present disclosure, the additional magnetic flux φadd [Wb] can be added because the excitation for each tooth can be freely performed. In the previous examples, a simple example with a rectangular shape of the magnetic flux density distribution was added to each figure example. However, the circumferential position, number, and shape of the distribution of the additional magnetic flux φadd [Wb] can be freely selected. On the other hand, there are restrictions on the maximum magnetic flux density of the soft magnetic material, motor speed, current and voltage of the power element of the drive circuit, motor vibration, noise, etc. The additional magnetic flux φadd can then be controlled by changing the shape of the distribution, etc., depending on the operating conditions such as motor speed, torque generation, drive circuit power supply voltage Vpw, etc. The purpose of the additional magnetic flux φadd can also be utilized not only to increase torque, but also to improve the power factor, reduce vibration and noise, etc.

Next, the method of energizing the rotor current Ir as per the current command value is shown. Here, the rotor current Irc as per the command value means, for example, in FIG. 27, the magnetic flux density distribution Bgap is given as an initial value to obtain the time function of the magnetic flux density of the rotor winding, and the rotor current Irc is obtained by the equations (73) and (77). When obtaining the rotor current Ir using equation (77), the leakage inductance Lrw is assumed to be 0, which is in a sense the ideal rotor current Irc. An example of that ideal rotor current is shown by 273 in FIG. 27.

In FIG. 27, the rotor current Ir has a first-order delay with respect to the rotor voltage Vr because of the relationship in equation (77). Now, contrary to this, the required rotor voltage Vrc is obtained by giving, for example, the 273 in FIG. 27 as the rotor current command Irc.

$$Vrc = Lrw \cdot dIrc/dt + Irc \cdot Rr = Lrw \cdot \Delta Irc/\Delta t + Irc \cdot Rr \quad (93)$$

In this case, Δt is the control sampling time, and ΔIrc is the change between Δt in the corresponding part of 273 in FIG. 27. The voltage required to energize 273, which is the rotor current command value, has been calculated. Then, the magnetic flux density Bgap that can generate this rotor voltage Vrc to the rotor winding is obtained by the following equation that is a variant of equation (73).

$$Bgap = Vrc/(\omega s \cdot Mr \times Wm \times 2) \quad (94)$$

Note that the magnetic flux density Bgap obtained by these equations (93) and (94) is a theoretical magnetic flux density, and the calculated value often exceeds the saturation magnetic flux density of the electromagnetic steel sheet of the motor, for example, 2.0 [T].

As such, if the magnetic flux density Bgap is larger than the allowable value, or if the time rate of change of the magnetic flux density is abnormally large, the calculated value will be uncontrollable in reality. To avoid this situation, the calculated value of the magnetic flux density Bgap obtained by formula (94) can be corrected, limiting it to a controllable value. After limiting and correcting the magnetic flux density Bgap, FIG. 26, FIG. 27, FIG. 35, FIG. 33, FIG. 36, etc., the voltage Vr of the rotor winding is calculated again using equation (73). The rotor current Ir is then recalculated again with equations (88) and (89) according to equation (77). Then, the torque Trn, etc. of the relevant rotor winding is calculated by formula (81) and used for motor control.

Figure 37:
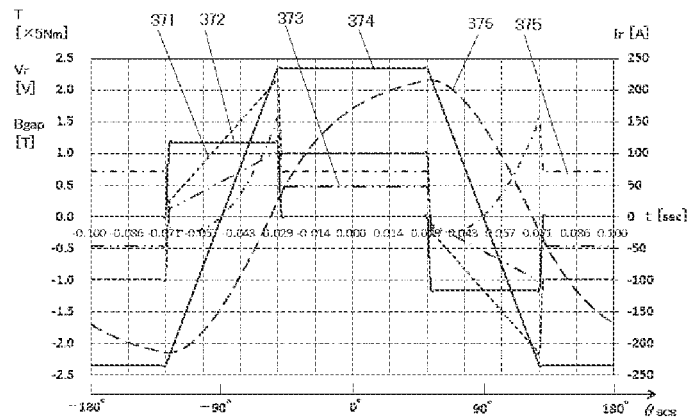
FIG. 37 exemplifies a rotor current, torque and others when driven by a trapezoidal wave.

FIG. 37 shows a specific calculation example of accurately controlling and energizing the motor by giving the initial rotor current command value Irc as described above. The conditions for energizing the induction motor are the same as in FIG. 27, and the rotor rotates CW at a slip frequency of 5 Hz. The motor constants are also the same. The rotor current command Irc is 273 in FIGS. 27 and 3 74 in FIG. 37. 376 in FIG. 37 is 273 in FIGS. 27 and 374 in FIG. 37. 373 is the rotor voltage Vrc obtained by equation (93), and 371 is the magnetic flux density of the rotor winding Bgap obtained by equation (94). 375 is the torque of the rotor winding obtained by Eq. (81). 372 is the torque of the rotor winding obtained by Eq. (93). 372 is the value obtained by converting the voltage component of the first term on the right side of equation (Lrw/dIrc/dt) to the magnetic flux density component using equation (94). It is the amount of change from the magnetic flux density of 271 in FIG. 27 to the magnetic flux density of 3 in FIG. 37. 71 to the magnetic flux density of 71, which is the added magnetic flux density component. Therefore, it can be said that by adding the magnetic flux density component of 372, the first-order delay of the rotor current Ir in FIG. 27 is eliminated and compensated.

The average value of the torque of 375 in FIG. 37 is 2.584 [Nm], which is an increase of 62.3% compared to the average value of 1.592 [Nm] in FIG. 27. However, in FIG. 37, the maximum value of the magnetic flux density Bgap in the air gap section is as high as 2.166 [T], and the maximum flux density of the teeth is nearly twice that value, about 4 [T], which is difficult in terms of magnetic materials and a fictitious value in the calculation. For example, if the magnetic flux density is smaller than half, the maximum value of the magnetic flux density Bgap can be set to about 1 [T], and the previous comparison is relatively valid. Note that since the aforementioned magnetic flux density Bgap of 371 is a value calculated backward from the rotor current command value Irc of 374, it is naturally The rotor current calculated by equations (88) and (89) when the magnetic flux density Bgap of 371 is given to the motor Ir is the same as the rotor current command value Irc of 374.

Figure 38:
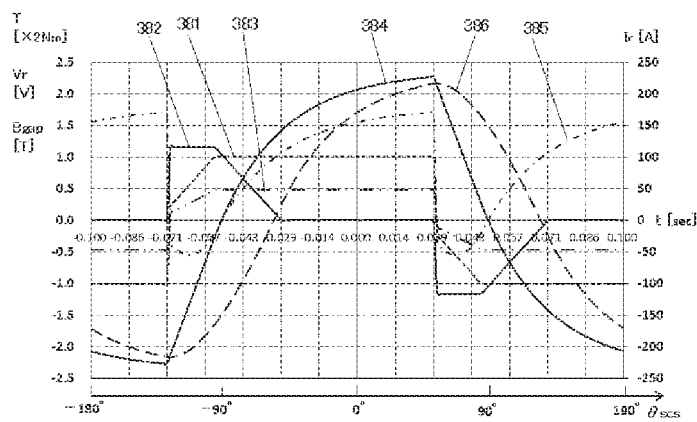
FIG. 38 exemplifies a rotor current, torque and others when driven by a trapezoidal wave.

Next, in the characteristics of FIG. 37, an example of adding a limit so that the magnetic flux density Bgap of 371 does not exceed 1 [T] is shown in FIG. 38 is shown. 381 shown in FIG. 38 is the magnetic flux density Bgap of the rotor windings, with the 371 mentioned above as the maximum This characteristic is limited so that the maximum value is 1 [T] and the minimum value is -1 [T]. In this case, the magnetic flux density added to the magnetic flux density Bgap of 271 in FIG. 27 is shown in FIGS. 38, 382, and 383 is the rotor voltage Vr obtained by equation (73). And the rotor current Ir calculated by equations (88) and (89) is 384. 386 is the rotor current Ir of 274 in FIG. 27, to be contrasted and compared. 385 is the torque of the rotor winding calculated by formula (81).

The average value of the torque of 385 in FIG. 38 is 1.847 [Nm], which is 16% higher than the average torque of 1.592 [Nm] in FIG. 27. The additional flux 382 in FIG. 38 has room for improvement because it only cuts the maximum value and does not go so far as to optimize the additional flux.

Figure 39:
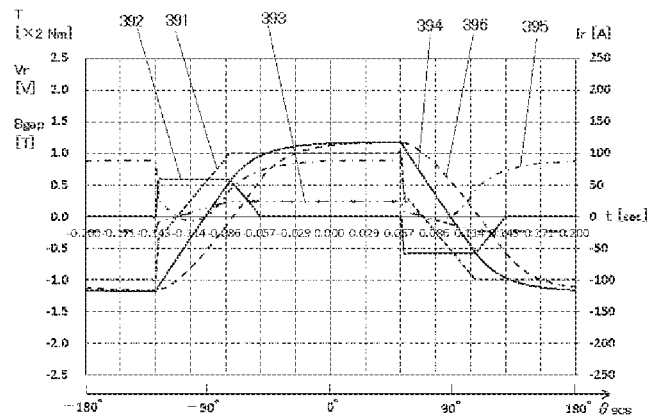
FIG. 39 exemplifies a rotor current, torque and others when driven by a trapezoidal wave.

Next, FIG. 371 in FIG. 37 shows an example of an induction motor operating region where an excessive magnetic flux density Bgap is generated. This magnetic flux density Bgap is an example of the characteristics of a region where the torque is large and the slip frequency Fs [Hz] is large, as shown in equations (93) and (94). FIG. 39 shows an example of an operating region where the torque is about ½, the slip frequency Fs is halved from 5 [Hz] to 2.5 [Hz], and the maximum flux density of Bgap is 1 [T]. 391 is the magnetic flux density Bgap of the rotor winding. In the characteristics shown in FIG. 27, the rotor current when the slip frequency Fs is halved from 5 [Hz] to 2.5 [Hz] is 39 6, and the flux density added to the flux density at that time is 392 in FIG. 39.3 93 is the rotor voltage Vr obtained by equation (73). And the rotor current Ir calculated by equations (88) and (89) is 394. 395 is the torque of the rotor winding obtained by formula (81). The average value of the 395 torque in FIG. 39 is 1.184 [Nm], which is the same as the average value of the torque when the sliding frequency Fs in FIG. 27 is 2.5 [Hz] in FIG. 27, which is an increase of 7.1% compared to the average torque value of 1.105 [Nm] when the slip frequency Fs is set to 2.5 [Hz]. There is room for further improvement. The method of setting the maximum flux density and controlling it by software is not a difficult calculation, for example, if the calculation result of formula (94) exceeds the maximum value, it can be controlled by replacing it with the maximum value allowed. As a result, the calculations in equations (93) and (94) are partially used. The target distribution function Dist1 can also be applied to waves other than the trapezoidal waves shown in the example.

In the examples shown in FIGS. 37, 38, 39, etc. above, the magnetic flux density Bgap rises rapidly and the magnetic flux density Bgap has a large rate of change over time. This flux excitation requires a stepwise increase in the excitation current, which is practically difficult to achieve except at extremely low speeds. Realistically, the sudden rise in magnetic flux density Bgap needs to be modified to a characteristic with a slope to mitigate the sudden rise in magnetic flux density Bgap in accordance with the rotor speed. In addition, for ease of understanding, 81, 82, and 83 of the target distribution function Dist1 in FIG. 8 above show a simple trapezoidal waveform for ease of understanding. And as for the trapezoidal shape of the time function in FIG. 27, etc., the time derivative values corresponding to the corners of the trapezoidal shape are discontinuous values in a step function, and there is a control difficulty in which the voltage driving the excitation current component is stepwise. In short, even in rectangular and trapezoidal waveform shapes, the aforementioned minor difficulties can be eliminated by making the corner shapes rounded and smooth. It is also expected to have the effect of making induction motors quieter.

When the slip frequency Fs is small, the phase delay of the rotor current is small, and the effect of the phase delay improvement method described here is small. When the output of the induction motor is large and the torque is high, the slip frequency Fs is large and the phase delay of the rotor current Ir is large, so the adverse effects are large and the effect of the phase delay improvement method is large. In the case of a sinusoidal magnetic flux distribution, even if magnetic flux is added using equations (93) and (94), the addition of the sinusoidal waveform is still a sinusoidal waveform, so this improvement method alone is not effective. Therefore, this improvement method alone is not effective. It is necessary to make the waveform non-sinusoidal, as in the example shown in FIG. 34.

The above description of the individual technologies used in this disclosure for induction motor control is mainly based on the example of a 7-phase AC, 2-pole, 14-tooth, 14-slot, full pitch winding(s) for each phase, and rotor shown in the cross-sectional view in FIG. 1. The individual technologies used in the induction motor control of the present disclosure are described here. Here, an overview of those individual technologies is described again. One of the specific individual technologies is the technology related to the full pitch winding(s) and virtual concentrated winding windings and their current interrelationships, mutual current conversion, and mutual voltage conversion. The magnetic flux density Bgap at the air gap of each tooth can be easily expressed and quantified by the current IsfnC of the virtual concentrated winding winding. One other individual technique is to define the distribution state of the magnetic flux density Bgap in the circumferential direction of the air gap section of the induction motor. For example, there is an ideal shape target distribution function Dist1 shown in FIG. 8 and a discrete distribution function Dist2, which is the real distribution state discretized by each tooth, and also a mutual transformation between them. The discrete distribution function Dist2 is, for example, FIG. 9, FIG. 14, etc. One of the other individual techniques is the coordinate that represents the induction motor on the cross-sectional view in FIG. 1 with variables for each of the seven phases, including the distribution state, and is referred to as the real axis coordinate. The other is the rotational coordinate that represents the rotational state of the field magnetic flux based on the variable for each of the seven phases, including the distribution state, and the rotational position of the field magnetic flux φm is represented with θscm and is called the MN coordinate. The coordinate transformation between the real axis coordinates and the MN coordinates is then performed.

One of the other individual technologies is a method to derive the excitation current component of the stator from the magnetic flux density Bgap in freely distributed states such as sinusoidal, trapezoidal, and rectangular waveforms. One of the other individual techniques is the method of continuously obtaining, from said distribution state of magnetic flux density and slip frequency Fs [Hz], its instantaneous transient values of rotor voltage Vr [V], rotor current Ir [A], and torque T [Nm] of individual rotor windings, based on the voltage equation. When the induction motor is in steady state operation, the total torque of the induction motor can be obtained by multiplying the average torque value of one rotor winding by the number of rotor windings, among other things. The instantaneous torque value can also be calculated by summing the torque of each phase of each rotor winding. The torque ripple component due to the basic structure can also be determined. One of the other individual techniques is to use the control mode command CRM, rotor speed Nr, and torque command Tc in FIG. 1 to select the target distribution function Dist1 in FIG. 8, 81, 81 82, 83, 84, etc., to drive in a more suitable control state. One of the other individual techniques is to add a magnetic flux density distribution that compensates for the first-order delay of the rotor current Ir, compensating for the current delay, increasing the motor torque and improving motor efficiency.

Each of these individual technologies is the main technology used to control the magnetic flux density for each tooth, that is, to control the distribution state of the magnetic flux density Bgap in the circumferential direction of the air gap section of the induction motor, for example, from a trapezoidal wave near a rectangular shape to a trapezoidal wave near a sine wave and then to a sine wave distribution state. The following is an example of a control block diagram in FIG. 2 using these techniques. Other individual technologies other than those mentioned above will be disclosed each time in the course of the explanation.

FIG. 2 shows a schematic of the speed control of an induction motor and is an example of a block diagram of the disclosure control. Some of the individual technologies of each block listed in FIG. 2 have been explained earlier, as they are also elemental technologies of the disclosure. Although a bit redundant, an overview of the functions in FIG. 2 will be reiterated here. The functions of each block are then described in detail in turn, including the relevant equations.

In FIG. 2, the velocity angular frequency ωr [rad/sec], which is the detected value, is fed back to the angular frequency command ωrc [rad/sec], which is the velocity command 22 of the induction motor. The speed of the 21 induction motor is controlled by controlling The current of the 21 induction motors is controlled by dividing the current into a field excitation current component and a rotor current component, which is the torque component, and synthesizing the command components of both currents backward in FIG. 2, and, if necessary, adding feed-forward components 2R are added, pulse width modulated by 24 PWM CONTROLLERs, and the result is shown in FIG. 82, FIG. 8 3, etc., and a DC voltage source and a power transistor, etc., to supply voltage and current to the induction motor 21 by 25 drive circuits. 2X in FIG. 2 is a current detector that detects the current of each phase, and 2Y is a magnetic flux detector that detects the magnetic flux [Wb] or flux density [T] of each tooth of the stator. 2Y is a magnetic flux detector that detects the magnetic flux [Wb] or magnetic flux density [T] of each tooth of the stator, and 2Z is a position detector that detects the position and speed of the rotor. The positional information means PORD, which is the interface of the position detector, and the rotational speed of the rotor. 28 is the positional information It detects the rotational angular position θr [°] and rotational angular speed [rad/sec] of the rotor. The control mode command CRM, shown 23, in FIG. 2 can command the operation mode of the induction motor, such as normal operation mode, high sensitivity operation mode, low sensitivity operation mode, and high efficiency operation mode.

A single line with an arrow indicates the direction of signal transmission for each variable, and a double line with an arrow indicates that the variable is a MULTIPHASE variable. For example, in the case of a 7-phase motor, the current signal shown by the double line with arrow contains the current signal for 7 phases, indicating that the current of each phase is controlled, respectively, in parallel. FIG. 42 shows the state of feedback control, in parallel, for each of them. On the other hand, the angular frequency command ωrc [rad/sec] of the 22 speeds in FIG. 2, the sliding angular frequency ωs [rad/sec], and the torque error correction ωster [rad/sec] are indicated by arrows These variables are shown as single lines with arrows and are common to each phase.

Next, specific control methods are described. In each phase, the field excitation current command component IsfnCMc and the field excitation current detection component IsfnCMd are controlled by feedback control of the field current components. These signals are the current values of the hypothetical concentrated winding windings, in the MN coordinate, which is a rotational coordinate. The rotor current command component IsrnFMc and the rotor current detection component IsrnFMd in each phase are controlled by feedback control. These signals are the current values of full pitch winding(s) and are in the MN coordinate, which is a rotational coordinate.

Thus, each variable is technically equivalent in each part to be controlled by either the values of the full pitch windings or the values of the hypothetical concentrated windings, and can be expressed either way. Physically, the full pitch winding(s) motor configuration of FIG. 1 can also be changed to concentrated windings, in which it can also be configured with a mix of full pitch windings and concentrated winding windings. The relationship between full-pitch windings and concentrated windings is the same for the current detector 2X and the magnetic flux detector, and the form can be modified. In addition, the present embodiment has described an example in which the induction motor current is classified into each current component and controlled separately as described above, but the method of separation can be varied, and there are also methods in which the current is not divided. It is also equivalent to control by either the value of the real axis coordinate, which is a fixed coordinate, or the value of the MN coordinate, which is a rotational coordinate. They can be converted to each other by the method shown below. Thus, each of the parts of the block diagram in FIG. 2 can be represented in other forms, which are equivalent to each other in terms of control. Thus, the block diagram in FIG. 2 can be transformed into many forms.

Next, the speed control section in FIG. 2 is explained. A rotor angular frequency ωr [rad/sec], which is the detected speed of the rotor, is subtracted by an adder 29 from the angular frequency command ωrc [rad/sec] of a speed 22 and is put into feedback control. A speed error is output to a proportional-integral compensator 2A, which generates a torque command Tc as output 2A. A proportional-integral compensator calculates the proportionality of the input, the integration of the input, or the differentiation of the input, multiplies each of them by a proportional constant, adds them, and outputs the sum. They are also often devised in various ways, such as by providing a limiter function to limit the maximum value, and are widely used in general.

A reference number 2B indicates current command generating means IAG. The torque command Tc, rotor angular frequency ωr, and control mode command CRM, shown by 23, are input to this means, and the magnetic flux density Bgapn and slip angular frequency ωs of the air gap surface for each phase are output. To generate a magnetic flux density Bgapn[T] for each phase, it is necessary to generate a target distribution function Dist1 as shown in FIG. 8. The symbols of the double-line signal transmission indicating the magnetic flux density Bgapn, etc. in FIG. 2 contain variables for each of the seven phases, as described above. For this reason, the signals of each phase are shown to be controlled, respectively, in parallel. For example, the specific configuration around the magnetic flux density Bgapn of each phase in FIG. 2, shown with double-line signal transmission, is illustrated in FIG. 42.

The magnetic flux densities Bgapn of the respective phases in FIG. 2 are the magnetic flux densities in the air gap plane of the induction motor in FIG. 1, which are composed of a magnetic flux density Bgapa of the A2 phase stator pole 11, a magnetic flux density Bgapb of the B2 phase stator pole 13, a magnetic flux density Bgapc of the C2 phase stator pole 15, a magnetic flux density Bgapd of the D2 phase stator pole 17, a magnetic flux density Bgape of the E2 phase stator pole 19, a magnetic flux density Bgapf of the F2 phase stator pole 1B, and a magnetic flux density Bgapg of the G2 phase stator pole 1D. These densities are indicated by the respective values in FIG. 42. Therefore, determining these flux density values also means determining the aforementioned discrete distribution function Dist2, which is the distribution state of the magnetic flux density on the air gap surface of the induction motor.

When the control mode command CRM is in the normal operation mode, the current command generating means IAG, shown by 2B in FIG. 2 generates the target distribution function Dist1 of the magnetic flux density Bgap [T] on the air gap surface of the induction motor, as shown in FIG. 8, by considering the torque command Tc [Nm], the angular rate of rotation ωr [rad/sec] of the induction motor and the drive circuit power voltage Vpw [V]. For example, the winding voltage Vad [V] of the AD2 phase full pitch winding(s) 1N and 1P of the stator in FIG. 1 is the following equation from Faraday's law of electromagnetic induction.

$$Vad = \omega f \times Mr \times Bgap \times Wm \times 2 \times Nws/2 = \omega f \times Bgap \times Mr \times Wm \times Nws, \quad (95)$$

in which Mr [m] is the radius of the rotor, Wm [m] is the effective length of the rotor, and Nws/2 [turns] is the number of turns of full pitch windings in each phase in each slot.

The field angular frequency ωf [rad/sec] of the field flux φm is the sum of the rotational angular velocity ωr of the rotor and the slip angular frequency ωs, and is expressed by the following formula.

$$\omega f = \omega r + \omega s \quad (96)$$

The maximum flux density Bmax [T] of the target distribution function Dist1 can be calculated roughly as follows from equation (95), taking into consideration the constant output characteristic at high speed rotation so that each winding voltage does not exceed the supply voltage Vpw [V].

$$B\max = Vpw/(\omega f \times Mr \times Wm \times Nws) \quad (97)$$

Note that if a portion of the target distribution function Dist1 exceeds the maximum flux density Bmax [T], a calculation error will occur in that portion. However, it is also possible to ignore it and recover the error in the speed feedback loop, or to compensate for the calculation error in an exceptional manner.

Here, the control conditions, etc., for the command values of each rotor current Irn that generates the torque T of the induction motor will now reviewed. The rotor current Ir energizing a given rotor winding is indicated by the voltage equation in equation (77) above. Since the rotor current Ir is represented by a differential equation and the rotor current Ir is a first-order delay value, time history information is necessary to identify the rotor current Ir. In the first place, the reason why the rotor current value cannot be controlled at high speed is that the rotor winding is on the rotating side and the rotor current Ir cannot be directly driven by the electric circuit. Also, in each control cycle of induction motor control, the calculation of current command generating means IAG is usually done relatively early in time, such as 0.0002 [sec], which is the time Δt of that control cycle. Therefore, in each control cycle of induction motor control, in the calculation stage of current command generating means IAG, even if the aforementioned discrete distribution function Dist2 and the slip angular frequency ωs, which is the distribution state of the magnetic flux density, are commanded from the aforementioned relationship, there remains ambiguity that the rotor current Ir and torque T cannot be specified at that time. As explained later, the rotor current is controlled to generate the appropriate torque by speed feedback, magnetic flux density detection, and current detection, resulting in convergence of the rotor current and torque to the proper values. Under such control conditions, various control methods for induction motors are possible. One control example is shown in the block diagram of FIG. 2. Various variations of FIG. 2 are possible.

The current command generating means IAG, shown by 2B, controls the induction motor by obtaining the target distribution function Dist1 of the magnetic flux density and the data of the slip angular frequency ωs from the torque command Tc and the rotor rotation angular frequency ωr as one method.

Figure 40:
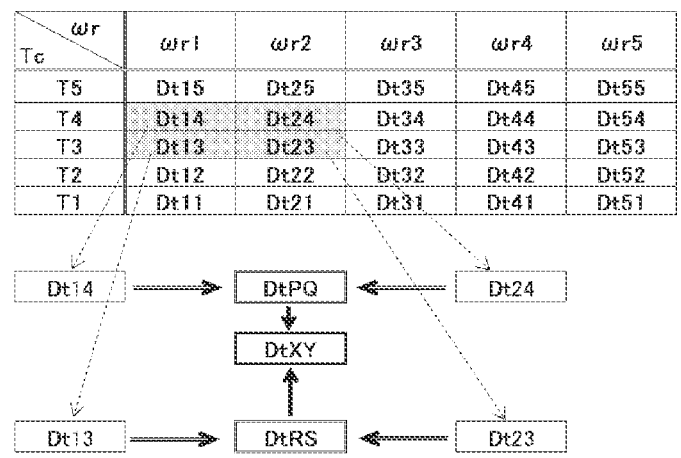
FIG. 40 exemplifies map-form data.

Specifically, as shown in FIG. 40, a finite number of information on Dist1 and ωs is stored in the form of a table data in map format, and the target distribution function Dist1 and slip angular frequency ωs for all operating points are calculated by interpolation and used for control. In FIG. 40, the horizontal axis showing ωr1, ωr2, ωr3, etc. corresponds to each value of the rotor rotation angular frequency ωr, and the vertical axis showing T1, T2, T3, etc. corresponds to each value of the torque command Tc. In the data columns Dt11, Dt33, Dt55, etc., the target distribution function Dist1 and the slip angular frequency ωs at the relevant torque command Tc and the relevant rotational angular frequency ωr, respectively, are stored. This table data is prepared in advance, including various characteristics of the induction motor to be controlled. In most cases, the values of the torque command Tc and rotor speed ωr of the IAG input are not in the table. Therefore, the target distribution function Dist1 and the slip angular frequency ωs are obtained by interpolation calculations based on each value in the table. Note that, in FIG. 2, 2BD indicates the memory that stores various data required by each block in FIG. 2.

For example, if the value of the rotor rotational angular frequency ωr, which is the input to the current command generating means IAG shown in FIG. 2, is a value P between ωr1 and ωr2 in FIG. 40, and the value of the torque command Tc is a value Q between T3 and T4, an example of the interpolation calculation is shown. First, the aforementioned input conditions of the IAG indicate that it is within the range of Dt14, Dt24, Dt13, and Dt23 in the data column of FIG. 40. Next, as an interpolation calculation related to the rotor rotational angular frequency ωr, the data DtPQ in FIG. 40 is obtained by proportionally distributing the data stored in Dt14 and Dt24 based on the relationship between the values of ωr1 and P and ωr2. Similarly, the data stored in Dt13 and Dt23 are proportionally distributed to obtain the data DtRS in FIG. 40. Next, as an interpolation calculation related to the torque command Tc, the data DtXY in FIG. 40 is obtained by proportionally distributing DtRS and DtPQ based on the relationship between the values of T3, Q and T4. The data DtXY corresponds to the data of target distribution function Dist1 and slip angular frequency ωs at the operating point where the value of rotor rotation angular frequency ωr is P and the value of torque command Tc is Q. The interpolation calculation may be a simple proportional interpolation calculation or an interpolation calculation that takes curvature into account. The field excitation angular frequency ωf, etc. can also be used instead of the rotor rotation angular frequency ωr.

As mentioned above, data such as Dt14, Dt24, Dt13, and Dt23 shown in FIG. 40 will be embedded with various characteristics of the induction motor and the drive method of the controller. As one example, FIG. 41 shows an example of the speed and torque characteristics of a motor for the main engine of an electric vehicle EV. In particular, the bold line indicates the maximum output value at each the number of turns of rotation. A range A is a large torque region at low speed rotation, and is necessary for hill climbing operation. A range C is a range for constant output characteristics, where field weakening control is performed. A range B is for the high-speed rotation region, which includes frequency issues, induction motor winding inductance and voltage issues. A range D is a range that is used frequently, such as in urban driving, and requires energy-saving mode operation. The required motor output characteristics differ depending on the application, as shown in FIG. 41. As each data shown in FIG. 40, according to the rotational angular frequency ωr and torque command Tc, the target distribution function Dist1, slip angular frequency ωs, and other data are stored in the memory 2BD. It is also possible to have multiple table data in map format as shown in FIG. 40 and switch between them according to the control mode command CRM shown in FIG. 2. For example, in the above energy-saving mode operation, the ratio of the field excitation current component and torque current component can be changed to reduce motor losses.

Next, the current command generating means IAG transforms the obtained target distribution function Dist1 to a discrete distribution function Dist2. Specifically, the target distribution function Dist1, as shown in FIG. 36, is transformed to a discrete distribution function Dist2, as shown in FIG. 12, FIG. 14, and FIG. 17. The characteristics of each of these figures show the magnetic flux density in the air gap section near each phase and tooth, as described above. Then, from these characteristics, a magnetic flux density Bgapn [T] of each phase, which is the output of the current command generating means IAG, is obtained. The target distribution function Dist1 shown in FIG. 36 and the discrete distribution function Dist2 shown in FIG. 14, FIG. 17, etc., show a representative example with a maximum flux density of 1 [T]. On the other hand, operation in the ranges C, B, etc., shown in FIG. 41, is controlled by weakening the field, so that the maximum magnetic flux density is weakened to 0.5 or 0.25 [T], etc.

FIG. 42 is also shown as an example of the contents of the double lines in FIG. 2, as described above, and its configuration and action are explained below. FIG. 42 shows this as the configuration of each phase implied by the double lines above. Such a configuration is shown in FIG. 2, from the current command generating means IAG to exciting-current generating means IFG, as well as the configuration around adder 2E, which performs feedback control. The configuration meant by the double line is mainly explained here, and the functional details of such means IAG and IFG, as well as the adder 2E, etc., will be explained later. The areas shown by FIG. 42 in FIG. 2 are treated as each variable in the MN coordinate, which is a rotation coordinate. The example of an induction motor is illustrated in FIG. 1. In addition, identical symbols in FIGS. 2 and 42 refer to the same elements In FIG. 2, the output Bgapn of the current command generating means IAG, indicated by the double line, represents discrete flux densities Bgapa, Bgapb, Bgapc, Bgapd, Bgape, Bgapf, and Bgapg of the seven phases, as shown in FIG. 42. In FIG. 2, 2C indicates exciting-current generating means IFG. This means 2C constitutes the exciting-current generating means IFGa, IFGb, IFGc, IFGd, IFGe, IFGf, and IFGgw for each of the seven phases, as shown in FIG. 42, and outputs excitation current commands IsfaCMc, IsfbCMc, IsfcCMc, IsfdCMc, IsfeCMc, IsffCMc, and IsfgCMc, respectively. 2E shown in FIG. 2 is an adder that performs feedback control. This adder 2E is divided into adder 42Ea, 42Eb, 42Ec, 42Ed, 42Ee, 42Ef, and 42Eg for the respective seven phases, as shown in FIG. 42. Each of the 7-phase adder then subtracts the detected excitation current from the excitation current commands to obtain excitation current errors, and outputs excitation voltage component of each phase through the proportional-integral compensator. For example, in the case of phase A2M, IsfaCMd is subtracted from IsfaCMc, and the excitation voltage component VsfaCM of the phase A2M is output through the proportional-integral compensator. This way is also applied to the other phases.

Figure 83:
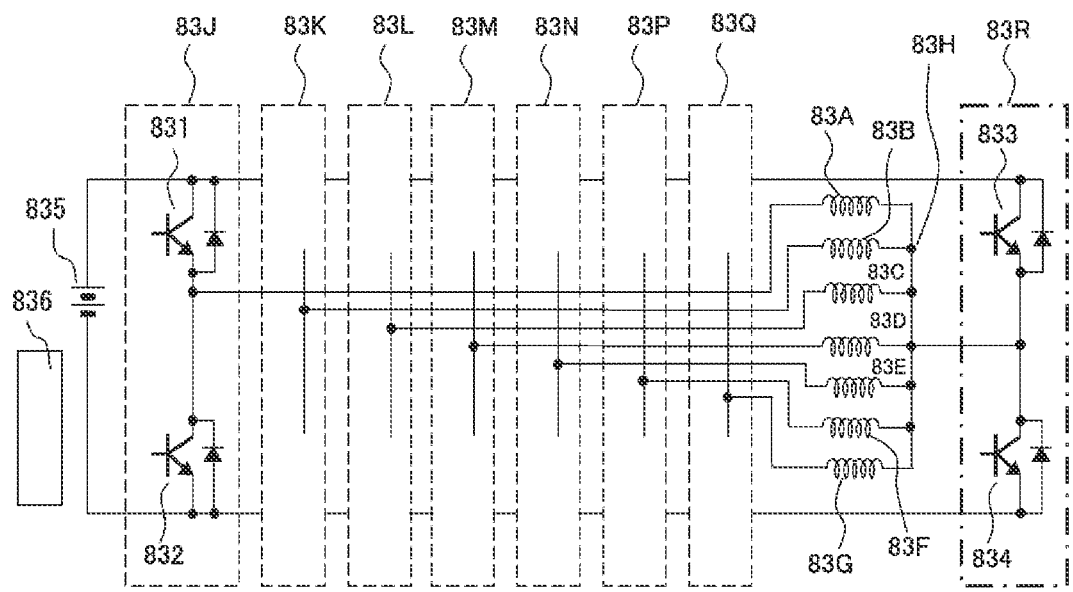
FIG. 83 exemplifies a 7-phase AC drive circuit with less current supply limitations.

As shown in FIG. 42, the double-line symbols of signal transmission in FIG. 2 indicate that the control processes for the induction motor in FIG. 1 and each phase in FIG. 2 are performed in parallel. The magnetic flux density in the air gap section of the stator poles of each phase can thus be controlled independently. The other double lines shown in FIGS. 2, 57, and 58 also indicate that each phase is controlled in parallel, as shown in FIG. 42. The current and voltage supplied to the windings of each phase must also be flexible, and drive circuits such as those shown in FIG. 82 and FIG. 83 are required. In addition to detecting the current in each phase, it is also necessary to detect the magnetic flux in each phase in the configuration shown in FIG. 2, which will be shown later. By controlling the magnetic flux density, etc. for each phase, the torque can be increased as shown in FIGS. 27 through 39, thus enabling induction motors to be more efficient, smaller, and less expensive. It also improves the utilization ratio of drive circuits, enabling smaller size and lower cost.

An embodiment of the first mode will now be explained. The first mode provides the basic structure of the disclosure, and examples of its implementation are involved in FIG. 2 and several other figures. In addition, the first mode is related to the description of the target distribution function Dist1 and the discrete distribution function Dist2, the outline purpose of which has already been explained.

The embodiment of the first mode is provided with the 7-phase induction motor shown in FIG. 1, the 7-phase drive circuit shown in FIGS. 82 and 83, and the controller 826 shown in FIG. 82. As shown in the block diagram in FIG. 2, the controller 826 sets a magnetic flux density in the air gap section of each tooth for each phase, determines a excitation current command component IsfFXc of the stator, determines a rotor current Ir flowing in the rotor winding, converts it to a rotor current component IsrFX flowing in the stator winding, superimposes the above excitation current component IsfFXc and rotor current component IsrFXc, and energizes each stator winding. In other words, the configuration in FIG. 2 shows an induction motor and its controller.

The details of each of the aforementioned technologies are described individually in separated sheets of this specification. The conversion techniques from the concentrated windings to the full-pitch windings, from the full-pitch windings to the concentrated windings, from the target distribution function Dist1 to the discrete distribution function Dist2, and from the discrete distribution function Dist2 to the target distribution function Dist1 were also explained. The method of obtaining a rotor current Ir based on the voltage equation and the method of converting the rotor current Ir to a stator's rotor current component IsrFX are also described. Although the 7-phase example is described for the number of phases, it can be applied in the same way to induction motors with other phase numbers, such as 5-phase, which will be shown later.

The circumferential range in which the magnetic flux passing through each tooth is distributed in the air gap section is defined in the mode by the term magnetic section. This is because some induction motors have relatively narrow circumferential widths of teeth and wide slot openings, which cannot be adequately defined by the circumferential width of the teeth alone. It is also to define the magnetic circumferential range of each phase in a so-called coreless structure induction motor with no teeth, which will be explained later.

Also, the number of phases in AC motors is confusing about in number. In electrical engineering, the number of phases of the induction motor in FIG. 1 is called 7-phase AC. For example, one full pitch winding, indicated by 1F in FIG. 1, serves as the AD2 phase winding 1N and its opposite phase, the AD2/phase winding 1P. Therefore, the seven windings make up the induction motor windings shown in FIG. 1. However, according to the physical and mathematical view, the induction motor in FIG. 1 has 14 slots and windings. In terms of winding technology, the number of windings is reduced to 14 when toroidal circular windings are used, for example and when concentrated winding windings are used. Even when defining each current element in FIG. 1 in an electromagnetic field analysis using the finite element method, 14 elements are defined. In the present disclosure, terms are used selectively such that the term "14" is used when describing individual elements and a conventional "7-phase AC" is used when referring to the induction motor in FIG. 1.

The presence of teeth constituting the stator poles of an induction motor is not a prerequisite. The so-called coreless structure motor, which will be described later, is an example of such a motor and has no teeth. Alternatively, an intermediate stator pole configuration between them is also possible. They have their own advantages and disadvantages. In such cases, the term magnetic section is also used in the present disclosure to refer to the area corresponding to a tooth or the like of a soft magnetic material normally used in the past. Hence, the terms of the tooth section and the magnetic section are used in the same sense electromagnetically.

Next, an embodiment of the second mode will be described. The second mode is dependent on the first mode, and its embodiment is provided with the 7-phase induction motor shown in FIG. 1, the 7-phase drive circuit shown in FIG. 82, and the controller 826 shown in FIG. 82. As shown in the block diagram in FIG. 2, the controller 826 sets a target distribution function Dist1 as shown in FIG. 8 according to the rotor rotational angular frequency ωr, torque command Tc, and control mode command CRM. 1, converts the target distribution function Dist1 to a circumferentially discrete distribution function Dist2 for each tooth as shown in FIG. 14, etc., according to the constraints of the aforementioned magnetic section such as stator teeth, and controls the magnetic flux density in the air gap of each tooth, phase by phase. These functions for an induction motor and its controller shown in FIG. 2. That is, the second mode proposes a technique for converting from an ideal distribution function, such as a trapezoidal waveform shape, to a realistic discrete tooth staircase magnetic flux density distribution.

FIG. 8 shows four examples of Dist1 target distribution functions, 81, 82, 83, and 84, and FIGS. 12 through 24 show various examples of Dist2 discrete distribution functions. In terms of the magnitude of the induction motor's output torque, a trapezoidal wave 81, which is closer to a square wave, can generate more torque than a sine wave 84. However, due to the current supply limitation of the drive circuit, the current change rate is limited, and it is not possible to drive in the shape of 81 trapezoidal waves even at high speed rotation. FIGS. 12 to 24 mainly show a model example of a maximum flux density of 1 [T], but for high-speed rotation, for example, the field must be weakened due to the power supply voltage, and the maximum flux density must be reduced to 0.5, 0.25, or 0.25 [T]. For example, at high speeds, the maximum flux density must be reduced to 0.5, 0.25, or 0.25 [T], etc. The electromagnetic steel portion of the teeth can also be used with different magnetic flux densities based on their magnetic nonlinearity and iron loss characteristics. For example, a ratio of 1.6 to 1.8 [T] is realistic for high-efficiency operation, and so on. The ratio of circumferential tooth width to slot width is selected according to the application. The trapezoidal wave shapes shown by the references 82, 83, and 84 are also examples of straight lines joined together, but the corners can be on a curve with rounded corners, and the straight sections can also be gently curved or transformed into an asymmetric shape. For example, the waveform 82 in FIG. 8 can be transformed into a target distribution function Dist1 with rounded corners, as shown by the single-dotted line. These shapes of the waveforms can be designed by selecting a convenient target distribution function Dist1 according to the characteristics of the induction motor, the torque command Tc, which is the input of the current command generating means IAG in FIG. 2, and the rotor rotation angular frequency ωr.

Next, an embodiment of a third mode will now be described. The third mode is dependent on the first mode, and its example has the 7-phase induction motor shown in FIG. 1, the 7-phase drive circuit shown in FIG. 82, and the controller 826 shown in FIG. 82. The induction motor is controlled as shown in the block diagram in FIG. 2. In the current command generating means IAG shown in FIG. 2, an additional flux φadd [Wb] for compensation is added to the target distribution function Dist1 with waveforms 81, 82, 83, 84, etc. shown in FIG. 8. This addition is to compensate for the phase delay of the rotor current Ir. A compensating additional magnetic flux φadd [Wb] is added near the leading edge of the field flux φm in the direction of travel thereof to reduce the phase delay of the rotor current.

Specifically, the magnetic flux indicated by a reference code 342 in FIG. 34 above is added, resulting in, for example, a 12.5% increase in torque. In FIG. 35, an example of a 10.7% increase in torque is shown by adding the magnetic flux indicated by a reference 352. In FIG. 36 above, an example of a 10.7% increase in torque is shown by adding the magnetic flux indicated by a reference 352. Thus, the compensating additional flux φadd [Wb] is added to a portion of the field flux φm to reduce a phase delay of the current, which can increase the torque. However, the phase and shape of the additional magnetic flux φadd [Wb] for compensation of the phase delay must be appropriate for the phase and shape of the additional magnetic flux φadd because of the restrictions on the magnetic flux density and rotational angular velocity ωr.

Next, an embodiment of a fourth mode will now be described. The configuration of this embodiment includes the 7-phase induction motor shown in FIG. 1, the 7-phase drive circuit shown in FIG. 82, and the controller 826 shown in FIG. 82. The functions of the controller 826 are realized by software that is executed according to the block diagram shown in FIG. 2. Specific waveform examples are shown in FIGS. 37 and 38. The function of this example sets a target distribution function Dist1 of the rotor current Ir at each moment, and the rotor current command value Irc is energized accurately. Normally, the rotor current Ir follows the differential equation shown in equation (77), which is a current with a first-order delay with respect to the rotor voltage Vr generated in the rotor winding. Therefore, as shown in FIG. 26, FIG. 27, FIG. 29, FIG. 31, etc., the phase of the current Ir is delayed, the amplitude of the current Ir decreases, and the waveform of the current Ir also changes, as shown in FIG. 26, FIG. 27, FIG. 29, FIG. 31, etc. As a countermeasure, the rotor current command value Irc is substituted for the rotor current Ir in equation (77), and the rotor voltage Vrc is obtained from equation (93).

As a specific example, let us explain the case where the rotor current command Irc is the waveform 273 shown in FIG. 27. As mentioned above, the waveform 273 is, in a sense, the ideal rotor current Ir, assuming zero leakage inductance Lrw when the target distribution function of magnetic flux density is Dist1, as shown by the waveform 83 in FIG. 8. The characteristics of each component with the waveform 273 provided as the rotor current command Irc are shown in FIG. 37. The aforementioned rotor voltage Vrc calculated by equation (93) is the waveform 373 in FIG. 37. The magnetic flux density Bgap that generates this rotor voltage Vrc is then determined using equation (73) or equation (94). This flux density is represented by a waveform 371 in FIG. 37. The waveform 372 shows the value of the voltage component of the first term in equation (93) converted to magnetic flux density in equation (94). The air gap section magnetic flux density 371 shown in FIG. 37 is the value obtained by adding the aforementioned waveform 372 to the magnetic flux density 271 shown in FIG. 27. The waveform 216 shown in FIG. 37 is the rotor current 274 shown in FIG. 27, and it can be seen that the rotor current Ir has changed significantly from waveform 376 to 374.

If the motor has a large number of phases in its stator, a large number of rotor windings, and a small circumferential discretization of the teeth, the rotor current Ir shown in waveform 374 in FIG. 37 will be supplied. In reality, however, it is discretely composed of 14 teeth, as shown in FIG. 1. Therefore, the target distribution function Dist1 of the magnetic flux density, shown in waveform 371, must be calculated again, as shown in FIG. 33, with the rotor current Ir transformed to the discrete distribution function Dist2. The rotor current Ir, which is re-calculated, gives a discrete magnetic flux density for each tooth, as shown in the example in FIG. 33. This causes the motor rotation to be slightly pulsating, but above a certain rotation speed, the pulsation is reduced due to the averaging effect.

After the discrete distribution function Dist2 of the magnetic flux density described above is obtained, control is performed as shown in the block diagram in FIG. 2. Such operations are described below, respectively. Such operations can be roughly explained so as to extract the magnetic flux density Bgapn of each tooth from the aforementioned discrete distribution function Dist2 of the magnetic flux density, convert it into the virtual concentrated winding excitation current component IsfnCM of each tooth as in equation (64), and perform feedback control including drive circuit.

On the other hand, for the rotor current component, the rotor voltage Vr of the rotor winding is obtained by substituting the magnetic flux density Bgapn of each tooth into formula (73), and the rotor current Ir is obtained by formula (77). The rotor current Ir is then converted to the rotor current component Isrn of each phase of the stator in a manner to be explained later. The rotor current component Isrn of each phase is controlled by feedback including the drive circuit. The error voltages of stator excitation current control and rotor current control are then added to obtain the error voltage for each phase. Then, since the above calculations were performed in MN coordinates, they are converted to each phase error voltage in real axis coordinates. Each phase error voltage is PWM-controlled and power-converted to supply voltage and current to each phase winding of the induction motor. The operation of each of these FIG. 2 block diagrams will be described later.

In FIG. 37 above, a simple theoretical expansion example is described, but the magnetic flux density of 371 at the air gap is 2 [T], a value that is impossible and too large in reality. FIG. 38 above shows an example of the maximum flux density reduced and modified to be 1 [T]. The added magnetic flux density component 372 in FIG. 37 was modified as shown in FIG. 38, 382, and the target distribution function Dist1 of magnetic flux density was modified to be 381, and the maximum magnetic flux density at the air gap was modified to be 1 [T]. As a result, the distribution state of the rotor current Ir decreases from 374 in FIG. 37 to 384 in FIG. 38. However, it is still larger than the 386 in FIG. 38, which is the rotor current Ir of 274 in the original FIG. 27.

385 in FIG. 38 shows the circumferential torque distribution state.
Note that this torque is the torque generated per assumed circumferential spacing of the rotor windings. Although the values are calculated as an extension of the target distribution function Dist1, which is a continuous function in the circumferential direction, for an actual simulation, it is more faithful to the principle to calculate each rotor current Ir by converting the magnetic flux density of each tooth to a discrete distribution function Dist2, as shown in FIG. 36. Since they are shown in MN coordinates, they must be converted from MN coordinates to real axis coordinates in one of the processes, such as the block diagram in FIG. 2, to be the voltage and current of each phase winding of the induction motor. As described above, FIG. 38 shows an example in which control is not always performed according to equations (93) and (94), but only partially according to equations (93) and (94).

In addition, in FIG. 371 above, the flux density Bgap was excessive by as much as 2 [T] in some parts, and in FIG. 38, the maximum flux density was set to 1 [T]. In FIG. 39, the first term in equation (93) decreases in the state where the slip frequency Fs is halved from 5 [Hz] to 2.5 [Hz], and the value of the magnetic flux density Bgap in equation (9 An example is shown where the value of the magnetic flux density Bgap in equation (4) also decreases. In FIG. 39, the maximum flux density is also treated not to exceed 1 [T], as in FIG. 38. Each waveform in FIG. 39 is as described above. The rotor current Ir is 396 when the sliding frequency Fs is 2.5 [Hz] for the characteristics in FIG. 27. In contrast, the rotor current Ir in FIG. 39 is 394, and the current phase is advanced, which considerably eliminates the phase lag of the rotor current.

The above examples in FIGS. 37 and 38 show the operation at relatively large magnetic flux density Bgap and large slip angular frequency ωs, as in regions A to C on the RPM and torque characteristics in FIG. 41. On the other hand, FIG. 39 shows the characteristics with slip frequency Fs [Hz] set to ½, in the region of ½ relative torque. In FIG. 41, the frequently used region D is often used in areas where the slip frequency Fs [Hz] and magnetic flux density Bgap are small. For example, in the case of control mode command CRM, such as high-efficiency operation, and when the torque command Tc is small, the magnetic flux density Bgap is often set to a small value. The technique of reducing the phase delay of the rotor current Ir is effective in the region where the torque command Tc is small in FIG. 41.

Next, an embodiment of a fifth mode will be described. The fifth mode is dependent on the first and second modes, and its example has the 7-phase induction motor of FIG. 1, the 7-phase drive circuit of FIG. 82, and the controller 826 of FIG. 82. The function of controller 826 is to control the field flux φm of the induction motor, the voltage and current of each winding, and so on, as shown in the block diagram in FIG. 2. 2B in FIG. 2 is the current command generating means IAG as described above, which generates the A2 phase flux density Ba, B2 phase flux density Bb, C2 phase flux density Bc, D2 phase flux density Bd, E2 phase flux density Be, F2 phase flux density Bf, and G2 phase flux density Bg in the air gap area near each phase tooth.

x φm [Wb] of the induction motor in FIG. 1 is multiplied by the area of the air gap surface of each tooth to obtain the following equation. Mr [m] is the rotor radius and Wm [m] is the effective length of the rotor.

$$\varphi m=(Ba-Be+Bb-Bd+Bg-Bc+Bf)\times 2\pi\cdot Mr/14\times Wm \qquad (98)$$

Here, the field magnetic flux φm[Wb] is the magnetic flux from −90° to +90° of the circumferential angular position θcs of the stator in the MN coordinate in FIG. 8. On FIG. 1, which assumes MN coordinates, θcs is the magnetic flux passing through the air gap section from −90° to +90° to CCW. The names of each tooth and each flux density in MN coordinates shall be the same names as in FIG. 1, which is a real induction motor with real axis coordinates. Thus, for example, the tooth 11 of phase A2 in the real axis coordinate differs from the tooth of phase A2 on the MN coordinate in circumferential position by the rotation angle position θmn of the field magnetic flux shown in the MN coordinate. Since each tooth is discretized in the circumferential direction by the tooth width, calibration related to the discretization is also necessary when the real axis coordinates and MN coordinates are mutually changed.

Under such conditions and conditions, the magnitude of the field flux φm [Wb] is controlled so that it does not change as much as possible. It is to control the field flux φm [Wb] in equation (98) on the MN coordinate to a constant value. The induction motor generates a slip angular frequency ωs in moving the field flux φm [Wb] in the circumferential direction, generating an effective rotor current that is approximately proportional to the torque. However, when the magnitude of the field flux φm [Wb] changes, a reactive voltage component proportional to the time rate of change of the magnitude is induced in the rotor winding and occurs on the left side of equation (77), generating a reactive current component in the rotor winding. This reactive current component does not contribute to torque generation and causes rotor copper loss, which reduces motor efficiency.

However, the reactive current component mentioned above is a finite value, and the increase in rotor copper loss is also finite and does not pose a significant problem if it is less than the allowable value. The stator has tooth widths and discrete flux distribution, and it is impossible to make the aforementioned reactive current component zero. Also, intentional variable control of the field flux φm [Wb]. For example, if the motor speed changes in area C in FIG. 41, field weakening is necessary and the field flux φm is intentionally varied. When an induction motor is operated with high efficiency in area D, etc., the field excitation current component is controlled by balancing the field excitation current component and the torque current component, so the field excitation current component is increased or decreased. Qualitatively, if the time rate of change of the magnitude of the field flux φm is small, the reactive voltage generated in the rotor windings is small and there are few practical problems. If the motor speed becomes somewhat higher, the fluctuating component of the field flux due to rotation becomes higher in frequency with the motor speed. In such a case, if the frequency is sufficiently higher than the circuit time constant of the rotor winding, the reactive current component of the rotor generated by equation (77) will be limited, with little adverse effect. Conversely, at low speeds, the magnetic flux density of each tooth is discrete in units of tooth width, which causes a change in the interlinked flux of each rotor winding and an increase in reactive current. If the frequency of the fluctuating component of the field flux φm is around the circuit time constant of the rotor winding, the reactive current component of the rotor current is likely to increase, which increases the rotor copper loss and is undesirable.

Figure 81:
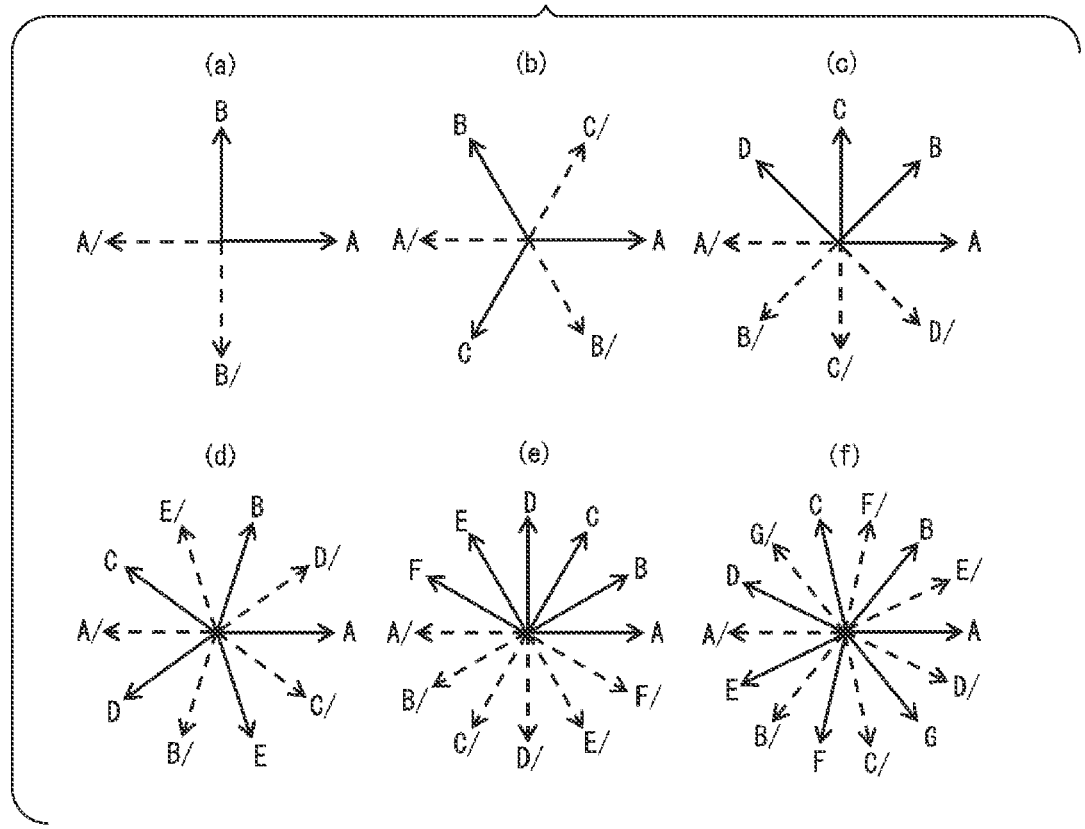
FIG. 81 shows multiphase vectors.

Next, an embodiment of a sixth mode is described. the sixth mode is dependent on the first an second modes, and its example has the 7-phase induction motor of FIG. 1, the 7-phase drive circuit of FIG. 82, and the controller 826 of FIG. 82. The function of controller 826 is to control the field flux φm of the induction motor, the voltage and current of each winding, and so on, as shown in the block diagram in FIG. 2. 2B in FIG. 2 is current command generating means IAG as described above, and the magnetic flux density target distribution function Dist1 of the air gap surface is set to control the magnetic flux distribution shape of the induction motor, as shown in FIG. 8 81, 82, 83, 84, etc.

The sixth mode controls the magnetic flux density in the air gap section of the field flux φm of the stator by varying the function Dist1 of the target distribution state of arbitrary shape in the circumferential direction according to the value of the rotor rotation angular velocity ωr or the torque command Tc. For example, when outputting a large torque in the vicinity of 0 [rpm] in region A on the speed and torque characteristics in FIG. 41, the field excitation current component IsfFM is obtained and controlled as the target distribution function Dist1 of the magnetic flux density shown by 81 in FIG. 8 on the MN coordinate. As shown in FIG. 31 and other examples, the closer the magnetic flux density distribution approaches a rectangular shape, the greater the torque output and the better the motor efficiency. However, as the rotation speed increases, the time rate of change of the field excitation current component IsfFM and the rotor current component IsrFM increases with rotation speed, making it difficult to energize the trapezoidal steep slope section. Therefore, as the rotation speed increases from 0 [rpm] in region A of FIG. 41, the shape of the target distribution function Dist1 in 82 and 83 is gradually changed. The time rate of change of the trapezoidal-shaped gradient section decreases with increasing rotation speed to facilitate stator current energization.

Here, the waveform shape may be smoothly transformed from the solid line of 82 to a single point chain line to facilitate current energization of each phase. For high-speed rotation, the waveform may be a trapezoidal shape to 84 sinusoidal waveforms. Furthermore, the amplitude of the current must be reduced in areas where high speed rotation and large current values make it difficult to energize the current. The range C in FIG. 41 is the region of constant output control by field weakening, where the magnetic flux density must be reduced along with the rotation speed. The field flux φm [Wb] should be reduced. As mentioned above, the sinusoidal waveform 84 may be used for high-speed rotation.

The target distribution function Dist1 of the magnetic flux density can be selected and varied according to the magnitude of the torque command Tc as well as the rotation speed. For example, in a region where the torque command Tc is small, there is no need to strongly emphasize motor efficiency, and the sinusoidal waveform 84 can be used. If the control mode command CRM in FIG. 2 is a high-efficiency operation mode and the torque command Tc is small, it may be better to use a smaller magnetic flux density. If control mode command CRM is in low-noise operation mode and torque command Tc is small, it may be better to use a smaller magnetic flux density and a sinusoidal waveform for the target distribution function Dist1 of magnetic flux density. These target distribution functions Dist1 can be selected and varied, for example, by including the relevant data in a table in map format as shown in FIG. 40, and interpolation calculations can be performed as described above. Thus, the sixth mode provides a control that varies the target distribution function Dist1 according to the value of the rotor rotation angular velocity ωr or the torque command Tc.

The following is an embodiment of an eighth mode. As described above, the coordinates that rotate with respect to the circumferential rotation position θmn of the field magnetic flux φm are the MN coordinate, and the real coordinate are the real axis coordinate. Both coordinates are subjected to coordinate transformation to each other. Then, multiphase variables such as each flux density and current are controlled independently between phases. Alternatively, control the state of each flux density, current, and other flexible variable distribution shapes.

For example, each of the target distribution functions 81, 82, 83, 84 in FIG. 8 above is an example where the rotational angular position θf of the field flux φm is 0°. Therefore, θmn=0 [°], and the waveform shape is the same for the real axis coordinate and the MN coordinate. FIG. 17 is a diagram of the real axis coordinates of the target distribution function 82 of the magnetic flux density Bgap in FIG. 8 transformed to the discrete distribution function Dist2 for the 7-phase, 14-tooth induction motor in FIG. 1, and is an example where the rotation angle position θf of the field magnetic flux φm is 0°.

For example, the magnetic flux density Ba of phase A2 stator pole 11 ranges from 0° to 360°/14=25.7° for θcs in FIG. 17, and Ba is 1 [T]. On the other hand, FIG. 24 shows the state of FIG. 17 in MN coordinates after coordinate transformation, and the rotation angle θmn in MN coordinates is 0°. The horizontal axis in FIG. 24 is expressed in θscm. The magnetic flux density of phase A2 stator pole 11 at this time ranges from 0° to 360°/14=25.7° for 8 scm in FIG. 24, and Ba is 1 [T].

FIG. 20 above shows the field flux φm advancing 90° to CCW from the state shown in FIG. 17 in real axis coordinates. For example, the magnetic flux density Ba of phase A2 stator pole 11 at this time ranges from 0° to 360°/14=25.7° for θcs in FIG. 20. The magnetic flux density Ba in this range is not a constant value as shown in the figure, so it is averaged as described above and is 0.5 [T]. On the other hand, FIG. 24 is also the coordinate-transformed MN coordinate of the state in FIG. 20, in which the rotation angle θmn of the MN coordinate is 90°. The magnetic flux density of phase A2 stator pole 11 at this time ranges from (0°−90°)=−90° to (360°/14−90°)=−64.3°. The magnetic flux density Ba in this range is not a constant value, as shown in the figure, so taking an average value as described above, it is 0.5 [T]. The examples shown above in FIG. 17, FIG. 24, and FIG. 20 are examples of coordinate transformations with the discrete distribution function Dist2.

Next, an embodiment of a ninth mode is described. The ninth mode is a method in which, in the eight mode, the coordinate transformation between real axis coordinates and MN coordinates is performed by taking the average value of the circumferential width of each variable in question as the value after the coordinate transformation. In the case of the discrete distribution function Dist2 variable, the circumferential values are discretely valued at each stator tooth width Pst, so if the rotation angle θmn in the MN coordinate is not an integer multiple of the tooth width Pst, some averaging calculation is required. The post-conversion tooth area spans the relationship between the two tooth widths Pst before conversion.

That is, in the coordinate transformation between real axis coordinate and MN coordinate, it is necessary to rotate the distribution of each variable by the rotation angle θmn of the MN coordinate and to average the values of variables in each phase discretized in the circumferential direction by the area of each phase. The target distribution function Dist1 may be coordinate transformed between real axis coordinate and MN coordinate. In that case, since the target distribution function Dist1 is not discretized in the circumferential direction, it is not necessary to average the value of each phase variable by converting the range of circumferential tooth width Pst. Therefore, the coordinate transformation in this case is simply to change the circumferential angle θmn of the rotational coordinate.

FIG. 25 is an image of a motor cross section of FIG. 1, which is a motor cross section in real axis coordinate, rotated by a circumferential angle θmn in MN coordinate. In this FIG. 25, the field flux φm is oriented in the circumferential angle θscm=0 [°] in the MN coordinate, i.e., to the right side of the paper. The circumferential shift of the field flux φm in real axis coordinate is indicated by its circumferential angle θmn.

Simple averaging based on the coordinate transformation MNC from real axis coordinates to MN coordinates is illustrated. As described above, for example, if the rotation angle θmn of the MN coordinate is 1.3 times the stator pole width Pst, i.e., θmn=1.3×360°/14=33.4 [°], the A2M phase stator poles of the MN coordinate in FIG. 25 will be 1 corresponds to 30% of the CW side of the B2X phase stator pole 13 and 70% of the CCW side of the E/2X phase stator pole 1A in the real axis coordinates. corresponds to 70% of the CCW side of the E/2X phase stator pole 1A. Thus, when calculated as a simple average, the magnetic flux density BaM of phase A2M stator pole 251 in MN coordinates can be obtained by adding together 30% of the magnetic flux density BbX of phase B2X stator pole 13 in real axis coordinates and 70% of the magnetic flux density Be/X of phase E/2X stator pole 1A. Thus, even if the rotation angle θmn of the MN coordinate is a fractional multiple of the stator pole width Pst, it can be converted from the real axis coordinate to the MN coordinate. The distribution state of the concentrated winding excitation current component and the full-pitch winding excitation current component can also be converted from real axis coordinates to MN coordinates in the same way. The same can be obtained for the other stator poles in FIG. 25.

Next, a conversion method RMNC from MN coordinates to real axis coordinates is explained. The specific method of conversion method RMNC is the same as the conversion method MNC described above. However, the stator poles subject to conversion are swapped. For example, if the rotation angle θmn in MN coordinates is 1.3 times the stator pole width Pst, i.e., θmn=1.3×360°/1433.4 [°], the phase A2X stator poles in the real axis coordinates in FIG. 1 are the G2M phase in MN coordinates in FIG. 25 30% of the CCW side of the 25D stator poles and the 258 D/2M phase stator poles corresponds to 70% of the CW side. Thus, when calculated as a simple average, the magnetic flux density BaX of phase A2X stator pole 11 in real axis coordinates can be obtained by adding together 30% of the magnetic flux density BgM of phase G2M stator pole 25D in MN coordinates and 70% of the magnetic flux density Bd/M of phase D/2 stator pole 258.

The mean value in the coordinate transformation of the discrete distribution function Dist2 can be calculated by other methods. For example, if the target distribution function Dist1 is known for each variable, then at 1.3 times the aforementioned stator pole width Pst, instead of a simple proportional distribution of 30% and 70% for the width over the two teeth, an average value can be taken that takes into account the weighting of the target distribution function Dist1. For example, the magnetic flux density of a certain discretized tooth before coordinate transformation is not considered to be uniform over the range of its stator pole width Pst, but is calculated assuming that there is a non-uniform distribution proportional to the target distribution function Dist1 over the range of its stator pole width Pst. The magnetic flux density is then area-integrated over the range width Pst of the tooth before the coordinate transformation and after the coordinate transformation to obtain an average value, which is the magnetic flux density after the coordinate transformation. For each tooth, the calculation is performed in the same manner. Thus, by transforming the coordinates of the discrete distribution function Dist2 based on the target distribution function Dist1 to create a virtual distribution within the range of each stator pole width Pst, the error caused by the coordinate transformation can be reduced.

The following is an example of a tenth mode. The tenth mode provides a method of controlling the current control of an induction motor by mutually converting the full-pitch winding current component and the virtual concentrated winding current component. For example, assuming an induction motor configured with the full-pitch winding(s) shown in FIG. 1 and a hypothetical concentrated winding shown in FIG. 3 above, the full-pitch winding current can be converted to the concentrated winding current. Conversely, the concentrated winding current can be converted to the full-pitch winding current.

Assuming a hypothetical concentrated winding as shown in FIG. 3 above, the relationship between the magnetic flux density at the air gap of each tooth and the concentrated winding current is simple and its control processing is easy. As will be shown later, when the magnetic flux density of each tooth is detected, the excitation current component at that time can be easily calculated. Here, each excitation current component can be obtained from equations (59) to (71) in the relationship between the magnetic field strength H [A/m] and the magnetic flux density B [T] in FIG. 7 above. Although the simplified characteristic 74 in FIG. 7 is used in the explanation, of course, the induction motor can be controlled more accurately if it is calculated and controlled with the exact characteristic in 71. However, in the case of FIGS. 1 and 3, the short-node winding coefficient of the full pitch winding(s) is several times larger than the short-node winding coefficient of the concentrated winding, so the copper loss becomes large, making the concentrated winding is practically disadvantageous.

The full pitch windings shown in FIG. 1 can generate torque in proportion to the product of the full-pitch winding current and the magnetic flux density, so it can generate torque more efficiently than concentrated winding. Torque calculation and control is also easier. Therefore, even if the concentrated winding current component is used in the calculation and control stages, it is converted to full-pitch winding current in the actual energizing stage and energized to the full-pitch winding) in FIG. 1.

The field excitation current component can also be expressed by the full-pitch winding current component without using the concentrated winding current of the hypothetical concentrated winding described above, and we do not reject this method. This method is not to be denied. For example, the concentrated winding current Ia of phase A2 can be positioned as part of equations (1) and (5) and controlled without considering it as a concentrated winding current component. In the case of a compound motor, in which two motors are combined on the inner and outer diameter sides of the motor, a toroidal-shaped annular winding can be used, and the full-pitch winding wire of FIG. 1 can be separated into two pieces. The same is true for a compound motor consisting of two motors in the axial direction.

The method of obtaining the rotor current IrFM, which is the value in MN coordinates in the full-pitch winding rotor winding of the rotor, and converting it to the stator's rotor current component IsrFM will be shown later. It will also be shown later that if the rotor current IrFM and the stator rotor current component IsrFM cancel each other and the induction motor is accurately controlled, both currents have little effect on the field flux φm in principle.

The following is an example of an eleventh mode. The eleventh mode provides a method of mutual current conversion so that the full-pitch winding current of the full-pitch winding(s) and the concentrated winding current of the hypothetical concentrated winding winding(s) are electromagnetically equivalent. Current conversion is performed so that the full-pitch winding current of the full-pitch winding(s) and the concentrated winding current of the hypothetical concentrated winding are electromagnetically equivalent to each other. For example, an induction motor with 7-phase full pitch winding(s) in FIG. 1 above and an induction motor with virtual 7-phase concentrated winding windings in FIG. 3 above, which is equivalent to FIG. 1. The following is a description of each current. These induction motors are point symmetrical about the rotor center. However, in the case of the full pitch winding(s) shown in FIG. 1, the windings in the slots on opposite sides of 180° are energized with currents in opposite directions to each other. In the case of the concentrated winding in FIG. 3, for example, the A2 phase winding 31 and the A/2 phase winding 3 2, for example, the phase A2 current Ia flowing in phase A2 winding 31 and phase A/2 winding 3a in FIG. 3 is in the opposite direction, producing the phase A2 flux φa shown in the figure. The number of turns of each full pitch winding(s) in FIG. 1 is Nws/2. The number of turns of each concentrated winding(s) in FIG. 3 is Nws/2. For example, phase A2 current Ia is energized in phase A2 winding 31 and phase A/2 winding 32, which generate phase A2 flux φa, and the sum of the number of turns of these two windings is Nws.

The method of converting the currents in each phase of the hypothetical 7-phase concentrated winding in FIG. 3 into the electromagnetically equivalent currents in each phase of the full pitch winding(s) in FIG. 1 is as described above, using equations (1) to (7). Equations (1) to (7) are used as described above. Conversely, the electromagnetically equivalent method of converting the currents in each phase of the full pitch winding(s) in FIG. 1 to the currents in each phase of the hypothetical 7-phase concentrated winding in FIG. 3 is as described above, using equations (15) to (21). Equations (15) to (21) are used as described above. The current conversion equations can be derived in a similar manner for induction motors with a different number of phases, distributed winding induction motors, or induction motors with a modified motor configuration.

Figure 43:
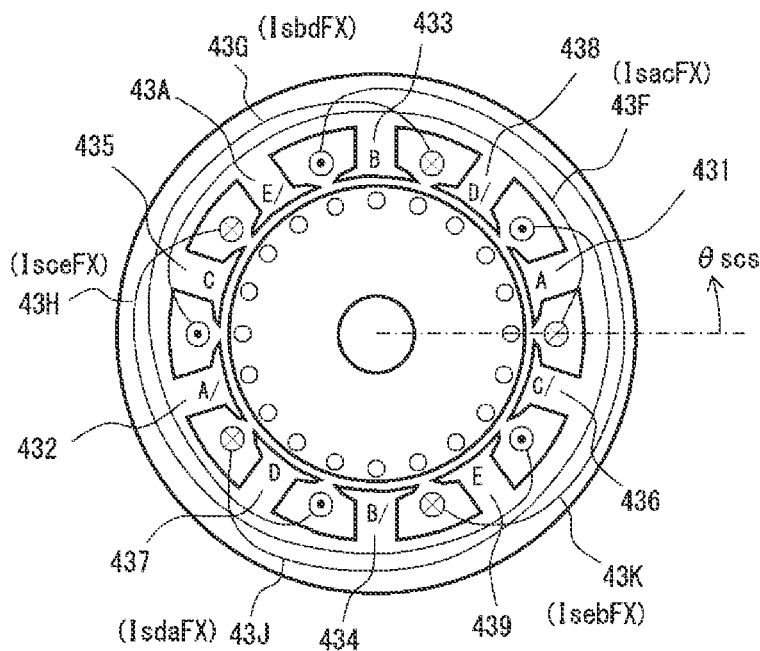
FIG. 43 is a sectional view showing a 5-phase induction motor.
Figure 44:
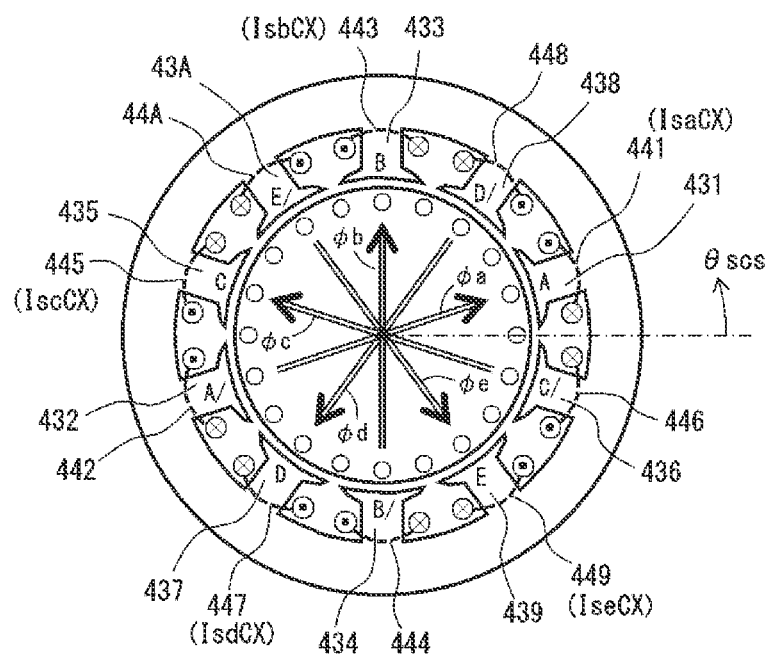
FIG. 44 is a sectional view showing a 5-phase concentrated induction motor.

FIGS. 43 and 44 show example cross-sectional views of a five-phase induction motor. FIG. 43 shows each winding as full pitch winding(s), and FIG. 44 shows each winding as a hypothetical concentrated winding, which is an electromagnetically equivalent replacement of FIG. 43. The relationship between FIGS. 43 and 44 is the same as the relationship between FIGS. 1 and 3 for the seven phases. FIGS. 43 and 44 have 10 teeth and slots, which are stator poles, and 20 rotor windings in the rotor, which are common to both motors.

In FIG. 43, 431 is the A3 phase stator pole, 432 is the A/3 phase stator pole 433 is the B3 phase stator pole and 434 is the B/3 phase stator pole. 435 is the C3 phase stator pole and 436 is the C/3 phase stator pole. 35 is the C3 phase stator pole, 436 is the C/3 phase stator pole, 437 is the D3 phase stator pole, 434 is the B/3 phase stator pole 7 is the D3 phase stator pole, 438 is the D/3 phase stator pole, 439 is the E3 phase stator pole, 438 is the E/3 phase stator pole, 439 is the E/3 phase stator pole, 43A is the E/3 phase stator pole 43A is the E/3 phase stator pole. The winding shown by coil end 43F is the AC 3-phase full pitch winding(s) and energizes the AC 3-phase current Iac. The winding shown at coil end 43G is the full pitch winding(s) of the BD3 phase and carries the BD3 phase current Ibd. The winding shown by coil end 43H is the full pitch winding(s) of phase CE3 and carries the phase CE3 current Ice. The winding shown by coil end 43J is the full pitch winding(s) of phase DA3 and energizes phase DA3 current Ida. The winding indicated by coil end 43K is the full pitch winding(s) of phase EB3, and energizes phase eb3 current Ieb. Each of these phase currents in the stator includes a field excitation current component and a rotor current component. The 3 at the end of the name, such as AC3 phase, is a number that identifies the motor model.

In FIG. 44, 441 is the concentrated winding of phase A3, and 442 is the A/3-phase concentrated winding, and both windings are usually connected in series to energize the A3-phase current Ia, and the field excitation current component of Ia generates the A3-phase flux φa. Similarly, 443 and 444 are the concentrated winding windings for the B3 and B/3 phases, respectively. 445 is phase C3 and 446 is phase C/3 concentrated winding. 445 is the phase C3 and 446 is the phase C/3 concentrated winding, which energizes both windings with phase C3 current Ic and generates phase C3 magnetic flux φc. 447 is phase D3 and 448 is phase D/3 concentrated winding, which energizes both windings with phase D3 current Ic and generates phase D/3 magnetic flux φc. 448 is the concentrated winding of phase D/3, which energizes both windings with phase D3 current Id and produces phase D3 flux φd. 449 is phase E3, 4A is phase E/3, 4B is phase E/3, 4C is phase E/3, 4D is phase E/3, 4E is phase E/3, 4E is phase E/3, 4E is phase E/3. 4A is the E/3 phase concentrated winding, which energizes both windings with the E3 phase current Ie and produces the E3 phase flux φe. In this section, only the field excitation current component of each phase current is described in relation to the magnetic flux of each phase. Although the rotor current component is also energized in each phase current of the stator, each rotor current Ir of the rotor and the rotor current component Isr of the stator winding are controlled so that the electromagnetomotive force cancels each other electromagnetically, so the magnetic flux in each phase is generated by the excitation current component of the stator.

The relationship between the full-pitch winding currents in each phase in FIG. 43 and the concentrated winding currents in each phase in FIG. 44 is the same as in equations (1) through (7), and the following equations:

$$Iac=Ia+Ic \qquad (99)$$

$$Ibd=Ib+Id \qquad (100)$$

$$Ice=Ic+Ie \qquad (101)$$

$$Ida=Id+Ia \qquad (102)$$

$$Ieb=Ie+Ib \qquad (103)$$

The relationship between the concentrated winding current of each phase in FIG. 44 and the full-pitch winding current of each phase in FIG. 43 is as follows, as in equations (15) through (21).

$$Ia=(Iac-Ibd-Ice+Ida+Ieb)/2 \qquad (104)$$

$$Ib=(Iac+Ibd-Ice-Ida+Ieb)/2 \qquad (105)$$

$$Ic=(Iac+Ibd+Ice-Ida-Ieb)/2 \qquad (106)$$

$$Id=(-Iac+Ibd+Ice+Ida-Ieb)/2 \qquad (107)$$

$$Ie=(-Iac-Ibd+Ice+Ida+Ieb)/2 \qquad (108)$$

Equations (104) through (108) determine the positive and negative signs of the magnetomotive force of each full-pitch winding current for the relevant magnetic path and flux. The equations (104) to (108) determine the positive and negative signs in the direction of the magnetomotive force of each full-pitch winding current for the relevant magnetic path and magnetic flux, and determine the electromagnetically equivalent relationship. For example, for the phase A3 magnetic flux φa in FIG. 44, the concentrated winding 441 of phase A3 and the Only the phase A3 current Ia flowing in the concentrated winding 442 contributes to the excitation. On the other hand, in FIG. 43, all full-pitch winding(s) currents contribute a magnetomotive force to the phase A3 flux φa. Assuming that the state in FIG. 44 is equal to the state in FIG. 43, the equation (104) reduces to equation (108). It can also be said to follow Ampere's law of integration around the circumference. By equations (99) to (108), for the 5-phase induction motor in FIG. 43 The mutual current conversion between the full-pitch winding current and the hypothetical concentrated winding current can be performed.

The following is an example of a twelfth mode. The twelfth mode provides a method of mutual voltage conversion so that the full-pitch winding voltage of the full-pitch winding and the concentrated winding voltage of the hypothetical concentrated winding are electromagnetically equivalent. voltage of the full-pitch winding and the concentrated winding voltage of the hypothetical concentrated winding are electromagnetically equivalent to each other. For example, an induction motor with 7-phase full pitch windings in FIG. 1 above and an induction motor with virtual 7-phase concentrated winding windings in FIG. 3 above, which is equivalent to FIG. 1. The respective voltages are explained in equations (22) to (42). The preconditions for this induction motor can be expressed in these equations if it has a structure with stator poles of opposite phases located at an electrical angle of 180° apart in the circumferential direction. This is a very common motor configuration. The voltage conversion equations can be derived in a similar way for induction motors with a different number of phases, induction motors with distributed winding, or induction motors with a modified motor configuration.

Equations (22) to (42) show the relationship between the AD2 phase full pitch winding(s)1 The equations (22) to (42) show the relationship between the full pitch winding(s) and voltage of each phase, such as the AD2 phase full pitch winding(s) 1*f* shown in FIG. 1, and the phase A2 flux component φa, phase B2 flux component φb, etc. shown in FIG. 3. (Equations (29) to (35) show the relationship between the voltage in the hypothetical concentrated winding of each phase and the phase A2 flux component φa, phase B2 flux component φb, etc. in FIG. 3. a, the phase B2 flux component φb, etc., as shown in FIG. 3. It can be said that these relationships follow Faraday's law of electromagnetic induction.

Equations (29) to (35) also serve as conversion equations from full-pitch winding voltage to virtual concentrated winding voltage. (Equations (36) to (42) are conversion equations from virtual concentrated winding voltage to full-pitch winding voltage. However, in these voltage equations, the voltage drop component of each winding resistance is ignored. The leakage inductance component of each winding is ignored. The voltage components caused by the iron loss of magnetic materials such as electromagnetic steel plates are also ignored. If necessary, those voltage components that were ignored can be added to modify the voltage equation to be more accurate.

Next, the conversion equations for the voltages in the case of the 5-phase induction motors shown in FIGS. 43 and 44 are explained. The relationship between the voltage of each phase, such as the voltage Vac of the full-pitch winding 43*f* of the AC3 phase in FIG. 43, and the magnetic flux component φa of phase A3, etc., is the following formula. Each magnetic flux component shown in FIG. 44 is interlinked with each full-pitch winding line, and the polarity of the generated voltage is determined by the direction in which the magnetic flux of each phase is interlinked.

$$Vac=Nws/2 \cdot d(\varphi a+\varphi b+\varphi c-\varphi d-\varphi e)/dt \qquad (109)$$

$$Vbd=Nws/2 \cdot d(-\varphi a+\varphi b+\varphi c+\varphi d-\varphi e)/dt \qquad (110)$$

$$Vce=Nws/2 \cdot d(-\varphi a-\varphi b+\varphi c+\varphi d+\varphi e)/dt \qquad (111)$$

$$Vda=Nws/2 \cdot d(\varphi a-\varphi b-\varphi c+\varphi d+\varphi e)/dt \qquad (112)$$

$$Veb=Nws/2 \cdot d(\varphi a+\varphi b-\varphi c-\varphi d+\varphi e)/dt \qquad (113)$$

The relationship between the phase A3 voltage Va, etc. of the hypothetical concentrated winding windings 441 and 442 of phase A3 in FIG. 44 and the phase A3 flux component φa, etc. is as follows.

$$Va=Nws \cdot d\varphi a/dt=Vac+Vda \qquad (114)$$

$$Vb=Nws \cdot d\varphi b/dt=Vbd+Veb \qquad (115)$$

$$Vc=Nws \cdot d\varphi c/dt=Vce+Vac \qquad (116)$$

$$Vd=Nws \cdot d\varphi d/dt=Vda+Vbd \qquad (117)$$

$$Ve=Nws \cdot d\varphi e/dt=Veb+Vce \qquad (118)$$

Equations (114) to (118) also serve as conversion equations from full-pitch winding voltage to virtual concentrated winding voltage to the virtual concentrated winding voltage. The magnetic fluxes φa, φb, φc, φd, and φe for each phase are the product of the magnetic flux density Bgapn at the air gap of the stator poles of each phase and the area of the stator poles, and are obtained as in (62), although the number of teeth varies. Each magnetic flux density Bgapn is calculated as shown in FIG. 2 in the current command generating means IAG, as described above. 2, 83, 84, etc., in the current command generating means IAG in FIG. 2, as described above, and is obtained by calculating the discrete distribution function Dist2, etc.

Equations (109) to (113) can be obtained as conversion equations from virtual concentrated winding voltage to full-pitch winding voltage by replacing them with virtual concentrated winding voltage.

$$Vac=(Va+Vb+Vc-Vd-Ve)/2 \quad (119)$$

$$Vbd=(-Va+Vb+Vc+Vd-Ve)/2 \quad (120)$$

$$Vce=(-Va-Vb+Vc+Vd+Ve)/2 \quad (121)$$

$$Vda=(Va-Vb-Vc+Vd+Ve)/2 \quad (122)$$

$$Veb=(Va+Vb-Vc-Vd+Ve)/2 \quad (123)$$

Figure 45:
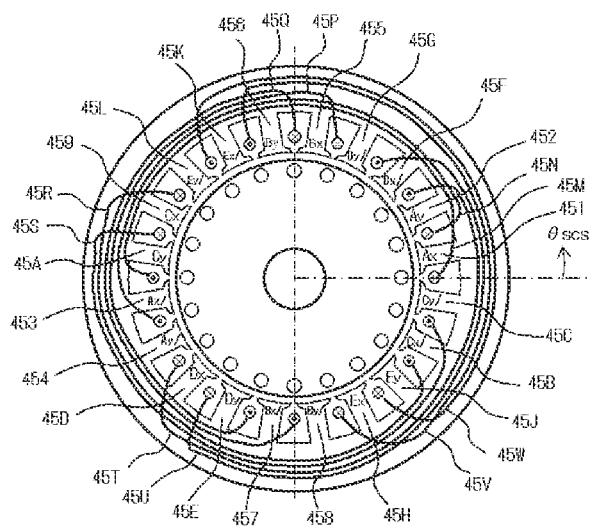
FIG. 45 is a sectional view showing a 5-phase distributed winding induction motor.

Next, an embodiment based on a seventh mode will be described. The example is a 5-phase, distributed-winding induction motor, shown and described in the cross-sectional views in FIGS. 45, 46, and 47. FIG. 43 is a 5-phase, full-pitch winding, concentrated winding, 10-slot induction motor. FIG. 45 is a modified version of FIG. 43, a 5-phase, full-pitch winding, distributed winding, 20-slot induction motor. In the distributed winding configuration of FIG. 45, the number of phases of stator current is the same for the five phases, but the stator windings and stator poles are divided, so the equations used for various calculations are slightly different. This technology is necessary to control the magnetic flux density of the stator poles in each phase not only in a sinusoidal distribution but also in a flexible magnetic flux density distribution.

The meanings of the terms "full-pitch winding," "short-pitch winding," "concentrated winding," and "distributed winding" are sometimes used ambiguously. The terms "full-pitch winding," "short-pitch winding," "concentrated winding" and "distributed winding" used in this disclosure are sometimes used ambiguously. Full-pitch winding" refers to winding with a pitch of 180° at an electrical angle, while "short-pitch winding" refers to winding with a pitch of less than 180° at an electrical angle. Concentrated winding" means that the windings of one phase are grouped together in one coil, while "distributed winding" means that the windings of one phase are divided into two or more coils and arranged in two or more slots, usually connected in series. The "distributed winding" is a state in which one phase winding is divided into two or more coils and arranged in two or more slots, usually connected in series. The term "concentrated winding" is confusing because it can also mean windings that are wound together around a single tooth.

Figure 46:
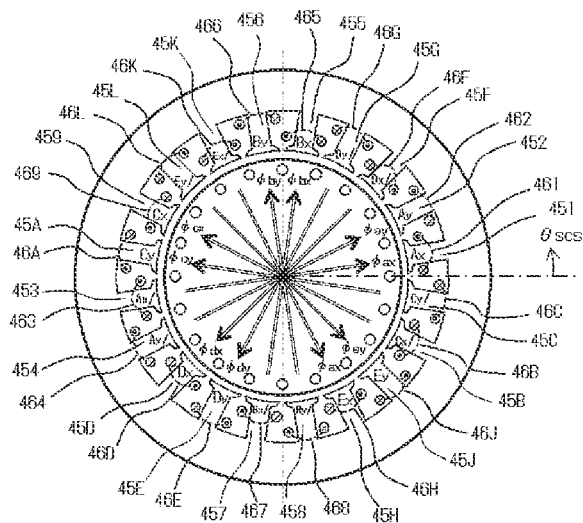
FIG. 46 is a sectional view showing a 5-phase distributed winding induction motor.

Thus, 43F in FIG. 43 is full-pitch winding and concentrated winding. It is a configuration in which one coil is placed in one slot. 441 in FIG. 44 is short-pitch winding and concentrated winding because the winding pitch is 360°/10. and is also a hypothetical winding equivalent to FIG. 43. Note that 441 is a concentrated winding that coalesces around a single tooth, but it consists of two coils in a single slot. 45M in FIG. 45 is full-pitch winding and distributed winding. 461 in FIG. 46 is short-pitch winding, concentrated winding, since the winding pitch is 360°/20. and is also a hypothetical winding equivalent to FIG. 45. These are not new definitions, but rather basic electrical engineering terms found in various literatures.

The winding coefficient is used as the product of the short-node coefficient and the distribution coefficient, and is the effective rate of the short-pitch winding current and the effective rate of the distributed winding current only when the voltage and current are sinusoidal drives. For trapezoidal waveform currents in the present disclosure, the conventional definition of winding coefficient does not apply. Similarly, for the power factor in sinusoidal drive, the trapezoidal waveform current in the present disclosure requires a different definition as the effective factor of power. For example, in the case of a square wave current in phase with a square wave voltage, it can be converted to a conventional power factor and be seen as equivalent to a power factor of 200%. The present disclosure also shows techniques to improve motor utilization factor and inverter utilization factor by using trapezoidal waveform shapes to rectangular waveform shapes, etc.

An induction motor in FIG. 45 is a 5-phase, 20-tooth, 20-slot, distributed winding configuration with each phase winding in two separate slots. 451 is the Ax4-phase stator pole, 452 is the Ay4-phase stator pole, 453 is the Ax/4-phase stator pole, and 454 are the Ay/4-phase stator poles; 455 are the Bx4-phase stator poles; 4 56 are By4-phase stator poles, 457 are Bx/4-phase stator poles, 45 459 is the Cx4 phase stator pole, 45A is the Cy4 phase stator pole, 45B is the Cx/4 phase stator pole, 458 is the By/4 phase stator pole 45B is a Cx/4-phase stator pole, 45C is a Cy/4-phase stator pole; 4 5D is the Dx4 phase stator pole, 45E is the Dy4 phase stator pole, 45F is the Dx/4 phase stator poles, 45G is Dy/4 phase stator poles, 45H is Ex4 phase stator poles, 45 45J is the Ey4-phase stator pole, 45K is the Ex/4-phase stator pole, 45 L is the Ey/4-phase stator pole. The 4 at the end of the name, such as Ax4 phase, is a number to identify the motor model.

45M and 45N, shown at the coil end of the windings, are distributed full pitch winding(s) of AC 4-phase winding, with the number of turns being Nws/4, respectively, connected in series and energized with AC 4-phase current Iac. Similarly, 45P and 45Q are distributed full pitch winding(s) of BD 4-phase windings, each with Nws/4 turns, connected in series and energized with AC 4-phase current Iac. 45R and 45S are full pitch winding(s) with distributed CE4 phase windings. 45R and 45S are distributed full pitch winding(s) of the CE4 phase winding, each with Nws/4 turns, connected in series and energizing the CE4 phase current Iac. 45T and 45U are distributed full pitch windings of the DA4 phase winding, each with Nws/4 turns, connected in series and energizing the BD4 phase current Ibd. U are distributed full pitch winding(s) of the DA4 phase winding, with Nws/4 turns each, connected in series and energizing the DA4 phase current Ida. 45V and 45W are distributed full pitch winding(s) of the EB4 phase winding, with Nws/4 turns each, connected in series and energizing the CE4 phase current Iac. 45W are distributed full pitch winding(s) of EB4 phase windings with Nws/4 turns each, connected in series and energizing EB4 phase current Ieb.

FIG. 46 shows an induction motor in which each full pitch windings in FIG. 45 has been replaced by a hypothetical electromagnetically equivalent concentrated winding. The stator windings in FIGS. 45 and 46 are the stator winding(s). The stator poles in FIGS. 45 and 46 are the same, and the same names are used. 463 are concentrated winding windings of Ax4 phase, each with Nws/4 turns, connected in series, energized with Ax4 phase current Iax, the excitation current component of which is shown in the FIGS. 462 and 464 are concentrated winding windings of the Ay4 phase, each with Nws/4 turns. The excitation current component of Iay produces the phase-Ay4 flux component pay shown in the FIGS. 465 and 467 are the phase-Bx4 concentrated winding windings, each with Nws/4 turns, connected in series and energized with phase-Ay4 current Iay. 465 and 467 are Bx4 phase concentrated winding windings, each with Nws/4 turns, connected in series and energized with Bx4 phase current Ibx, the excitation current component of which generates the Bx4 phase flux component φbx shown in the FIGS. 466 and 468 are By4-phase concentrated winding windings with the number of turns being Nws/4, respectively. The excitation current component of Iby produces the By4-phase flux component φby shown in FIGS. 469 and 469B. B are Cx4 phase concentrated winding windings, each with Nws/4 turns, connected in series and energized with Cx4 phase current Icx, the excitation current component of which produces the Cx4 phase flux component φcx shown in the FIGS. 46A and 46C are concentrated winding windings for the Cy4 phase, each with Nws/4 turns. The excitation current component of Icy generates the Cy4 phase flux component φcy shown in the FIGS. 46D and 46F are Dx4 phase concentrated winding windings. F are Dx4 phase concentrated winding windings, each with Nws/4 turns, connected in series and energized with Dx4 phase current Idx, the excitation current component of Idx producing the Dx4 phase flux component φdx shown in the FIGS. 46E and 46G are Dy4-phase concentrated winding windings, each with Nws/4 turns. The excitation current component of Idy generates the Dy4-phase flux component φdy shown in the FIGS. 46H and 46K are the Ex4-phase concentrated winding windings, each with Nws/4 turns, connected in series. K are Ex4-phase concentrated winding windings, each with Nws/4 turns, connected in series and energized with Ex4-phase current Iex, the excitation current component of which generates the Ex4-phase magnetic flux component φex shown in the FIGS. 46J and 46L are concentrated winding windings of the Ey4 phase, each with Nws/4 turns. The excitation current component of Iey generates the Ey4 phase flux component φey shown in the figure.

The number of phases in FIG. 45 is 5 phases, and 5 different full-pitch winding currents are energized. However, in FIG. 46, to be electromagnetically equivalent, it is necessary to energize 10 different hypothetical currents, even though it is 5 phases. For example, 45M and 45N in FIG. 45 are AC 4-phase windings, and the same AC 4-phase current Iac is energized, but the magnetic flux component φax passing through the Ax4 phase stator pole 451 and the magnetic flux component φay passing through the Ay4 phase stator pole 452 are different values. φay are different values. As a result, the Ax4 phase current that energizes the concentrated winding windings 461 and 463 of the Ax4 phase Iax, and the current of phase Ay4 energizing the concentrated winding windings 462 and 464 of phase Ay4 Iay are different. However, as will be explained later, there is a certain relationship between these Iax and Iay.

Assuming that each current flowing in each slot in FIGS. 45 and 46 is equal, the relationship is as follows. The number of turns of each winding is Nws/4, since they are distributed in two.

$$Iac=Iax+Icy \tag{124}$$

$$Iac=-Iax+Iay \tag{125}$$

$$Ibd=Ibx+Idy \tag{126}$$

$$Ibd=-Ibx+Iby \tag{127}$$

$$Ice=Icx+Iey \tag{128}$$

$$Ice=-Icx+Icy \tag{129}$$

$$Ida=Idx+Iay \tag{130}$$

$$Ida=-Idx+Idy \tag{131}$$

$$Ieb=Iex+Iby \tag{132}$$

$$Ieb=-Iex+Iey \tag{133}$$

From equations (124) to (133), the relationship is also as follows.

$$Iac=(Iay+Icy)/2 \tag{134}$$

$$Ibd=(Iby+Idy)/2 \tag{135}$$

$$Ice=(Icy+Iey)/2 \tag{136}$$

$$Ida=(Idy+Iay)/2 \tag{137}$$

$$Ieb=(Iey+Iby)/2 \tag{138}$$

Equations (124) to (138) are the conversion equations from the hypothetical concentrated winding current to the full pitch winding(s) current in FIG. 45. For example, the full pitch winding(s) current Iac of 4-phase AC can be calculated by any of the equations (124), (125), and (134). (134) equations.

On the other hand, the currents of each hypothetical concentrated winding in equations (124) to (133) are mutually related to each other by the following equation Since there are only five phases of freedom, 10 concentrated winding currents cannot be freely set.

$$Iax=(Iay-Icy)/2 \tag{139}$$

$$Ibx=(Iby-Idy)/2 \tag{140}$$

$$Icx=(Icy-Iey)/2 \tag{141}$$

$$Idx=(Idy-Iay)/2 \tag{142}$$

$$Iex=(Iey-Iby)/2 \tag{143}$$

Next, the equation for converting the full pitch winding current in FIG. 45 to the hypothetical concentrated winding current in FIG. 46 is shown in the following equation.

$$Iax = (Iac - Iac - Ibd - Ibd - Ice - Ice + Ida + Ida + Ieb + Ieb)/2 = \\ -Ibd - Ice + Ida + Ieb \tag{144}$$

$$Iay = (Iac + Iac - Ibd - Ibd - Ice - Ice + Ida + Ida + Ieb + Ieb)/2 = \\ Iac - Ibd - Ice + Ida + Ieb \tag{145}$$

$$Ibx = (Iac + Iac + Ibd - Ibd - Ice - Ice - Ida - Ida + Ieb + Ieb)/2 = \\ Iac - Ice - Ida + Ieb \tag{146}$$

$$Iby = (Iac + Iac + Ibd + Ibd - Ice - Ice - Ida - Ida + Ieb + Ieb)/2 = \\ Iac + Ibd - Ice - Ida + Ieb \tag{147}$$

$$Icx = (Iac + Iac + Ibd + Ibd + Ice - Ice - Ida - Ida - Ieb - Ieb)/2 = \\ Iac + Ibd - Ida - Ieb \tag{148}$$

$$Icy = (Iac + Iac + Ibd + Ibd + Ice + Ice - Ida - Ida - Ieb - Ieb)/2 = \\ Iac + Ibd + Ice - Ida - Ieb \tag{149}$$

$$Idx = (-Iac - Iac + Ibd + Ibd + Ice + Ice + Ida - Ida - Ieb - Ieb)/2 = \\ -Iac + Ibd + Ice - Ieb \tag{150}$$

$$Idy = (-Iac - Iac + Ibd + Ibd + Ice + Ice + Ida + Ida - Ieb - Ieb)/2 = \\ -Iac + Ibd + Ice + Ida - Ieb \tag{151}$$

-continued $$Iex(-Iac - Iac - Ibd - Ibd + Ice + Ice + Ida + Ida + Ieb - Ieb)/2 = \quad (152)$$
$$-Iac - Ibd + Ice + Ida$$

$$Iey = (-Iac - Iac - Ibd - Ibd + Ice + Ice + Ida + Ida + Ieb + Ieb)/2 = \quad (153)$$
$$-Iac - Ibd + Ice + Ida + Ieb$$

Note that these equations follow Ampere's law of integration around the circumference.

In the block diagram of control in FIG. 2, in the current command generating means IAG, the target distribution function Dist1 of the magnetic flux density in the air gap section such as 81, 8 2, 83, 84, etc. in FIG. 8 are determined in the IAG, and the discrete distribution function Dist2, etc. is calculated to obtain the magnetic flux density Bgapn is obtained. Specifically, in the case of FIGS. 45 and 46, the magnetic flux density Bgapay of the stator magnetic pole 452 of the Ay4 phase, the magnetic flux density Bgapn of the By4 phase stator pole 456, the magnetic flux density Bgapby, the magnetic flux density Bgapcy of the Cy4-phase stator pole 45A, the magnetic flux density Bgapn of the Dy4-phase stator pole 4 5E, the magnetic flux density Bgapdy of the Dy4-phase stator pole 45J, and the magnetic flux density Bgapey of the Ey4-phase stator pole 45J. Next, the phase excitation current components IsfnCX of the hypothetical concentrated winding that realize those magnetic flux densities Bgapn are obtained by the following approximate formulas that transform equations (63) and (64). The following approximate formulas are obtained by transforming equations (63) and (64).

$$IsfnCX \times Nws/4 \times 2 = Hgap \times Lgap \times 2 \quad (154)$$

$$IsfnCX = (Bgapn/\mu_0) \times Lgap \times 4/Nws \quad (155)$$

The excitation current component IsfnCX of the Ay4 phase obtained by equation (155) is the excitation current component of Iay, and the excitation current component IsfnCX of the Cy4 phase is the excitation current component of Icy. Substituting the excitation current components of Iay and Icy into equation (139), the excitation current component of Iax in phase Ax4 is obtained. Similarly, the excitation current components of Iby, Idy, and Iey for the By4, Dy4, and Ey4 phases are obtained by (155) and substituting (140) into (143), the excitation current components of Ibx, Icx, Idx, and Iex for the Bx4, Cx4, Dx4, and Ex4 phases are obtained. The excitation current components for all hypothetical concentrated winding windings in FIG. 46 are obtained. In the control of FIG. 2, the excitation current components of the field flux of each phase are controlled in the state of virtual concentrated winding windings, which will be explained later. In this way, equations (124) to (155) can be used to obtain the respective currents in the distributed winding and control the induction motor. The motor can be controlled using equations (124) to (155). Note that each current includes the excitation current component of the field flux and the rotor current component, so they must be calculated and controlled separately. Equations (124) to (153) are equations that are valid with the excitation current component and rotor current component included. Equations (154) and (155) are expressions for the excitation current component only.

For complexity, compare the 5-phase, full-pitch winding, distributed-winding, 20-slot induction motor of FIGS. 45 and 46 with the 5-phase, full-pitch winding, distributed-winding, 10-slot induction motor of FIGS. 43 and 44. Compare the 5-phase, full-pitch winding, concentrated winding, 10-slot induction motor of FIGS. 43 and 44. The distributed winding of FIG. 45 is more complex to configure because it has twice as many slots. In terms of current control, both motors in FIGS. 45 and 43 have the same 5-phase current. For the conversion from virtual concentrated winding current to full-pitch winding current, the full-pitch winding and concentrated winding induction motors in FIG. 43 are shown in equations (99) to (103), while full-pitch winding and distributed winding in FIG. 45 are shown in equations (99) to (103). The full-pitch winding and distributed winding induction motors in FIG. 45 are similar, with equations (139) to (143). For the conversion from full-pitch winding current to virtual concentrated winding current, the full-pitch winding and concentrated winding induction motors are equations (104) to (108), and the conversion from full-pitch winding and distributed-pitch winding currents to virtual concentrated winding currents are equations (104) to (108) in FIG. 45. The full-pitch winding and distributed-winding induction motors in FIG. 43 have equations (104) to (108), while the full-pitch winding and distributed-winding induction motors in FIG. 45 have equations (144) to (153). Although the number of equations is doubled, they are similar. From these comparisons, it can be said that in terms of control complexity, the induction motor of distributed winding in FIG. 45, which is the configuration of distributed winding, is not disadvantageous. In terms of performance, the distributed winding induction motor of FIG. 45 can generate a smoother magnetomotive force distribution and reduce harmonic components. From a manufacturing perspective, the full-pitch winding and concentrated winding induction motors of FIG. 43 are more suitable when a simple configuration is desired.

In addition, induction motors with distributed winding windings are more effective in reducing their harmonics when the number of phases is small. In this sense, the harmonic reduction effect of distributed winding is relatively small because the harmonic components of 5-phase and 7-phase induction motors are small. Distributed winding is also one of the most promising methods when multiple slots are required for reasons such as the use of flat rectangular conductors as induction motor windings, or when precise induction motor control is to be realized. Furthermore, this technology can be applied to other winding techniques such as staggered winding.

Next, let the voltages in each of the hypothetical concentrated winding windings shown in FIG. 46 be as follows: Ax4 phase concentrated winding windings 4 61 and 463 are connected in series and the voltage at both ends is Vax. The same is true for the other phases.

$$Vax = Nws/2 \cdot d\varphi ax/dt \quad (156)$$

$$Vay = Nws/2 \cdot d\varphi ay/dt \quad (157)$$

$$Vbx = Nws/2 \cdot d\varphi bx/dt \quad (158)$$

$$Vby = Nws/2 \cdot d\varphi by/dt \quad (159)$$

$$Vcx = Nws/2 \cdot d\varphi cx/dt \quad (160)$$

$$Vcy = Nws/2 \cdot d\varphi cy/dt \quad (161)$$

$$Vdx = Nws/2 \cdot d\varphi dx/dt \quad (162)$$

$$Vdy = Nws/2 \cdot d\varphi dy/dt \quad (163)$$

$$Vex = Nws/2 \cdot d\varphi ex/dt \quad (164)$$

$$Vey = Nws/2 \cdot d\varphi ey/dt \quad (165)$$

Next, the voltages in each phase of the 5-phase, full-pitch winding and distributed-winding windings of FIG. 45 are shown in FIG. 46, with the hypothetical The voltages for each phase of the concentrated winding windings are shown. Using each flux component 25 and its voltage component used in the control of FIG. 2, the voltage of each phase of the full-pitch winding(s) in FIG. 45 that actually drives the voltage and current is obtained. It is also a voltage conversion equation that converts the voltage of each phase of the hypothetical concentrated winding to the voltage of each phase of the full-pitch winding and distributed winding in FIG. 1. The full-pitch winding(s) of the four AC phases in FIGS. 45, 45M and 45 N in series with the Ax4 phase flux component φax, the Ay4 phase flux component (pay, etc., in the AC4 phase in FIG. 45 is the following equation. The same relationship applies to the other phases. Each magnetic flux component shown in FIG. 46 is interlinked to each full-pitch winding line, and the direction in which the magnetic flux of each phase is interlinked so that the polarities of the generated voltage are determined.

$$Vac = \qquad (166)$$

$$Nws/4 \cdot d(\varphi ax + \varphi ay + \varphi bx + \varphi by + \varphi cx + \varphi cy - \varphi dx - \varphi dy - \varphi ex - \varphi ey - \varphi ax + \varphi ay + \varphi bx + \varphi by + \varphi cx + \varphi cy - \varphi dx - \varphi dy - \varphi ex - \varphi ey)/dt =$$

$$Nws/2 \cdot d(\varphi ay + \varphi bx + \varphi by + \varphi cx + \varphi cy - \varphi dx - \varphi dy - \varphi ex - \varphi ey)/dt =$$

$$Vay + Vbx + Vby + Vcx + Vcy - Vdx - Vdy - Vex - Vey$$

$$Vbd = \qquad (167)$$

$$Nws/4 \cdot d(-\varphi ax - \varphi ay + \varphi bx + \varphi by + \varphi cx + \varphi cy + \varphi dx + \varphi dy - \varphi ex - \varphi ey - \varphi ax - \varphi ay - \varphi bx + \varphi by + \varphi cx + \varphi cy + \varphi dx + \varphi dy - \varphi ex - \varphi ey)/dt =$$

$$Nws/2 \cdot d(-\varphi ax - \varphi ay + \varphi by + \varphi cx + \varphi cy + \varphi dx + \varphi dy - \varphi ex - \varphi ey)/$$

$$dt = -Vax - Vay + Vby + Vcx + Vcy + Vdx + Vdy - Vex - Vey$$

$$Vce = \qquad (168)$$

$$Nws/4 \cdot d(-\varphi ax - \varphi ay - \varphi bx - \varphi by + \varphi cx + \varphi cy + \varphi dx + \varphi dy + \varphi ex + \varphi ey - \varphi ax - \varphi ay - \varphi bx - \varphi by + \varphi cx + \varphi cy + \varphi dx + \varphi dy + \varphi ex + \varphi ey)/dt =$$

$$Nws/2 \cdot d(-\varphi ax - \varphi ay - \varphi bx - \varphi by + \varphi cy + \varphi dx + \varphi dy + \varphi ex + \varphi ey)/$$

$$dt = -Vax - Vay - Vbx - Vby + Vcy + Vdx + Vdy + Vex + Vey$$

$$Vda = \qquad (169)$$

$$Nws/4 \cdot d(+\varphi ax + \varphi ay - \varphi bx - \varphi by - \varphi cx - \varphi cy + \varphi dx + \varphi dy + \varphi ex + \varphi ey + \varphi ax + \varphi ay - \varphi bx - \varphi by - \varphi cx - \varphi cy + \varphi dx + \varphi dy + \varphi ex + \varphi ey)/dt =$$

$$Nws/2 \cdot d(+\varphi ax + \varphi ay - \varphi bx - \varphi by - \varphi cx - \varphi cy + \varphi dy + \varphi ex + \varphi ey)/$$

$$dt = Vax + Vay - Vbx - Vby - Vcx - Vcy + Vdy + Vex + Vey$$

$$Veb = \qquad (170)$$

$$Nws/4 \cdot d(+\varphi ax + \varphi ay + \varphi bx + \varphi by - \varphi cx - \varphi cy - \varphi dx - \varphi dy + \varphi ex + \varphi ey + \varphi ax + \varphi ay + \varphi bx + \varphi by - \varphi cx - \varphi cy - \varphi dx - \varphi dy + \varphi ex + \varphi ey)/dt =$$

$$Nws/2 \cdot d(+\varphi ax + \varphi ay + \varphi bx + \varphi by - \varphi cx - \varphi cy + \varphi dx + \varphi dy + \varphi ey)/$$

$$dt = Vax + Vay + Vbx + Vby - Vcx - Vcy - Vdx - Vdy + Vey$$

Next, a simpler control example of the 5-phase, full-pitch windings, distributed windings, 20-slot induction motor in FIG. 45 is shown in FIG. 4 7 and explain. Simplified control of the distributed winding induction motor of FIG. 45 is the same as the full-pitch winding, concentrated winding, 10-slot induction motor of FIG. 43. winding, and 10-slot induction motor in FIG. 43, and then modifying some of the calculations. Originally, the full-pitch winding, distributed-winding induction motor of FIG. 45 was calculated to control the full-pitch winding, concentrated winding, 10-slot induction motor of FIG. 43. The full-pitch winding and distributed winding induction motors of FIG. 45 are similar to the full-pitch winding and distributed winding induction motors of FIG. 43, and have many points in common. Therefore, in the simplified control described above, the common points are diverted and the different points are handled by simple calculations.

Figure 47:
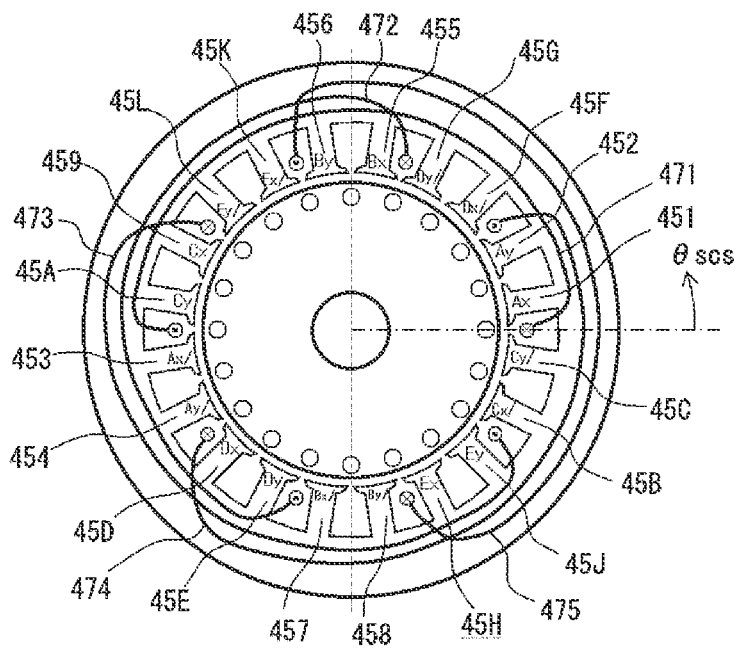
FIG. 47 is a sectional view showing a 5-phase distributed winding induction motor.

The induction motor of FIG. 47 is now described as the motor model for the simplified control of FIG. 45. Each stator pole in FIG. 47 is the same as in FIG. 45, with 20 stator poles. Each stator winding in FIG. 47 is the same as in FIG. 43, with five sets of full-pitch winding wires. As shown, no windings are placed in the half slots in FIG. 47. 471 is the full-pitch winding, concentrated windings of the phase AC5, which are the same as the full-pitch windings, concentrated windings of the phase AC3 in FIG. 43. Similarly, 472 is the BD 5-phase winding, the same as the BD 3-phase winding 43G in FIG. 43. 473 is the CE5 phase winding, the same as the CE3 phase winding 43H in FIG. 43. 474 is the DA5 phase winding, the same as the DA3 phase winding 43J in FIG. 43. 475 is the EB5 phase winding, the same as the EB3 phase winding 43K in FIG. 43.

Equations (124) to (170) for the induction motors of full-pitch winding and distributed-pitch winding in FIG. 45 are calculated by the above equations (124) to (170) for the induction motors of full-pitch winding and distributed-pitch winding in FIG. 43. Equations (124) to (170) of the induction motor with full-pitch winding and distributed winding in FIG. 45 are compared with the above equations (99) to (118) of the induction motor with full-pitch winding and concentrated winding in FIG. 43 and analyzed. The equations (99) to (118) are compared with the equations (99) to (118) for the full-pitch winding and concentrated winding induction motors in FIG. 43 and analyzed. First, we focus on the electromotive forces acting on the stator poles of the Ay4, By4, Cy4, Dy4, and Ey4 phases in FIGS. 45, 46, and 47. Equations (134) to (138) in FIG. 45 are similar to those in Equations (99) to (103) in FIG. 43. In FIGS. 45 and 46, the number of turns of each winding is Nws/4, which is half, so each equation is ½. However, when considered in terms of the magnetomotive force Q[A-turn], the equations are the same.

Therefore, when the same 5-phase current is energized to each phase winding of the induction motor in FIG. 43 and FIGS. 45 and 46, the same magnetomotive force acts on the A3 phase stator pole 431 in FIGS. 43 and 44 and the Ay4 phase stator pole 452 in FIGS. 45 and 46. Similarly, the same magnetomotive force acts on the B3 phase stator pole 433 in FIGS. 43 and 44 and the By4 phase stator pole 456 in FIGS. 45 and 46. The same magnetomotive force acts on the C3 phase stator pole 435 in FIGS. 43 and 44 and the Cy4 phase stator pole 45A in FIGS. 45 and 46. The same magnetomotive force acts on the D3 phase stator pole 437 in FIGS. 43 and 44 and the Dy4 phase stator pole 45E in FIGS. 45 and 46. The same magnetomotive force acts on the E3 phase stator pole 439 in FIGS. 43 and 44 and the Ey4 phase stator pole 45J in FIGS. 45 and 46.

From these results, the magnetomotive forces Iay, Iby, Icy, Idy, and Iey acting on the stator poles of phases Ay4, By4, Cy4, Dy4, and Ey4 in FIGS. 45 and 46 can be calculated with the magnetomotive forces Ia, Ib, Ic, Id, and Ie acting on the stator poles of phases A3, B3, C3, D3, and E3 in FIGS. 43 and 44.

$$Iay = 2 \cdot Ia \quad (171)$$

$$Iby = 2 \cdot Ib \quad (172)$$

$$Icy = 2 \cdot Ic \quad (173)$$

$$Idy = 2 \cdot Id \quad (174)$$

$$Iey = 2 \cdot Ie \quad (175)$$

Note that this consideration is also valid in view of Ampere's law of integration around the circumference.

Next, consider the magnetomotive forces Iax, Ibx, Icx, Idx, and Iex acting on the Ax4 phase, Bx4 phase, Cx4 phase, Dx4 phase, and Ex4 phase stator poles in FIGS. 45 and 46. Equation (139) shows that electromotive force acting on the Ax4 phase stator pole 451 in FIGS. 45 and 46 has an average electromotive force provided by the electromotive force acting on the Ay4 phase stator pole 452 in FIGS. 45 and 46 and the magnetomotive force acting on the Cy4 phase stator pole 45C in FIGS. 45 and 46. Similarly, from equation (140), the magnetomotive force acting on the Bx4 phase is obtained by the average of the magnetomotive force of the By4 phase and the Dy4 phase. From Eq. (141), the magnetomotive force acting on the Cx4 phase is obtained by the average value of the magnetomotive force of the Cy4 phase and the magnetomotive force of the Ey4 phase. From Eq. (142), the magnetomotive force acting on the Dx4 phase is obtained by the average value of the magnetomotive force of the Dy4 phase and the magnetomotive force of the Ay4 phase. From equation (143), the magnetomotive force acting on the Ex4 phase is obtained by the average value of the magnetomotive force of the Ey4 phase and the By4 phase.

From these results, the electromotive force acting on the stator poles of phases Ax4, Bx4, Cx4, Dx4, and Ex4 in FIGS. 45 and 46 can be calculated by the electromotive force acting on the stator poles of phases A3, B3, C3, D3, and E3 in FIGS. 43 and 44.

$$Iax = (Iay - Icy)/2 = Ia - Ic \quad (176)$$

$$Ibx = (Iby - Idy)/2 = Ib - Id \quad (177)$$

$$Icx = (Icy - Iey)/2 = Ic - Ie \quad (178)$$

$$Idx = (Idy - Iay)/2 = Id - Ia \quad (179)$$

$$Iex = (Iey - Iby)/2 = Ie - Ib \quad (180)$$

Also, concerning the conversion from equation (171) to equation (180), a conversion from the hypothetical concentrated winding currents to the full-pitch winding currents of FIG. 45 can be obtained by any of equations (124) to (138). Since there are only five phases of freedom and each virtual concentrated winding current is correlated, the conversion of each full-pitch winding current into a full-pitch winding current can be obtained from equations (124) through (138). Equations are each expressed in three equations, but they all have the same value.

The above shows that the current components for each phase of the 5-phase, full-pitch-winding, distributed-winding, 20-slot induction motor in FIG. 45 can also be obtained from the calculated results of the 5-phase, full-pitch-winding, distributed-winding, 10-slot induction motor in FIG. 43. It is shown that the current components for each phase of the 5-phase, full-pitch winding, distributed winding, 20-slot induction motor of FIG. 45 can also be obtained from the calculation results of the 5-phase, full-pitch winding, concentrated winding, 10-slot induction motor of FIG. 43. That is, the induction motor of FIG. 45 is calculated as if it were the induction motor of FIG. 47, and the currents in the hypothetical concentrated winding windings are calculated from equations (171) to (180). The subsequent calculation of the rotor current and feedback control in the control of FIG. 2 can be calculated using the motor models of FIGS. 45 and 46, as will be shown later. FIG. 45 and FIG. 46.

It is also possible to further simplify the control of the 5-phase, full-pitch winding, distributed-winding, 20-slot induction motor of FIG. 45. That is, control as if it were the 5-phase, full-pitch winding, concentrated winding, 10-slot induction motor of FIG. 43. In this case, the amplitude of each current of the motor in FIG. 43 is adjusted and the current center position of each phase is shifted, so that, for example, the current phase can be shifted in the circumferential direction by about ½ slot pitch of FIG. 45. This can be done. This simplified method provides considerable control accuracy, although it is less rigorous in principle.

Also, for example, each of the 45M and 45N windings in FIG. 45 can be split into two full pitch windings each. One winding of 45N is moved one slot to CCW, one winding of 45N is moved one slot to CCW, and the same configuration is used for each phase winding. The four AC4-phase windings would be divided into three slots. It is a short-pitch winding, distributed winding, with a winding pitch of $360° \times 9/20 = 162°$ in the configuration shown in FIG. 45. It is often used because it has the effect of reducing the harmonic component of torque.

And many winding forms of induction motors are possible, and their specific calculation and control methods are shown in equations (124) to (180). There is a method of calculating and controlling the motor model and the magnetomotive force of each current faithfully, albeit with approximate formulas, as shown in equations (124) through (180), while there is another method of calculating and controlling the motor model with similar characteristics, such as those shown in FIGS. 43 and 45. There is also a method of calculation and control by approximation. The present disclosure technology can be applied to induction motors of these various winding forms and their controllers, and is included in the present disclosure.

Figure 48:
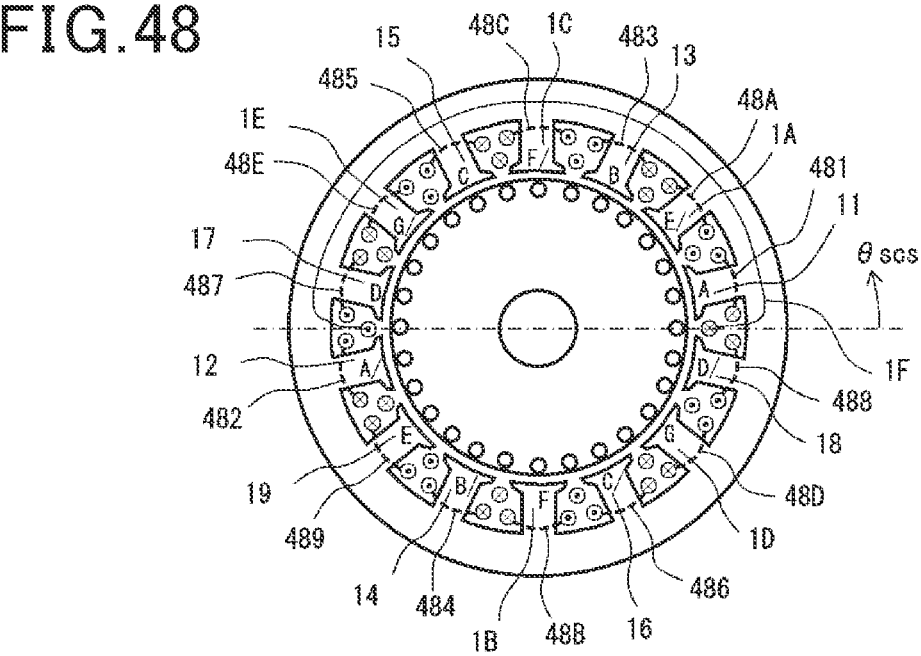
FIG. 48 is a sectional view showing a 5-phase induction motor with distributed windings and concentrated windings.

Next, an induction motor with both full pitch windings and concentrated winding windings, shown in FIG. 48, is also possible. if in FIG. 48 has the same configuration as the AD 2-phase full pitch windings 1F. The windings in FIG. 48 that are not signed and the coil ends are not filled in are also the same as the full pitch windings for each phase in FIG. 1. 481 and 482 in FIG. 48 are the concentrated windings of phase A2. 483 and 484 are the concentrated winding windings of phase B2. 485 and 486 are the concentrated winding windings of phase C2. 487 and 488 are the concentrated winding windings of phase D2. 487 and 488 are the concentrated winding windings of phase D2. 489 and 48A are the concentrated winding windings of phase E2. 48B and 48C are the concentrated winding windings of phase F2. 48B and 48C are the concentrated winding windings of phase F2. 48D and 48E are the concentrated winding windings of phase G2. The configuration is the same as the concentrated winding windings for each phase in FIG. 3.

In this way, both full pitch winding(s) and concentrated winding windings are wound, and the excitation current component of the field flux, the rotor current component on the stator side, or the current component to compensate the delay of the rotor current, can be divided between the two windings, taking control convenience into consideration. The two windings can be energized separately, taking control convenience into consideration. Since both windings have their own characteristics, it can be said that control can be performed by taking advantage of their features. For example, in the control shown in FIG. 2, the field flux is proportional to the concentrated winding excitation current for each tooth, as will be shown later. 81 and 482 in FIG. 48 are convenient for flux excitation. On the other hand, the torque current, i.e., the rotor current component, is proportional to each current of the full-pitch winding and the magnetic flux density at that location, which makes the full-pitch winding more convenient for torque control. Thus, each winding in FIG. 48 may be used differently. In particular, the present disclosure simplifies the field flux control because the magnitude of the magnetic flux density is controlled for each phase and each tooth. Since the field current is smaller than the maximum value of the rotor current component, the increase in winding burden in FIG. 48 is small compared to the motor in FIG. 1, even if the field excitation is performed with concentrated winding windings. However, in the case of FIG. 48, the number of power transistor elements in the drive circuit increases.

Next, an embodiment of a thirteenth mode is described. The thirteenth mode provides an example in which, in the first and second modes, the torque command Tc of the induction motor and the rotor rotational angular velocity ωr are used to obtain the slip angular frequency ωs and an arbitrary shape of the magnetic flux density The current control of the induction motor is performed by determining the distribution shape Dist1 of the magnetic flux density or the arbitrary shape of the excitation current component corresponding to the aforementioned magnetic flux density. The distribution shape of the magnetic flux density is the circumferential distribution shape of the air gap of the induction motor. In particular, the arbitrarily shaped distribution shape Dist1 is not only a sinusoidal distribution like 84 in FIG. 8, but also a trapezoidal distribution like 83, 82, and 81, but also trapezoidal waves such as 83, 82, 81, or any distribution shape at all. The specific example of the thirteenth mode is included in the current command generating means IAG of 2B in the block diagram of FIG. 2. The IAG is expressed in the MN coordinate, which is rotational coordinates, and an example is shown below.

Figure 49:
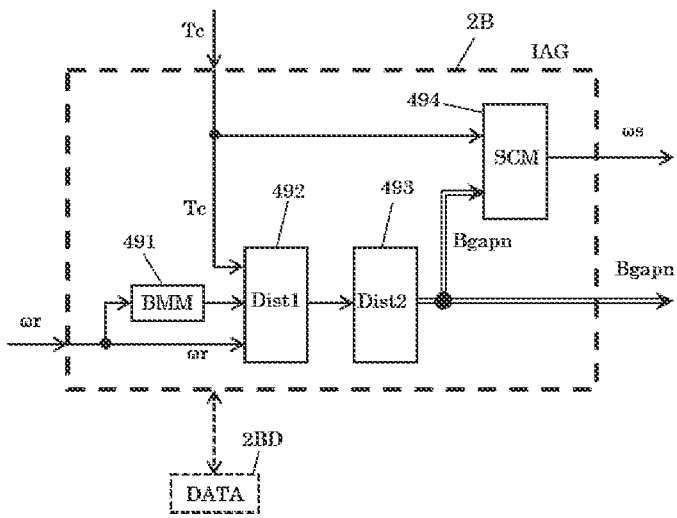
FIG. 49 is a partially detail of the block diagram.

An example of the internal configuration of the current command generating means IAG is shown in FIG. 49. The input of the current command generating means IAG is the torque command Tc [Nm] and the rotor rotation angular frequency ωr [rad/sec]. s [rad/sec] and the magnetic flux density Bgapn near the air gap of each tooth of the induction motor. 491 in FIG. 49 is the maximum flux density setting method BMM, which finds the maximum value of the magnetic flux density Bgapn. In the region where the rotor rotational angular frequency ωr is small, the maximum value of the magnetic flux density is determined by the structure and magnetic material of the induction motor. In the induction motor of FIG. 1, as an example, the maximum value of each phase magnetic flux density Bgapn in the air gap section is 1.0 [T]. It is equivalent to 2.0 [T] because the magnetic flux collects in the stator teeth. When the rotor rotational angular frequency ωr becomes so fast that it exceeds the base rotational speed, for example, in the case of the drive circuit in FIG. 82, the supply voltage of the DC voltage source 825 Vpw[V], each winding voltage will be limited to Vpw[V]. The maximum magnetic flux density is then limited as the value of Bmax [T] as shown in equations (95) and (97).

By 492 in FIG. 49, a target distribution function Dist1 of the magnetic flux density is obtained from the conditions of the input torque command Tc, the maximum magnetic flux density Bmax, and the rotor rotation angular frequency ωr.

81, 82, 83, 84, etc. in FIG. 8 and the shape of the distribution. Find the maximum magnetic flux density. For low speed rotation and large torque, the waveform should be a trapezoidal wave close to a square wave as shown in 81. For high speed rotation, the current change rate is limited, so the waveform should be a sine wave shape, for example, 84. In order for the induction motor to output more torque, a larger flux density and a target distribution function Dist1 that is closer to a square wave is preferred. The copper loss of the motor and the current value of the drive circuit can be reduced.

One method to obtain the target distribution function Dist1 is to functionalize parameters such as the trapezoidal wave slope as shown in FIG. 8 with the 492 inputs in FIG. 49, namely One method is to functionalize the parameters such as the torque command Tc, the maximum magnetic flux density Bmax, and the rotor rotational angular frequency ωr, which are the inputs of 492 in FIG. 49. Once the 492 inputs are determined by functionalization, the target distribution function Dist1 can be obtained. Another method to obtain the target distribution function Dist1 is to pre-calculate the target distribution function Dist1 according to the input conditions of 492, as shown in the example in FIG. 40. The parameterization of the target distribution function Dist1 is done in advance, as shown in the example in FIG. 40, and a finite number of data is stored in the table in FIG. 40, and at the time of use, interpolation calculation is performed according to the 492 inputs to obtain the parameters of the target distribution function The method is to obtain the parameters of Dist1 and create the target distribution function Dist1. In any case, 492 is the generator of the target distribution function Dist1.

Also, in FIG. 49, 492 or 493, a delay compensating flux can be added to the target distribution function Dist1 to compensate for the delay in the rotor current. A delay compensation flux can also be added to the target distribution function Dist1 to compensate for the delay of the rotor current in FIG. 492 or 493. The delay compensation flux is an additional flux as shown in detail in FIGS. 35 to 39, and this delay compensation flux can increase the output torque. The delay compensation flux can also be realized by adding it to the data in the table in FIG. 40. The above mentioned embodiment method of increasing torque by improving the time delay of the rotor current with the compensation flux is also an embodiment method based on the third and fourth modes.

493 in FIG. 49 is an inverter in which the output of 492, the target distribution function of magnetic flux density Dist 1, inverts to a discrete distribution function Dist2 of the magnetic flux density for each tooth. As mentioned above, for example, the magnetic flux density in the air gap section near each tooth in FIG. 1 is almost uniform over the circumferential width range of the tooth because the tooth is made of a soft magnetic material with small magnetic impedance. In other words, as shown in FIG. 8, the target distribution function Dist1 of the magnetic flux density can be set to any distribution shape. However, the magnetic flux density distribution in the air gap section in FIG. 1 is discretized to the circumferential width of each tooth. Specific examples are shown in FIG. 9, FIG. 14, FIG. 17, FIG. 20, and FIG. 2 4.

In these distribution diagrams, the horizontal axis shows the circumferential angle θcs in the stator, and the circumferential width of each tooth is determined by the angular range of θcs. For example, the magnetic flux density near the air gap section of the A2 phase stator pole 11 in FIG. 1 is the magnetic flux density in the range of θcs from 0° to 360°/14 in FIG. 9. B2 phase stator pole 13 are the magnetic flux densities in the range of θcs from 2×360°/14° to 3×360°/14 in FIG. 9. As shown in FIG. 9 and other figures, the distribution shape of the magnetic flux density is a staircase-like distribution diagram for each tooth as a result of discrete value conversion.

The output 493, which is the transformer to the discrete distribution function Dist2, is the magnetic flux density distribution Bgapn for each tooth, which in the case of the induction motor in FIG. 1 consists of seven individual phase magnetic flux density data Bgapa, Bgapb Bgapc, Bgapd, Bgape, Bgapf, and Bgapg. Those output values are output to the exciting-current generating means IFG and the rotor current generator IRG as shown in FIG. 42 above.

Each value of the discrete distribution function Dist2 of the magnetic flux density is the average of the values of the circumferential widths corresponding to each tooth in the target distribution function Dist1, as described above. One method of calculating the average value is to simply calculate the area of the corresponding width in the target distribution function Dist1 and take the average, but various methods may be used. For example, when calculating the excitation current of the magnetic flux corresponding to each tooth, the average value of the magnetic flux density is used to obtain the excitation current, but the flux distribution shape of the target distribution function Dist1 can be used in the calculation of the rotor current component. Since the relevant angular range of each tooth changes when the discrete distribution function Dist2 is converted to the real axis coordinate using the MN coordinate, which is the rotational coordinate, the magnetic flux distribution for each rotational position may be calculated without changing the flux distribution function of the target distribution function Dist1, and then the average flux density for each tooth may be calculated.

Next, 494 in FIG. 49 is the slip angular frequency generator SCM, which generates the initial slip angular frequency ωs during sampling control of the controller. As mentioned above, the initial slip angular frequency ωs can be obtained using equation (87). However, since equations (84) to (87) are approximate equations assuming that the leakage inductance Lrw of each rotor winding is zero, the decrease in each rotor current Irn and the response delay require attention, and various countermeasures are effective. One of these countermeasures is to decrease the estimate of the rotor current Irn in equation (84) and increase the slip angular frequency ωs in equation (87). Another way to deal with the response delay is to include an element of differential compensator in the proportional-integral compensator of 2A in FIG. 2 to compensate for the response delay by advancing the phase of the torque command Tc. The response delay can also be compensated by advancing the phase of the torque command Tc. Another method is to add a torque error correction ωster, which is the output of the 2H3 proportional-integral compensator, or the 2 The method of adding a rotor current error correction ωsier, which is the output of the 2U proportional-integral compensator, will be explained later. As described above, from the inputs of the torque command Tc and the rotor rotational angular frequency ωr, the target distribution function Dist1 and the discrete distribution function Dist2 of the magnetic flux density, Bgapn and the slip angular frequency ωs, can be obtained.

The distribution state of the magnetic flux density was obtained in the current command generating means IAG in FIG. 2. That is, the distribution state of the magnetic flux density was obtained for each of the maximum flux density setting means shown in 491, the function for obtaining the target distribution function Dist1 of the magnetic flux density shown in 492, the converter to the discrete distribution function Dist2 shown in 493, and the sliding angular frequency generator SCM shown in 494, which are examples of the internal configurations of the IAG. However, there is a certain relationship between the magnetic flux density in the air gap section and its excitation current component, as shown in equation (64). Although there are errors such as nonlinearity in the accuracy, and errors generated by the approximation, they can be corrected. Therefore, the distribution state of the magnetic flux density treated in the IAG of FIG. 2, i.e., each function of FIG. 49, can be replaced by the distribution state of the excitation current component, which is equivalent. In the present disclosure, the distribution state of the magnetic flux density and the distribution state of the excitation current component are equivalent, and both expressions are included in the present disclosure.

Next, an embodiment of a fourteenth mode is described. The fourteenth mode relates to is an example in which, as in the first and second modes, an arbitrary-shaped target distribution function Dist1 of the magnetic flux density in the air gap section is converted to a discrete distribution function Dist2, as described above, and the hypothetical The excitation current command components Isf1Cc, Isf2Cc, Isf3Cc, and Isf4Cc . . . of the concentrated winding windings CW1, CW2, CW3, and CW4 . . . are obtained. In the case of the induction motor shown in FIG. 1, in the current command generating means IAG in FIG. 2, the target distribution function Dist1 of this magnetic flux density has a distribution shape as shown in FIG. 8, and the magnetic flux density of each tooth in each phase is The target distribution function Dist1 is transformed into the discrete distribution function Dist2 for the magnetic flux density Bgapn of each tooth of each phase, i.e., Bgapa, Bgapb, Bgapc, Bgapd, Bgape, Bgapf, and Bgapg. Then, the excitation current components of each phase are converted by the exciting-current generating means IFG in FIG. 2C. An example of this discrete distribution function Dist2 is shown in FIG. 9 to FIG. 23.

The full pitch windings in FIG. 1 can be replaced by the hypothetical concentrated winding and its concentrated winding current in FIG. 3. Equations (1) to (42). The relationship between each current component and each magnetic flux density is as in equations (43) to (62). The phase A2 excitation current component IsfaCMc in the phase A2 current IsaCM of the hypothetical concentrated winding in FIG. 3 is shown in equation (64) above and is a command value. IsfaCMc is a function of the exciting-current generating means IFG shown in FIG. 2, 2C. It is the excitation current that excites the magnetic flux density Bgapa during its gap length Lgap. Similarly, for phases B2 to G2, the magnetic flux density of the air gap section is converted to the command values of the excitation current components IsfbCMc, IscfCMc, IsfdCMc, IsfeCMc, IsfcMc, and IsfgCMc. Note that although equation (64) describes the A2-phase excitation current component IsfaCMc in real axis coordinates, IAG and IFG, etc. in FIG. 2 are shown in MN coordinates, which are rotational coordinates, and the A2-phase excitation current component is IsfaCMc. Also, as mentioned above, for example, the variable names of the currents, IsfaCMc, are in that order: s is the stator, f is the excitation current component, a is phase A2 since it is an induction motor in FIGS. 1 and 3, c is concentrated winding, M is MN coordinates, and c is the command value.

When the distribution state of magnetic flux density is replaced by the distribution state of excitation current components in the current command generating means IAG in FIG. 2 as described above, the function of the exciting-current generating means IFG has already been performed, and the IFG in 2C on FIG. 2 is not necessary.

Next, an embodiment of a fifteenth mode is described. The fifteenth mode relates to an example of the first, second, and fourteenth modes in which the magnetic flux density of each phase of an induction motor is estimated to obtain the excitation current detection component of a hypothetical concentrated winding excitation current detection component is obtained, and feedback control is performed by subtracting the excitation current detection component from the excitation current command component to obtain an excitation current error for the phases, respectively.

2Y in FIG. 2 is a magnetic flux density detector that detects the magnetic flux density in the air gap section of each phase. Various magnetic flux and magnetic flux density detection means, methods, and devices are possible, but here we assume magnetic flux density detection using a Hall element or similar device placed inside or near the tooth. 27 is the magnetic flux density 27 is the magnetic flux density information means φDET. With this means, a magnetic flux density of phase A2, Bgapad; a magnetic flux density of phase B2, Bgapbd; a magnetic flux density of phase C2, Bgapcd; a magnetic flux density of phase D2, Bgapdd; a magnetic flux density of phase E2, Bgaped; a magnetic flux density of phase F2, Bgapfd; and a magnetic flux density of phase G2, Bgapgd [T] are obtained respectively from the 2Y output, as shown in FIG. 1. Then, the exciting-current generating means IFG, shown in 271, is to calculate the magnetic flux density Bgapad of phase A2 based on the above equation (64). The same applies to the magnetic flux densities of the other phases, including the magnetic flux density Bgapbd of phase B2. This results in the calculation of the excitation current components IsfbCXd, IsfcCXd, IsfdCXd, IsfeCXd, IsfcCXd, and IsfgCXd for the respective phases. Note that 271 is the same function as the exciting-current generating means IFG in 2C above.

2D shown in FIG. 2 is an MN coordinate converter CMNC that converts the excitation current components of the concentrated winding from the real axis coordinate to the MN coordinate. This converter converts the excitation current components IsfaCXd, IsfbCXd, IsfcCXd, IsfdCXd, IsfeCXd, IsffCXd, and IsfgCXd of each phase described above into the virtual concentrated winding excitation current components IsfaCMd, IsfbCMd, IsfcCMd, IsfdCMd, IsfeCMd, IsffCMd, and IsfgCMd. The hypothetical motor in the MN coordinates of the induction motor in FIG. 1 is shown in FIG. 25. The magnetic flux and flux density of each tooth in FIG. 25 are discretized magnetically to the tooth width as described above. When rotating the coordinates, the circumferential range of each tooth changes, so the magnetic flux of each tooth must be divided, converted, and redistributed. The d at the end of the signal name of the detected magnetic flux density and the detected excitation current component described above indicates the detection signal.

Figure 50:
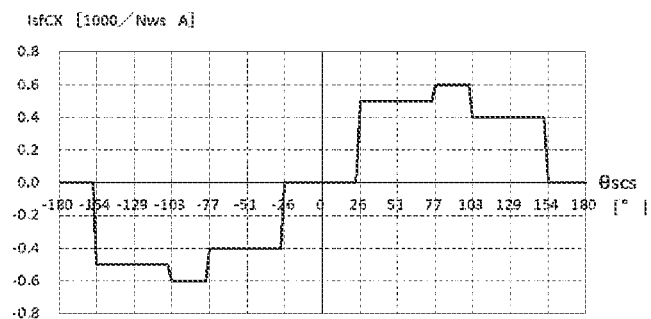
FIG. 50 exemplifies an excitation current to a 7-phase trapezoidal-wave full-pitch winding.
Figure 51:
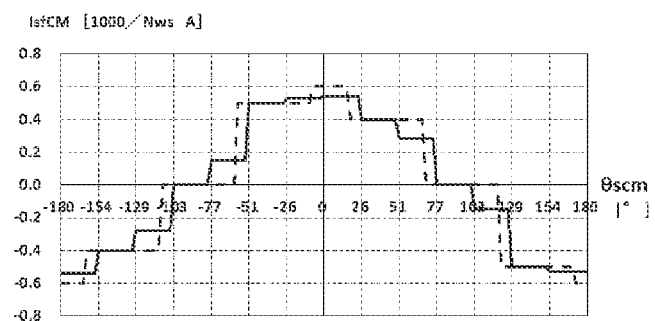
FIG. 51 exemplifies an excitation current to a 7-phase trapezoidal-wave full-pitch winding.

One method of redistributing magnetic flux and flux density in MN coordinate converter MNC is to simply calculate the area average. FIGS. 50 and 51 illustrate this method. As an example, FIG. 50 shows the state of the magnetic flux density distribution in the induction motor of FIG. 1 in real axis coordinates. In the state shown in FIG. 50, the rotor rotation angle θr is at 3.3×360°/14, and the horizontal axis θcs is the circumferential angular position in the stator. The direction of the field flux is in the direction of θcs=3.3×360°/14. The vertical axis is the current IsfnCX of the hypothetical concentrated winding. The excitation current component IsfaCX of phase A2 is shown in equation (64), and the same for the other phases. Since these are real-axis coordinates, the θcs in FIG. 50 from 0° to 360°/14=25.7° shows the magnetic flux density of the phase A2 stator pole 11 in FIG. 1. From 2×360°/14=51.4° to 3×360°/14=77.1°, it shows the magnetic flux density of phase B2 stator pole 13. The other phases are similar, showing the circumferential magnetic flux density in FIG. 1.

FIG. 51 shows the characteristics of FIG. 50 in real axis coordinates converted to MN coordinates, where the horizontal axis is the circumferential angular position in the stator in MN coordinates. The horizontal axis is the circumferential angular position in the stator in MN coordinates, and θmn, which indicates the field position in MN coordinates, is 3.3×360°/14=84.9°. The vertical axis is the current IsfnCM of the hypothetical concentrated winding in the MN coordinate. The dashed characteristic in FIG. 51 is the waveform of FIG. 50 shifted 84.9° to the left on paper, with the same shape. For the induction motor model of FIG. 1, the distribution diagram of MN coordinates in FIG. 51 also assumes 14 virtual teeth aligned in the circumferential direction of FIG. 25. In FIG. 51, θscm between 0° and 360°/14 corresponds to stator pole 251 of phase A2M in FIG. 25. Similarly, a θscm between 2×360°/14 and 3×360°/14 corresponds to 253 stator poles in phase B2M. A θscm between 4×360°/14 and 5×360°/14 corresponds to 255 stator poles in phase C2M. A θscm between 6×360°/14 and 7×360°/14 corresponds to 257 stator poles in phase D2M. A θscm between −6×360°/14 and −5×360°/14 corresponds to 259 stator poles in phase E2M. A θscm between −4×360°/14 and −3×360°/14 corresponds to stator pole 25B in phase F2M. A θscm between −2×360°/14 and −360°/14 corresponds to the stator poles 25D in phase G2M. In both FIGS. 50 and 51, the magnetic flux density is discrete-valued in the circumferential tooth width, so it is also a discrete distribution function Dist2.

In FIG. 51, the magnetic flux density distribution shown by the dashed line varies between the circumferential widths of the stator poles in the MN coordinates, and for later calculations, the magnetic flux is redistributed and each stator in FIG. 25 The magnetic flux density of each stator pole in FIG. 25 must be calculated by redistributing the magnetic flux for later calculations. The solid line in FIG. 51 is an example of the redistributed calculated values. As shown by the solid line in FIG. 51, in the circumferential width range of the stator poles of each phase in the MN coordinate described above, the value of the magnetic flux density of the solid line shows a uniform value, which is the average value of the dashed line, and the average value of the magnetic flux [Wb] shown by the solid line and the dashed line [Wb] is equal to the average value of the magnetic flux [Wb] shown by the solid line. It can also be said that the solid line and the dashed line have equal areas of magnetic flux density for each stator pole on the paper. In this case, the effective length in the rotor axial direction is calculated as Wm [m] and the rotor radius as Mr [m].

The above example of coordinate transformation between FIG. 50 and FIG. 51 is a method in which the magnetic flux [Wb] is equal, but other methods can be used. For example, the distribution waveform in FIG. 50 is converted from 14 divisions to 28 divisions, which is twice the number of divisions. Alternatively, it is multiplied by 4. At that time, the magnetic flux is distributed by weighting with the distribution waveform of the target distribution function Dist1. Then, as shown in FIG. 51, move in the circumferential direction and transform the MN coordinates so that the areas of the magnetic flux densities are equal.

Next, 2E in FIG. 2 is the adder for each phase, which performs feedback control by subtracting the detected value from the command value of the excitation current component of each phase, and 2F output to the proportional-integral compensator. These calculations are performed in parallel for each phase, as shown in FIG. 42. In FIG. 42, the exciting-current generating means IFG shown in FIG. 2C is shown for each phase like IFGa, and the adder shown in 2E is also shown for each phase like 42Ga. The adder shown in 2E is also shown phase by phase as in 42Ea.

The induction motor in FIG. 1 is an AC motor, but on the MN coordinates in FIG. 2, the magnetic flux in each phase, the current in each phase, and the voltage in each phase are always in the same phase, resulting in DC control quantities. For these error quantities, it is possible to use a 2F proportional-integral compensator, which makes it possible to have various frequency characteristics. For example, the integral function amplifies even the smallest error amount, reducing the error and enabling low-frequency response but high-precision control. The response characteristics in the dynamic high-frequency range are mainly controlled by the proportional function. Then, arbitrary frequency characteristics can be selected and provided according to the control conditions. The technology of utilizing a proportional-integral compensator itself is a conventional general control technology.

An output 2F shown in FIG. 2 shows the error amounts IsfaCMer2, IsfbCMer2, IsfcCMer2, IsfdCMer2, IsfeCMer2, IsffCMer2, and IsfgCMer2 are shown. 2G in FIG. 2 is a full-pitch winding converter IFPC that converts the concentrated winding current of each phase to the full-pitch windings current of each phase in MN coordinates. winding converter IFPC that converts the concentrated winding current of each phase into the full-pitch winding(s) current of each phase. Equations (1) to (7) above are conversions to full-pitch winding currents in real-axis coordinates, while conversions to full-pitch winding currents in MN coordinates differ from those in real-axis coordinates by a rotation angle position of θ mn, the relevant stator poles and currents are different in the circumferential direction. However, the full-pitch winding current conversion equation is the same as equations (1) to (7) above, so it is used as is. 2G current full-pitch winding converter The output of IFPC is the error amount of the excitation current component of the field magnet in the stator winding in MN coordinates, which is IsfadFMer2, IsfbeFMer2, IsfcfFMer2, IsfdgFMer2, IsfeaFMer2, IsffbFMer2, and IsfgcFMer2.

Although FIG. 2 shows an example of feedback control of the excitation current component by converting the magnetic flux density of the field flux into an excitation current component, variations such as feedback by commanding the magnetic flux density are also possible. Later, the error amounts of these currents are added with the error amount of the rotor current component of the stator and adder 2Q. Both error amounts are the amount of current converted to full pitch winding(s) in MN coordinates. These current amounts in each phase are then converted into current values in each phase in real-axis coordinates, converted into voltage commands in each phase in real-axis coordinates, and supplied with voltage and current to the full pitch winding(s) in each phase in FIG. 1 by means of a power converter, etc. The rotor current component, real-axis coordinate converter RMNC, voltage commands for each phase in real-axis coordinates, PWM converter, power converter, etc. are explained later.

The following is an example of a sixteenth mode. The sixteenth mode sets up a hypothetical multiple rotor windings on the rotor, determines each rotor voltage generated in each rotor winding based on the magnetic flux density generated by each stator pole, and determines each rotor current in each rotor winding based on the resistance of the rotor winding and the leakage The induction motor is controlled by continuously calculating the inductance, including the inductance. The rotor current of an induction motor is, in outline, a first-order delay current, which is a complex phenomenon due to response delays and other factors. The sixteenth mode continuously calculates and controls the voltage, current, and torque of each rotor winding for an arbitrary magnetic flux density distribution of each stator pole, thus increasing the control accuracy and enabling higher torque and efficiency of the induction motor. It can also improve control performance.

In the sixteenth mode, each rotor voltage generated in each rotor winding of the induction motor in FIG. 1 is determined by calculating each rotor current. FIG. 1 shows an example of 28 rotor windings arranged in a circle. The present disclosure shows how to calculate the rotor current such that it does not depend on the number of rotor windings, the rotation phase of the rotor, and the rotor current component that should be energized to the stator windings.

To simplify the explanation of each rotor winding and rotor current, a cross-sectional view of the induction motor of FIG. 25 with the rotor windings reduced to 14 is shown in FIG. 52. Note that FIG. 25 is a representation in the MN coordinate, which is a coordinate conversion of the induction motor of FIG. 1 shown in real axis coordinates. Each stator pole and each stator full pitch windings in FIG. 52 are the same as in FIG. 25, but the indication of the connection relationship at the coil end is omitted to simplify the figure presentation. The connection of the coil ends has been omitted to simplify the figure. In FIG. 52, 251 is an A2M phase stator pole, 252 is an A/2M phase stator pole, 253 is a phase B2M stator pole, 254 is a phase B/2M stator pole, 255 is a phase C2M stator pole, 256 is a phase C/2M stator pole, and 255 is a C2M phase stator pole, 256 is a C/2M phase stator pole, 257 is a phase D2M stator pole, 258 is a phase D/2M stator pole, 259 is a phase E2M stator pole, 25A is a phase E/2M stator pole, 25 is a phase F2M stator pole, 25C is an F/2M phase stator pole, 25 is a G2M phase stator pole, and 25E is a G/2M phase stator pole. 25N and 25P in FIG. 52 are the AD2M phase full pitch windings for the AD2M phase. Similarly, 521 and 522 are full pitch windings of the BE2M phase, 523 and 524 are full pitch windings of the CF2M phase, 525 and 526 are full pitch windings of the DG2M phase, 527 and 528 are full pitch windings of the EA2M phase, 529 and 2A are the full pitch windings of the FB2M phase, and 52B and 52C are the full pitch windings of the GC2M phase.

Next, an example of the configuration of the rotor windings is shown in FIG. 52. Each rotor winding is a full-pitch winding wire and is shown pointing to the connection relationship at the coil end. The first hypothetical rotor windings RWC11, RWC12, RWC13, RWC14, RWC15, RWC16, and RWC17 are marked with squares on the rotor in FIG. 52. The currents to these windings are Ir11, Ir12, Ir13, Ir14, Ir15, Ir16, and Ir17. The second virtual rotor windings RWC21, RWC22, RWC23, RWC24, RWC25, RWC26, and RWC27 are marked with white circles. The currents to these windings are Ir21, Ir22, Ir23, Ir24, Ir25, Ir26, and Ir27. Each of these rotor windings is a full pitch winding and each is a shorted induction winding. The number of turns of each rotor winding is assumed to be 1 [turn].

For example, the equivalent circuit of rotor winding RWC11 is shown in FIG. 4. The same is true for the other rotor windings. If the winding is insulated, it is not affected by the voltage and other electrical circuit effects of the other rotor windings. If the resistance of the coil end of the rotor in FIG. 52 is sufficiently small, the equivalent circuit on the electric circuit from the stator side will be almost the same as that of a cage winding made of copper bars, etc., or an aluminum die-cast rotor winding. Conversely, a conventional cage winding rotor or aluminum die-cast rotor can be used as the rotor in FIG. 52. If the stator windings are full pitch windings, currents with mutually negative values will flow to windings 180° apart at an electrical angle. This condition is satisfied. Even in the case of a configuration that is not electromagnetically target, the method shown as an example of the present disclosure can be modified and applied.

Figure 53:
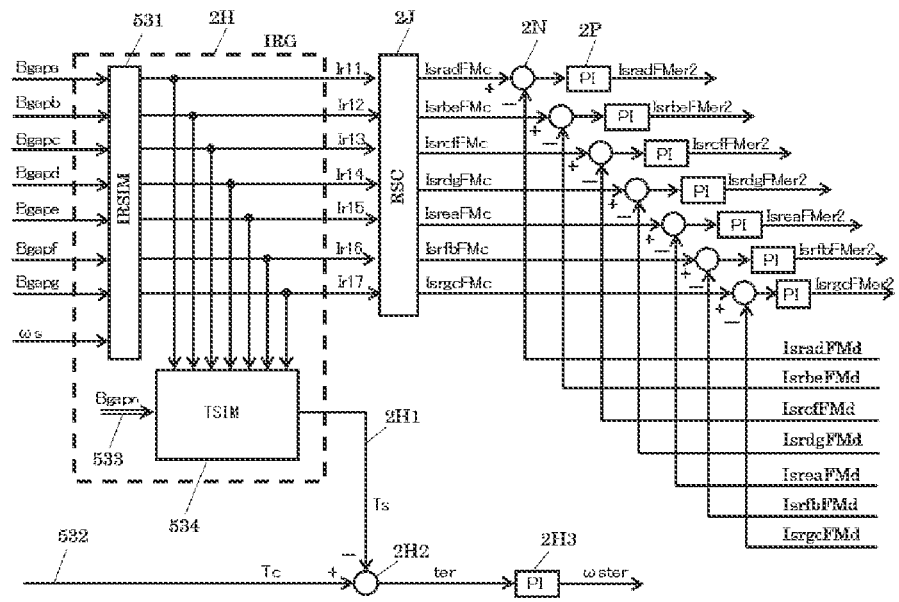
FIG. 53 is a partially detail of the block diagram.

Next, the configurations of 2H, 2J, 2N, and 2P of FIG. 2 is are provided as a configuration for each phase and FIG. 53 is shown, with the configuration for each phase and the variable names added. The same items as in FIG. 2 are shown with the same symbols. Also, these functions in FIG. 53 are calculated in the MN coordinate. 2H in FIG. 2 and FIG. 53 is the rotor current generator IRG, which calculates each rotor current in each rotor winding using the 5 31 rotor current calculation method IRSIM to calculate and obtain the rotor current. The rotor current calculation method is based on the assumption that a convenient number of rotor windings are set first, and then each rotor current is continuously calculated from the magnetic flux density B [T] and the slip angular frequency $\omega s$ [rad/sec]. Even if the number of rotor windings of the induction motor to be driven is as large as 100, the rotor model and the number of rotor windings are assumed to be convenient. In the case of FIG. 52, 14 rotor windings and 7 sets of rotor windings are assumed. In this rotor current generator IRG, the number of rotor windings convenient for control and calculation is selected, and a hypothetical rotor model with seven full-pitch winding rotor windings is set up and calculated, as shown in FIG. 52, for example. The calculation method of the rotor current is shown below. The purpose of this method is to obtain the stator equivalent of the rotor current, which is necessary for induction motor control. On the other hand, since the rotor current is measured or estimated in some way, the calculation is continued each time while calibrating the aforementioned calculated value of the rotor current.

The inputs to the rotor current generator IRG are the magnetic flux densities Bgapa, Bgapb, Bgapc, Bgapd, Bgape, Bgapf, and Bgapg of each phase and the slip angular frequency $\omega s$ [rad/sec], as shown in FIG. 53, which is the output of the current command generating means IAG. The voltages generated in the first hypothetical rotor windings RWC11, RWC12, RWC13, RWC14, RWC15, and RWC16, RWC17 can be obtained for each rotor winding by applying it Vr in equation (73) described. Since the slip angular frequency $\omega s$ is common to all rotor windings, if the aforementioned magnetic flux density acting on each rotor winding is known, the voltage Vr of each rotor winding can be obtained from equation (73). The currents Ir11, Ir12, Ir13, Ir14, Ir15, Ir16, and Ir17 in each rotor winding can be obtained from equation (77). The example of the magnetic flux density Bgapn [T] for each phase in FIG. 53 is similar to characteristic as shown in FIG. 9, FIG. 14, FIG. 17, and FIG. 24, which characteristics are the discrete distribution function Dist2 shown in FIG. 53. The magnetic flux distribution, each current, and each voltage for each phase in FIG. 53 are given in the MN coordinate.

Since equation (77) is a differential equation construction, each rotor current is a first-order delay value and is energized under the influence of past current values. Therefore, each of these rotor currents Ir11, Ir12, Ir13, Ir14, Ir15, Ir16, and Ir17 are calculated using equation (77) and continued in time every calculation time $\Delta t$.

The actual control of the induction motor is performed by sampling control of the control software, and in the present disclosure example in this specification, the control sampling time $\Delta t$ is described as 0.2 [msec]. When each rotor current is calculated by the control software according to equation (77), it is calculated by equations (88) and (88). In the sixteenth mode, each rotor current of each first hypothetical rotor winding is thus calculated separately and continuously in time.

Since the direction of the field flux moves with a slip angular frequency $\omega s$ [rad/sec] with respect to the rotor winding, in MN coordinates where the field flux position is fixed, the circumferential position of the first virtual rotor winding in this FIG. 52 is Each sampling control moves continuously each time by the product of the negative slip angular frequency and the control sampling time $\Delta t$ ($-\omega s \times \Delta t$) [rad]. Each rotor current value also changes continuously in time. And to obtain good response characteristics in induction motor control, it is important to calculate each of the first hypothetical rotor currents Ir11, Ir12, Ir13, Ir14, Ir15, Ir16, and Ir17 continuously in time.

The following is an example of a seventeenth mode. The seventeenth mode equivalently converts each rotor current of an arbitrary current distribution into a rotor current component of each stator winding. At this time, the positive and negative signs of the rotor current and stator rotor current components are opposite. The induction motor is then controlled using these stator rotor current components as command values. In the 2J stator current converter RSC in FIG. 2, these controls are performed in the MN coordinate.

In the 2H rotor current generator IRG of FIG. 2 and FIG. 53, the rotor currents Ir11, Ir12, Ir13, Ir14, Ir15, Ir16, and Ir17 of each of the first hypothetical rotor windings, indicated by the square marks in FIG. 52, were obtained. In the stator current converterRSC shown in FIG. 2 at 2J, the current distribution of the second virtual rotor windings RWC21, RWC22, RWC23, RWC24, RWC25, RWC26, and RWC27, which are opposite each stator winding in FIG. 52 through the air gap and marked with white circles, is obtained by equivalent conversion of the respective rotor currents in the first virtual rotor winding. The second virtual rotor winding is a virtual winding of the relay for calculation purposes, which is set up to facilitate the conversion of the rotor current into the current of each stator winding. As will be shown later, if the rotor current [A×turn] is the rotor current [A×turn] across the air gap to each stator winding, the value is multiplied by (−1) to obtain a negative value, which can be easily obtained as the stator equivalent rotor current component Isr [A×turn]. That is, each rotor current Ir11, Ir12, Ir13, Ir14, Ir15, Ir16, and Ir17 of the first virtual rotor winding is converted to obtain each rotor current Ir21, Ir22, Ir23, Ir24, Ir25, Ir26, and Ir27 of the second virtual rotor winding. The current distribution of the first virtual rotor current is converted and converted so that the current distribution of the first virtual rotor current and the current distribution of the second virtual rotor current are almost equivalent. Although the first hypothetical rotor winding rotates and moves with the rotor rotation, the rotational position of the second hypothetical rotor winding is always, for the purposes of the previous section, the rotational position in FIG. 52 opposed to each winding of the stator in the MN coordinate. These calculations also require information on the rotational position of the field flux and the rotor.

Figure 54:
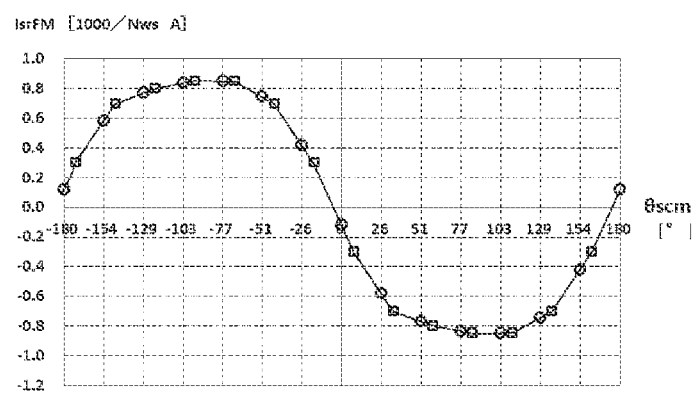
FIG. 54 exemplifies a distribution of a rotor current.

Next, the conversion method between the first and second virtual rotor currents is explained. The current values of the rotor windings aligned in the CCW circumferential direction from the stator rotation angle θscm of −180° in FIG. 52 follow the order of, from −Ir11, Ir15, −Ir12, Ir16, −Ir13, Ir17, −Ir14, Ir11, −Ir15, Ir12, −Ir16, Ir13, −Ir17, and to Ir14 in the RWC11. For example, assume that the stator rotation angle θscm of the first hypothetical rotor winding RWC11 is 0.3×360°/14 and the first hypothetical rotor winding in the CCW direction is aligned at a pitch of 360°/14. Assuming that those values are the current values of the square marks shown in FIG. 54, a broken line connects the 14 points between each other from (−180°+0.3×360°/14) to (6.3× 360°/14). It is the current distribution of the first hypothetical rotor winding, and examples of its current values are shown in FIG. 54 in the order of the distribution in FIG. 52.

The other second virtual rotor windings RWC21, RWC22, RWC23, RWC24, RWC25, RWC26, and RWC27 are marked with white circles in FIG. 52. This second virtual rotor windings are located at the stator rotation angle θscm opposed to the stator winding through the air gap, where θscm has a pitch of 360°/14 to the CCW from −180° to 6×360°/14. The order of each current in the second hypothetical rotor windings in FIG. 54 from −180° is −Ir21, Ir25, −Ir22, Ir26 −Ir23, Ir27, −Ir24, Ir21, −Ir25, Ir22, −Ir26, Ir23, −Ir27, and Ir24, and are 54, are marked with white circles.

Each current value of the second virtual rotor windings is calculated by interpolation from the current values of the first virtual rotor winding located before and after the circumferential direction, respectively. In the case of a simple proportional distribution interpolation calculation, in FIG. 54, each current value of the second virtual rotor winding is on the aforementioned broken line created by the current values of the first virtual rotor winding. For example, the value of the first virtual rotor current Ir12 in FIG. 54 is −0.7, the value of −Ir16 is −0.8, and the value of the second hypothetical rotor current −Ir26 can be interpolated as (0.3×(−0.8)+0.7×(−0.7))=−0.77. The values of the other second hypothetical rotor currents can be calculated by interpolation in the same way.

The rotor current component Isrn of each stator winding is related to each rotor current Irn opposite each other through the air gap such that the two current components add up to zero. In other words, the positive and negative signs are inverse. If the number of turns of the rotor winding is Nwr/2 and the number of turns of the stator winding is Nws/2, the following relationship is obtained. The product of the current and the number of turns on both sides [A×turn] is equal.

Isrn×$Nws$/2=−Irn×$Nwr$/2

Isrn=−$Nwr/Nws$×Irn  (181)

In the example in FIG. 54 above, the number of turns of the rotor winding, Nwr/2, is described as 1. The relationship in equation (181) is similar to the relationship between the secondary current and the primary secondary current component in a transformer that converts commercial power to voltage.

Equation (181) shows that the full pitch windings of the AD2M phases in FIG. 25 and FIG. 52. The rotor current components IsradFMc of 25N and 25P are the command values of the rotor current components as shown in FIG. 53. The command value of the rotor current component is shown in FIG. 53. Similarly, the commanded values of the rotor current components of the full pitch windings 521 and 522 of phase BE2M are IsrbeFMc, the command values of the rotor current components of the full pitch windings 523 and 524 of the CF2M phase are IsrcfFMc, the command values of the rotor current components of the full pitch windings 525 and 526 of phase DG2M are IsrdgFMc, and the command values of the rotor current components of the full pitch windings 527 and 528 of the EA2M phase are IsreaFMc, the command values of the rotor current components of the full pitch windings 529 and 52A of phase FB2M are IsrfbFMc, the command values of the rotor current components of the full pitch windings 529 and 52A of phase GC2M are IsrfbFMc, and the commanded value of the rotor current component of the full pitch windings 52B and 52C of the phase is IsrgcFMc. These values are obtained with the stator current converter RSC by 2J in FIG. 2. FIG. 53, by 2J therein, shows the input-output relationship for each phase, with a little more detail on the configuration before and after.

In the examples in FIGS. 52 and 54, the same number of rotor windings and stator windings, which is 14, are described. However, in terms of the circumferential distribution of the rotor current and discreteness, a larger number of rotor windings is less discrete and can be calculated more accurately. In this sense, when the number of rotor windings is larger than the number of stator windings, for example, when the number of rotor windings is doubled to 28, as in FIG. 25, the equation (181) relationship should be doubled.

The first virtual rotor winding, indicated by the square mark in FIG. 52, is calculated continuously in time, as described above, and moves and rotates by an angle of (−ωs×Δt) [rad] every sampling control on the MN coordinate. The second virtual rotor winding, indicated by the white circle mark, is fixed in the MN coordinate. Therefore, the second virtual rotor winding exists only for the sake of explanation and has no further significance. From the respective current values Ir11, Ir12, Ir13, Ir14, Ir15, Ir16, and Ir17 of the first virtual rotor winding, the respective rotor currents Ir21, Ir22, Ir23, Ir24, Ir25, Ir26, and Ir28 of the second virtual rotor winding can be calculated by interpolation, etc. Ir26, and Ir27 are calculated from Ir21, Ir22, Ir23, Ir24, Ir25, Ir27, and then each value is substituted into equation (181), the second virtual rotor winding does not have to be present, and there is no problem in the calculation.

As described above, the sixteenth mode shows how to obtain each phase command value IsrnFMc of the stator's rotor current components from each current value of the first hypothetical rotor winding calculated from the magnetic flux density distribution of the rotor. Since the positive and negative signs of each of these phase command values IsrnFMc and the rotor current IrnFM opposite each other through the air gap section are opposite, the sum of the magnetomotive forces [A×turn] of both current components in each phase is zero, and both current components do not generate magnetic magnetomotive forces outside of both currents. Therefore, it can be said that both rotor current components have qualitatively little effect on the field magnetic flux. However, both rotor current components generate a circumferential magnetic flux component Bcir in the air gap section and are involved in the circumferential force Fcir and radial force Frad, which are derived from Maxwell's stress equation. This will be explained later. Note that Fcir and Frad are consistent with the torque equations (80), (81), and (85) derived from the Lorentz force and Fleming's left-hand rule. The equations are consistent with the equations (80), (81), and (85).

Next, an embodiment of an eighteenth mode is described. The eighteenth mode provides a method for obtaining the detected value of the rotor current component of each phase of the stator by subtracting the field excitation current component of each phase from the detected value of the full-pitch winding current of each phase. In this detection of the rotor current of each phase, the current value for each phase is also obtained to control the current distribution of each phase arbitrarily, such as trapezoidal shape distribution.

A member 2X in FIG. 2 is the stator current detection method MCDM that detects the full-pitch winding current of the induction motor in FIG. 1, and 26 is its interface current information means IDET. Values [A] of an AD2-phase full-pitch winding current IsadFXd, a BE2 phase full-pitch winding current IsbeFXd, a CF2 phase full-pitch winding current IscfFXd. a DG2 phase full-pitch winding current IsdgFXd, an EA2 phase full-pitch winding current IseaFXd, an FB2 phase full-pitch winding current IsfbFXd, and a GC2 phase full-pitch winding current IsgcFXd are detected by 2X and 26.

Meanwhile, the excitation current components IsfaCXd, IsfbCXd, IsfcCXd, IsfdCXd, IsfeCXd, IsffCXd, and IsfgCXd for each phase were calculated by the 271 exciting-current generating meansIFG described above. These currents are the currents converted to the hypothetical concentrated winding windings in FIG. 3. These currents are converted to full-pitch winding currents by the 2K full-pitch winding converter IFPC using equations (1) to (7) to calculate IsfadFXd, IsfbeFXd, IsfcfFXd, IsfdgFXd, IsfeaFXd, IsffbFXd and IsfgcFXd. Examples of that specific full-pitch winding transformation diagram and distribution state are shown in the examples in FIGS. 12 through 19. 2L is the adder obtained by subtracting the rotor currents in each phase. The full-pitch winding current of each phase is subtracted from the field excitation current component. As shown in FIG. 2, subtract the field excitation current component from the full-pitch winding current of each phase to obtain the rotor current component of each phase. These are the detected values of the real axis coordinates in full-pitch winding current.

IsradFXd=IsadFXd−IsfadFXd

IsrbeFXd=IsbeFXd−IsfbeFXd

IsrcfFXd=IscfFXd−IsfcfFXd

IsrdgFXd=IsdgFXd−IsfdgFXd

IsreaFXd=IseaFXd−IsfeaFXd

IsrfbFXd=IsfbFXd−IsffbFXd

IsrgcFXd=IsgcFXd−IsfgcFXd (182)

Next, an embodiment of a nineteenth mode is described. The nineteenth mode provides a feedback control of the command value and the detected value separately for each phase rotor current component in order to control arbitrary rotor current distribution such as trapezoidal shape distribution in rotor current control of each phase. In the control shown in FIG. 2, the rotor current components of each phase are feedback controlled in the MN coordinate.

The output of stator current converter RSC, indicated by 2J in FIG. 2, is the command value of each phase rotor current component described above, IsradFMc, IsrbeFMc, IsrcfFMc, IsrbdgMc IsreaFMc, IsrfbFMc, and IsrgcFMc. On the other hand, the outputs of the 2L adder are the detected values of the rotor current components of each phase in equation (182), and these are the values in real axis coordinates. These values are converted from real axis coordinate values to MN coordinate detected values by the 2M MN coordinate converter MNC. This determines the current values of IsradFMd, IsrbeFMd, IsrcfFMd, IsrbdgMd, IsreaFMd, IsrfbFMd, and IsrgcFMd. The conversion from real axis coordinates to MN coordinates with MN coordinate converter MNC is performed as shown in the example of the conversion from FIG. 50 to FIG. 51. In the MN coordinate, information on the direction of the field magnetic flux in the real axis coordinate is necessary, and information on the field rotation angle position θmn is added.

The amount of rotor current error for each phase is obtained by subtracting the detected value of the rotor current error from the detected value of the rotor current, and feedback control is performed. The variable relationship of each phase around adder 2N in FIG. 2 is shown in FIG. 53. The aforementioned error amounts for each phase are processed through the proportional-integral compensator 2P for each phase shown in FIGS. 2 and 53. Current errors IsradFMer2, IsrbeFMer2, IsrcfFMer2, IsrdgFMer2, IsreaFMer2, IsrfbFMer2, and IsrgcFMer2 of the rotor current component of each phase are output to the voltage adder 2Q. Note that these calculations are performed in the MN coordinate.

Next, an embodiment of a twentieth mode is described. In the twenties mode, according to the drive conditions generated by the current command generating means IAG in FIG. 2B Simulation calculation of the rotor current based on the voltage equation in 2H. Then, the torque generated by the induction motor is calculated, the difference Ter from the torque command Tc is calculated, and after its proportional integral compensation, the torque error correction ωster is obtained, added to the slip angular frequency ωs, and corrected. The addition of this torque error correction ωster is not a prerequisite for the control shown in FIG. 2, but it can reduce the constant of the aforementioned proportional-integral compensation. Although the response is somewhat delayed, the error in the slip angular frequency ws can be covered by the speed control section and the proportional-integral compensator shown by 2A.

In the 2H rotor current generator IRG in FIG. 2, the rotor current and its generated torque are calculated by simulation. The rotor current generator IRG is shown in detail in the dashed line in FIG. 53. As described above, the rotor currents Ir11, Ir12, Ir13, Ir14, Ir15, Ir16, and Ir17 of the first hypothetical rotor windings RWC11, RWC12, RWC13, RWC14, RWC15, RWC16, and RWC17 are calculated using the 531 rotor current calculation method IRSIM. The rotor currents Ir11, Ir12, Ir13, Ir14, Ir15, Ir16, and Ir17 were obtained. In the torque calculation method TSIM in FIG. 53-534, the rotor currents Ir11, Ir12, Ir13, Ir14, Ir15, Ir16, and Ir17 and the respective From the magnetic flux density at the location where the currents are located, each torque is calculated according to formula (81), and the total torque Ts shown in 2H1 is calculated by simulation. Then, the torque error Ter is obtained by subtracting the simulated torque Ts from the 532 torque command Tc by adder 2H2, and through the proportional-integral compensator 2H3 to obtain the torque error correction ωster that corrects the slip angular frequency ωs.

Ter=Tc−Ts (183)

For example, if the magnitude of the torque is expected to be small, the slip angular frequency is compensated by ωster to increase the torque.

Next, an embodiment of a twenty-first mode is described. In the twenty-first mode, the rotor current error correction ωsier of slip is obtained from the rotor current error amount of the aforementioned phase obtained by the adder 2N in FIG. 2, added to the slip angular frequency ωs, and corrected. The addition of this rotor current error correction ωsier is not a prerequisite in the control of FIG. 2, and the constants of the proportional-integral compensation connected in series can be made as small as possible. Although the response is somewhat delayed, the error in the slip angular frequency ωs can be covered by the speed control section and the proportional-integral compensator 2A.

As noted above, the output of adder 2N in FIG. 2 is the control error IsrnFMer of the stator winding equivalent rotor current component in each phase. In FIG. 53, each phase is shown separately, and the value of each phase is related to the following equation.

IsradFMer=IsradFMc−IsradFMd

IsrbeFMer=IsrbeFMc−IsrbeFMd

IsrcfFMer=IsrcfFMc−IsrcfFMd

IsrdgFMer=IsrdgFMc−IsrdgFMd

IsreaFMer=IsreaFMc−IsreaFMd

IsrfbFMer=IsrfbFMc−IsrfbFMd

IsrgcFMer=IsrgcFMc−IsrgcFMd　　　(184)

For the rotor current error IsrnFMer of each of these phases, their total value Isrer is obtained in the rotor current error detection method ISRER of 2T in FIG. 2. The method for calculating the total value is to calculate the values from −90° to +90° when the distribution is as shown in FIG. 8 in the MN coordinate, i.e., −IsrcfFMer, +IsrgcFMer, −IsrdgFMer, +IsradFMer, −IsreaFMer, +IsrbeFMer, and −IsrfbFMer, or by weighted addition to increase the value of the central part near 0° in FIG. 8. The method of weighted addition is also applicable. The total value of Isr is then passed through a proportional-integral compensator 2U to obtain a rotor current error correction ωsier that corrects the slip angular frequency ωs. When an error occurs in the rotor current, the ωsier corrects the slip angular frequency ωs. For example, if the rotor current error occurs due to a decrease in the drive power supply voltage of the main circuit, the rotor current of each phase is increased by increasing the sliding angular frequency because the applied voltage cannot be increased. Although FIG. 2 shows five proportional-integral compensators, the functions and characteristics of the proportional, integral, and differential constants should be selected according to the purpose of each compensator.

Next, an embodiment of a twenty-second mode is described. In the twenty-second mode, the final value of the slip angular frequency is obtained, the rotational position θf3 value of the field flux in real axis coordinates is obtained, and the result calculated in MN coordinates is converted to real axis coordinates. The rotor current is given a relative speed by the slip angular frequency between the field flux φm and the rotor winding, and the rotor voltage is generated by Faraday's law of electromagnetic induction, resulting in the rotor current flow. On the other hand, a rotor current component with the opposite current direction is energized to the stator side in parallel with this rotor current. At this time, the voltage due to the leakage inductance of the stator winding is superimposed on the induced voltage due to the field flux φm. In the example of the vector diagram in FIG. 5 above, 51 energizes the field excitation current Isf. Then, 55 supplies the rotor current component Isr, and at the same time, 58 supplies the voltage drop Is·Rs of the stator winding resistance Rs, 59 supplies the leakage reactance drop Is·Xs voltage must be provided.

At that time, the stator winding is superimposed with 57 induced voltage Es, which is generated in chains with the field flux φm. Thus, to supply the rotor current component of the stator, each of the above mentioned voltages as well as the slip angular frequency of the field flux are supplied.

In the means POFG of generating the field command position shown by 2 W in FIG. 2, the slip angular frequency ωs3 [rad/sec] is corrected by adding the aforementioned torque error correction ωster and rotor current error correction ωsier to the slip angular frequency ωs. The following equation is obtained. Then, the value of the rotation position of the field flux θf3 [°] in the shaft real coordinates is obtained as follows. where θr is the angular position of the rotor rotation [°], θs1 [°] is the value of the field flux rotation position θf3 [rad] in the previous control cycle, and Δt [sec] is the cycle time of the control, which is 0.0002 [sec] in the example described in this specification.

ωs3=ωs+ωster+ωsier　　　(185)

θf3=θr+θs1+360°/(2π)×Δt×ωs3　　　(186)

The unit of rotation angle, such as θr, is expressed in either [rad] or [°], each time, and the conversion between 360° and (2π) is necessary.

On the other hand, for each rotor current component of the stator, the control error IsrnFMer of the rotor current component of each phase, shown in equation (184), was obtained by an adder 2N, as shown in FIG. 2 and FIG. 53. These values are then passed through a proportional-integral compensator 2P to obtain the error quantities IsradFMer2, IsrbeFMer2, IsrcfFMer2, IsrdgFMer2, IsreaFMer2, IsrfbFMer2, and IsrgcFMer2 of the rotor current components in the stator windings, as shown in FIG. 53. An adder2Q adds the error amount of the rotor current component and the aforementioned error amount of the field excitation current component, for each of the stator windings. This yields the current error amount IsnFMer of the current in each phase of the stator windings, which is a value in the MN coordinate, as shown in the following equation.

IsadFMer=IsradFMer2+IsfadFMer2

IsbeFMer=IsrbeFMer2+IsfbeFMer2

IscfFMer=IsrcfFMer2+IsfcfFMer2

IsdgFMer=IsrdgFMer2+IsfdgFMer2

IseaFMer=IsreaFMer2+IsfeaFMer2

IsfbFMer=IsrfbFMer2+IsffbFMer2

IsgcFMer=IsrgcFMer2+IsfgcFMer2　　　(187)

As will be shown later, when the output of the feedforward voltage generating means FF shown by 2R in FIG. 2 is added, the induced voltage components generated by the field flux φm chained to each stator winding will be borne by that side. command will be borne by that side. In the example of the vector diagram in FIG. 5, this corresponds to the induced voltage Es of 57 generated by the interlinkage of the field flux φm shown by 52. As a result, the induced voltage component generated by the field flux φm interlinked with each stator winding is no longer necessary for each current error amount in equation (187), which is part of the feedback loop value of the stator's field current component.

For example, the relationship between each rotor current of the rotor in FIG. 52 and the rotor current component of the stator in FIG. 1 is as in equation (181), and both currents are energized so that the magnetomotive force acting on the other parts of the motor cancels out. Therefore, the rotor current component is controlled so that it does not generate magnetic flux to other parts of the motor. For example, in the example shown in FIG. 5, the relationship between the rotor current Ir in 54 and the stator rotor current component Isr in 55 is such that the magnetomotive force of both currents cancels out, so that the armature reaction related to the rotor current does not occur. No armature reaction related to the rotor current occurs because the magnetomotive forces of both currents cancel. This characteristic of the torque current component not generating armature reaction is a major feature and differs from the armature reaction characteristics of synchronous motors and other motors. There is a possibility to further develop this characteristic of induction motors, which will be explained in detail later.

Next, the real-axis coordinate transformation RMNC, indicated by 2V in FIG. 2, is explained. Most of the operations described so far in FIG. 2 have been performed in the MN coordinate, which is a rotational coordinate. However, in order to apply voltage to each winding of the induction motor shown in FIG. 1, it is necessary to convert to voltage command values in real-axis coordinates. The calculation of the induced voltage of each winding in the feedforward voltage generating means FF shown by 2R is also performed in the real-axis coordinate.

The real-axis coordinate transformation RMNC shown in 2V has as input the current error amount IsnFMer of the current in each phase of the stator winding obtained by equation (187). This conversion transforms the coordinates from MN coordinates to current error quantities IsadFXer, IsbeFXer, IscfFXer, IsdgFXer, IsseaFXer, IsfbFXer, and IsgcFXer in the real axis coordinate. The method of coordinate transformation to real axis coordinates is the method shown in the examples in the eighth and ninth modes. The current error amount for each phase in equation (187), expressed in the MN coordinate in FIG. 25, is converted to the current error amount for each phase in real axis coordinates in FIG. 1. The field rotation position θf3 [rad] shown in equation (186) is used as the field rotation angle position θmn, which is the position information of the field magnetic flux in the MN coordinate, as the value in that control cycle. At 2V, the voltage coefficients are further multiplied and converted to the voltage command values VsiadFXc, VsibeFXc, VsicfFXc, VsidgFXc, VsieaFXc, VsifbFXc, and VsigcFXc based on the current error of each phase, which are then output to an adder 2S.

Although the method of adding, to the rotational position of field flux θf3 [rad], the torque correction ωster and the rotor current correction ωsier according to the slip angular frequency ωs has been explained above, various variations of the method are possible. For example, it is possible to omit the torque correction ωster and the rotor current correction ωsier. Alternatively, the initial slip angular frequency ωs can be corrected by obtaining the difference Ter from the torque command value Tc after simulation calculation of the torque in the 2H rotor current generator IRG. Furthermore, the modification of the slip angular frequency ωs can be repeated multiple times until the difference Ter from the torque command value Tc is within the allowable value. Alternatively, the angular frequency ωs can be obtained from the torque command value Tc and the values of the rotor currents in each phase at that time, taking into account the phase delay of the rotor currents, and controlled.

Next, an embodiment of a twenty-third mode is described. In the twenty-third mode, the induced voltage component of each phase of the full pitch winding(s) of the induction motor is calculated and added to the voltage command value of each phase. First, the magnetic flux density in the air gap section of the stator poles of each phase in FIG. 1 is obtained, the voltage components of the concentrated winding are obtained from the time rate of change of the magnetic flux in each phase, the full-pitch winding transformation is performed, and the induced voltage components of each phase are calculated. In the example of the vector diagram in FIG. 5, this corresponds to 57 induced voltages. However, in the present disclosure, they are multiphase independent full-pitch windings induced voltages. These induced voltage components are added with the voltage command value VsinFXc of each phase based on the current error described above to obtain the voltage command value VsnFXc of each phase.

Figure 55:
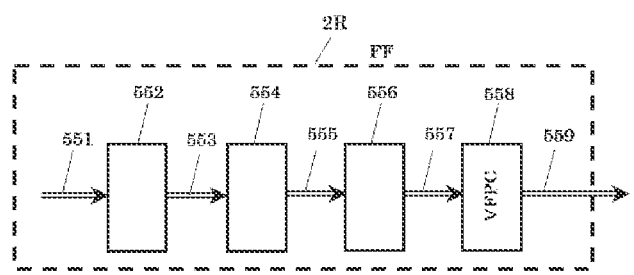
FIG. 55 shows how to calculate a feed-forward voltage.

Examples of specific methods for calculating the induced voltage components of each phase of full pitch windings in the induction motors of FIGS. 1 and 3 and the block diagram of FIG. 2 are shown and described in FIG. 55. A range of 2R enclosed by the dashed line in FIG. 55 is the feedforward voltage generating means FF shown by 2R in FIG. 2. 551 in FIG. 55 is the target distribution function of the magnetic flux density, Dist1, generated by the current command 551 in FIG. 551 is the target distribution function Dist1 or the discrete distribution function Dist2 of the magnetic flux density generated by the current command generating means IAG in FIG. 2B. These are MN coordinate values, so they are combined with the field flux position θmn.

At 552, the discrete distribution function of the magnetic flux density in the real axial coordinates is obtained from the information at 551. If the information at 51 is used as the target distribution function Dist1 for the magnetic flux density, the value of this target distribution function Dist1 and the information on the field flux center position θmn are distributed to each stator pole in FIG. 1, which is the actual situation in the real axial coordinates, and the air The magnetic flux densities Bgapa, bgapb, Bgapc, bgapd, Bgape, bgapf, and Bgapg are obtained. A value 553 is obtained. If the information at 551 is the discrete distribution function Dist2 of the magnetic flux density, the magnetic flux density distribution on the MN coordinate is transformed to the magnetic flux density distribution on the real axis coordinate by the real axis coordinate transformation RMNC, and the magnetic flux densities in the air gap section (or the air gap) of each stator pole in FIG. 1, Bgapa, bgapb, bgapf, and Bgapc, bgapd, Bgape, bgapf, and Bgapg [T], are obtained.

At 554, the magnetic fluxes φa, φb, φc, φd, φe, φf, and φg [Wb] in the air gap section (or the air gap) of each phase are obtained from the magnetic flux density described above as in (62). These magnetic fluxes are the respective fluxes shown in FIG. 3. Then, at 556, equations (29) to (35) are used to calculate the hypothetical The phase voltages Va, Vb, Vc, Vd, Ve, Vf, and Vg [V] of each phase of the concentrated winding are obtained. For example, in the case of the A2 phase voltage Va in equation (29), the amount of magnetic flux change during the time width, At is obtained by transforming equation (29) into the following approximate equation The approximate formula is obtained by transforming equation (29) into the following approximate formula.

$$Va = Nws \cdot d\varphi a/dt = Nws \cdot (\varphi a - \varphi a1)/\Delta t \qquad (188)$$

In this formula, (pal is the phase A2 magnetic flux at the time of one previous sampling control. The number of winding turns of the windings 31 of the A2-phase stator poles 11 and the windings 32 of the A/2 phase stator poles 11 in FIG. 3 is Nws/2 [turns], respectively. An A2 phase voltage Va is the sum of the voltages generated by the windings 31 and 32. Phase B2, C2, etc., other than phase A2, are calculated in the same way.

Next, 558 converts the virtual concentrated winding voltages of each of the above phases to full-pitch windings voltages Vad, Vbe, Vcf, Vdg, Vea, Vfb, and Vgc [V]. Equations (36) through (42) are used for this conversion. These values are the induced voltage components of the full pitch windings of each phase of the induction motor in FIG. 1, and the number of turns of the full pitch winding is Nws/2 [turns]. The names of these voltages are changed to the voltage command values VseadFXc, VsebeFXc, VsecfFXc, VsedgFXc, VseeaFXc, VsefbFXc, and VsegcFXc of the induced voltage components of each phase and output to adder 2S. In the example of the vector diagram in FIG. 5, it corresponds to the induced voltage component Es of 57. In addition, the voltage drop IsRs of the stator winding resistance shown at 58 and the voltage drop Is×Xs of the stator winding leakage inductance shown at 59 in the vector diagram of FIG. 5 can be added to the above voltage command value. The explanation in FIG. 55 explains how to calculate each of those configurations anew, but there is some overlap with the calculations at 572 and 573, which can be shared with the calculations in FIG. 57.

Next, the final voltage command values VsadFXc, VsbeFXc, VscfFXc, VsdgFXc, VseaFXc, VsfbFXc, and VsgcFXc for each full pitch windings in FIG. 1 are obtained by adder 2S as the sum of the voltage command value VsinFXc based on current error in each phase and the voltage command value VsenFXc for the induced voltage component in each phase, as in the following formula.

VsadFXc=VsiadFXc+VseadFXc

VsbeFXc=VsibeFXc+VsebeFXc

VscfFXc=VsicfFXc+VsecfFXc

VsdgFXc=VsidgFXc+VsedgFXc

VseaFXc=VsieaFXc+VseeaFXc

VsfbFXc=VsifbFXc+VsefbFXc

VsgcFXc=VsigcFXc+VsegcFXc   (189)

A voltage command value in equation (189) is then converted by the pulse width modulator PWM in 24 to a signal suitable for on and off switching operation by a power transistor or other device. The power is then amplified by 25 drive circuit inverters, and voltage is applied to each winding of 21 induction motors, i.e., FIG. 1, etc., and current is energized. The drive circuit 25 can be configured in various ways, and specific examples will be explained later. An induction motor 21 can be configured by various ways including the 7-phase induction motor as shown in FIG. 1, the 5-phase induction motor as shown in FIG. 43, the distributed winding configuration as shown in FIG. 45, the short-pitch winding configuration, the configuration with a mixture of full pitch windings and concentrated windings as shown in FIG. 48, and/or the configuration utilizing toroidal windings. In particular, in a combined motor that incorporates two induction motors in the inner and outer diameters or in the axial direction of the rotor, the use of toroidal windings can shorten the winding length at the coil ends and improve the occupancy ratio of the windings. This makes them superior in terms of copper loss reduction, productivity improvement, efficiency improvement, and miniaturization. The power element 25 includes IGBTs, power MOSFETs, SiO2, GaN, and other power elements, which are described as power transistors in the present disclosure.

Figure 57:
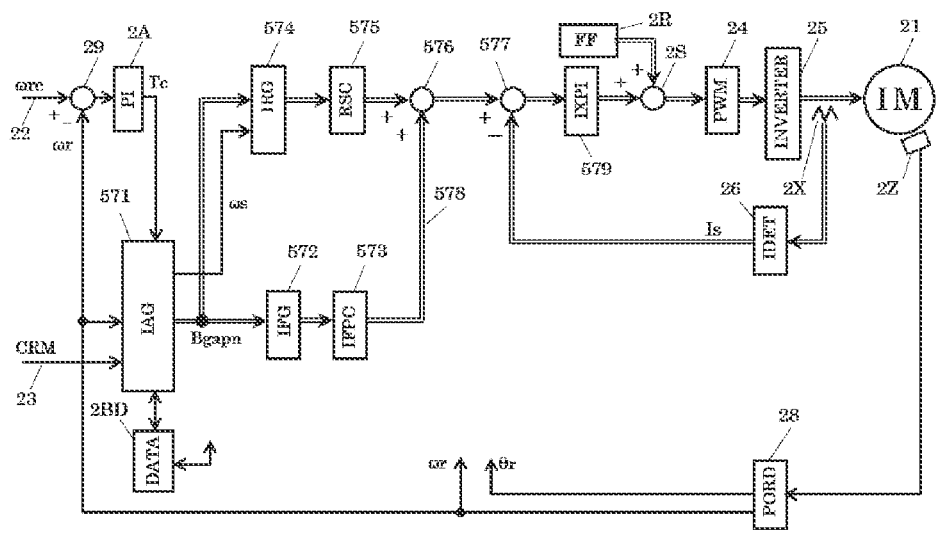
FIG. 57 exemplifies a simplified control block diagram.

Next, FIG. 57 shows an example of a control block diagram that is a variation of FIG. 2. The configuration of FIG. 57 is a simplified version of FIG. 2. The major difference is that FIG. 57 does not use MN coordinates, which are rotational coordinates, but controls in rotational coordinates. The configuration also omits the magnetic flux detector 2Y of FIG. 2. However, the configuration and control method to enable control of arbitrary magnetic flux density distribution in the circumferential direction are the same. Also, the point where an arbitrary magnetic flux density distribution in the circumferential direction is commanded according to conditions such as the torque command Tc is the same. The control method is also the same in that it controls with an arbitrary current in multiphase. There are many parts of the same configuration and control.

Figure 56:
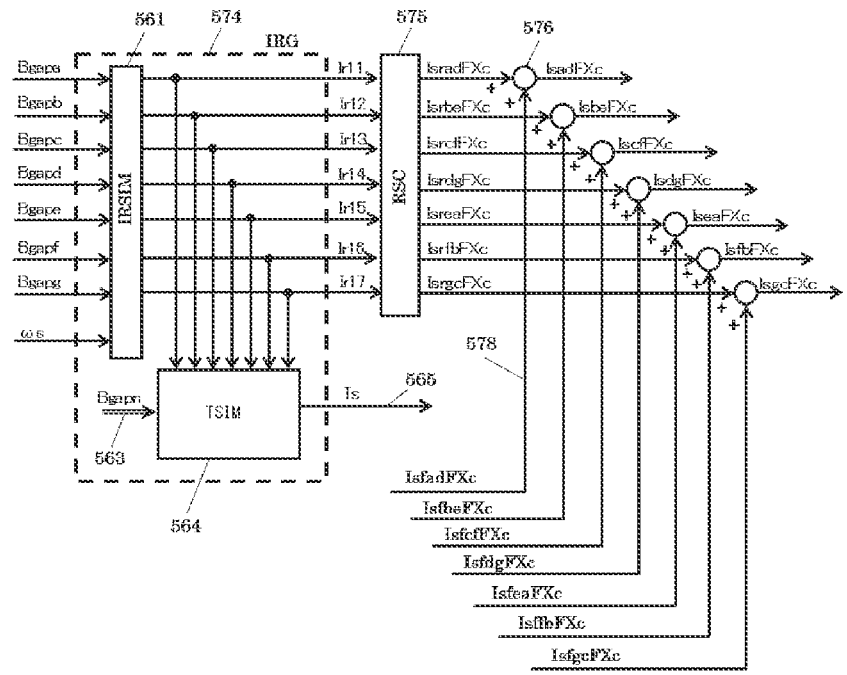
FIG. 56 is a partially detail of the block diagram.

Of the components in FIG. 57, those with the same symbols as in FIG. 2 have the same configuration and functions. The speed control related to the rotor angular frequency ωr is the same as in FIG. 2, and the torque command Tc is the same. 571 to 57 The configuration in FIG. 57 is controlled in real axis coordinates. 571 current command generating means IAG is performed in real axis coordinates. Since IAG is performed in real-axis coordinates, the circumferential distribution of the magnetic flux density, which is its output, is different from the distribution state of the magnetic flux density in FIG. 2. In the real-axis coordinates of FIG. 57, the rotational angular direction of the center of the field flux moves circumferentially with a magnitude of θmn. Therefore, the output of the current command generating means IAG of 571 in FIG. 57 is the same as in FIG. 56 shows the signal for each phase, and its Bgapa shows the magnetic flux density near the air gap section of the A2 phase stator pole in FIG. 1 11. On the other hand, for example, the output of the current command generating means IAG in FIG. 2 shows the signal for each phase in FIG. 42, where Bgapa is the value on MN coordinates. motor cross section on MN coordinates. The magnetic flux density near the air gap section of the A2 phase stator poles of 251 in FIG. 25 is shown. And, for example, if the rotation position θmn of the field flux is $(360° \times 2/14) = 51.4°$, the value of Bgapa is 51.4° from the starting point in the real axis coordinate, FIG. 1, in the CCW direction. The magnetic flux densities of Bgapb, Bgapc, etc. also shift 51.4° in the CCW direction. The same symbols are used in this specification to indicate whether the system is operating in MN coordinates or real axis coordinates.

The function of the exciting-current generating means IFG, indicated by a reference 572, is the same as the function of the exciting-current generating means IFG shown by 2C in FIG. 2. This function converts each phase of the magnetic flux density into the excitation current component of the virtual concentrated winding required for its excitation, as in equation (64). The full-pitch winding converter IFPC for the current indicated by a reference 573 is the same as the full-pitch winding converter IFPC for the current 2G in FIG.

2. This converter performs full-pitch winding conversion of current from virtual concentrated winding current to full-pitch winding current, using the relationship in equations (1) to (7).

The configuration shown for each phase for the elements 574, 575, 576, and 577 in FIG. 57 is shown in FIG. 56. The magnetic flux densities Bgyapa, Bgyapb, Bgyapc, Bgyapd, Bgyape, Bgyapf, and Bgyapg of each phase, and the slip angular frequency ωs, which are the inputs on the left side of the paper in FIG. 56, are the outputs of the current command generating means IAG, indicated by a reference 571 in FIG. 57. In FIG. 56, any values are shown in the real axis coordinate. This is the same part of FIG. 2 as in FIG. 53 described earlier. However, the rotor current calculation method IRSIM shown by the reference 531 and stator current converter RSC shown by the reference 2J in FIG. 53 were calculated while operating in the MN coordinate. Therefore, FIG. 25, which shows the state of the MN coordinate, and especially FIG. 52, which assumes the virtual winding of the rotor, shows the fixed field flux and gives an example of the calculation. In FIG. 52, with the field flux advancing in the CCW direction, the calculations are based on the description in FIG. 53, assuming that the field flux is fixed and the rotor is rotating relative to the CW with a slip angular frequency ωs to the CW. In the rotor current calculation method IRSIM, indicated by the code 531 in FIG. 53, each of the rotor currents Ir11, Ir12, Ir13, Ir14, Ir15, Ir16, and Ir17 flowing in the first virtual rotor windings RWC11, RWC12, RWC13, RWC14, RWC15, RWC16, and RWC17 is calculated.

In contrast, in FIG. 56, it is necessary to calculate each rotor current with the field flux moving at rotational angular frequency (ωr+ωs) to CCW and the rotor rotating at rotational angular frequency ωr to CCW in the condition of FIG. 1. With the induction motor in FIG. 1 rotating at 6000 [rpm] and a slip angular frequency ωs of (5×360°/(2π)), the field flux rotates to an angle CCW of 7.56 [°] during a control sampling time Δt of 0.0002 [sec]. The rotor rotates to CCW by 7.2 [°]. For example, if the induction motor has four pole pairs, the electrical angle of rotation during Δt is four times greater. Since the rotation is at high speed, the amount of rotation during Δt is a control error problem. Therefore, for accurate calculation, the rotational speed of the rotor and the circumferential discreteness of each stator pole must be taken into account.

However, the relative velocity between the field flux and the rotor winding is still the slip angular frequency ωs in the real axis coordinates in FIG. 56. Various approximate calculations are possible. For example, FIG. 56 shows the calculation in real axis coordinates, but even if the rotor current is calculated as if it were in MN coordinates as shown in FIG. 53, a large error will not occur if the number of phases is large, such as 7 phases. The torque calculation method TSIM, indicated by a reference 564 in FIG. 56, calculates each torque according to the formula (81) in the same way as 534, indicated by a reference in FIG. 53, and simulation calculates the total torque Ts, indicated by 565. The slip angular frequency ωs can be modified from the values of torque command Tc and torque Ts. Alternatively, the simulation calculation can be performed again with the modified ωs to improve the accuracy of the slip angular frequency ωs to improve torque accuracy.

A component 475, indicated by a sign in FIGS. 57 and 56, is a stator current converter RSC. The same calculation is performed as in the case of 2J in FIG. 53. However, since the calculations in FIGS. 57 and 56 are performed in real axis coordinates, the relative position between the rotor and stator windings changes. Next, 476, shown in FIGS. 57 and 56 with a reference sign, is adder, and the stator rotor current components IsrnFXc and the outputs IsfnFXc of the full-pitch winding converter of the current in 473 are added to each other to obtain the full-pitch current command values IsnFXc of the full-pitch winding lines of the stator in FIG. 1 is obtained as follows.

IsadFXc=IsradFXc+IsfadFXc

IsbeFXc=IsrbeFXc+IsfbeFXc

IscfFXc=IsrcfFXc+IsfcfFXc

IsdgFXc=IsrdgFXc+IsfdgFXc

IseaFXc=IsreaFXc+IsfeaFXc

IsfbFXc=IsrfbFXc+IsffbFXc

IsgcFXc=IsrgcFXc+IsfgcFXc          (190)

In FIG. 57, a reference 477 is an adder for each phase. This adder performs feedback control by subtracting the detected value of stator current IsnFXd from the command value of stator current IsnFXc shown in Equation (190) to obtain the error amount of stator current IsnFXer. Here, these variables IsnFXc, IsnFXd, and IsnFXer are AC variables that depend on the rotational angular frequency (ωr+ωs) of the field magnetic flux. Therefore, the variables cannot be converted to DC as in the calculation in the MN coordinate in FIG. 2. As a result, when a proportional-integral compensator is placed in the feedback loop, the control accuracy of the stator current at high speed rotation may be reduced.

479 is a voltage command generation method that converts the stator current error amount IsnFXer of each phase into the voltage command value VsnFXc of each phase. The method of creating this voltage command value VsnFXc can be configured in various ways. A simple method is to generate a voltage that is a proportional multiple of the input. The aforementioned command value of the stator current, IsnFXc, is mainly an alternating current of the rotation frequency. And said current error amount IsnFXer is also mainly the AC current of the rotation frequency. If the voltage command generator 479 is a proportional-integral compensator, the low-frequency gain is usually large and the high-frequency gain is usually low. This can cause problems with large stator current control errors at high speeds. This is the same as described above. If the high-frequency gain is also increased, the problem of instability in that frequency range is likely to occur.

In FIG. 57, as a solution to this problem, only the control before and after adder 577 can be converted to MN coordinates, the current control of each phase can be controlled in MN coordinates, and the It is also possible to improve the control accuracy of each phase current by allowing the current to be controlled in DC and inserting a proportional-integral compensator. Specifically, each value of equation (190), which is the output of adder 476, can be adjusted to 47 6 and 477, and insert a converter MNC to MN coordinates between 477 and 477 to convert the values in the MN coordinate. Then, an MN coordinate converter MNC is inserted between 26 and 477, so that the detected current values of each full pitch windings of the real axis coordinates, which are IsadFXd, IsbeFXd, IscfFXd, IsdgFXd, IsseaFXd, IsfbFXd and IsgcFXd for each full pitch windings in real axis coordinates, are converted to the MN coordinate values IsadFMd, IsbeFMd, IscfFMd, IsdgFMd, IsseaFMd, IsfbFMd, and IsgcFMd. This MN coordinate converter, for example, is the same as the 2M in FIG. 2. Then, in FIG. 57, 579 is removed and in its place, the proportional-integral compensator 2P and real axis coordinate converter 2V of FIG. 2 are inserted. As a result of this configuration, the currents in each phase of the stator are once converted to MN coordinates for control, and then converted to real axis coordinates for control, resulting in a proportional-integral compensator effect, which improves the accuracy of stator current control at high speed rotation.

Figure 58:
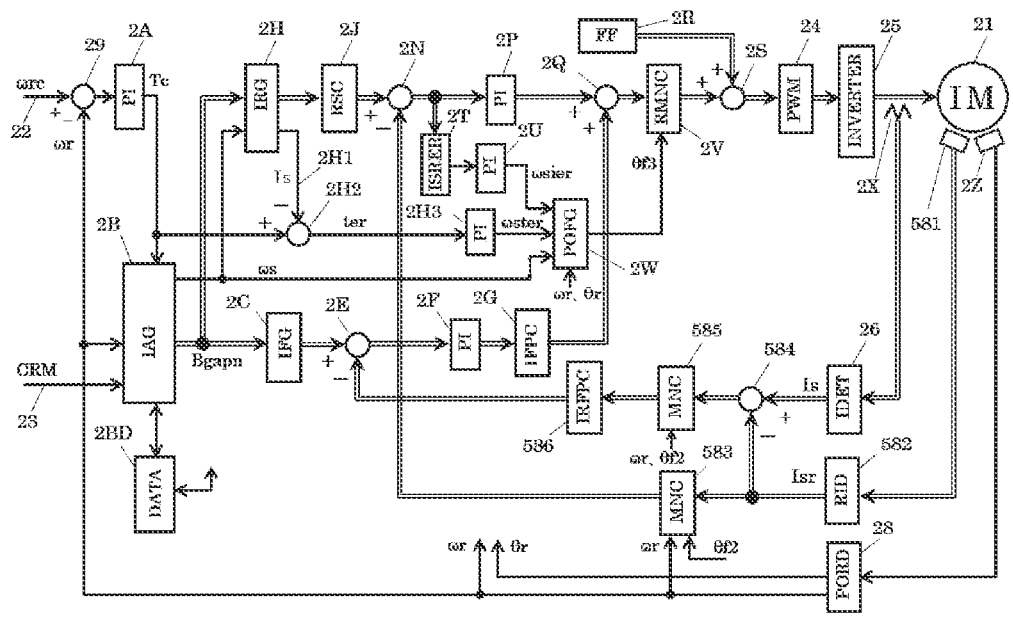
FIG. 58 exemplifies a control block diagram which enables detection of the rotor current.
Figure 84:
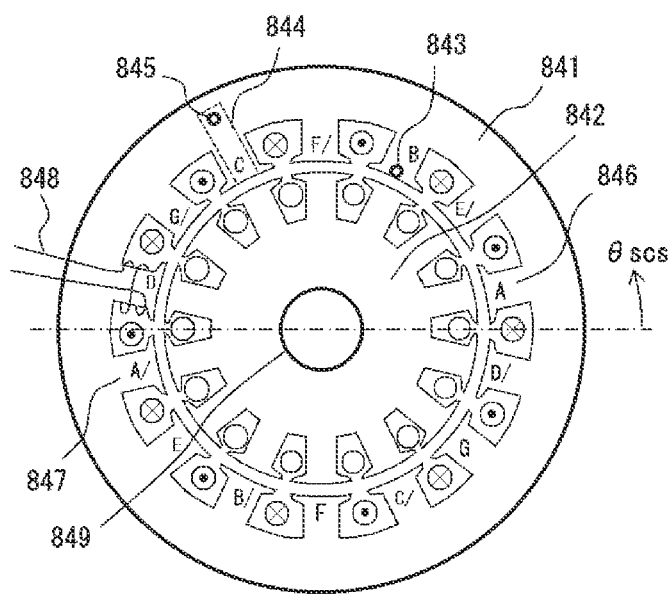
FIG. 84 shows magnetic density detection based on a hall element.

Next, FIG. 58 shows and describes an example of a control block diagram for detecting the current flowing in each rotor winding of a motor such as FIG. 1 and FIG. 84. FIG. 58 has the rotor current detectors 581 and conversely, does not have the magnetic flux detector 2Y in FIG. 2. The detection of the field flux φm and the rotor current Ir are important issues in the control of induction motors. The field flux φm can be substituted by the field excitation current component Isf. The stator current Is is the sum of the field excitation current component If and the stator conversion current Isr of the rotor current Ir.

$$Is = Isf + Isr$$

Therefore, since the stator current Is can be easily detected, control of the induction motor becomes easier if either the field flux φm or the rotor current Ir can be detected. Of course, if both the field flux φm and rotor current Ir can be detected, this is more advantageous in terms of control accuracy and responsiveness. Examples of methods for detecting rotor currents in each rotor winding are shown later in FIGS. 85, 86, and 87, and are illustrated below.

The control block diagram in FIG. 58 has a different rotor current detector from 581 to 586 and the calculation of each current value compared to FIG. 2, but otherwise has the same configuration as FIG. 2. 581 in FIG. 58 is the rotor current detector, which measures the current information flowing in each winding of the rotor. 582 is the rotor current detection method, which obtains each rotor current of each rotor winding and further calculates it as the rotor current conversion value Isr of each phase on the stator side. 583 converts full-pitch winding current in real axis coordinates to full-pitch winding current in MN coordinates, which are rotation coordinates. This output is then used as the rotor current detection value as a feedback value of the rotor current component Isr of each phase in the aforementioned adder 2N. 584 is an adder, and the field excitation current component Isf of each phase is obtained by subtracting the rotor current equivalent Isr of each phase on the stator side from the stator current of each phase, as shown in the following formula.

$$Isf = Is - Isr$$

585 converts full-pitch winding current in real axis coordinates to full-pitch winding current in MN coordinates, which are rotational coordinates. 586 is a concentrated winding converter, which converts the field excitation current component Isf of each phase of the full-pitch winding current to the concentrated winding current using equations (15) to (21). These current values are used as feedback values for the field excitation current components of each phase in adder 2E above. Otherwise, the configuration is the same as in FIG. 2.

The value of each rotor current Ir of an induction motor is a first-order delay current as shown in equation (77), and the temperature coefficient of the rotor winding resistance Rr is large and temperature changes are large, making the estimation calculation difficult and tends to result in large errors. In this respect, the control in FIG. 58 can be controlled with high precision and high response because it is a method of measuring each rotor current. However, rotor current detection as described later is necessary.

The control block diagram in FIG. 57 differs in several respects from the configuration in FIG. 2. In FIG. 57, as mentioned above, the MN coordinates, which are rotational coordinates, are not used, but rather the real axis coordinates are used for control. As in equation (190), the field excitation current component IsfnFXc of the stator and the rotor current component IsrnFXc are collectively controlled as stator current IsnFXc. Therefore, there is no separate feedback for the field excitation current and rotor current components. The control block diagram in FIG. 58 has a rotor current detector and, conversely, does not have the magnetic flux detector 2Y in FIG. 2. As shown in these examples of control block diagrams in FIG. 2, FIG. 57, and FIG. 58, the configuration and control techniques of the disclosure can be varied. Each has its own advantages and disadvantages. These variant controls shall also be included in the present disclosure for the purposes of the present disclosure.

The following is an example of the implementation of a twenty-fourth mode. In the twenty-fourth mode, in driving and controlling an induction motor as shown in FIG. 2 or FIG. 57, the necessary drive data DATA is collected in advance by simulation or actual driving, without performing some calculations, and stored in the memory 2BD. Then, when driving the induction motor, the current command values, etc. for each phase are read from the aforementioned drive data DATA according to 23 control mode command CRM, torque command Tc, and rotor rotation angular velocity ωr, and each phase current is driven and controlled. The creation of the drive data DATA described above can compress the recorded data on the assumption that interpolation calculations are performed when the data is used, as shown in FIG. 40. In the case of control using the drive data DATA described above, interpolation calculation of the recording data is performed from the control state, as shown in FIG. 40, to provide fine-tuned, error-free control.

The explanation in FIG. 2 describes the basic algorithm based on an approximate model and approximate formula for an induction motor. In practice, however, the number of control processing items increases significantly to deal with errors due to approximation, errors in nonlinearity, magnetic saturation of magnetic materials, current limitation of the drive, power supply voltage limitation, fluctuations in power supply voltage, fluctuations due to temperature characteristics, and abnormal diagnosis. And there is the problem of increased processing time. In the method utilizing the drive data DATA described above, some processing time can be omitted, so the calculation time in each control cycle time Δt can be shortened and speeded up. In addition, since it is possible to store detailed corrected drive conditions for the aforementioned nonlinearity, etc., in the aforementioned drive data DATA, control performance can be improved in some aspects. However, this method can be applied to induction motors whose characteristics are known in advance or for which trial operation is possible, but not to the control of induction motors whose detailed characteristics are unknown. In other words, it is difficult to apply this technology to general-purpose applications, and it is necessary to devise a way to group induction motors with similar characteristics.

In the example of the twenty-fourth mode, the control in FIG. 2 is used in a variant. In other words, according to the control mode command CRM shown in 23, torque command Tc, and rotor rotational angular velocity ωr, the excitation current commands IsfaCMc, IsfbCMc, IsfcCMc, IsfdCMc, IsfeCMc, IsffCMc, IsfgCMc and slip angular frequency ωs for each phase as described in FIG. 42 are obtained by reading the above drive data DATA and by interpolation calculation. In addition to the magnetic resistance of the air gap section, the magnetic resistance of soft magnetic materials used in induction motors, characteristics of nonlinearity of soft magnetic materials, and magnetic saturation support can be incorporated. The slip angular frequency ωs can also be made more accurate by more detailed simulation. For example, equation (84), which ignores the leakage inductance Lrw, is a bit wild, so a reduction in its error can be expected. A reduction in computation time at each control cycle time Δt can be expected.

Other examples of the twenty-fourth mode can be performed in the control of FIG. 57. In other words, according to the control mode command CRM shown in 23, torque command Tc, rotor rotation angular velocity ωr, and field rotation angular position θf, the value of (190), which is the current command value IsnFXc of the full-pitch winding line of the stator shown in FIG. 1, is obtained by reading the field rotation angular position θf and the above drive data DATA and interpolation calculation. A reduction in computation time at each control cycle time Δt can be expected.

When the control mode command CRM is in low-loss mode or high-efficiency mode, the induction motor can also be made low-loss. Even at the same torque, the copper loss of the induction motor can be reduced by balancing the magnitude of the field excitation current and the rotor current. This is effective for operation in the low-torque range at low speeds. As the rotation speed increases, a balance between the magnitude of the field excitation current and the rotor current can also be selected, taking into account iron loss. For these control manners based on control mode command CRM, the algorithm was not described in the description of FIG. 2, but it can be added. Another method is to store those drive data DATA into 2BD memory.

Figure 59:
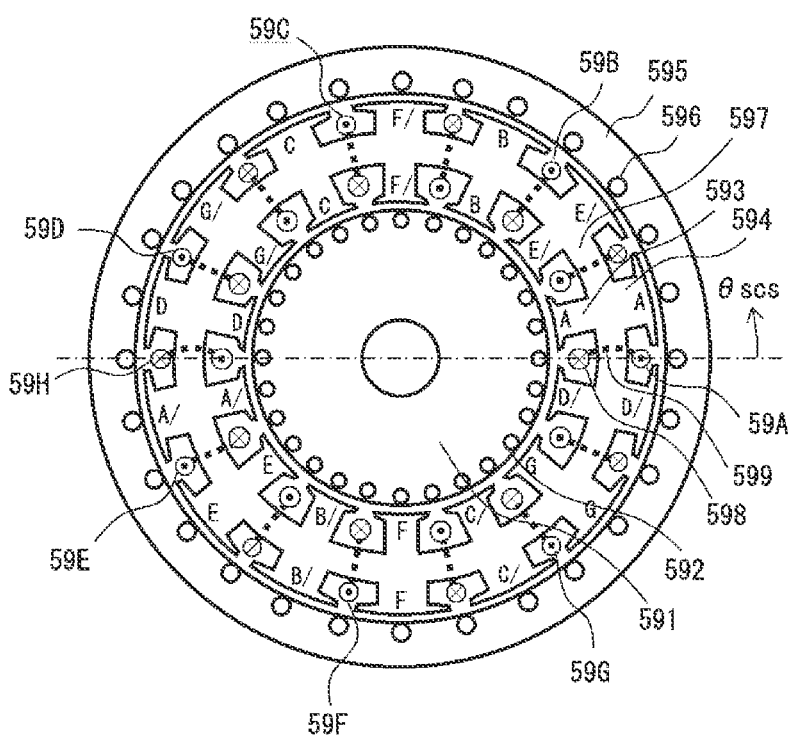
FIG. 59 is a sectional view of a combined motor composed of two motors arranged in radially inner and outer sides.

Next, an example of a twenty-fifth mode is shown in FIG. 59 and explained. The disclosure is illustrated in the example of FIG. 1. The coil ends of 1F, 1G, 1H, 1J, 1K, 1L, and 1M are long, which causes a problem of large copper loss at the coil ends. There is a problem that the coil ends increase the motor length. There is also a problem of poor fabrication of windings and reduced winding occupancy. FIG. 1 shows the basic configuration of an induction motor, and for the purpose of explanation, we dare to show a two-pole configuration, i.e., a single-pole pair. In practical use, for example, a four-pole pair configuration is used, which considerably improves the aforementioned coil end problem. However, the aforementioned problem of coil ends still remains.

The induction motor shown in FIG. 59 is a composite motor that arranges two motors, the first motor on the inner diameter side and the second motor on the outer diameter side. Both motors are two-pole, i.e., one-pole pairs, and their circumferential relationship is synchronous. 591 is the first rotor on the inner diameter side and 592 is its rotor winding. 593 is the A6 phase stator pole of the first stator on the inner diameter side, followed by the E/6 phase, B6 phase, F/6 phase, C6 phase, G/6 phase, D6 phase, A/6 phase, E6 phase, B/6 phase, F6 phase, C/6 phase, G6 phase, and D/6 phase arranged in circumferential direction, as shown. 594 is the A6 phase stator pole of the second stator on the outer diameter side, followed by the E/6 phase, B6 phase, F/6 phase, C6 phase, G/6 phase, D6 phase, A/6 phase, E6 phase, B/6 phase, F6 phase, C/6 phase, G6 phase, and D/6 phase arranged in circumferential direction, as shown. A 597 portion is the common stator back yoke for the first motor on the inner diameter side and the second motor on the outer diameter side. Through this common stator back yoke, stator poles of the same phase are arranged on the inner and outer diameter sides, as shown in the FIG. 596 is the rotor winding of the second rotor on the outer diameter side. 595 is the second rotor on the outer diameter side. In particular, the portion of 595 shown in the figure is the back yoke portion of the second rotor and is strong, so the rotor windings of the second rotor 59 6 can retain the centrifugal force generated in the rotor windings.

598, 599, and 59A are the AD6 phase windings common to the first motor on the inner diameter side and the second motor on the outer diameter side. The 598 portion of this AD 6-phase winding passes through the slot in the first motor on the inner diameter side, and the 59A portion passes through the slot in the second motor on the outer diameter side. The 599 portion is the coil end section, and as shown in the figure, the phases of the stator poles on the inner and outer diameter sides are placed at the same target with respect to the stator back yoke, so the length of the coil end can be shortened. The winding 59H, located 180° on the opposite side, is the AD6 phase winding and is wound in the opposite direction of winding 59A, but carries the same current. Therefore, windings 59A and 59H can be driven by connecting them in series so that the current direction is the same. Similar to the AD6 phase windings 59A and 59H, 59B is a BE6 phase winding, 59C is a CF6 phase winding, 59D is a DG6 phase winding, 59E is an EA6 phase winding, 59F is an FB6 phase winding, and further, 59G is a GC6 phase winding. Each can be connected in series with a winding located 180° opposite to the other and carry the same current. As a result, the current can be energized in the same relation as when the two sets of motor windings are full pitch windings.

The shape of these windings is so-called toroidal windings, also called annular windings, which have a simplified shape. The long coil end as shown in FIG. 1 can be shortened, winding can be done at close range for ease of fabrication, and winding occupancy can be increased because the overlap of the windings can be checked. Increasing the pole-logarithm of the motor can also shorten the axial length of the motor. By shifting the circumferential position of the slots on the inner diameter side and the outer diameter side and devising a rounded slot shape, the space for each tooth of each stator pole can carry the function of the 597 back yoke section, enabling the motor to be made smaller.

FIG. 59 shows an example of two induction motors arranged on the inner and outer diameter sides, but a compound motor with two induction motors arranged in the rotor axial direction can also be configured. The so-called axial gap type motor consists of a stator and a rotor facing each other in the rotor axial direction. This is a composite motor configuration in which the stator of an axial-gap induction motor is placed back-to-back and the rotor is placed on both sides of the axial direction. A toroidal-shaped annular winding is wound around each phase and placed in each slot of both stators. In the case of a composite motor with a rotor axial direction, it is easy to design the motor so that it does not have a large diameter, and the connection and rotational support of the two rotors is easy. However, since the direction of the magnetic flux is three-dimensional, it is necessary to select soft magnetic materials and devise the configuration.

The stator winding in FIG. 59 is a toroidal winding with a circular winding, which, as mentioned above, shortens the coil end, has excellent winding fabrication properties, and has a high occupancy ratio. Therefore, the effect is particularly significant in thin motors. For relatively thin motors, a configuration in which one of the two sets of motors in FIG. 59 is removed is practical because the toroidal windings are very effective.

Figure 60:
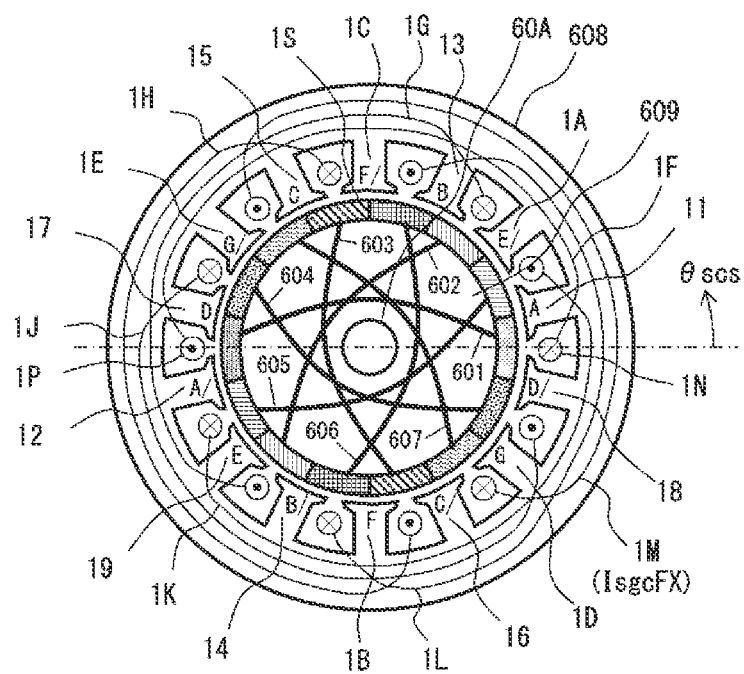
FIG. 60 is a sectional view showing a motor with its respective rotor teeth removed.

Next, an example of the implementation of a twenty-sixth mode is shown and explained in FIG. 60. As will be explained later, the teeth composed of soft magnetic material in the rotor are eliminated to reduce the leakage inductance Lrw of each rotor winding. One of the objectives of the induction motor configuration in FIG. 60 is to increase the maximum torque of the induction motor. As shown in FIG. 4 as an example of an equivalent circuit for one of the rotor windings, if the leakage inductance Lrw is reduced, the circuit time constant tr=Lrw/Rr becomes smaller, and the phase delay of the rotor current Ir is reduced. In the case of sinusoidal drive, the phase delay θs of the rotor current Ir in FIG. 5 54 becomes smaller, and the amplitude of the rotor current Ir also increases. In particular, when a large torque is generated, the slip angular frequency ωs increases, so the phase delay θs increases rapidly. In FIG. 6, which shows an example of the characteristics of a conventional induction motor, the maximum torque is limited to its maximum value by the leakage inductance Lrw, as shown by the torque T shown by 62. The induction motor in FIG. 60 has a torque characteristic of 66 shown by the dashed line in FIG. 6, which is intended to increase the maximum torque.

Figure 61:
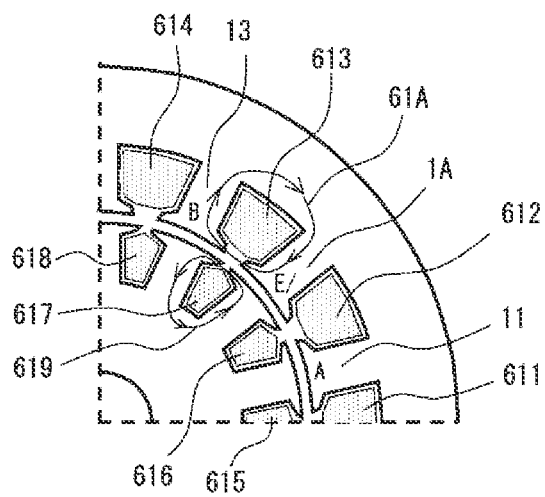
FIG. 61 is a partial sectional view showing an example of teeth, slots, and windings of both the stator and rotor.

FIG. 61 shows an example of the cross-sectional shape of the stator winding of an induction motor and an example of the cross-sectional surface shape of the rotor winding. In the cross-sectional view of the induction motor shown in FIG. 1, the stator and rotor windings are simplified with symbols. FIG. 61 shows an enlarged view of the upper right quarter of FIG. 1 and a more specific example of the shape of each slot and winding. The stator in FIG. 61 is the same as the stator in FIG. 1, a 7-phase AC, 14-slot example, and for this reason stator poles 11, 1A, and 13 have the same symbols as in FIG. 1. 611 is an AD2 phase, 612 is an EA/2 phase, 613 is a BE2 phase, and 614 is an FB2/phase, indicating their full pitch windings. The stator windings are wound around the full space of the slot as shown above. 615, 616, 617, and 618 are examples of cross sections of each rotor winding, which is wound to fill the slot space as shown. Note that this is an example of 14 rotor windings in all, which can be made more uniform as a large number. The rotor winding can also be a die-cast aluminum rotor winding configuration, or a cage-shaped rotor winding with copper bars, etc.

As mentioned earlier, for example, as the number of turns Nwr/2 [turn] of the rotor winding 617, its rotor current Ir [A] generates a leakage flux φrw [Wb] as shown in 619 through the surrounding soft magnetic material, etc. This φrw is also a magnetic flux that partially chains to each rotor winding but does not contribute to torque generation as a field magnetic flux φm. Furthermore, this leakage flux φrw also has a partial flux component that only interlinks with some of the rotor windings 617.

The leakage inductance Lrw[H] of the rotor winding and the leakage magnetic flux φrw are related by the above formula (78), and the magnetic flux chain number ψrw [turn×Wb] is the following formula.

$\psi rw = Lrw \cdot Ir = Nwr/2 \cdot \varphi rw$

The voltage component due to leakage flux φrw is then expressed by equation (79). Since the rotor current Ir [A] is the relation in equation (77), the rotor current Ir is the current of the first order delay function related to the leakage flux φrw with respect to the induced voltage component Vr [V] generated by the field magnetic flux φm and the slip angular velocity ωs.

$Vr = Lrw \cdot dIr/dt + Ir \cdot Rr$

That is, the first-order delay time constant T=Lrw/Rr [sec] of the rotor current Ir increases when the leakage flux φrw increases, and the first-order delay time constant T decreases when the leakage flux decreases. This leakage flux φrw varies greatly, especially depending on the magnetic circuit configuration of the rotor. As mentioned above, this leakage inductance Lrw is responsible for the phase delay θs of the rotor current Ir in FIG. 5, shown by 54, and the torque characteristic 62 in FIG. 6. The leakage inductance Lrw [H] of the rotor winding is an important parameter when the maximum torque must be increased in an induction motor. As for the action and effect, the first order delay time constant of the rotor current Ir, T=Lrw/Rr [sec], is an important parameter. 61A is the leakage flux generated by the current Isbe in the BE 2-phase stator winding 613, which has the same relationship to the rotor current leakage flux. The voltage component of this leakage flux 61A is undesirable, but since it is on the stator side, the drive circuit of the induction motor can compensate.

Figure 62:
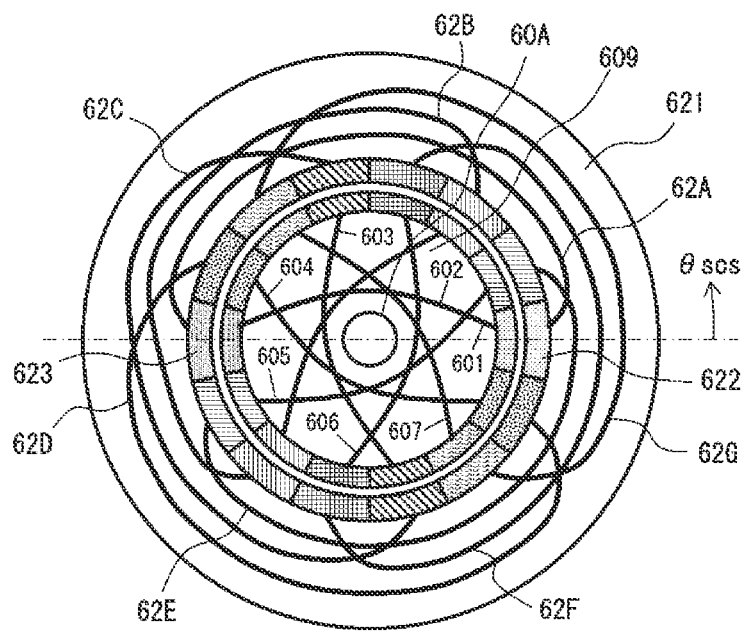
FIG. 62 is a sectional view showing a motor with its respective rotor and stator teeth removed.

To summarize the motor in FIG. 61, the stator poles and rotor poles face each other through an air gap for the most part, and the mutual magnetic resistance is small. Therefore, the excitation current of the field flux φm due to the stator current can be reduced, and the mutual inductance between the stator and rotor windings is large. However, the rotor slots are surrounded by soft magnetic material, and the leakage inductance Lrw of the rotor windings becomes large, and the rotor current Ir shown in equation (77) has a large phase delay relative to the position of the field flux φm, resulting in a problem of reduced power factor. Furthermore, in the case of the motor configuration shown in FIG. 61, there is a problem that the maximum torque cannot be generated efficiently because of the saturated torque characteristics as shown in FIG. 6 62.

As mentioned above, many induction motors have long been used in direct drive to 3-phase power supplies by turning on and off manual switchgear or electromagnetic contactors. However, induction motors are now driven by inverters, which greatly improves the flexibility of control. On the other hand, there seem to be few attempts to drastically change the characteristics of induction motors, perhaps because of the need for compatibility with induction motors for direct-injection drives. Specifically, a leakage inductance Lrw of some magnitude is also useful in a direct-injection drive. However, when the maximum torque of an induction motor is increased to about twice the conventional torque, or even much more than twice the conventional torque, the aforementioned value of the leakage inductance Lrw [H] of the rotor winding and the time constant T=Lrw/Rr [sec] of the rotor winding are major problems. There are also issues such as reducing the resistance of the rotor winding, close arrangement of the stator winding and rotor winding, field flux distribution state, and flexible energization and current distribution of each phase current. By solving these issues, various improvements can be made, such as increasing the efficiency of induction motors and reducing the size of drive circuits.

The stator in FIG. 60 has the same configuration as the aforementioned induction motor in FIG. 1. In FIG. 60, each tooth of the rotor's soft magnetic material is eliminated and the windings of each phase of the rotor are circumferentially aligned on the rotor surface. The number of rotor windings is 14, an example of seven pairs of full pitch windings. The full pitch windings of the first phase of the rotor are connected at the coil end 601 of the rotor winding. Similarly, 602 is the coil end of the full pitch windings of 2 phases. And 603 is phase 3, 604 is phase 4, 605 is phase 5, 606 is phase 6, and 607 is phase 7, indicating the respective coil end sections.

In the example in FIG. 60, the number of full pitch windings of the rotor is shown as seven for ease of explanation. However, as mentioned above, a larger number of rotor windings is preferable for reducing torque ripple, etc., and the number of rotor windings should include a different number of primes than the number of stator windings. The rotor windings of FIG. 60 do not have to be full pitch windings, as in the aluminum diecast rotor, or the rotor windings of each phase may be mutually shorted at the rotor axial end of the rotor windings, as in the rotor of a cage induction motor.

Since the induction motor in FIG. 60 has no rotor teeth, the distance Lgrby from the tip of each stator pole tooth to the rotor back yoke 609, which is composed of soft magnetic material, is larger, and the burden on the stator excitation current component Isf of the field flux increases significantly. Conversely, however, since there are no rotor teeth, a simple calculation allows the radial thickness of each rotor winding, i.e., the aforementioned distance Lgrby about ½ compared to the original figure in FIG. 1. On the other hand, the leakage inductance Lrw of the rotor winding will be significantly lower in the winding structure without slots shown in FIG. 60 compared to the rotor winding placed in the rotor slot. Hypothetically, if the magnitude of the field flux φm in FIG. 60 is the same as in FIGS. 1 and 61, the rotor winding resistance is the same, r, and the magnitude of the rotor current Ir is the same, the torque in FIG. 60 is larger by the amount that the phase delay θs of the rotor current is reduced. In this state, if the rotor current is increased by increasing the slip angular velocity ωs, the torque difference becomes increasingly large.

To elaborate a bit further, when the induction motor in FIG. 60 is operating near its continuous rated torque, assuming that the stator current increases by the amount that the aforementioned stator excitation current component Isf increases and the stator rotor current component Isr remains the same, the torque T increases slightly by the amount that the aforementioned θs delay decreases, but is not largely changed in its amount. However, when the output torque of the induction motor in FIG. 60 increases to near maximum torque, the torque characteristic in FIG. 6 changes from 62 to 66 because the phase delay θs in FIG. 5 above is small, allowing the maximum torque to increase significantly. As a result, the induction motor in FIG. 60 can significantly increase the maximum torque, although the motor efficiency near the continuous rated torque is reduced.

The torque T of the induction motor in FIG. 60 can also be modified by revising the content of the stator current Is from equation (81) and changing the balance between the field excitation current component Isf and the rotor current component Isr. In the low-torque range, copper loss is at a minimum when the field excitation current component Isf is equal to the rotor current component Isr, according to simple theory. The drive with the lowest total loss, including iron loss, etc., i.e., a highly efficient drive is possible.

There are several specific ways to realize the rotor windings shown in FIG. 60, as well as methods of shape retention and strengthening. For example, the rotor winding can be composed of high heat-resistant and high-strength resin glass fiber filled. The outer circumference of the rotor may be covered and secured with a high heat-resistant, high-strength, non-magnetic, non-conductive material such as fiberglass. It is also possible to hold and reinforce the rotor windings with partial projection shapes, such as 634 in FIG. 63, as explained later. The outer rotor configuration can also be used to maintain and strengthen the shape of the rotor windings. Copper wire, aluminum die cast rotor, copper sheet, etc. can be used for the rotor winding wire. Various methods of processing copper sheets are possible, including stamping with dies, cutting, laser cutting, and laser welding. Superconducting windings, described below, can also be used.

For comparison, the characteristics of the induction motor in FIG. 1 and those in FIG. 60 are estimated relative to the rotor-related characteristics. The air gap length Lgap of both motors is 0.5 [mm] and the radial depth of the slot where the rotor winding is placed in FIG. 1 is 15 [mm]. If the rotor teeth were simply removed in this state, the relative ratio of the stator excitation current components would be (15+0.5)/0.5=31, requiring about 31 times more. However, assume that the rotor in FIG. 60 can reduce the aforementioned 15 [mm] to ¼ by allowing the rotor windings to be placed in the space of the rotor teeth and by increasing the occupancy of the rotor windings by about 2 times. In this case, the excitation current component becomes (15/4+0.5)/0.5=8.5, which reduces the increase. Nevertheless, compared to FIG. 1, the excitation current component in FIG. 60 requires about 8.5 times more.

In this example, the excitation current component of the motor in FIG. 60 is about 8.5 times larger, which is problematic because the field excitation burden increases significantly. However, as mentioned above, the leakage inductance Lrw of each rotor winding is greatly reduced, and the circuit time constant T=Lrw/Rr [sec] is greatly reduced. For example, qualitatively, at light loads of ⅓ or less of the continuous rated torque, a torque of the same magnitude can be obtained by reducing the excitation current component Isf and increasing the slip speed, thus reducing the problems of increased motor current and reduced efficiency. In the vicinity of the continuous rated torque, the excitation current component Isf increases, so the phase delay θs in FIG. 5 decreases, but the efficiency decreases. However, the aforementioned phase delay θs at large torques, such as three times the continuous rated torque, can be reduced, and the efficiency of the torque current component improves.

In addition, the induction motor in FIG. 60 is particularly effective in reducing the phase delay θs in the large torque region of 3 times or more. Since the torque characteristic of 62 in FIG. 6 is close to that of 66, a large amount of torque can be generated. This large torque effectively reduces the phase delay θs and at the same time, as described above, the feature that the field flux φm is not easily disturbed because no magnetomotive force is generated outside of both windings by each rotor current Irn and each rotor current component Isrn in the stator. That is, induction motors are configured so that the so-called armature reaction does not occur. In the case of the surface permanent magnet synchronous motor shown in FIG. 69, there is the problem of armature reaction and demagnetization of the permanent magnet when large torque is generated. The induction motor in FIG. 60 has fewer of those problems.

Thus, the induction motor in FIG. 60 shows its strength in the large torque range, although there is a problem with the increase in the excitation current component Isf. Since motor drives such as inverters are determined by the maximum torque, their usage can rather enable their downsizing and cost reduction as well. Applications include, for example, applications that require long periods of light-load operation and occasional large torque. Even if a large current is energized, the problem of heat generation can be reduced for a short period of time. There are not a few applications that require large torque, such as some electric vehicle drives, some industrial machine drives such as machine tools, or some home appliances. These characteristics are also qualitatively common to the induction motors in FIGS. 62, 63, and 64, which will be discussed later.

Next, an example of the implementation according to a twenty-seventh mode is illustrated in FIG. 62. One of the objectives of the configuration of the induction motor in FIG. 62 is to reduce the leakage inductance Lrw of the rotor winding, as in the induction motor in FIG. 60, to reduce the phase delay θs of the rotor current Ir in FIG. 5 54, and to increase the torque maximum of the torque T in FIG. 6, shown by 62. One of the other objectives of the induction motor of FIG. 62 is to increase the flux density average of the field flux φm by about a factor of 2 in the high torque region. This can increase the magnetic flux density in the air gap section because there is no longer a limit to the magnetic flux that can pass through the stator teeth. As a result, if the magnetic flux density is approximately doubled, the torque constant of the rotor current component Isr is doubled, and each torque in equation (81) is doubled. The stator excitation current component Isf increases, but the rotor current component Isr can be reduced. One of the other objectives of the induction motor shown in FIG. 62 is to improve the fabrication and productivity of the windings, as well as to improve the conductor occupancy ratio. This also shortens the distance Lgby from the back yoke of the stator to the back yoke of the rotor and reduces the excitation current component Isf.

The rotor in FIG. 62 has the same configuration as the rotor in FIG. 60. The stator in FIG. 62 eliminates each tooth of the stator poles in FIG. 1 and Ku and arranges the windings of each phase of the stator circumferentially on the stator surface. The number of stator windings is 14, an example of seven pairs of 7-phase full pitch windings. 62A is the coil end of the AD7 and AD/7 phase full pitch windings of the stator. Similarly, 62B is BE7 phase, 62C is CF7 phase, 62D is DG7 phase, 62E is EA7 phase, 62F is FB7 phase, 62G is GC7 phase, which show the coil ends of their windings for the respective phases. The rotor windings in FIG. 62 are shown in a configuration similar to the stator windings, but the number and form of the rotor windings can be changed as described above.

The induction motor of FIG. 62 has less magnetic material around the rotor windings than the configuration of FIG. 60, and the leakage inductance Lrw of the rotor windings can be smaller than in FIG. 60. As a result, the torque maximum of torque T can be made larger. In addition, as described above, the magnetic flux density in the air gap section can be increased because there is no longer a limit to the magnetic flux that can pass through the stator teeth. As a result, if the magnetic flux density is approximately doubled, the torque constant of the rotor current component Isr is doubled, and each torque in equation (81) is doubled. The stator excitation current component Isf increases, but the rotor current component Isr decreases.

This action and effect are related to the unique characteristics of induction motors. That is, as will be explained later in FIGS. 70, 71, and 72, the rotor current Ir of the induction motor and the stator rotor current component Isr have the same magnitude of current [A×turn] and the opposite direction of current, and the sum of Ir and Isr is 0. Therefore, their external electromagnetic influence on the field flux φm is small. It can be said that the action corresponding to armature reaction, which is a problem in DC motors and synchronous motors, is small. Furthermore, the circumferential magnetic flux density Bcir in the air gap section can be increased, as shown later, and the circumferential force Fcir in equation (193) can be increased.

The structure and characteristics of conventional induction motors are one form of pursuing efficiency and power factor near the rated torque. Another important feature is that it follows the old 3-phase sine wave AC theory and can be driven directly into a 50/60 [Hz] commercial power source. As a result, the characteristics of the conventional induction motor are as shown in FIG. 6, with a relatively large leakage inductance Lrw of the rotor winding.

This disclosure proposes an induction motor with a trapezoidal waveform shape to a sinusoidal waveform shape close to a square waveform, control techniques and a drive circuit. The induction motor can also be made with a smaller leakage inductance Lrw of the rotor winding, and the phase delay θs of the rotor current Ir in FIG. 5 54 can be made smaller, making the torque characteristic 66 of 62 shown in FIG. 6, shown by the dashed line, increasing the maximum torque. In addition, many new challenges arise in their realization, and we propose technologies to overcome these challenges. In addition, the basic characteristics of the induction motor have excellent aspects and have the potential to solve the problems of armature reaction and torque saturation of DC motors, synchronous motors, and reluctance motors, which are later explained in FIGS. 70, 71, 72, and 73.

The induction motor of FIG. 62 has no soft magnetic material teeth, so each winding does not need to be inserted into a conventional slot, which allows for a different winding configuration. As in the example of the winding fabrication method described below, the winding occupancy can be improved, and the radial thickness of the stator winding and rotor winding in FIG. 62 can be reduced. And since the distance Lgby from the back yoke of the stator to the back yoke of the rotor can be reduced, the excitation current component Isf of the stator can be reduced. The absence of soft magnetic teeth also reduces cogging torque ripple.

The rotor winding in FIG. 60, the stator winding in FIG. 62, and the rotor winding can be shaped by fixing the winding bundle with resin, for example. Copper sheets can also be punched to the required winding shape. Resins, adhesives, and fiberglass with high heat resistance and high strength can be used. Moreover, cylindrical windings can be produced, as shown in the cross-sectional view in FIG. 62.

Figure 63:
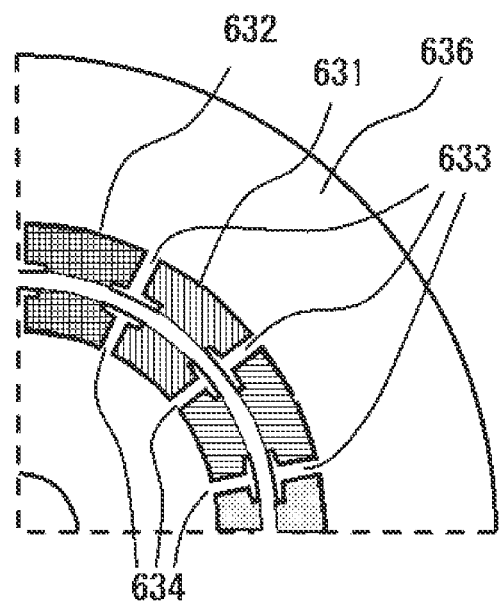
FIG. 63 shows a configuration in which stator windings and rotor windings are fixed, respectively.

The stator winding in FIG. 62 can also be held and secured in place by the 633 winding fixture in FIG. 63, which shows the upper right quarter of the winding. 631 is the BE 7-phase winding and 632 is the FB/7-phase winding. The rotor windings can also be held and secured by the winding fixing section 534.

Figure 64:
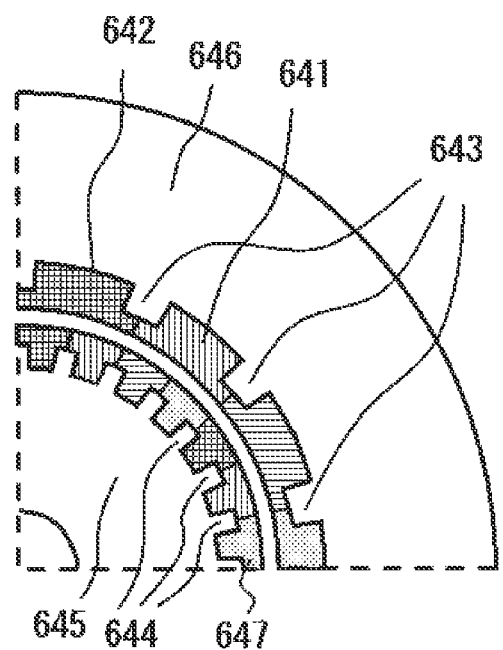
FIG. 64 exemplifies proportions attained to soft magnetic members of the stator and rotor, respectively.

Next, an example of the implementation according to a twenty-eighth mode is illustrated and explained in FIG. 64. In the induction motors shown in FIGS. 60 and 62, the leakage inductance Lrw of the rotor winding can be reduced, but the distance between the soft magnetic body of the stator and the soft magnetic body of the rotor increases, which causes an increase in the excitation current Isf. The burden of the excitation current Isf is particularly high in the low torque region. In the configuration of FIG. 64, a soft magnetic protrusion 644 is added to the back yoke 645 of the rotor to shorten the distance to the soft magnetic part of the stator, reducing the excitation current component Isf, especially in regions where the field flux φm is small. Similarly, a soft magnetic protrusion 643 can be added to the back yoke 646 of the stator to shorten the distance to the soft magnetic part of the rotor and reduce the excitation current component Isf, especially in regions where the field flux φm is small. 641 is an BE 8-phase winding and 642 is an FB/8-phase winding.

Here, the height and width of the shape of the protrusions 643 and 644 of the soft magnetic material in FIG. 64 can be flexibly selected. The number of protrusions 643 and 644 arranged in the circumferential direction can also be varied. Various shapes are possible for the protrusions 643 and 644. Thus, by optimizing the protrusions 643 and 644 of the soft magnetic material in FIG. 64, the leakage inductance Lrw of the rotor winding can be made to an appropriate value. At the same time, the distance from the soft magnetic body of the stator to the soft magnetic body of the rotor is substantially shortened, thereby reducing the excitation current component Isf, especially in the low torque region. The number of rotor windings by 647 in FIG. 64 and the number of protrusions in 644 must be increased to smooth the circumferential magnetic and electrical properties of the rotor. The shape of the protrusions 643, 644, etc. of the soft magnetic material in FIG. 64 can be convenient for fixing the winding. The rotor can also be placed on the exterior side to improve rotor strength.

In FIG. 64, the specific shapes of the projection 643 of the stator and the projection 644 of the rotor can be set as follows. As an example, for a radial distance Lgby from the back yoke of the stator to the back yoke of the rotor, the radial distance from the tip of the projection 643 of the stator to the tip of the projection 644 of the rotor is less than Lgby/2. In that configuration, the excitation current component Isf can be reduced by about half, especially in the low torque region, thus improving motor efficiency at light loads. For large loads, the leakage inductance Lrw of the rotor winding can be reasonably small because the protrusions are arranged circumferentially apart from each other in the shape of the aforementioned protrusions 644 in FIG. 64. In addition, a large amount of torque can be generated. If the mutual circumferential distance between the tips of the stator's projection 643 becomes smaller, the leakage inductance Lrw of the rotor winding increases, so the radial distance from the tip of the stator's projection 643 to the tip of the rotor's projection 644 should be Lgby/10 or more. As a result, this motor configuration is a practical motor characteristic because it can handle both light and large loads. There are many motor applications with such characteristics.

The following is an example of the implementation according to a twenty-ninth mode. The aforementioned rotor winding shown in FIGS. 60 and 62 is an example of a configuration where each phase has full pitch windings. The full pitch windings have a large and complicated problem because the coil end section is longer and the windings of each phase intersect. In particular, the rotor winding should be simple because it rotates and is subject to centrifugal force. As mentioned above, the short-circuit winding of the full-pitch winding of the induction motor rotor is electrically equivalent to the aluminum diecast rotor and cage rotor. However, there is also the problem of unexpected current flow due to the adverse effects of these conductors and soft magnetic materials being electrically connected and the impedance of the short-circuit at the coil end not being sufficiently low In the twenty-ninth mode, the rotor windings shown in FIGS. 60, 62, and 64 are realized in the manner shown in FIGS. 65 and 66. Rotor windings are realized with plates of copper, aluminum, or other conductors with high occupancy to simplify the rotor windings by shorting the coil ends, as in aluminum die-cast rotors. FIG. 65 (*a*) shows a sheet copper plate being processed, where 651 is an elongated hole and slit, providing electrical insulation in the circumferential direction of the copper plate, forming rotor windings 652, etc. This rotor winding 652 corresponds to the rotor winding in the rotor slot in the case of the rotor in FIG. 1. This is an example of 14 slits, forming 14 rotor windings. 653 and 654 short the rotor windings of each phase at the coil end. The purpose of the aforementioned slit 651 is electrical insulation, and a partial cutting process can be used to create a small gap for insulation. Simply by providing a cut surface, the average electrical resistance can be increased by a factor of 10 or more, even if metal contacts remain in some places.

Next, the copper plate of FIG. 65 (*a*) is deformed into a cylindrical shape, as shown in the cross section of FIG. 66 (*a*). The dashed line 661 is the slit 651 in FIG. 65. 662 is the rotor winding 652 in FIG. 65. 663 is the joint, which corresponds to the left and right ends of the coil ends 653 and 654 on the paper side of FIG. 65 (*a*). The joint 663 is mechanically and electrically coupled to each other. This cylindrical rotor winding unit is then mounted and secured to the rotor shown in FIGS. 60 and 62. The width of the 651 slits in FIG. 65 can be very small, just enough to allow electrical separation, and the occupancy of the rotor windings can be close to 100%. The coil end part can be a simple plate shape, which is simpler and has greater strength. However, the rotor can be reinforced with fiberglass or other materials to resist centrifugal force during rotation, or it can be configured as an outer rotor configuration in which centrifugal force applied to each part of the rotor is received by the reinforcement material on the rotor periphery.

The copper plate in FIG. 65 (*a*) can be fabricated by punching or other machining process using a die, which is highly productive. It is easy to increase the number of rotor windings around the entire circumference, and it is also easy to skew the rotor windings and other innovations. Cutting and welding processes using processing lasers can also be used, and can be combined with mold processing. It is also possible to form and assemble the flat copper plate of (a) in FIG. 65 to the rotor of FIGS. 60 and 62 while deforming it into a cylindrical shape, and then join the portions of 663 in FIG. 66 by laser welding or other means. Electrical isolation between the rotor winding and the rotor back yoke is possible and preferred.

In addition, FIGS. 65 and 66 show a copper plate with a circumferential length of one layer, but there are difficulties in processing thick plates. Therefore, multiple thin copper sheets can be stacked in multiple layers to produce the cylindrical rotor winding unit of cylindrical shape shown in FIG. 66 (*a*). There are several possible fabrication methods for the multilayer thin plate configuration, and any of them can be used. One way to construct multiple layers of thin sheets is to simply stack the configuration in (a) of FIG. 66 in multiple layers.

Another method is to wind circumferentially long copper sheets in multiple layers and perform a series of operations simultaneously. That is, for example, the copper sheet is pulled out from a drum of raw material on which the copper sheet is wound, the slits 651 and 655 in FIG. 65 are processed by laser processing onto the copper sheet, and the copper sheet is wound onto the rotors in FIGS. 60, 62, 64, and 67 in sequence. At this time, the laser processing shape of the copper sheet changes, but since the shape can be calculated, the processing position and shape can be varied according to the situation of wrapping the sheet around the rotor. In addition, the following techniques can be used: sheet surface insulation technology, adhesion technology between copper sheets, electrical and mechanical bonding of coil ends by laser welding between multiple layers, and fixing the outer circumference of the rotor with glass fiberglass tape or other means that contains resin. Mechanical interference during wrapping onto the copper sheet can be solved by the deformability of the copper sheet, modification of the shape of each part, and laser welding. Conversely, copper sheets can be arranged in circumferential sections and connected by laser welding or other means. Aluminum plates, etc. can also be used instead of copper plates and sheets. Superconductive materials, other new conductors, etc. can also be used.

Then, for the rotor winding geometry shown in FIG. 64, the copper plate geometries of (a) and (b) in FIG. 65 can be used. FIG. 65 (*b*) shows the width of the slit portion of 655, i.e., the elongated hole shape, is larger than that of 651. 656 is the rotor winding and 657 and 658 are the coil ends of the rotor. For example, if (a) and (b) in FIG. 65 are superimposed to form a cylindrical shape, it will look like (b) in FIG. 66. 665 is the same slit as 661, 666 is the same rotor winding as 662, 667 is the wider slit of 655 in FIG. 65, 668 is the rotor winding on the inner diameter side, and 669 and 66A are the same joint as 663.

To assemble each rotor winding to the rotor 645 in FIG. 64, first assemble the cylindrical rotor winding on the inner diameter side in FIG. 66 (*b*), which consists of the copper plate in FIG. 65 (*b*), and then the cylindrical rotor winding on the outer diameter side in FIG. 66 (*b*). Those copper plates can also be configured in a multilayer configuration. Each of the aforementioned processing and assembly techniques may also be used. As a result, the winding occupancy ratio can be improved. Production methods can be optimized to improve fabrication and productivity.

When the number of rotor windings in the circumferential direction is small, as in FIGS. 60, 62, 63, and 64, and when conductor plates like those in FIGS. 65 (*a*) and (*b*) are used, the field magnetic flux tries to pass through the area where the flat part is wider. This causes a problem of increased eddy currents in the flat areas of the conductor plates. In such cases, eddy currents can be greatly reduced by providing narrow slits or simply cut surfaces as shown in FIG. 65 (*c*), by 65E and 65F. 65A, shown by the dashed line in FIG. 65(*c*), is an enlarged view of the portion of dashed line 659 in FIG. 65(*b*). 65B, 65C, and 65D are slits similar to 655 in FIG. 65(*b*), and the other parts of FIG. 65(*b*) are rotor windings similar to 656. 65E and 65F are thin slits machined into their rotor windings, or simply partially cut surfaces, to prevent electrical continuity. This cut surface can be processed relatively easily, as in the punching process, and even if the cut surface returns to its approximate original position after the cutting process, mutual electrical continuity is greatly reduced. Also, it is possible to process the cut surface in such a way that there is a slight gap by using a cutting die or other device for the cutting process, thereby preventing electrical continuity. In this way, eddy current problems can be reduced. If the number of circumferential rotor windings is increased, the eddy current component is reduced, the loss due to eddy currents is reduced, and the need for the narrow slits and cut surfaces 65E and 65F mentioned above is reduced. Similarly, the slit 651 in FIG. 65 (*a*) can be used to create a small gap in a partial cut surface to provide electrical insulation in the circumferential direction.

Figure 67:
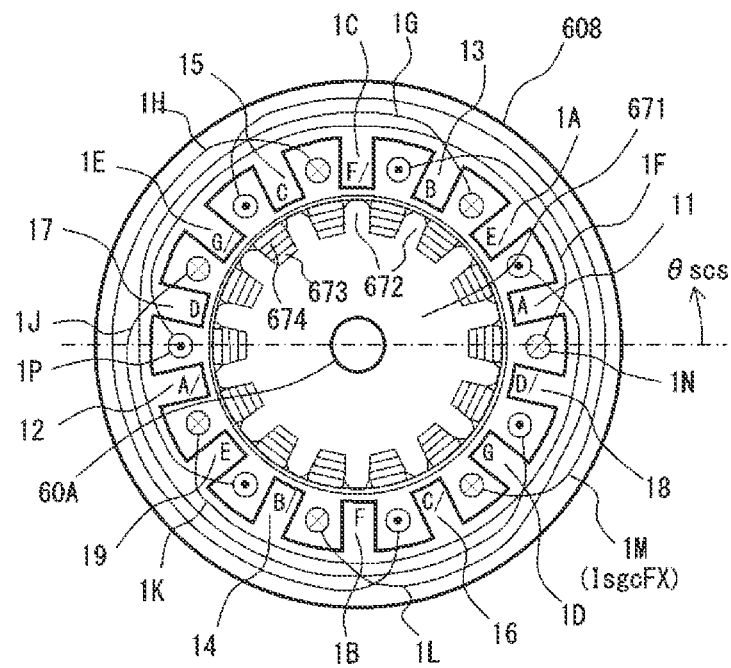
FIG. 67 is a sectional view showing a motor in which leakage inductance of the windings are decreased.

Next, the motor configuration example in FIG. 67 is explained. The stator has the same arrangement and configuration, although the teeth of the stator in FIG. 1 have been modified, and are marked with the same symbols. The teeth in FIG. 67 are almost straight in the radial direction and have a larger slot opening width. 672 in FIG. 67 are the teeth of the rotor, which are made nearly straight in the radial direction and have a larger slot opening width. 673 and 674 are rotor windings, which are laminated copper sheets as shown in FIGS. 65 and 66. The configuration in FIG. 67 is an example of an induction motor configuration that reduces the leakage inductance Lrw of the rotor winding. The outer circumference of the rotor may be covered and reinforced with a non-magnetic, non-conducting reinforcing material, the so-called outer rotor structure. The configuration and geometry in FIG. 67 is a model with the same number of teeth in the stator and rotor for ease of explanation. When the rotor rotates, the magnetic resistance between the stator and rotor changes drastically, making it unusable in practical use. In practical application design, the number of rotor teeth and rotor windings should be increased, prime numbers such as 3, 5, 7, and 11 should be used, pole pairs should be increased to 2 or more, circumferential magnetic pulsations should be cancelled out, and the total magnetic smoothness characteristics should be achieved.

Geometric interference occurs when copper sheets 673 and 674, the rotor windings in FIG. 67, are wound circumferentially. As a countermeasure, the copper sheet can be assembled with deformation. The length of axial length with deformation of slit shape can be conveniently optimized. The shape of the axial end of the rotor teeth can be shortened to facilitate assembly of the copper sheet. The shape of the rotor teeth can also be modified to a shape that is convenient for assembly of the copper sheet.

The stator and rotor of FIGS. 60, 62, 64, and 67 can be combined with each other. The induction motor of FIG. 64 is characterized by the addition of a projection 644 on the rotor, which can reduce the magnetic resistance MRsr from the back yoke of the stator to the back yoke of the rotor. At this time, the leakage inductance Lrw increases, so a balance between MRsr and Lrw must be considered.

For example, the rotor of FIG. 64 can also be combined with the stator of FIG. 60. As a result, the leakage inductance Lrw and magnetoresistance MRsr can be changed and selected. The shape and number of rotor windings and protrusions 644 can be designed. That is, depending on the shape and number of protrusions 644 on the rotor, the value of magnetic resistance MRsr can be changed and made smaller, which can reduce the excitation current component, especially in the low-torque region, improving efficiency in the low-torque range.

In summary, as explained earlier, the motor of FIG. 61 has the features of small mutual magnetic resistance between the stator and rotor magnetic poles, allowing the excitation current of the field flux φm to be reduced, and large mutual inductance between the stator and rotor windings. On the other hand, the slots of the rotor are surrounded by soft magnetic material, and the leakage inductance Lrw of the rotor windings is large, which causes a large phase delay of the rotor current Ir with respect to the position of the field flux φm, resulting in the problem of a lower power factor and the smaller maximum torque shown in FIG. 6. In contrast, motors such as those shown in FIGS. 60, 62, 64, and 67 sacrifice a larger mutual magnetic resistance between the stator and rotor magnetic poles and a larger excitation current for the field flux φm, but they reduce the leakage inductance Lrw of the rotor winding, reduce the phase delay of the rotor current Ir with respect to the position of the field flux φm, and increase the maximum torque value shown in FIG. 6.

Figure 76:
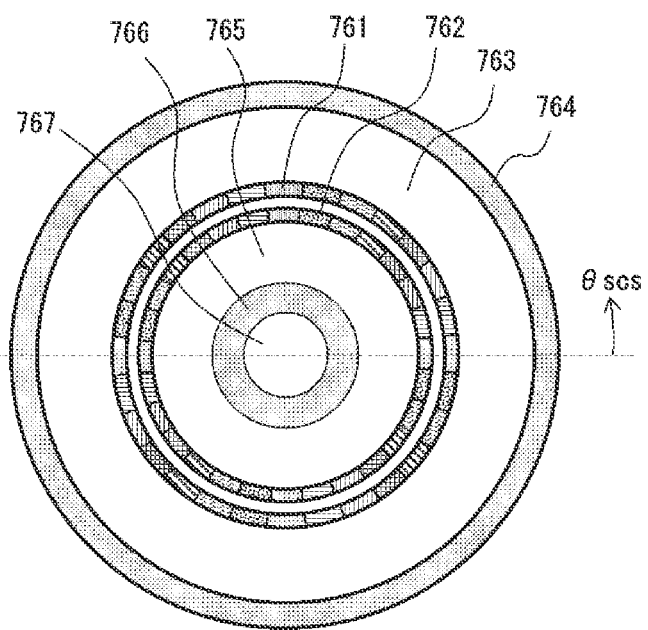
FIG. 76 exemplifies a section of a motor from which most of a soft magnetic member is removed from around the winnings thereof.

As a specific measure to reduce the leakage inductance Lrw, the leakage inductance Lrw can be reduced by removing the soft magnetic material near the rotor windings, as shown in FIGS. 60, 62, and 63. The height of the projection 644 of the soft magnetic material of the rotor and the height of the projection 643 of the soft magnetic material of the stator in FIG. 64 can be optimized to reduce the leakage inductance Lrw and to secure some mutual inductance between the stator and rotor windings to make the configuration compatible with both characteristics. The rotor slot opening and the status slot opening can be widened to reduce the leakage inductance Lrw, as shown in FIG. 67. Furthermore, as shown in FIG. 76 below, in a structure where there is no soft magnetic material around the stator and rotor windings, the mutual inductance between the stator and rotor windings is also small, but the leakage inductance Lrw of each rotor winding can be reduced. However, in a case such as FIG. 76, it is necessary to effect the interaction between the stator current and the rotor current, as will be shown later.

Then, as shown later in FIG. 70, equation (193), the magnetomotive force component generated by the rotor current and the magnetomotive force component generated by the stator current cancel the effect of the magnetomotive force on their outer parts and the rotor current component and the stator current component produce the circumferential magnetic flux density component Bcir the air gap section. Therefore, the maximum torque of the motor is increased when combined with the aforementioned inventive control techniques. That is, the maximum torque of the motor can be increased more effectively through mutual optimization of the motor and control. As a result, the maximum torque can be increased, as shown in the characteristic 66 in FIG. 6. Note that these actions and effects differ in some respects from those of conventional synchronous motors, reluctance motors, etc.

As a result, the leakage inductance Lrw of the rotor winding can be made small and moderate. Therefore, depending on the application, the phase delay θs in FIG. 5 can be reduced, and the torque characteristic of 62 in FIG. 6 can be changed to the characteristic of 66 shown by the dashed line, so that the maximum torque can be increased. The magnetic resistance MRsr from the back yoke to the back yoke of the rotor can be reduced, and the problem of the excitation current component Isf can be reduced to an acceptable level. The distribution balance between the excitation current component Isf and the rotor current component Isr can be selected and controlled. In regions of high torque, the radial flux density of the torque-generating actuator can be increased to nearly 2.0 [T]. Circumferential distribution of magnetic flux and current can be controlled by multiphase voltage and current, such as 7-phase, trapezoidal wave distribution instead of sinusoidal wave distribution. Also, as mentioned above, the size of the power transistor in the motor drive circuit is often constrained by the maximum torque, rather than the size of the motor drive circuit, which allows its downsizing and cost reduction.

Figure 68:
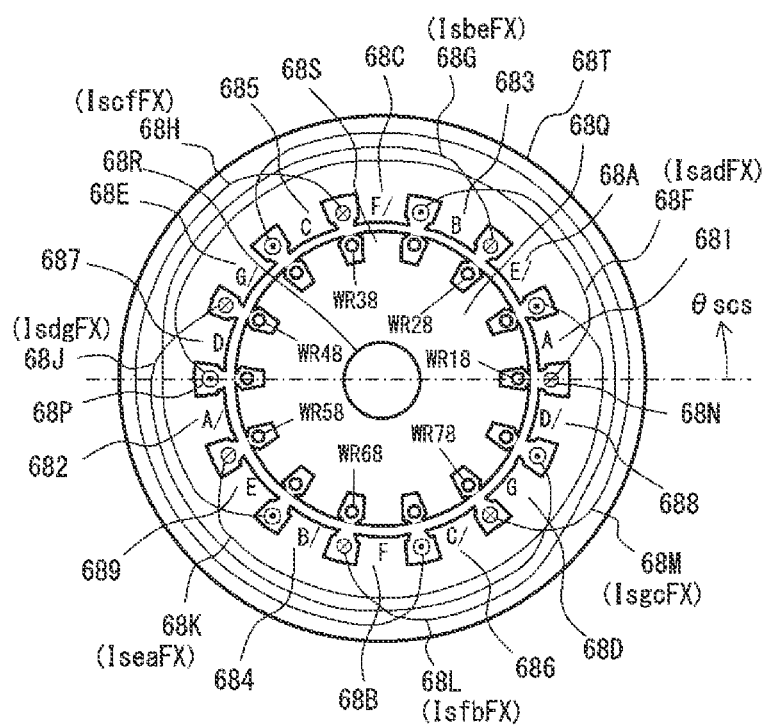
FIG. 68 is a sectional view exemplifying a motor structured to have superconducting windings.

The following is an example of the implementation of a thirtieth mode. The motor in FIG. 68 is an example of claim 30. This motor uses superconducting windings with zero resistance at low temperatures for the stator and rotor windings. The correlation between stator configuration and current, rotor configuration and current, and their actions, functions, features, and problems are shown and explained in FIGS. 69, 70, 71, 72, and 73.

In the thirties mode, the electromagnetic action of the stator and rotor is expressed by the field excitation current component of each phase, the rotor current component, and the distribution of the field flux φm, but the electromagnetic action of each phase current of the stator and the current group of the rotor can be a difficult state to describe simply. According to current motor technology, torque and other factors are often determined by electromagnetic field analysis using the finite element method, for example, the values of equations (193) and (194) derived from Maxwell's stress equation, shown below, can be accurately obtained by integrating circumferentially along the air gap plane. Equations (193) and (194) represent the force components Fcir and Frad generated by the magnetic flux density components Bcir and Brad alone in each section that are generated as a result of both of the above current groups. However, modes such as the thirtieth mode can be a bit abstract and limiting, since they are expressed in terms of the distribution of the field flux φm and the distribution of each current component of both current groups described above, as in equation (191) of the Lorentz force. And, for example, the field flux φm may be generated by both a partial component of the stator current and a partial component of the rotor current component, resulting in current control states that are slightly different from those expressed in the modes. The present disclosure does not exclude those control states, but includes them as well.

The superiority of superconducting windings is that the resistance can be reduced to zero and the current density can be increased. By simply replacing the copper and other windings of conventional synchronous and reluctance motors with superconducting windings, motors can be made more efficient, smaller, and lighter. Based on these basic characteristics, various properties can be obtained, such as superconducting electromagnets. On the other hand, there are many problems with superconducting windings. For example, cooling is required. The price is still expensive. There is loss of peripheral components such as electromagnetic steel plates in the motor, and their heat generation is a burden on cooling. If the rotor winding of an induction motor is replaced with a superconducting winding, the rotor becomes a superconducting electromagnet, and the field flux cannot be changed or varied, so it also has the problem of not acting as an induction motor.

In particular, rotors using superconducting windings enable so-called superconducting electromagnets, which can maintain a magnetic force stronger than that of permanent magnets, and are expected to be used in JR's so-called Linear Shinkansen, which uses superconducting electromagnets. However, this is only because superconducting electromagnets are used, and less than 50% of the motor's superconducting windings are utilized. Due to the various problems mentioned above, superconducting windings are used in special applications, and in motor applications, they are only being considered for special applications such as high output and small size, and are not mass produced. There is little information on development for industrial, automotive, and consumer electronics applications. This disclosure proposes a new motor technology that utilizes superconducting windings, as well as peripheral technologies that are required together with superconducting windings.

Next, the motor in FIG. 68 is described as an example of the thirties mode. 68T is a stator, 68R is a rotor shaft, 68Q is a rotor, and superconducting windings are used for stator and rotor windings. Each stator winding and its connection relationship and the arrangement of each stator pole are the same as those of the induction motor shown in FIG. 1, which is a 7-phase stator. Since the resistance of the stator winding is 0 [Ω] and the current density can be increased, the area of the cross-sectional shape of the slot and winding is smaller, each tooth width is wider, and the thickness of the back yoke is increased compared to FIG. 1. 681 is an A8 phase stator pole, 682 is an A/8 phase stator pole, 683 is a B8 phase stator pole, 684 is a B/8 phase stator pole, 685 is a phase C/8 stator pole, 686 is a phase C/8 stator pole, 687 is a phase D/8 stator pole, 688 is a phase D/8 stator pole, 689 is an E/8 phase stator pole, and 68A is an E/8-phase stator pole, 68B is an F/8-phase stator pole, 68C is an F/8 phase stator pole, 68D is a G8 phase stator pole, 68E is a G/8 phase stator phase G/8 stator poles. The full pitch windings shown at the 68F coil end are AD8 phase windings. Similarly, 68G is a BE 8-phase winding, 68H is a CF 8-phase winding, 68J is a DG 8-phase winding, 68K is an EA 8-phase winding, 68L is an FB 8-phase winding, and 68M is a GC 8-phase winding.

For ease of explanation and other reasons, 14 rotor windings are shown in FIG. 68. However, as mentioned above, the higher the number of rotor windings, the smoother the drive, and a combination of prime numbers is preferred to avoid interference with the stator. WR18, WR28, WR38, WR48, WR58, WR68, WR78, etc. are the rotor windings for each phase. These connections can be made in a variety of ways. For example, the rotor windings can be 180° apart circumferentially and full pitch windings. As will be shown later, there are also several ways to interconnect each rotor full-pitch winding wire.

The motor in FIG. 68 can be driven in three ways. As shown later, the first method is driven as an induction motor as configured in FIG. 74. The second method, as configured in FIG. 75, supplies stator current and rotor current and generates torque through their electromagnetic interaction. The third method proposed is to use a superconductor to construct a superconducting electromagnet and drive it as a synchronous motor in various ways. The present disclosure does not address this third method.

Figure 69:
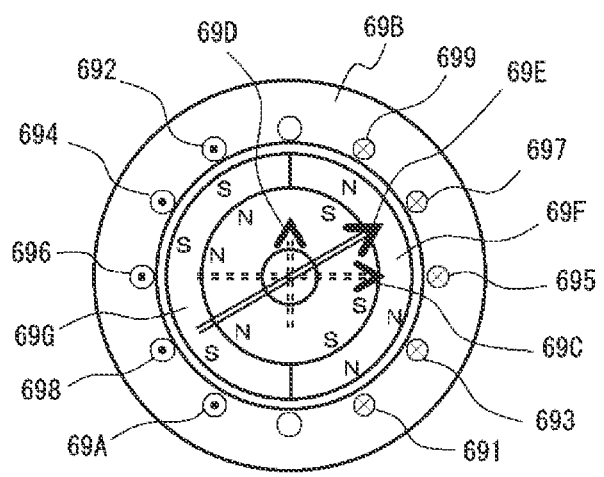
FIG. 69 exemplifies a section of a surface magnet type simultaneous motor SPMSM.

Before describing the action of the motor in FIG. 68, the permanent magnet synchronous motor in FIG. 69, which is a conventional motor, and its problems are described. 69B in FIG. 69 is the stator. 69F is a permanent magnet of the rotor, with the right side is the N-pole. 69G is also a permanent magnet in the rotor, with the S-pole on the left side of the paper. When the stator current is zero, the field flux is generated from the left side of the paper to the right side, as shown by the double-dashed arrow in 52C. This is called a surface magnet synchronous motor SPMSM. To generate a large torque in the CCW direction in this state, current should be applied to the stator windings of 691, 693, 695, 697, and 699 from the front side of the paper to the back side, as indicated by the winding symbols, and to the stator windings of 692, 694, 696, 698, and 69A from the back side of the paper to the front side. Each stator current generates the magnetomotive force shown by the double dashed arrows in 69D, and the magnetic flux component resulting from the stator current is generated. The total field flux is then the field flux indicated by the double-line arrow in 69E. As a result, a phase shift of, say, 30° occurs between the direction of the field flux and the center of the stator current distribution, causing a phase shift of 30° from the optimum phase for generating a large torque.

In response to this problem, the aforementioned phase shift of 30° is well understood, so the phase of the stator current is shifted in the CCW direction to optimize torque generation. Alternatively, the permanent magnets are changed to higher performance characteristics to reduce the phase shift problem. In the synchronous motor IPMSMs with built-in magnets, which are used as motors for home appliances, industrial motors IPMSMs with built-in magnets, and main motors of hybrid vehicles, the phase and magnitude of the field flux changes significantly due to the magnetomotive force of the stator current, partly with the aim of obtaining constant output characteristics through weak field control. From a different perspective and expression, IPMSM actively utilizes the fact that the field flux changes with the magnetomotive force of the stator current. The field flux is strengthened or weakened by the stator current.

Usually, a permanent magnet is indicated by its magnetic properties in the second quadrant of its H-B characteristic, for example, if the magnetic resistance of the magnetic circuit increases, the permanent magnet will act to maintain its magnetic flux by generating a large magnetomotive force. Similarly, the 691, 693, 6 95, 697, and 699 in FIG. 69, when the stator current flows, exchange interaction Similarly, when the stator currents of 691, 693, 695, 697, and 699 in FIG. 69 flow, an equivalent current that opposes the stator current seems to flow at the atomic level on the permanent magnet side due to exchange mutual action. However, there is a limit to the magnitude of such currents, and the present disclosure does not address those effects of permanent magnets.

Figure 73:
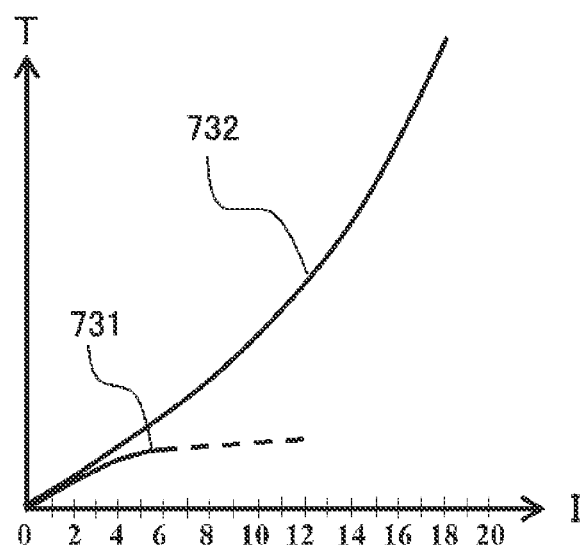
FIG. 73 exemplifies characteristics between the current and torque.

The torque characteristics of these commercially available SPMSMs and IPMSMs are often about 300% of the maximum torque for the continuous rated torque by applying the above-mentioned measures. Reluctance motors are about the same; at 500% stator current, there are problems with torque saturation and demagnetization of the permanent magnets due to the limitations of the aforementioned measures. In the case of reluctance motors, the pull force is limited by magnetic saturation. Its torque characteristic is shown in FIG. 73, 731. The vertical axis is torque, the horizontal axis is stator current, and the scale on the horizontal axis is a multiplier to the continuous rated torque, for example, 4 indicates 400% of the continuous rated torque. The torque characteristic has entered a nonlinear region with respect to the current, and the torque is saturating. The surface magnet synchronous motor SPMSM shown in FIG. 69 has a torque saturation problem. There is also the problem of field weakening, which weakens the field flux φm at high speeds, and the problem of demagnetization of the permanent magnet.

In contrast to the torque saturation characteristics of current motors as shown in 731, motors for future electric vehicles and aircraft may require a higher torque as shown in 732. Torque may be desired for future motors for electric vehicles and aircraft. At the same time, downsizing, weight reduction, and cost reduction are also required. In this disclosure, we propose a motor and a control device that can increase torque like 732 in FIG. 73, as well as achieve downsizing, weight reduction, and cost reduction. In the operation in the large current range as shown in FIG. 73-732, Joule heat, such as copper loss in the motor, becomes a problem. Therefore, the characteristics of 732 in FIG. 73 are explained in parallel with the superconducting winding, where Joule heat is zero. However, there is no direct relationship between the superconducting winding and the characteristics of 732 in FIG. 73. There is also no direct relationship between equations (193) and (194) derived from Maxwell's stress equation and the superconducting winding, which will be shown later.

Next, the basic configuration that can generate large forces and large torques, such as 732 in FIG. 73, is explained. When manually calculating the torque of the permanent magnet synchronous motor SPMSM shown in FIG. 69 above, the torque is calculated using the torque formula derived from the Lorentz force. That is, the torque T [Nm] can be calculated from the magnetic flux density of the field flux B [T], the current I [A×turn], and the effective length of the winding L [m] using the following equation, with force F [N] and winding position or rotor radius Mr[m].

$$F = B \times I \times L \quad (191)$$

$$T = F \times Mr \quad (192)$$

The problem with these equations and the permanent magnet synchronous motor SPMSM shown in FIG. 73 is that the current I changes the direction of the field flux φm and the flux density B decreases, as explained above. Equation (191) is derived from Faraday's law of electromagnetic induction and is a known equation. Fleming's left-hand rule is known as a way to indicate the relative direction of each vector.

On the other hand, electromagnetic field analysis using the finite element method is commonly employed in motor design today. Although the author uses magnetic field analysis tools, he is not familiar with the software for the internal calculations of the analysis, but in the analysis, rather than Lorentz force as in equation (191), the finite element Maxwell's stress equation, etc. The magnetic field is expressed in terms of a distribution of magnetic fields. The following equation is derived from Maxwell's stress equation and is known as the force acting at the air gap of the motor.

$$\text{Fcir} = (B\ \text{rad} \times \text{Bcir})/\mu_0 \quad (193)$$

$$F\ \text{rad} = (B\ \text{rad}^2 - \text{Bcir}^2)/(2 \times \mu_0) \quad (194)$$

Fcir [N] in equation (193) is the circumferential force component and Frad [N] is the radial force component. Brad [T] is the magnetic flux density component in the radial direction. $\mu_0$ is the vacuum permeability.

The torque T [Nm] is the same as in equation (192).

$$T = \text{Fcir} \times Mr \quad (195)$$

In the case of a motor, the force F [N] in equation (191) and the force Fcir [N] in equation (193) are the same (193). However, the force F[N] in equation (191) is the force per effective length L[m] of the winding, and the force Fcir [N] is the force per unit area. It is also the force component Fcir acting in the circumferential direction in equation (193). In particular, equations (193) and (194) are expressions that do not include current, and differ from equation (19 (1) differ from equation (193) in that respect. There is no force acting on the current.

Here, equation (191), which is the Lorentz force, and equation (193), which is derived from Maxwell's stress equation, do not contradict, but are different expressions. What is particularly relevant to the present disclosure is that near the operating point that generates the circumferential force component Fcir [N] in equation (193), if the current component Icir that generates the circumferential magnetic flux density component Bcir If the current component Icir that generates the circumferential magnetic flux density component Bcir has a small effect on the radial magnetic flux density component Brad, then the above current component Icir can be large without affecting the field flux φm. Then, the circumferential force Fcir can be made a large value. 732 torque characteristic in FIG. 73, and a large torque can be generated. Here, the magnetic flux density component Brad is the magnetic flux density of a part of the field flux φm. These effects are explained in FIG. 70 and others.

Figure 70:
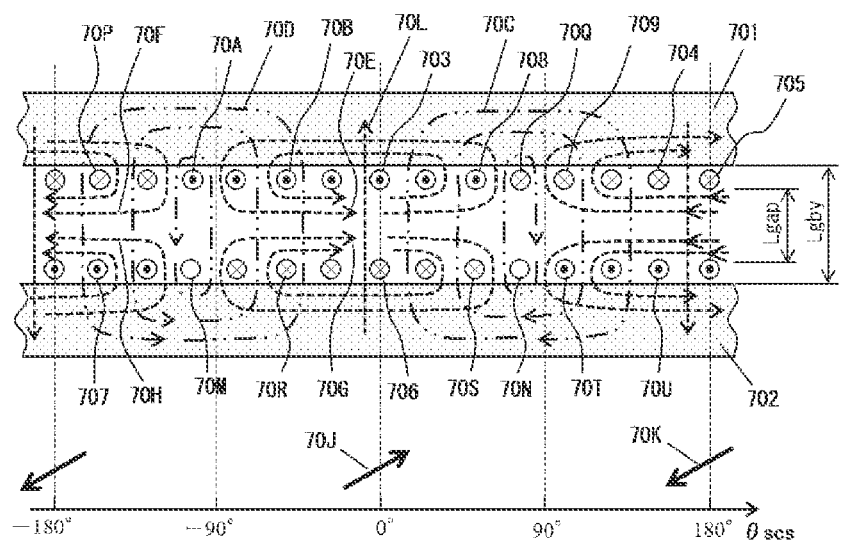
FIG. 70 is a view provided by linearly extending and largely displaying an air gap section of a motor section.

Next, an example of effectively generating the circumferential force Fcir shown in equation (193), i.e., a concrete example of the configuration, current, flux, and force, is shown in FIG. 70. Equations (193) and (194) represent the electromagnetic force in the state of magnetic flux distribution. The values are then calculated as magnetic field analysis values on a computer by dividing each part of the motor into finite elements and using a lot of memory. Because of its complexity, the constitutive model of force generation that can be described in this paper is limited to a very simplified configuration.

FIG. 70 shows a development cross section of the stator and rotor in a horizontal, straight line. It is a particularly easy to understand example of a special energized state, i.e., a simple current distribution. This motor model is a variant of the motor in FIG. 68 above by removing the teeth of each phase of the stator and each tooth of the rotor, as shown in FIG. 62. The cross-sectional shape of the motor is then developed into a straight line, as shown in FIG. 70. The relationship between current, flux, force, etc. shown in FIG. 70 is the same as that shown in FIG. 68, FIG. 60, FIG. 62, FIG. 63, FIG. 64, etc. FIGS. 63, 64, etc. also share the same relationships. Superconducting windings can also be applied to these motors.

701 in FIG. 70 is the back yoke of the stator, corresponding to 6 702 is the back yoke of the rotor, corresponding to 6 corresponds to 68Q in FIG. 68. The rotor shaft is not shown in FIG. 70. The rotational angular position of the stator, θcs, is shown at the bottom of the paper in FIG. 70, with θcs=0° in the center, θcs=180° on the right side, and θcs=−180° on the left side. The air gap from the stator to the rotor is the Lgap section, which is actually a small gap of about 0.5 [mm], but it is important because the magnetic flux distribution in this small gap generates most of the force generation phenomena in induction motors, etc. This air gap section is shown extremely enlarged. For example, assuming that the outer diameter of the motor in FIG. 68 is 250 [mm], the air gap length Lgap of 0.5 [mm] is a relatively small length. The distance from the back yoke 701 of the stator to the back yoke 702 of the rotor is Lgby as illustrated in FIG. 70.

Here, we explain that even though the current flow is physically the same as in the other cross-sectional views, the linear development in FIG. 70 shows the current direction in the opposite direction from the cross-sectional view. In FIG. 70, the right direction on the paper is the positive direction of the stator rotation angle position θcs, as described above. This is the same position and direction as the first and second quadrants in mathematics, etc. On the other hand, in FIG. 70, which is a linear development of the CCW rotation of the rotor in the cross-sectional view of FIG. 1 or FIG. 68, the right direction is the positive direction of the stator rotation angle position θcs. and the rotor rotation angular position θr increases. That is the convention when expressing in time charts and the like. As a result, FIG. 70 can be considered to be a linear expansion of the cross-sectional view of FIG. 1 or FIG. 68 viewed from the back side of the paper. That is, for example, when a positive current is energized in the AB8 phase winding 68N in FIG. 68, the AB8 phase winding 703, the current flows from the back side of the paper to the front side, which is represented by the current symbol as a negative current symbol. The same current should be represented in the opposite direction in both figures. Although this can sometimes be misleading, this is the way this linear development diagram is represented in the present disclosure.

The stator and rotor windings in FIG. 70 are shown schematically with a positive current symbol of an X and a circle, and a negative current symbol of a dot and a circle. In FIG. 70, 703 is the AB 8-phase winding of the stator, 705 is the AB/8 phase winding and is the full pitch winding(s) shown by the 68F coil end in FIG. 68, and the 68N and corresponds to the 68P windings. Similarly, 708 in FIG. 70 is a BE8-phase winding, equivalent to 68G of FIG. 68. 709 in FIG. 70 is the CF8-phase winding, corresponding to 68H of FIG. 68. 704 in FIG. 70 is the DG 8-phase winding, corresponding to 68J of FIG. 70 corresponds to 68H of FIG. 68. 70P in FIG. 70 is the EA8-phase winding, corresponding to 68K in FIG. 68. K of FIG. 70 corresponds to 68J of FIG. 68. 70A in FIG. 70 is the FB 8-phase winding and 70Q is the FB/8-phase winding, corresponding to 68L in FIG. 68L of FIG. 68. 70B in FIG. 70 is the GC 8-phase winding, corresponding to 68 M, which corresponds to 68L in FIG. 68.

The rotor windings in FIGS. 70 and 68 are 14 full pitch windings, as are the stator windings, for ease of explanation. The rotor winding 706 in FIG. 70 corresponds to WR18 in FIG. 68. The rotor winding of 70S in FIG. 70 corresponds to WR28 in FIG. 68. The rotor winding of 70T in FIG. 70 corresponds to WR38 in FIG. 68. The rotor winding of 70U in FIG. 70 corresponds to WR48 in FIG. 68. The rotor winding of 707 in FIG. 70 corresponds to WR58 in FIG. 68. The rotor winding of 70M in FIG. 70 corresponds to WR68 in FIG. 68. The rotor winding of 70R in FIG. 70 corresponds to WR78 in FIG. 68. As mentioned above, a large number of rotor windings, including a large number of primes, is preferable from the viewpoint of torque ripple reduction, etc.

Figure 74:
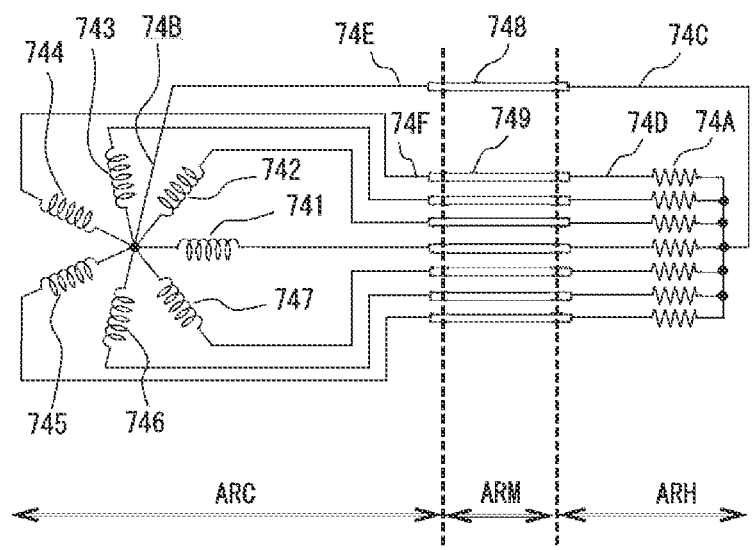
FIG. 74 shows an electric circuit diagram and ranges, which are provided with superconducting rotor windings.
Figure 75:
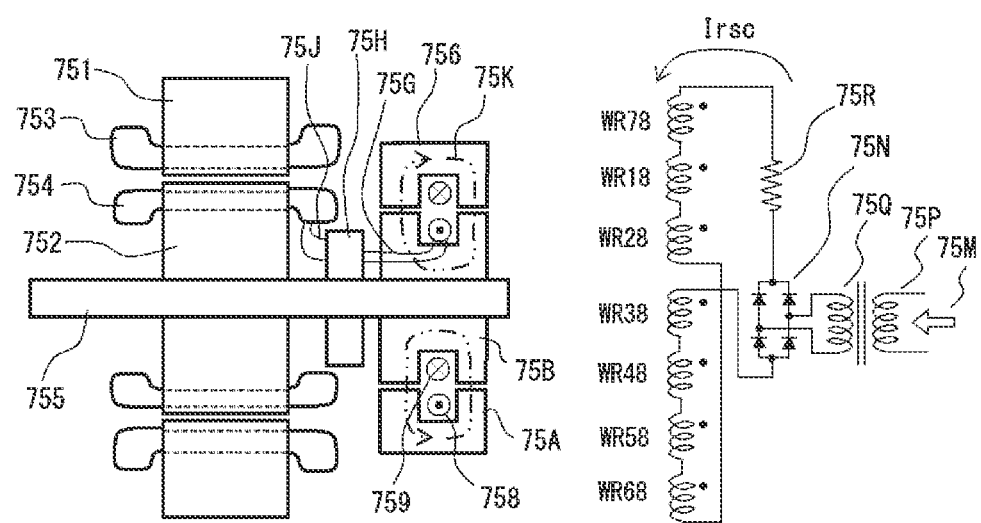
FIG. 75 shows the superconducting rotor windings and rotor current supply means.

Next, current is energized to the stator and rotor windings, and the relationship between the current distribution, the magnetic flux distribution, and the force generated is shown in FIGS. 70, 71, and 7 2, and will be explained in the following paragraphs. Note that the thirties mode is a motor with superconducting windings, but the explanations in FIGS. 70, 71, 72 and FIG. 73 are explanations of electromagnetic action and are not limited to superconducting windings. However, since superconducting windings have 0 [Ω] resistance and a small cross-sectional area due to the high current density, FIGS. 60, 62, 63, 63 FIGS. 60, 62, 63, 63, 68, 76, 77, etc., can be applied to these motors to compensate for their shortcomings and to make them better motors. This makes it possible to compensate for the disadvantages of these motors and make them even better motors. The example in FIG. 74, which operates as an induction motor, and the example in FIG. 7-5, which supplies current externally to the rotor winding, are shown as examples of how current is supplied to each superconducting winding of the motor shown in FIG. 68. 5, in which current is also supplied to the rotor windings from an external source. In the case of FIGS. 74 and 75, the connection relationship of each rotor winding is not limited here. As mentioned above, the motor in FIG. 68 is a superconducting winding, so this is an example where the winding cross-sectional area is reduced and the width of each tooth and the thickness of the back yoke are increased.

As mentioned above, FIG. 70 is a linear expansion of FIG. 68 and considers a very simple example of energizing each current. In FIGS. 70, 70A and 70Q are full pitch winding(s) energizing FB 8-phase currents. The positive excitation current component IsffbFX [Axturn] is energized as shown by the current symbols, and the field flux components 70L, 70C, 70D, etc. are generated. The positive current Ir8 [Axturn] is energized from the front side to the back side of the paper to the rotor windings of the current symbols marked with X and circle. 7 Ir8 is the product of the energized current and the number of turns [Axturn]. The product of the energized current and the number of turns [Axturn] is used to represent the current. The current Ir8 [Axturn] is energized from the back side of the paper to the front side for the rotor windings with current symbols marked with dots and circles 707, 70T, 70U, etc. The two rotor windings 70M and 70N The current value of the two rotor windings 70M and 70N is 0 [Axturn]. Since these rotor windings are examples of full pitch winding(s) and are short-circuited windings connected at a pitch of 180° electrical angle, the currents in the remaining six rotor windings not described are also specified.

The current energized to the stator windings is the opposite rotor through the air gap, except for the FB8 phase currents of 70A and 70Q described above. From 703 in the AB8 phase winding to 705 in the AB/8 phase winding, the AB8 phase current IsrabFX=Ir8 The AB8 phase current IsrabFX=Ir8 [Axturn] is energized from 703 of the AB8 phase winding to 705 of the AB/8 phase winding. As explained earlier, the linear development in FIG. 70 corresponds to the view from the back side of the paper of the cross-sectional view in FIG. 68, so the 703 of the AB8-phase winding When the AB8 phase current IsrabFX of phase 3 is positive, the current flows from the back side of the paper in FIG. 70 to the front side, and as shown in the figure, the current symbol 703 is negative. Similarly, to the BE8 phase winding 708, BE8 phase current IsrbeFX=Ir8 [Axturn], to the CF8 phase winding 709, CF8 phase current IsrcfFX=−Ir8 [Axturn], DG8 phase current IsrdgFX=−Ir8 [Axturn] to DG8 phase winding 704, EA8 phase current to EA8 phase winding EA8 phase current IsreaFX=−Ir8 [Axturn] for EA8 phase winding 70P, GC8 phase current IsrgcFX=−Ir8 [Axturn] for GC8 phase winding 70B The phase current IsrgcFX=Ir8 [Axturn] is energized to the phase 70P. Each current is expressed as the product of the current value actually energized and the number of turns [Axturn]. The direction of each current is the direction of the current symbols in FIG. 70: FB8 phase winding 70A and FB/phase winding 70 Q are energized with the aforementioned FB8 phase current IsffbFX [Axturn], and the currents in 70M and 70N are 0 [Axturn], and the magnitude of the current in the other windings is Ir8 [Axturn]. Although this is a simple example of energizing, normally the field excitation current component and torque current component are superimposed, distributed, and vary with rotor rotation to energize each stator winding.

FIG. 70 shows the distribution of magnetic flux in the aforementioned energized state with dashed and double-dotted lines. The negative values of the excitation current components IsffbFX [Axturn] in the above 70A and 70Q allow the x si C, 70L, 70D, etc., to generate the field magnetic fluxes φrad shown by the double-dashed lines. These field fluxes φrad are the radial direction flux components φrad in the air gap section of the motor in FIG. 68. Other than the aforementioned excitation current components IsffbFX, the stator and rotor current components in FIGS. 70, 70F, 7 0H, 70E, 70G, etc., the magnetic flux component φcir shown by the dashed line is generated. 70F, 70H, 70E, 70G, etc. These field fluxes are the circumferential direction flux components φcir in the air gap section of the motor in FIG. 68.

Figure 71:
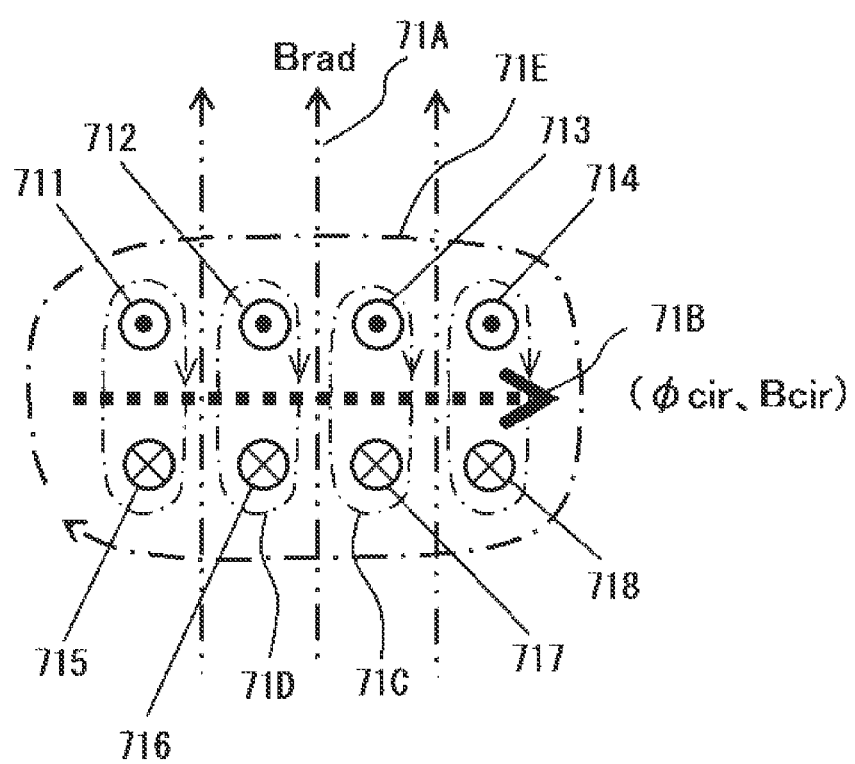
FIG. 71 is an illustration of rotor currents and rotor current components of the stator.

Next, the aforementioned 70C, 70L, 70D etc. in FIG. 70, and the magnetic flux component φrad in the radial direction and the magnetic flux component φcir in the circumferential direction, such as the above 70F, 70H, 70E, etc. 70E, 70G, etc. in the circumferential direction and φcir and the strength of the magnetic field [A/m] generated by each current are considered, FIG. 70 is shown in FIG. 71, which is partially enlarged. Also shown in FIG. 72 is a portion of FIG. 71, which shows the basic configuration of the force generation and its action.

The configuration in FIG. 71 is a cross-sectional view configuration of approximately the center portion of FIG. 70, with a space containing four stator windings 711, 712, 713, 714 712, 713, 714 and four rotor windings 715, 716, 717, and 718 and their respective energizing currents are shown. A negative current −Is9 [A×turn] is energized to each stator winding, and a positive current Ir9=Is9 [A×turn] is energized to each rotor winding. 711 and 713 in FIG. 71 are equivalent to 70B and 703 in FIG. 70. 715 and 717 in FIG. 71 correspond to 70R and 706 in FIG. 70. correspond to 70R and 706 in FIG. 70.

Figure 72:
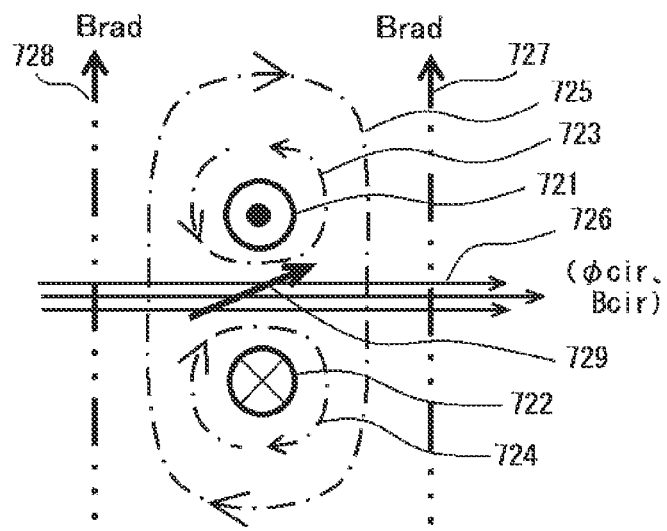
FIG. 72 is an illustration of rotor currents, rotor current components of the stator, and field magnetic fluxes.

FIG. 72 shows a portion of FIG. 71 taken out and enlarged; 721 is the stator winding, FIG. 713 in FIGS. 71 and 70 in FIG. 70. 722 is the rotor winding, corresponding to 713 in FIGS. 71 and 706 in FIG. 70. And in the configuration of FIGS. 71 and 72, as shown by 72A, 727 and 728, the field flux φm9 [Wb] is given from the bottom side of the paper to the top side, and the flux density is assumed to be Brad [T].

The strength of the magnetic field H [A/m] and the magnetic flux density B [T] in the surroundings in these conditions and states in FIGS. 71 and 72 are considered based on Ampere's law of integration around the circumference, etc. The integral of the magnetic field strength H [A/m] along the one-pointed circumferential path in FIG. 71C, where the current passing through (−Is9+Is9)=0, so it is zero, and the magnetic flux p [Wb] that follows that path is also zero. Similarly, the integral value of the magnetic field strength H [A/m] of the left and right single-pointed circumferential paths in 71D, etc., and the magnetic flux p that follows that path are also 0. The integral value of the magnetic field strength H [A/m] of the circumferential path of the single-dashed line in 71E, which is drawn around the eight windings in FIG. 71, and the magnetic flux p that follows that path are also zero. The magnetic flux φ traversing that path is also zero, as well. The paths of 71C in FIGS. 71 and 72 The integral value of the magnetic field strength H [A/m] of the circumferential path of the dotted chain line and the magnetic flux φ tracing that path are also zero.

The current 721 chaining the path of 723 in FIG. 72 flows from the back side of the paper to the front side of the paper. As described above, Is9[A×turn] is flowing, and the integral of the magnetic field strength H[A/m] of the one-pointed circumferential path is Is9[A×turn]. The current 722 chaining the path of ne4 is Ir9=Is9 [A×turn] flowing from the front side of the paper to the back side, and the integrated value of the magnetic field strength H [A/m] of the circumferential path of the single-dot chain is Is9 [A/m]. The integral value of the magnetic field strength H[A/m] of the one-pointed circumferential path is Is9[A×turn]. On the other hand, as mentioned above, the strength of the magnetic field H [A/m] of the circumferential path of 725 is 0 because the magnetomotive force [A×turn] of both currents in the chain cancel each other, and the magnetic flux of 72 The magnetic flux in the circumferential path of 5 is 0 [Wb]. Then, the magnetomotive force [A×turn] of both currents 721 and 722 acting in the same direction in which the magnetic flux component φcir of 726 is induced. Note that the direction of the magnetic flux component φcir of 726 is the same as that of the currents 721 and 72 The magnitude of φcir depends on the magnetic resistance of the entire magnetic flux path.

Also, 726 in FIG. 72 is the same as 71 in FIG. 71 B, and the magnetomotive force of each stator current and each rotor current in parallel in the circumferential direction in FIG. 68 is the dashed line 71B, acting in the direction of 71B. In FIGS. 68, 70, and 71, each adjacent stator current and each adjacent rotor current acts in the direction of the dashed line 71B in FIGS. 1 and 70E in FIGS. 70, and 70G, jointly excite the flux component φcir. Therefore, as can be seen from the flux paths of 70E and 70G in FIG. 70, each current The length of each magnetic path that shares the excitation is approximately the width of each winding interval in the horizontal direction on the paper surface of FIG. 70, which is relatively small. As a result, although this circumferential magnetic flux component φcir is a magnetic flux component that passes in the circumferential direction through the space of high magnetic resistance in the air gap, the circumferential magnetic flux density Bcir [T] can be a large value. However, the circumferential magnetic flux component φcir [Wb] is a small value because the radial gap of the air gap section, Lgap, is a small gap of about 0.5 [mm].

Next, in FIGS. 71 and 72, the effects of the magnetomotive force of each stator current and each rotor current on the radial flux component φrad and the magnetic flux density component Brad are explained. In FIG. 72, the magnetic flux in the circumferential path of 725 is zero, as described above, and the average effect on the radial magnetic flux component φrad is small. However, when a large torque is generated, the circumferential magnetic flux density component Bcir becomes a large value at the air gap. The magnetic flux density synthesized from the radial magnetic flux density component Brad and the circumferential magnetic flux density component Bcir is, for example, as shown in FIG. 729, and the direction of the magnetic flux changes significantly. The direction of the magnetic flux changes significantly. However, since the air gap length Lgap is a small value as described above, the radial direction magnetic flux component φrad in FIGS. 71 and 72 shifts only a small distance to the left and right on the paper. Therefore, it can be said that the currents in the eight windings shown in FIG. 71 have little effect on the average values of the radial direction magnetic flux component φrad and the radial direction magnetic flux density component Brad from a macroscopic point of view.

Next, let us return to the configuration of FIG. 70 and the relationship between FIGS. 71 and 72. The configuration near the air gap section in FIG. 70, as described above, has a part where the field flux φm is N-pole and a part where it is S-pole when viewed from the rotor side during 360° in terms of electric angle. The portion of the stator rotation angle position θcs from −90° to +90° is the N-pole portion, and the portion of θcs from +90° to 180°, that is, −90° through −180°, is the S-pole portion. And in the N-pole portion where θcs is from −90° to +90°, a negative current −Ir8 [A×turn] is energized in the stator winding and a positive current Ir8 [A×turn] in the rotor winding. θcs is from +90° to 180°, i.e., the S-pole section at −90° through −180° is energized with current in the opposite direction, respectively. Note that the FB8 phase currents IsfbFX [A×turn] of 70A and 70Q in the full pitch winding(s) are negative field The negative field excitation current is energized.

FIG. 71 shows the N-pole area near the air gap in FIG. 70, viewed from the rotor side, and the S-pole area is not shown in FIG. 71. Although not shown in FIG. 71, the direction of the magnetic flux and the direction of the current are exactly opposite. Therefore, in both the N-pole and S-pole portions viewed from the rotor side, the stator current component and the rotor current component are energized in opposite directions through the air gap. And since the field flux component φm is also in the opposite direction, the torque generation direction is the same in CCW. At this time, as explained in FIGS. 71 and 72, the aforementioned stator current and rotor current have almost no effect on the radial field flux φ m in the radial direction.

The direction of the composite magnetic flux of the radial direction flux component φrad and the circumferential direction flux component φcir in the air gap section in FIG. 70 is at the position where θcs is 0°, in the 70J The direction of the composite magnetic flux is in the direction of the arrow shown at 70J when θcs is 0°. At the position where θcs is 180°, it is in the direction of arrow 70K. Although the direction of the magnetic flux is 180° different between 70J and 70K, the attractive force generated by the magnetic flux is in the same direction, and the rotor has a positive θcs direction, i.e., a torque of CCW is generated in the rotor. The torque can theoretically be calculated, for example, by integrating the middle position of the air gap section in FIG. 68 in the circumferential direction using equation (193). However, the calculation method of equation (193) is difficult for engineers to perform by hand, and analytical calculations are usually performed by the finite element method using a computer. On the other hand, other methods to obtain torque are to calculate the current [A×turn] of each rotor winding in FIGS. 68 and 70, using the Lorentz force. It can be calculated and integrated using equations (191) and (192).

The main feature of the motors of FIGS. 68 and 70 and their energization method is that, as mentioned above, the stator current component and rotor current component, which are opposite each other and facing each other through the air gap, have almost no effect on the radial field flux φm and radial flux density component Brad. The stator current component and the rotor current component, which are opposite to each other, have almost no effect on the radial field flux φm and the radial flux density component Brad, respectively. The flux component of 69D due to the electromotive force generated by each stator current in the motor of FIG. 69 above is the same as the flux component of 69D in the motors of FIGS. 68 and 70. It does not occur when a specific current is energized in the motor of FIG. 70. As the stator current increases, the aforementioned magnetic flux component 69D also becomes a large value, and as mentioned above, the torque characteristic of the motor in FIG. 69 is shown in FIG. 73, 731, and the torque becomes a saturating characteristic.

On the other hand, according to the motor and its energization method shown in FIGS. 68 and 70, the 73 2 characteristic and a large torque can be generated. The circumferential force Fcir is proportional to the product of the field excitation current component and the other torque current components, as expressed in equation (193). Then, assuming no magnetic saturation and no internal losses such as copper loss in the motor, the theoretical torque is proportional to the square of the current, and the 73 2, which is a larger characteristic of the torque increase rate than the characteristic in FIG. 73. The most simplified basic configuration of the motor and its energization method in FIGS. 68 and 70 is the configuration in FIG. 72.7 The two currents with opposite positive and negative signs, 22 and 723, have a small effect on the radial magnetic flux density Brad because the magnetomotive force cancels. The circumferential magnetic flux density component Bcir can then be generated and rotor torque can be reliably generated.

Although not directly related, the configuration in FIG. 71 shares the same magnitude and opposing currents with a toroidal wire ring, toroidal coil, or a linearly expanded cross-section of what is called a cyclic solenoid. And this toroidal wire ring is well known as a typical configuration that efficiently generates magnetic flux. In other words, the configuration in FIG. 71 can generate circumferential magnetic flux φcir and circumferential magnetic flux density Bcir as efficiently as a toroidal wire ring.

In the configuration shown in FIG. 71 in the air, with the circumferential current density as Idens [A/m], the circumferential magnetic flux density generated in the air gap section as Bcir, and the radial magnetic flux density component of equation (191) as Brad, the Lorentz force, equation (191) can be transformed into the following formulae.

$$Bcir = \mu_0 \times H = \mu_0 \times Idens \quad (196)$$

$$F = B \times I \times L \quad (197)$$

$$= Brad \times Idens \times L$$

$$= Brad \times Bcir/\mu_0$$

In the configuration shown in FIG. 71, the circumferential current density Idens [A/m] is equal to the strength of the circumferential magnetic field H [A/m] in the air gap section. Substituting equation (196) into equation (191), which is the Lorentz force, (19 Equation (7) is consistent with equation (193). That is, if the configuration and energization method in FIGS. 70 and 71 are limited, the torque equation (197), which is derived from the Lorentz force, is equal to equation (191) and equation (196), which is the Lorentz force. (193), which is the torque equation derived from the Lorentz force, and equation (193), which is derived from Maxwell's stress equation, are consistent. Then, if the configuration and energizing method of FIG. 70 is used, the current component that excites Bcir of the equations (193) and (197) does not significantly affect Brad. As a result, a large torque can be generated without torque saturation, as shown in FIG. 73, 732.

This is the configuration of the induction motor shown in FIG. 73. The aim of the induction motor shown in FIG. 74 is to achieve a large torque as shown in FIG. 73-7-32 by optimizing the series resistance of the rotor winding and the leakage inductance of the rotor winding, as will be explained later. 32, by optimizing the series resistance of the rotor winding and the leakage inductance of the rotor winding, as will be explained later. The Joule heat at that time can be reduced, and the space problem of the rotor winding can also be reduced due to the high current density characteristics. FIGS. 60, 62, 64, 76, 7 7, FIG. 78, etc. can be more easily realized. If the rotor winding of a conventional induction motor is simply replaced with a superconducting winding, several problems arise. One of the problems is the basic problem that the rotor becomes a so-called superconducting electromagnet that prevents the magnetic flux from changing, making it impossible to control the field flux φm and rotor current Ir variably as an induction motor. To solve this problem, when resistors and inductors are added in series to the rotor winding of the superconducting winding, there is the problem of processing the Joule heat, etc. This can be complicated, as shown in FIG. 74. There is also the problem that the iron loss of the soft magnetic material and the heat generated by other peripheral components raise the temperature of the superconducting winding, making it impossible to maintain the superconducting state.

A superconducting winding is used for the wires. The motor configuration of FIG. 68 can be transformed to the configuration and shape shown in FIGS. 60, 62, 63, 64, etc. due to the problem of heat generation in the peripheral components of the superconducting windings and the need for cooling. The configuration and shape of the motor shown in FIGS. 60, 62, 63, 64, etc. can also be modified due to the heat generation of the superconducting winding peripheral components and the need for cooling. 741 in FIG. 74 is the rotor winding of the motor shown in FIG. 68. WR18, which is a full pitch winding(s). Similarly, 742 is WR28, 74 3 is WR38, 744 is WR48, 745 is WR 58, 746 is WR68, and 747 is at WR78; 74 A is an external 7 resistor RWA, which is connected in series with each rotor winding. Their resistance value is Rr [Ω]. The leakage inductance of the rotor windings and resistor RWAs is Lrw [H]. These resistance values Rr [Ω] and leakage inductance Lrw [H] can be selected according to the characteristics of the induction motor. 748 and 749 are 8 connecting conductors, which connect each rotor winding to each resistor.

The rotor windings of the seven full pitch winding(s) from 741 to 747 described above are connected at 7 One end of each rotor winding is connected at the part indicated by 4B. When the other ends of each rotor winding are also connected to each other and short-circuited, the resistance of the superconducting winding is 0 [Ω], so that if the chain flux changes, as described above, the current flows to compensate for the change in the chain flux, forming a so-called superconducting electromagnet. In order to operate as a rotor of an induction motor, a 74A resistor RWA is added. Without losses on the rotor side, the field flux cannot be changed. The higher the Rr [Ω] of the above resistance value, the more heat is generated, and there is a maximum value allowed. Efficiency as a motor also decreases. The circuit time constant Tr of the rotor is Lrw/Rr. If it is large, the phase delay of the rotor current relative to the field magnetic flux increases, causing a problem that reduces the maximum torque. These conditions optimize the values of resistance Rr [Ω] and leakage inductance Lrw [H] mentioned above. In particular, the value of leakage inductance Lrw [H] is highly dependent on the shape of the rotor iron core, so the choice of rotor structure is important. FIG. 68, FIG. 60, FIG. 62, FIG. 63, FIG. 6 4, etc., stator and rotor configurations can be selected and transformed.

Thus, proper selection of the motor configuration, utilization of superconducting windings, and proper selection of the resistance Rr [Ω] and leakage inductance Lrw [H] of the resistor RWA in 74A are very important to obtain that induction motor characteristic. A typical characteristic is the torque characteristic shown in FIG. 73. To obtain a large torque characteristic such as 732, the above rotor circuit time constant Tr=Lrw/Rr must be a small value. It is also necessary to make the resistance value Rr [Ω] of the 74A resistor RWA small in terms of heat generation reduction and efficiency improvement. It is also necessary to decrease the delay phase θs of the rotor current in FIG. 5, and to improve the torque characteristic 62 in FIG. 6 to the torque characteristic 66 shown by the dashed line. It is also to improve the torque characteristic of 66 shown by the dashed line in FIG. 6. By utilizing superconducting windings, the characteristics of the induction motor can be greatly improved, although the configuration is limited. In addition, the resistor RWA in FIG. 74, 74A, generates heat and must be thermally separated from each rotor winding. As shown in the various regions ARC, ARM, and ARH in FIG. 74, consideration must be given to heat generation, cooling, thermal shielding, temperature gradients, and heat conduction.

The aim of realizing the motor configuration of FIG. 68 and the energized state of each current shown in FIG. 70 with the rotor configuration of the induction motor of FIG. 74 is to realize a large torque as shown in 732 of FIG. 73 by optimizing the series resistance of the rotor winding and the leakage inductance of the rotor winding as described above. The aim of realizing the motor configuration of FIG. 68 and the current flow conditions shown in FIG. 70 with the rotor configuration of the induction motor of FIG. 74 is to realize a large torque as shown in FIG. 73,732, by optimizing the series resistance of the rotor winding and the leakage inductance of the rotor winding, as described above. In other words, the aim of the induction motor shown in FIG. 74 is to achieve zero resistance and high current density by applying a superconducting winding to a motor structure that does not cause torque saturation as shown in FIG. 70, resulting in a large synergistic effect is to achieve higher output, smaller size, and lighter weight of the induction motor. In addition, the Joule heat of the rotor winding is 0 and the space for the rotor winding can be reduced. To be a little more specific, the rotor current in a large current region such as shown in FIG. 73, 732, can be used as the energizing current shown in FIG. 70. In order to supply and energize the current as an induced current in a relationship close to the state, the series resistance and leakage inductance described above must be optimized. The idea is to supply a large rotor current from the stator side to the rotor winding as an electromagnetically induced current with a small phase delay as with respect to the field flux φm. If the large rotor current in the energized state shown in FIG. 70 is supplied by other methods, the rotor current supply system would be a large configuration. The induction motor shown in FIG. 74 can control the field flux φm, so field weakening control is possible, and constant power control and high-speed rotation control are also possible. On the other hand, in the case of a synchronous motor using a superconducting electromagnet, field weakening control and constant output control are difficult.

Note that in the induction motors shown in FIGS. 68, 70, and 74, the phase delay as of the rotor current relative to the field flux p m, the phase delay θs of the rotor current relative to the field flux φm causes the torque decrease, so the phase delay θs must be kept at a small value. The phase delay θs corresponds to the phase shift of the field flux φrad and the rotor current to the left and right of the paper surface in FIG. 70.

In addition, as will be described later, motors such as those shown in FIG. 68, FIG. 60, FIG. 62, FIG. 63, FIG. 64, etc., can be configured in the so-called outer rotor configuration, in which the rotor is placed on the exterior side. 64, etc., can be configured as the so-called outer rotor configuration, in which the rotor is placed on the exterior side, the motor configuration can be made without using soft magnetic materials or with greatly reduced soft magnetic materials, and the motor configuration can be made to serve as a magnetic bearing using the repulsive force generated by the current in the stator winding and the current in the rotor winding. It is also possible to use a motor configuration that also serves as a magnetic bearing using the repulsive force generated by the current in the stator windings and the current in the rotor windings. These are not limited to induction motors, but can be applied to the motor configuration shown in FIG. 75.

The following is an example of a thirty-second mode. Assume that in a motor using a superconducting winding, there occurs a region ARC of low temperature state where the superconducting state can be maintained, and a region ARH of relatively high temperature near a heat source such as the resistor RWA in FIG. 74A or near the drive circuit that supplies current to the stator. Of course, such an assumption is unnecessary if the cooling system can maintain the low-temperature state of superconductivity in the entire region shown in FIG. 74. Then, as shown in FIG. 74, consider a configuration in which an intermediate connection region ARM is provided between the aforementioned low temperature region ARC and high temperature region ARH, connecting the two regions. Here, the low-temperature region ARC must be in a low-temperature state that can maintain a superconducting state. There is a heat source in the aforementioned high temperature region ARH, and a certain degree of temperature rise is inevitable. And the heat conduction from the high temperature region ARH to the intermediate connection region ARM mentioned above should be small. In the intermediate connection region ARM, it is assumed that parts of the region where low-temperature conditions that can maintain a superconducting state cannot be ensured may occur, so it is necessary to have a normal conductor such as copper or aluminum with a large conductor cross-sectional area and low resistance characteristics for its current connecting conductor. In addition, winding with high-temperature superconducting materials, which can be used with liquid nitrogen cooling, is promising. In such cases, nitrogen in the air, the raw material for liquid nitrogen, can be procured in any quantity, even in special use environments, such as aircraft applications, for example. It is also possible to spray liquid or gaseous cooling substances from the stator side to each of the rotor sides. The cooling system is not shown in FIG. 74, but it cools the aforementioned ARC, ARM, ARH, and other areas.

As a concrete measure of the above requirement, eight connecting conductors, such as 748 and 749 in FIG. 74, are provided to the intermediate connection area ARM. Connecting lines such as 74C, 74D, etc. from said high temperature area ARH including heat sources such as resistors RWA, etc. to said connecting conductors.

Said connecting conductors 748 and 749 are composed of copper, aluminum, or other good conductors, and their cross-sectional area is at least twice the cross-sectional area of said connecting wires 74C and 74D to reduce Joule heat due to current flow. The heat generated by the connecting wires 74C and 74D should also be small, but the cross-sectional area of the connecting wires should be reduced so that the heat from the resistor RWA in 74A is not transferred easily. For example, if the average current density of said connecting conductors is 2.0 [A/mm2] or less, the average copper loss of said connecting conductors is relatively 16% or less, since the average current density of the windings of a motor with Class F insulation, totally enclosed structure and self-cooling is about 5.0 [A/mm2]. At the same time, said connecting conductors shall be configured and shaped for easy cooling with liquid nitrogen or the like to enhance cooling capability. As mentioned above, the connecting wires should be relatively thin to reduce heat conduction from the high temperature region ARH side as much as possible. Thus, the intermediate connection region ARM of the connecting conductor between the low temperature region ARC, where the superconducting winding is used, and the aforementioned high temperature region ARH, which includes heat sources such as resistors RWA, etc., ensures that the superconducting state of the superconducting winding is maintained. Since the entire motor is located in a limited space and its components are often relatively close to each other, it is important to consider heat generation, cooling, thermal shielding, temperature gradient, and heat conduction, as described above.

Next, there are several ways to implement the thirtieth mode, with the motor cross-sectional geometry of FIG. 68 and the stator current and rotor current energization conditions of FIG. 70. As mentioned above, the soft magnetic bodies of the stator and rotor can also be deformed. In both configurations, the technical point is the method of supplying rotor current. As an example of the thirtieth mode, a longitudinal section of the motor and the rotor current supply circuit are shown in FIG. 75. FIG. 75 is an example of the specific motor of FIG. 68.

751 in FIG. 75 is the stator and 753 is the coil end of the stator winding. 752 is the rotor and 754 is the coil end of the rotor winding. Cross-sectional views of 751, 753, 752, and 754 are shown in FIG. 68 above. The stator 751 and stator winding 753 in FIG. 75 are the stator 68T and each of the 7 phase full pitch winding shown in the description of FIG. 68. And as mentioned above, FIG. 70 is a linear expansion of the cross-sectional view of FIG. 68. FIG. 70 shows a specific example of energizing and the magnetic flux generated during the energizing process, as well as the specific torque generation and energizing methods.

756 is the stator of a single-phase rotating transformer, 758 is the annular stator winding of the rotating transformer 756, 75B is the rotor of the rotating transformer 756, 759 is the annular rotor winding, and 75K, the two-point chain, shows the magnetic flux acting. The right-hand side of FIG. 75 shows the energizing circuit for the rotor current in the 754 rotor windings, showing the relationship between the rotating transformer, full-wave rectifier circuit 75H, and each of the 754 rotor windings. 75P is the annular stator winding of the rotating transformer, which is the same as 758. 75Q is the annular rotor winding and is identical to 759. 75N is a full-wave rectifier circuit and 75H. WR78, WR18, WR28, WR38, WR48, WR58, and WR68 are the rotor windings of the same name in FIG. 68 and are examples of full-pitch winding rotor windings in FIG. 75.

Here, WR18 in FIG. 75 is the rotor windings 706 in the rotor rotation position of FIG. 70, and is energized with a positive current [A×turn], as explained above. Similarly, WR28 in FIG. 75 is the rotor winding of 70S in FIG. 70, which energizes a positive current. WR38 in FIG. 75 is the rotor winding of the 70T in FIG. 70, which energized a negative current. WR48 in FIG. 75 is the rotor winding of 70U in FIG. 70, which energizes negative current. WR58 in FIG. 75 is the rotor winding of the 707 in FIG. 70, which energizes a negative current. WR78 in FIG. 75 is the rotor winding of 70R in FIG. 70, which energizes positive current. WR68 in FIG. 75 is the rotor winding from 70M to 70N in FIG. 70, which energizes the negative current. In this case, the direction of the rotor currents in 70M and 70N will be the same as the direction of the FB8 phase currents in the stator's FB8 phase windings 70A and 70Q, and the field flux φm will be excited by the current components of both stator and rotor currents. Since these rotor windings are connected in series, the current Irsc of each rotor winding is the same. Alternatively, the current in WR68 from 70M to 70N can be set to 0 [A×turn], as in the example illustrated in FIG. 74.

The generation of each flux component and the generation of force in each rotor winding in the energized state of each winding shown in FIG. 70 of the motor in FIG. 75 is the same as the conditions and values described in FIGS. 68, 70, 71 and 74. However, as mentioned above, the 70M and 70N rotor currents of WR68 can be selected. In the case of the motor configuration shown in FIG. 75, there is a degree of freedom in the connection path of each rotor winding. Since the current-carrying current value and current direction of each rotor winding are fixed, the connection path to each rotor winding can be freely selected as long as the current direction is not changed. Therefore, the order of connection may be changed for reasons such as the manufacturability of the windings. For example, each rotor winding may be wound concentrically so that they do not intersect. The circumferential distribution state of the rotor current [A×turn] can also be selected by freely changing the number of turns of each rotor winding.

75R in FIG. 75 is a resistor, which functions similarly to resistor 74A in FIG. 74. That is, the voltage is generated at the time-varying rate of each of the chain-chain fluxes of each of the rotor windings WR78, WR18, WR28, WR38, WR48, WR58, and WR68 in FIG. 75, and acts like a superconducting electromagnet to maintain the total interlinkage flux. Resistor 75R is connected in series to generate losses so that the chain flux can be reduced. Therefore, the resistance of resistor 75R should be such that the field flux φm can be reduced at the required rate of decrease. Since the full-wave rectifier circuit 75N can also generate losses due to its voltage effect, if its reduction rate is sufficient, resistor 75R can be 0 [Ω] and is not necessary.

Next, the electromagnetic behavior of the motor in FIG. 75 is described. The motor in FIG. 75 can also operate as described in FIG. 70, but it will operate differently than an induction motor. The rotor current Irsc can be freely controlled by the single-phase AC voltage of 75M in FIG. 75. The 7-phase stator currents in FIG. 75 can be freely controlled for each phase current, as in FIG. 1 and FIG. 68. As explained in the example in FIG. 70 and elsewhere, among the currents in the stator, there is a current component [A×turn] that has the same magnitude as the current in the rotor but in the opposite direction of current flow. As shown in the current distribution in FIG. 70, the rotor side current of Icc is a generic term for the current distributed in the circumferential direction because each rotor winding is distributed in full-pitch winding, and the total current in each rotor winding at an electrical angle of 360° is 0 [A×turn]. Icc is the current component that flows in opposite directions with the same amplitude to the opposite rotor and stator windings through the air gap, as shown in FIGS. 70, 71, and 72. As explained in FIG. 72, the common current component Icc has almost no effect on the field flux φm because the magnetomotive force cancels out the stator-side current component and the rotor-side current component. On the other hand, the field current component If, which excites the field flux φm, is a different current component from the common current component Icc. This field current component If is also a generic term for the circumferentially distributed currents as shown in FIG. 70. If can then be energized on both stator and rotor sides.

The force generated in FIG. 75 is the Lorentz force of equation (191) between the field flux φm and each rotor side current. Here, each rotor side current is the common current component Icc on the rotor side and the field current component energizing the rotor side, which is a part of the field current component If. On the other hand, the Lorentz force in equation (191) acts in the opposite direction with the field flux φm and each stator side current. And eventually, it can be considered that a force acts between the stator and the rotor via the field flux φm. In the case of FIG. 1, the external product of that field current If and the field flux φm was considered to be zero and no force [N] is generated. However, when the field current component in FIG. 75 is energized on both sides of the stator and rotor, part of the field current component If is considered to generate force.

More accurate calculations can be made by magnetic field analysis using the finite element method, such as equations (193) and (194) derived from Maxwell's stress equation.

Various methods can be considered for motor current control in FIG. 75. One method is to first set the field flux φm from the torque command Tc and the rotor rotation angular velocity ωr. Next, the field current component If that generates the field flux φm is set. This field current component If can be shared by both the stator and rotor windings. Next, the rotor current Irsc is set from the torque command Tc and the field flux φm. Then, the common current component Icc is obtained from these currents and set. The stator current is the sum of a portion of the field current component If and the stator side current of the common current component Icc. In this way, the command values for each phase current of the stator and the rotor current Irsc can be obtained to drive the motor shown in FIG. 75. The control of the motor in FIG. 75 differs from the block diagram in FIG. 2 in the control of the rotor current Irsc, the common current component Icc, etc. In the motor in FIG. 75, there is no slip angular velocity ωs of the induction motor.

As explained above, the motor in FIG. 75 is a motor that is controlled by energizing the excitation current component If of the field flux φm in both the stator and rotor windings, the common current component Icc, and the rotor current Irsc. As described above, constant output control is possible by field weakening control of the field flux φm, and high-speed rotation control is also possible. However, the rotating transformer shown in FIG. 75, a single-phase AC voltage source 75M for driving the field excitation current input to the rotating transformer, a full-wave rectifier circuit 75H, and a resistor 75RR are required. The power consumption of the rotor winding 754 is small, and the use of a larger frequency for the aforementioned single-phase AC allows for a smaller rotating transformer. The turn ratio of the rotating transformer can be selected so that each phase current of the rotor windings 754 can be increased to a higher current. In that case, the number of turns of each phase winding of the rotor winding 754 can be simplified to 1 [turn], for example. FIG. 75 shows an example of a motor with the cross-sectional configuration of FIG. 68, but motors with configurations such as FIGS. 60, 62, 64, 76, 77, and 78 can be applied.

The use of a rotating transformer, as shown in FIG. 75, with the rotor windings connected in series to supply the DC rotor current Irsc can also be achieved in other ways. For example, instead of a rotating transformer, etc., a DC current drive circuit and brushes and slip rings can be used to supply the rotor current Irsc. It is also possible to add and wind an additional excitation winding WPS with a winding pitch of an integer multiple, such as twice that of the stator winding in FIG. 75, or to divert the stator winding to form an excitation winding WPS and supply AC voltage for the rotor current from the stator side to the rotor side. Then, on the rotor side, a secondary winding for receiving power with the same winding pitch as the excitation winding WPS and a rectifier circuit can be provided to supply the rotor current Irsc. The stator winding and the excitation winding WPS have different winding pitches (integer multiples), so they do not affect each other electromagnetically and can act independently. Thus, the rotor current Irsc in FIG. 75 can be supplied in other ways.

The state of FIG. 70 qualitatively shows and describes a particular simplified state. When the rotor actually rotates, the field flux φm rotates in the circumferential direction and acts equivalently at their average value, although the current in the stator winding is configured to be discretely arranged in the circumferential direction. In the energized state as shown in FIG. 70, in the boundary region where each current in the circumferential direction switches positive and negative signs, in most cases, the excitation current component If and the torque current component It are superimposed and energized, which is more complicated than the situation shown in FIG. 70. Torque is obtained by integrating the circumferential force Fcir in the circumferential direction in equation (193), and the circumferential distribution state of each current has a complex relationship such as a trapezoidal wave shape, which cannot be simply expressed by dividing the excitation current component If and torque current component It. However, the method of qualitatively understanding the field excitation current component If and the rotor current component Ir separately is easy to understand and useful, and although it remains a little ambiguous, it is used in the explanation of this disclosure.

The following is an example of the thirty-third mode. One parameter that is usually determined in the early stages of motor design is the ratio of magnetic loading to electrical loading, which is assumed here as 50% and 50% as a typical example. Specifically, it is the ratio of the circumferential tooth width of the stator to the circumferential tooth width of the slot that houses the winding. Since the approximate output of a motor is proportional to the product of the magnitude of the magnetic flux and the current, the motor output is greater when the magnetic loading and electrical loading are 50% and 50%. Now, the thickness of the outer back yoke should be the minimum thickness required to make the motor compact and lightweight. With respect to the shape of the motor, if the length of the entire circumference of the air gap section is Lgcir, and the pole logarithm of the motor is Pn, and the magnetic loading is 50%, the thickness of the outer back yoke, Mby, is a little larger than Lgcir/(8×Pn). At that value, the magnetic resistance of the soft magnetic material of the back yoke section is not excessive due to the nonlinearity and magnetic saturation of the soft magnetic material, assuming the magnetic characteristics as shown in FIG. 7. On the other hand, if the thickness Mby the back yoke is made unnecessarily large, the motor will become larger and heavier in proportion to the square of the motor outer diameter, and material costs will also increase.

As explained in FIGS. 70, 71, and 72 for the current energization method, each flux component, and the force component to be generated, FIG. 1, FIG. 68, and other motors show that the field flux φm is not affected by the magnetomotive force of the torque current component, and that the circumferential flux component φcir in the air gap section can be generated efficiently to increase the circumferential flux density component Bcir. Torque is shown in equations (193) and (195), and is calculated as the circumferential integration of the values expressed by Brad and Bcir, and explained that a large torque can be generated as shown in FIG. 73, 732. That is, even if each current is set to a large value, this characteristic does not result in torque saturation as in 731.

In a large torque region such as 732 in FIG. 73, each current value [A×turn] also becomes a large value, and even if the soft magnetic material has the magnetic characteristics shown in FIG. 7, the magnetic flux density at the tip of each tooth and at the air gap can be far above 2.0 [T]. And the magnetic flux density of the nonmagnetic part of the slot section also increases. In such a large torque range, rather than motor geometries with teeth, such as FIG. 1 and FIG. 68, configurations such as FIGS. 60, 62, 63, and 64, which allow a smaller distance Lgby the back yoke shown in FIG. 70, are more advantageous because the magnetic resistance at the operating point can be reduced and the average magnetic flux density can be increased. At this time, the magnetic flux passing through the back yoke increases, and it is effective to make the thickness of the back yoke Mby the following equation.

$$Mby > Lgcir/(6 \times Pn) \tag{198}$$

Furthermore, when the percentage of magnetic loading is greater than 50%, the value of the back yoke thickness Mby is proportionally larger, such as Lgcir/(4×Pn) or more.

In the case of motor configurations such as FIGS. 60, 62, 63, and 64, there are problems with the holding and fixing strength of each winding, and the rotor can be placed on the exterior side, the so-called outer rotor motor configuration. In that case, the back choke thickness on the exterior side is the thickness of the back yoke of the rotor. In addition, when superconducting windings are used, the current density can be increased and the winding cross-sectional area can be reduced. And since the distance Lgby between the back yokes is small, motor configurations such as FIGS. 60, 62, 63, and 64 are advantageous. These motor configurations are not limited to induction motors, but are also common to motors such as FIG. 75.

The following is an example of a thirty-fourth mode. In a large torque range as described above, each current value [A×turn] is also a large value, and with the winding arrangement and energization method as shown in FIG. 70, it is possible to eliminate soft magnetic materials such as each tooth of the stator, the back yoke of the stator, the teeth of the rotor, and the back yoke of the rotor, as shown in FIG. 76. 767 is the rotor shaft, 762 is the rotor winding, and 761 is the stator winding. 763 and 765 are space, or nonmagnetic, or materials with small specific permeability. In a real-world configuration, 763 and 765 would be composed of several types of components, including soft magnetic materials, for example, the average of which has a specific permeability of less than 100. The specific magnetic permeability of ordinary electromagnetic steel sheets is about 1000 or higher, and in comparison, the average magnetic permeability is less than 1/10th. 764 and 767 are magnetic shielding, etc., and will be discussed later.

The energizing method of FIG. 76 means that the field flux component φm due to the field excitation current component If generates a radial flux density component Brad in the air gap section, as described above in FIG. 70. The torque current component It then energizes both the stator winding and the rotor winding with the equivalent same current amplitude and in opposite directions [A×turn] through the air gap to generate a circumferential magnetic flux density component Bcir at the air gap. The force component generated in the air gap section is then expressed by equations (193) and (194), and the torque component by equation (195). The total torque of the motor can be obtained by integrating equation (195) over the entire motor circumference. Here, as can be seen from equation (193), a small circumferential phase shift between the radial direction magnetic flux density component Brad and the circumferential direction magnetic flux density component Bcir is also required. Here, in particular, in the winding arrangement and energizing method as shown in FIG. 70, it is important that the circumferential magnetic flux density component Bcir can be created efficiently, and that the field magnetic flux component φm and the radial magnetic flux density component Brad in the air gap section are less adversely affected by the torque current component It.

In the case of the induction motor with the motor configuration shown in FIG. 76, there is a feature that the leakage inductance Lrw of the rotor winding can be reduced with respect to the characteristics of the rotor current Ir shown in equation (77). As a result, excellent torque characteristics such as increased maximum torque can be obtained, partly because the phase delay θs in FIG. 5 can be reduced. In particular, it is characterized by a large torque range where the magnetic flux density exceeds 2 [T]. Moreover, the motor is not limited by the saturation flux density of the soft magnetic material. In addition, the configuration shown in FIG. 76 removes the heavy soft magnetic material, which makes the motor lighter. However, although not shown in FIG. 76, the peripheral members of the stator and rotor windings must be composed of non-magnetic materials, and they must be held and fixed firmly. On the other hand, the motor configuration in FIG. 76 has the problem that the motor becomes larger in the small torque range because the field excitation current component If and torque current component It increase and copper loss increases. For short-time high-torque output, the winding can be used until the temperature rises, but if the output time becomes long, a forced cooling device or other means will be required.

A magnetic material such as shown in 764 and 767 can also be added to the configuration shown in FIG. 76. One of its purposes is magnetic shielding so that the electromotive force generated by the motor does not leak outside. It is also possible to have the magnetic elements 764 and 767 carry part of the function of the back yoke. That motor configuration is also an intermediate motor configuration between FIG. 62, and the distance between the stator winding 761, rotor winding 762, and the magnetic elements 764 and 767 can be selected. In this case, the current burden of the field excitation current component If and the torque current component It can be reduced, thus alleviating the problem shown in FIG. 76.

Superconducting windings can also be used for the stator winding 761 and rotor winding 762 in FIG. 76. In that case, the aforementioned copper loss problem can be solved. It can generate large torques as shown in FIG. 73, 732. In addition, since superconducting windings can increase the current density, the winding space can be reduced, making the motor smaller and lighter. When the magnetic elements 764 and 767 are made to carry part of the function of the back yoke, the current burden of the field excitation current component If and torque current component It can be reduced. And since iron loss and heat generation of the soft magnetic material become problems when superconducting windings are used, the back yoke configuration can be made with an appropriate amount of amorphous steel plate with low iron loss. However, to maintain the superconducting state, a cooling system using liquid nitrogen or the like is required. If the motor in FIG. 76 is an induction motor, variable control of the field flux is necessary, and the motor configuration is as shown in FIG. 74, for example. The motor in FIG. 76 can also be configured as the motor shown in FIG. 75. It is also possible to add the function of a non-contact bearing, which will be described later, to use a superconducting wire-wound electromagnet for the rotor, or to convert it into a linear motor to achieve magnetic levitation.

Figure 77:
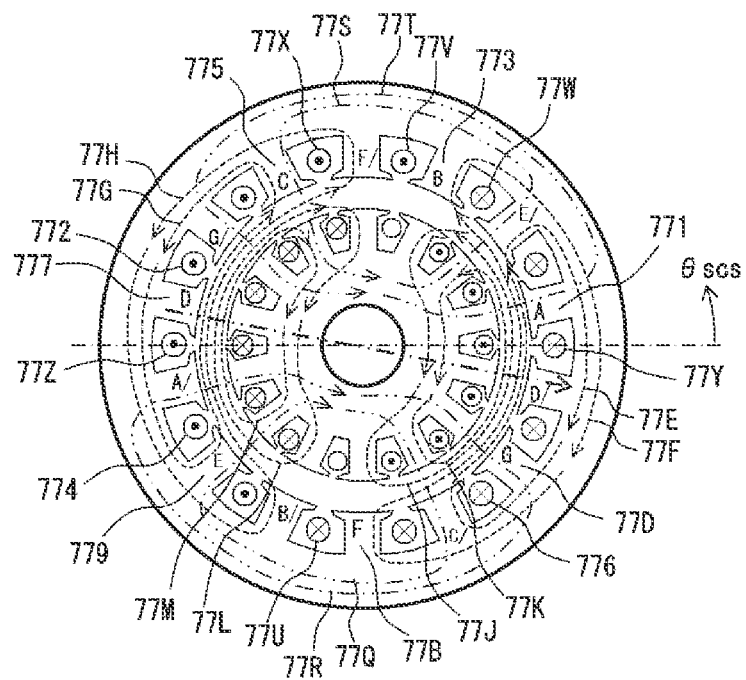
FIG. 77 is a sectional view of a motor in which an air gap is enlarged and displayed.
Figure 78:
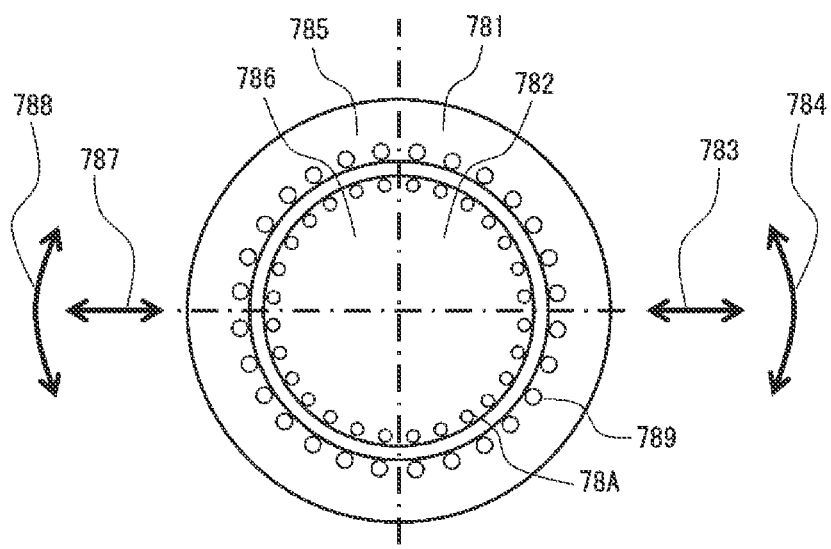
FIG. 78 exemplifies a two-pole pair of motor provided with a magnetic bearing function.
Figure 79:
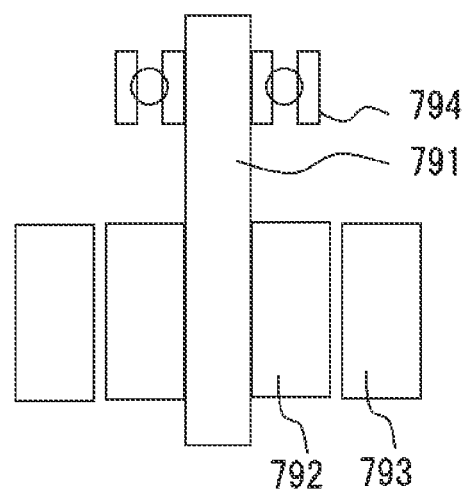
FIG. 79 shows a rolling bearing and a magnetic bearing.

Next, examples of a thirty-fifth mode are shown and explained in FIGS. 77, 78, and 79. The stator current and rotor current generate, among other things, a repulsive force component acting between the stator and rotor, which constitutes a non-contact magnetic bearing that controls the rotor shaft position without contact. At the same time, the stator and rotor can generate a torque component as a motor. That is, it is a motor that also serves as a non-contact magnetic bearing. For example, in motor operation areas where the attractive force between the stator and rotor is limited, the repulsive force can be effectively utilized to control the non-contact magnetic bearing. When a non-contact magnetic bearing is configured primarily by repulsive force, it is also possible to configure a non-contact magnetic bearing by passive self-aligning action, without active control misalignment compensation control for misalignment of the rotation axis. Space can be reduced by having the motor also function as a non-contact magnetic bearing. The non-contact magnetic bearings can reduce vibration noise, increase bearing reliability and service life, and reduce maintenance work.

FIG. 7 is a cross-sectional view of the motor and is in the same form as the motor in FIGS. 1, 68, 70, etc. It can also be further transformed into motors such as those shown in FIGS. 60, 62, 76, etc. FIG. 77 shows, in particular, the air gap length Lgap between the stator and rotor magnified by a factor of 10 or more to show the magnetic flux distribution in the air gap section, which is the same as in FIG. 70. The energized state is the same as the linear expansion diagram in FIG. 70 described earlier, and the magnetic flux distribution state is also the same. However, as mentioned above, the linear development diagram in FIG. 70 is a linear development of the shape of FIG. 68 viewed from the back side of the paper, so the direction of each current is opposite in FIG. 70 and FIG. 77. For example, 703 in FIG. 70 is the AD8 phase winding and 77Y in FIG. 77 is the AD9 phase winding, same phase, same current, but the current symbols on the windings show opposite directions for negative and positive currents. Note that the model number of the motor in FIGS. 68 and 70 is 8, and the model number in FIG. 77 is 9, so the signs are different.

In FIG. 77, 771 is an A9 phase stator pole, 773 is a B9 phase stator pole, 775 is a C9 phase stator pole, 777 is a D9 phase stator pole, 779 is an E9 phase stator pole, 77B is a F9 phase stator pole, 77D is the a G9 phase stator pole. The stator and rotor windings in FIG. 77 are examples of full pitch winding. 77Y is an AD9 phase winding, 77Z is an AD/9 phase winding, 77W is a BE9 phase winding, 77X is a CF9 phase winding, 772 is a DG9 phase winding, 774 is an EA9 phase winding, 77U is a FB9 phase winding, and 776 is a GC9 phase winding.

The energizing currents for each winding in FIG. 77 are the same as in FIG. 70, which shows a very simple example of energizing. The energizing current of the six rotor windings on the right side of the paper in FIG. 77 is -Ir9 [A×turn], and that of the six rotor windings on the left side is +Ir9. The AD9 phase current in the AD9 phase winding 77Y of the stator in FIG. 77 is +Ir9 [A×turn], in the opposite direction of the rotor current facing through the air gap. Similarly, the BE9 phase current at 77W and the GC9 phase current at 776 are +Ir9 [A×turn]. The CF9 phase current in 77X, the DG9 phase current in 772, and the EA9 phase current in 774 −Ir9 [A×turn]. These rotor and stator currents excite the circumferential flux components of 77J, 77K, 77L, and 77M, as well as 77E, 77F, 77G, and 77H, as shown in FIG. 77. These circumferential flux components produce the circumferential flux density Bcir in equations (193) and (194) at the air gap.

77U and 77V in FIG. 77 are FB 9-phase full pitch winding, energizing the excitation current component IsffbFX [A×turn] as indicated by the current symbols to generate field flux components 77Q, 77R, 77S, 77T, etc. These flux components are radial direction flux components at the air gap, producing the radial direction flux density Brad in equations (193) and (194).

The forces acting relative to the stator and rotor are shown in equations (193) and (194). The torque component of the motor is shown in equation (193), while the radial attraction and repulsion forces between the stator and rotor are shown in equation (194). In the case of a conventional synchronous motor like the one shown in FIG. 69, the radial force between the stator and the rotor is known to be a suction force. However, as shown in FIGS. 70 and 77, if the winding arrangement is as shown in FIGS. 70 and 77 and the energizing current is controlled as described above in FIG. 77, the so-called armature reaction is hardly generated and the circumferential flux components 77E, 77F, 77G, and 77H can be generated efficiently. As a result, Bcir can be large, and the all-around average of the value in equation (194) can be positive, which can also generate a repulsive force between the stator and rotor. It is well known that this similar action generates an attractive force when the two parallel line currents are energized in the same direction and a repulsive force when they are energized in opposite directions, as shown in FIG. 72. The repulsive force in this FIG. 72 is the force considered by the Lorentz force in equation (191). On the other hand, the aforementioned suction force in the SPMSM in FIG. 69 is conventional motor common sense and acts differently from the repulsive force in FIG. 72.

Next, an example is shown in FIG. 78 to illustrate how to use the force generated by the motor in FIG. 77 to generate a radial force in any direction relative to the rotor shaft to form a non-contact magnetic bearing. The cross-sectional view in FIG. 78 is a motor configuration that includes two pairs of motors, one with two poles and the other with four poles, as shown in FIG. 77. On the paper side of FIG. 78, the right side of the dotted line contains one motor configuration with a circular width of 360° in electric angle, and the left side contains another motor configuration with a circular width of 360° in electric angle. 781 is the first stator, 782 is the first rotor, 785 is the second stator, 786 is the second rotor, 789 is the stator winding, and 78A is the rotor winding.

On the paper side of FIG. 78, the first motor on the right side of the one-pointed line can generate and control suction and repulsion forces, as well as circumferential forces, as described in FIG. 77 and equations (193) and (194). The same is true for the second motor on the left side of the one-dot line. The two motors are controlled in concert and can be controlled arbitrarily in the left/right and up/down directions on the paper in FIG. 78. Here, the stator current control of the first motor and the stator current control of the second motor are independently controlled by different drive circuits. For example, to generate the force Fradh acting on the right side of the paper to the rotor in FIG. 78, increase the force Fradh1 in equation (194) of 783, which is the attraction and repulsion force of the first motor, and at the same time, we can increase the 787 force Fradh2, which is the suction and repulsion force of the second motor, and control it as in the following equation.

$$Fradh = Fradh1 - Fradh2 \quad (199)$$

To generate the force Fradv acting on the upper side of the paper to the rotor in FIG. 78, we can generate the force component Fradv1 of equation (193) of 784, which is the CCW direction force of the first motor, and at the same time generate the CW direction force component Fradv2 of the second motor, and control as follows.

$$Fcirv = Fcirv1 - Fcirv2 \quad (200)$$

However, care should be taken because if Fcirv1 and (−Fcirv2) do not have the same value, the force Fcirv that should work on the upper side of the paper will be in the inclined direction. Conversely, however, Fcirv1 and (−Fcirv2) are set to different values, and a force component in the left-right direction in the paper plane can also be generated and applied.

Thus, basically, the two-pole pair of motors can be controlled arbitrarily in the left/right and up/down directions on the surface of the paper in FIG. 78. At this time, the calculation of each current value becomes complicated because rotational torque must also be superimposed as a function of the motor. That is, the current component related to torque must be energized and the conditions of equations (199) and (200) must be satisfied at the same time. In addition, in applications where non-contact magnetic bearings are used effectively, motor speeds are usually high, and field weakening control and constant output control are often used. In such applications, the circumferential magnetic flux density Bcir in equation (194) can be used to effectively use the radial direction force because of the restriction of the field flux φm. The degree of freedom of control can be further increased by multipolarizing the motors in FIG. 78 to 4-pole pairs or 8-pole. In the aforementioned non-contact magnetic bearing configuration, safety measures such as installing touchdown bearings are prerequisites for practical application.

When the rotor is supported by a non-contact magnetic bearing, the configuration shown in FIG. 78 must be placed at two locations in the rotor axial direction. In this case, the motor in FIG. 78 must be divided into two parts in the axial direction. In such cases, there is the problem of overall size and complexity. Another idea is to use a conventional non-contact magnetic bearing on one side as a non-contact magnetic bearing. One practical configuration proposal is the one shown in FIG. 79. 791 is the rotor shaft, 792 is the rotor in FIGS. 78, and 793 is the stator in FIG. 78. 794 is an example of a rolling bearing. It also takes loads in the thrust direction. If the mechanical unbalance in the vicinity of the rolling bearing 794 is adjusted as precisely as possible, even if some unbalance remains in the vicinity of the motor rotor 792, the motor can rotate quietly due to the spherical alignment action. As a result, even if a rolling bearing is used on one side, vibration noise reduction, higher bearing reliability, and longer bearing life can be achieved, and space can be reduced compared to conventional non-contact magnetic bearings.

The induction motor shown in FIG. 1, etc. can be used as the motor in FIG. 77. The motor may also be configured to supply current to the rotor windings, as shown in FIG. 75 and elsewhere. The motor configuration in FIG. 77 can also be shown in FIGS. 60, 62, 64, 67, 68, 74, 75, 76, etc. Superconducting windings can also be used as stator and rotor windings. In particular, superconducting windings have a large maximum current density [A/mm2] and the cross-sectional area of the windings can be reduced, making it possible to confine the circumferential magnetic flux shown in FIG. 77 to a narrow space near the air gap. The effect of the non-contact magnetic bearing due to the passive self-aligning action when the rotor shaft is off-center can then be increased. The prerequisite is that a large repulsive force is generated at this time. The motor configuration in FIG. 77 can also be transformed into a linear motor configuration, and the repulsive force can be utilized as a magnetic levitation force by using equation (194) as a large negative value. The winding configuration of the motor in FIG. 77 can also be changed to a circular winding with the windings wound in a circumferential direction. When the stator and rotor windings are annular windings facing each other through an air gap, and DC or AC currents in opposite directions are applied to each other, a repulsive force is generated and the effect of a non-contact magnetic bearing with passive self-aligning action can be achieved. In such a case, a linear motor that drives linearly in the direction of the rotor axis can also be used. The rolling bearing 794 in FIG. 79 can also be a combination of a radial direction bearing and a thrust direction bearing. Rolling bearings, plain bearings, solid bearings, or fluid dynamic bearings can also be used. When the gravity and load loads in FIG. 79 are applied in the downward direction of the paper surface, these forces also act like a self-aligning force, which is advantageous for the action of the bearings in 792 and 793.

The following is an example of the implementation of a thirty-sixth mode. In the motors shown in FIGS. 1, 60, 62, 64, 67, 68, 74, 75, 76, etc., the motor configuration has the rotor on the external side and the stator on the internal side. These motors have windings in the rotor, which are subject to large centrifugal forces at high speeds, which can cause strength problems. For example, in the case of the induction motor shown in FIG. 1, where the rotor is structured to insert the rotor winding into the rotor slot, the strength near the opening of the rotor slot is not large, and it is necessary to consider whether the rotor winding can withstand centrifugal force at high speed rotation. One of the countermeasures is a configuration in which the rotor is placed on the exterior side. An example of this specific configuration is the configuration of the second motor on the outer diameter side in FIG. 59. As explained earlier, the second rotor 595 is placed on the outermost diameter side and the second stator is placed on its inner diameter side. In particular, the 595 shown in the figure is the back yoke portion of the second rotor and is strong, so it can hold the centrifugal forces generated in the rotor windings 596 of the second rotor.

Conversely, if a motor configuration in which the rotor is placed on the exterior side is assumed, the centrifugal force problem is reduced and a new motor structure becomes possible. For example, even if the rotor slot geometry is open, as in the motor shown in FIG. 67, the rotor can be placed on the outer diameter side without problems as a motor configuration resistant to centrifugal forces. In the case of motor configurations such as FIGS. 60, 62, 63, 64, 65, and 66, the strength of the rotor winding and the structure holding the rotor winding may be small. In such cases, the rotor winding and its surrounding configuration can be held firmly by the back yoke of the rotor by placing the rotor on the outer diameter side. If a large torque can be generated, as shown in FIG. 73,732, an in-wheel motor that does not require a transmission to achieve a high torque can be made possible, and by driving the wheels directly with the motor rotor, a smaller, lighter, and lower cost characteristic of this disclosure can be achieved. Regarding the arrangement of the inner and outer diameter sides of the stator and rotor, there are many applications where it is more convenient to rotate the outer diameter side, such as fan applications.

Figure 80:
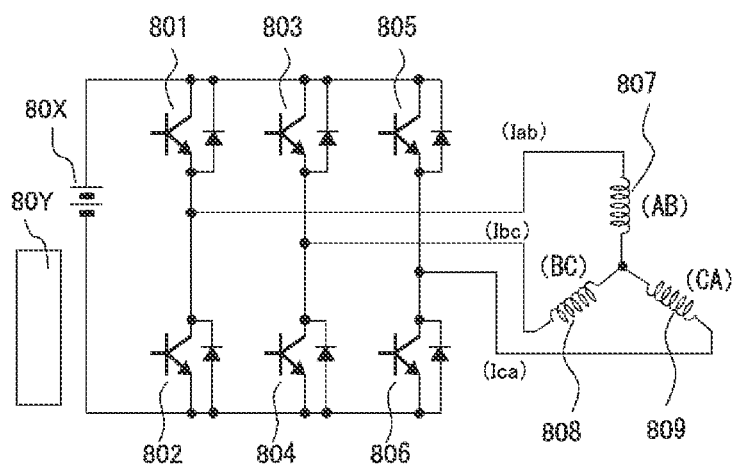
FIG. 80 shows a conventional 3-phase AC drive circuit.

Next, the example of a thirty-seventy mode will be described. The example in FIG. 88 was described earlier as a conventional induction motor. FIG. 80 is an example of a drive circuit that drives the induction motor in FIG. 88. 807 in FIG. 80 is the AB1 phase winding, which is the full pitch winding of 889 in FIG. 88, and energizes the AB1 phase current Iab. Similarly, the 808 in FIG. 80 energizes the BC1 phase current Ibc in the BC1 phase winding of 88A in FIG. 88. 809 in FIG. 80 is the CA1 phase winding of 88B in FIG. 88, which energizes the CA1 phase current Ica. 80X is the DC voltage source and 80Y is the motor control circuit. 801, 802, 803, 804, 805, 806 are power transistors.

The induction motors in FIGS. 80 and 88 assume 3-phase sinusoidal AC, with the following current constraints.

$$Iab+Ibc+Ica=0 \quad (201)$$

As shown in FIG. 3, the currents converted to the concentrated-pitch winding are Ia, Ib, and Ic, and the currents Iab, Ibc, and Ica for each full-pitch winding are decomposed into the phase currents Ia, Ib, and Ic for each stator pole, as follows.

$$Iab=Ia+Ib$$

$$Ibc=Ib+Ic$$

$$Ica=Ic+Ia \quad (202)$$

For example, assume that the rotor in FIG. 88 is stationary at zero speed, the torque is zero, and all of the current is the field excitation current component. The excitation current such that the field flux passes from the top to the bottom of the paper surface of the rotor in FIG. 88 is, for example, Ia=If, Ib=If, and Ic=−If, where If is a certain excitation current value. The magnetic flux density of the field magnet becomes uniform in the range of θscs from 0 to 180°, resulting in a rectangular wave-shaped field magnet flux density distribution in a linearly expanded form. The value on the left side of equation (201) is not 0, but 2×If. In other words, the drive circuit in FIG. 80 cannot generate a field flux in the form of a square wave because it deviates from the condition in equation (201). The drive circuit shown in FIG. 80 also has the problem that it cannot drive the excitation of a rectangular wave-shaped field, or even a trapezoidal-shaped field that is close to a rectangular wave. And similarly, the torque current component also has the problem of not being able to generate a square wave-shaped magnetomotive force in the circumferential direction. However, certain trapezoidal waveforms that satisfy the conditions of equation (201) can be driven by the drive circuit in FIG. 80. As a result, in the target distribution function Dist1 shown in FIG. 8, there is a problem that the sinusoidal wave distribution 84 can be driven, but trapezoidal wave distributions such as 81 and 82 cannot be driven.

On the other hand, as shown in FIG. 1 and the explanation of its operation, the present disclosure generates a flexible magnetomotive force on each stator pole according to a discretized discrete distribution function Dist2 for each stator pole derived from the target distribution function Dist1 to drive the motor efficiently. The magnetomotive force distribution can be freely controlled from a square wave distribution to various trapezoidal wave distributions and sinusoidal wave distributions, depending on operating conditions such as rotation speed and torque. Therefore, the current values of each phase must be controlled at will, and with the limitations of equation (201), those functions and control cannot be fully realized.

FIG. 82 shows an example of a drive circuit that drives the 7-phase induction motor in FIG. 1. The current value of each phase can be controlled without being constrained by the other phases. That is, the current in each phase is independent. 825 in FIG. 82 is the DC voltage source and 826 is the motor control circuit for the entire drive circuit. FIG. 82 shows a drive circuit that freely controls the voltage and current of a 7-phase motor. 82A, for example, is the AD2 phase winding 1F in FIG. 1. 821, 822, 823, and 824 are power elements such as power transistors, each with a diode in inverse parallel, that can apply a positive or negative voltage to winding 82A and conduct a positive or negative current. Its applied voltage and energizing current are not affected by the other windings as in equation (201), so they can be freely controlled and the aforementioned problems can be eliminated. 82K, 82L, 82M, 82N, 82P, and 82Q, shown in dashed lines, have the same configuration as 82J, shown in dashed lines, except for winding 82A. In the 7-phase induction motor example in FIG. 1, winding 82B corresponds to BE2 phase winding 1G, winding 82C to CF2 phase winding 1H, winding 82D to DG2 phase winding 1J, winding 82E to EA2 phase winding 1K, winding 82F to FB2 phase winding 1L, and winding 82G to GC2 phase winding 1M. Examples of various control methods and specific values for the voltage and current of each winding of the 7-phase induction motor in FIG. 1 were explained earlier.

Here, FIG. 81 shows examples of vectors of magnetomotive force vectors from 2 to 7 phases for the phases of the magnetomotive force applied by the stator poles of the motor to the rotor, and confirms again how each phase is named in the present disclosure, such as A, B, and C. In FIG. 81, (a) is 2-phase, (b) is 3-phase, (c) is 4-phase, (d) is 5-phase, (e) is 6-phase, and (f) is 7-phase. In all cases, the starting point is on the right side of the paper in FIG. 81, and the direction of each phase is defined in the order of the first quadrant, second quadrant, third quadrant, and fourth quadrant. Each phase is arranged in an equal circumferential distribution with respect to the center point. Then, at the 180° angular position of each phase, there is a vector of phases acting in electromagnetically opposite directions. In particular, the vectors of the odd-numbered phases 3, 5, and 7 are symmetrical about the center and equally distributed in the circumferential direction. In comparison, it should be noted that in the even-numbered phases of 2, 4, and 6 phases, the order of naming is not equally distributed in the circumferential direction.

For example, in the case of the 7-phase induction motor of FIG. 1, it corresponds to the vector in (f) of FIG. 81. As indicated earlier, 11 in FIG. 1 is the A2 phase stator pole, 12 is the A/2 phase stator pole, 17 is the D2 phase stator pole, and 18 is the D/2 phase stator pole. Then, the induction motor with the 7-phase full pitch winding configuration of FIG. 1 can be replaced with a theoretically equivalent induction motor with the 7-phase concentrated-pitch winding configuration of FIG. 3. The concentrated-pitch winding 31 and 32 in FIG. 3 are A2 phase concentrated-pitch windings, and normally, these are connected in series in the opposite direction, and the A2 phase current Ia is energized, and from Ampere's law, the magnetomotive force is applied only to the A2 phase stator poles 11 and A/2 phase stator poles 12, acting on the rotor. Similarly, the concentrated-pitch windings 37 and 38 are D2 phase concentrated-pitch windings, and normally, these are connected in series in the opposite direction, and the D2 phase current Id is energized, and from Ampere's law, the electromotive force is applied only to the D2 phase stator poles 17 and D/2 phase stator poles 18, acting on the rotor. Then, the AD2 phase current Iad energizing the AD2 phase winding of the full-pitch winding, which is placed in the slot surrounded by the A2 phase stator pole 11, A/2 phase stator pole 12, D2 phase stator pole 17 and D/2 phase stator pole 18 in FIG. 1, is as shown in equation (1).

$$Iad = Ia + Id$$

The AD2 phase current Iad also applies a magnetomotive force to all stator poles and rotors in FIG. 1 and has an electromagnetic effect, based on Ampere's law. Conversely, the converted A2 phase current Ia is subject to the electromagnetic effects of all full pitch winding currents in FIG. 1, according to Ampere's law, as shown in equation (15), which follows.

$$Ia = (Iad - Ibe - Icf - Idg + Iea + Ifb + Igc)/2$$

The relationship between phase naming, current naming, and electromagnetic action is as shown above.

The drive circuit in FIG. 82 should match the number of drive units shown by the dashed lines in FIG. 82 for the motor with the number of vectors and phases shown in FIG. 81. For example, for the 5-phase motor in (d) of FIG. 81, remove 82P and 82Q from the drive circuit in FIG. 82. For motors with 8 or more phases, an additional drive unit, indicated by the dashed line, should be added.

In terms of complexity of the drive unit, the drive circuit in FIG. 82 requires four transistors per phase, which is twice as many elements as the star-shaped wiring in FIG. 80, which requires two transistors per phase. However, the drive circuit in FIG. 82 can apply twice the voltage to each winding compared to the drive circuit in FIG. 80. Thus, the doubling of the number of elements can be offset by a doubling of the voltage. Therefore, for example, when considering the drive circuit of a 5-phase motor, the number of power transistors in the drive circuit in the configuration method of FIG. 82 is 20, while the number of power transistors in the drive circuit in the configuration method of FIG. 80 is 10, resulting in 20/10=twice as many power transistors in the configuration method of FIG. 82. However, in the configuration method shown in FIG. 82, the output voltage of each phase is doubled, so the current capacity of the power transistor can be halved. Therefore, the voltage-current capacitance of the drive circuit, expressed as (voltage of transistor×current of transistor×number of transistors) in the configuration method of FIG. 82, is the same for the configuration method of FIG. 82 and that of FIG. 80. For example, power transistors are often connected in parallel when driving motors larger than 50 [kW]. In that case, the only difference between the configuration method of FIG. 82 and that of FIG. 80 is the change in the connection between the power transistors, but not the number of them.

The product of square wave voltage and square wave current is twice the product of sinusoidal voltage and sinusoidal current, so theoretically and in terms of a simple model, the drive circuit in FIG. 82 can output twice as much with a different waveform shape. Since qualitative comparisons are difficult to understand, quantitative comparisons are shown in the following examples. For example, assuming that the maximum transistor voltage is $V_0$ and the maximum current is $I_0$, let us quantitatively compare the capability of square wave driving by the drive circuit composed of the three dashed drive units in FIG. 82 and sine wave driving by the drive circuit in FIG. 80. The maximum output of the drive units in the three dashed sections of FIG. 82 is $3 \times V_0 \times I_0$. The maximum output of sinusoidal drive by the drive circuit in FIG. 80 is $\frac{3}{4} \times V_0 \times I_0$. The maximum output of FIG. 82 is four times that of FIG. 80, and even if the number of elements is subtracted, it is twice that of FIG. 80. Therefore, if the total power output of the drive circuits are matched, the drive circuit of FIG. 82 can be made half smaller, lighter, and less expensive. Even though a trapezoidal waveform shape drive close to a square wave may be possible at low speed rotation, it is often difficult to energize at high speed rotation due to winding inductance and other factors, and a current waveform shape close to a sine wave is gradually forced. However, there are many applications that require maximum torque at low speeds and not so much at high speeds, such as EVs, industrial machinery, and home appliances.

Even-numbered phases, such as the two phases in (a), the four phases in (c), and the six phases in (e) in FIG. 81, bias the total current value, so that even with sinusoidal currents, a situation occurs where the total current value of all phases is not related to 0 [A] as in equation (201). Of course, in the case of square wave or trapezoidal wave current drive, a condition will occur where the sum of all phase currents will not be 0 [A]. Therefore, it cannot be driven by star-connection and therefore cannot be driven as shown in FIG. 80. However, even in the case of an even number of phases, the drive circuit shown in FIG. 82 can drive rectangular or trapezoidal waveforms without problems. As the number of phases increases, the area of trapezoidal waveform shape that can be energized gradually becomes wider, even with current constraints such as those in equation (201). From the viewpoint of realistic motor design, especially in driving trapezoidal wave voltage and trapezoidal wave current, the cancellation effect of the harmonic component of torque is important, and phases 5, 7, and 11 are significantly superior. The minimum number of phases required is selected based on a comprehensive evaluation of the purpose of the disclosure, which is to control the magnetic flux distribution at will.

Next, an example of a thirty-sixth mode is shown in FIG. 83 and explained. 835 in FIG. 83 is the DC voltage source, and 836 is the motor control circuit for the entire drive circuit. 831 and 832 are power transistors, each with a diode in inverse parallel, which can apply a positive or negative voltage to winding 83A and can conduct a positive or negative current. 83K, 83L, 83M, 83N, 83P, and 83Q, shown in dashed lines, are the same configuration as 83J, shown in dashed lines, and are examples of 7-phase motor drives. The output of 83K is connected to winding 83B, the output of 83L to winding 83C, the output of 83M to winding 83D, the output of 83N to winding 83E, the output of 83P to winding 83F, and the output of 83Q to winding 83G. The other end of these windings is a common interconnected neutral point 83H. If FIG. 83 is a 3-phase case, the configuration of the method is similar to FIG. 80. The drive unit 83R, enclosed by a single dotted line, is equipped with diodes in reverse parallel with the 831 and 832 power transistors, respectively, whose outputs are connected to the aforementioned neutral point 83H.

The drive circuit in FIG. 83 uses two transistors to drive the voltage and current of one winding, and the neutral point 83H at the other end of each winding is driven by the drive unit 83R described above. When a sinusoidal current of each phase is energized to each phase winding of 83A, 83B, 83C, 83D, 83E, 83F, and 83G, the total current Iall is 0 [A], as in equation (201), but the total current Iall is not 0 [A] when a square wave current or a trapezoidal wave-shaped current close to square wave is energized. By driving the total current Iall with the drive unit 83R, the voltage and current of each winding can be controlled as sinusoidal or trapezoidal currents in each phase. FIG. 83 shows an example of a drive circuit driving a 7-phase induction motor, for example. As in FIG. 82, FIG. 83 can be driven by changing the number of drive units, such as 83L, 83M, 83N, 83P, 83Q, etc., for each number of phases of the motor shown in FIG. 81.

The voltage that each drive unit in FIG. 83 can output to each winding is simply ½ of the voltage that each drive unit in FIG. 82 outputs to each winding. The number of power transistors in each drive unit in FIG. 83 is two, while the number of power transistors in each drive unit in FIG. 82 is four. The drive circuit in FIG. 83 requires drive unit 83R compared to FIG. 82. Comparing the power capacity of the power transistors in FIGS. 83 82, and 83 is less favorable because it requires 83R drive units. However, the drive circuit in FIG. 83 has the feature of relative simplicity because it requires fewer transistors. For example, for 7-phase, the number of power transistors in FIG. 83 is 16, while the number of power transistors in FIG. 82 is 28. The number of power transistors in FIG. 82 is 28. One of the features of the drive circuit shown in FIG. 83 is its overall simplicity.

Since each winding has various inductance components, the timing of increasing or decreasing the trapezoidal current to each winding requires a large voltage at each phase for each winding. The drive unit 83R in FIG. 83 not only acts to keep the aforementioned neutral point 83H at the average voltage of the drive circuit in FIG. 83, but can also operate to provide the respective timing overvoltage required for each winding. For example, if the voltage of the DC voltage source 835 in FIG. 83 is 400 [V], the maximum voltage that can simply be applied to each winding is 200 [V], but it can be increased to 250 [V], for example, at times when the current is increased or decreased. In extreme cases, it may be possible to apply 400 [V], twice the normal value, for an instant. For example, if the current waveform of each phase has a trapezoidal waveform shape with steep increases and decreases, since each phase requires a large voltage at the timing to increase or decrease its respective current, in such cases, the drive circuit of FIG. 83 can be utilized more effectively and the overall size can be reduced.

Also, a variant of the drive circuit shown in FIG. 83 is possible. One variant is to split the DC voltage source 835 into two series voltage sources to create an intermediate voltage, and by connecting said neutral point 83H to that intermediate voltage, drive unit 83R can be eliminated. Alternatively, a capacitor can be placed between the aforementioned neutral point 83H and the common line of the DC voltage source 835 to substitute for a series voltage source split. In this case, the drive unit 83R can also be eliminated. In these ways, the drive circuit of FIG. 83 can be simplified.

Next, the current detector 2X, which detects the stator current in each phase, is shown in the block diagram in FIG. 2. The motor control requires a current detector 2X to control the flux components, torque, etc. of each phase. Various conventional current detectors can be used. The rotor rotation position detector 2Z is also necessary for the motor control of the disclosure. A variety of conventional rotating position detectors can be used. Sensorless position detection utilizing software is also possible.

Next, an example of a thirty-ninth mode is shown in FIG. 84 and explained. In order to effectively and efficiently control induction motors, such as the induction motor shown in FIG. 1, the magnetic flux distribution of the induction motor, i.e., the magnetic flux of each phase, is controlled in this disclosure. As shown in FIG. 57, it is possible to guess or predict the control state of an induction motor, but for more accurate control, the magnetic flux in each phase must be detected. The magnetic flux detector 2Y shown in the block diagram in FIG. 2 detects, for example, the magnetic flux [Wb] or flux density [T] of each tooth in FIG. 1. One method for directly detecting magnetic flux density is to use Hall elements, magnetoresistive elements, etc.

FIG. 84 shows an example of an induction motor with the same configuration as the stator and rotor shown in FIG. 1, where the magnetic flux density of each stator tooth is detected by a Hall element, magnetoresistive element, or other means. In FIG. 84, 841 is the stator, 842 is the rotor, and 849 is the rotor shaft. 843 is an example of a Hall element mounted near the tip of the teeth of the stator poles of phase B2, which detects the magnetic flux density of the magnetic flux passing through the teeth of the stator poles of phase B2. Another example is to provide a magnetic path 844 dedicated to Hall elements in a part of the stator poles of phase C2, and to install Hall elements 845 in the dedicated magnetic path 844. The magnetic path 844 dedicated to the Hall element shall be configured such that a non-magnetic material such as resin is provided between the soft magnetic part of the stator poles of the C2 phase, and the magnetic flux components for magnetic flux density detection can pass through it. The magnetic flux is then configured to connect the magnetic path to the stator back yoke on the exterior side after it passes through the Hall element 845. This configuration allows more accurate detection of the magnetic flux density of the stator poles of the C2 phase, even if they are located on the exterior side of the stator 841. The shape of the magnetic path 844 dedicated to the Hall element allows the magnetic flux detection space to be downsized, with the thickness in the rotor axial direction as the minimum length required for magnetic flux density detection. Thus, the overall torque drop of the induction motor can be reduced. The position of the magnetic path 844 in the axial direction of the rotor is not limited to the axial end or the center of the stator core.

Placing the Hall element 845 on the outer diameter side of the stator 841 allows the Hall element 845 to be mounted from the outer diameter side of the motor. Wiring to the Hall element 845 is easy, and cooling can be devised. Since each stator winding in FIG. 84 is full pitch winding and the motor configuration is point symmetrical with respect to the motor center, for example, the magnetic flux passing through the A2 phase stator pole 846 and the magnetic flux passing through the A/2 phase stator pole 527 can be regarded as flux of the same magnitude with relatively opposite flux directions. The magnetic flux [Wb] can be calculated by multiplying the magnetic flux density [T] by the cross-sectional area of the teeth [m$^2$]. Therefore, to detect the magnetic flux of all the teeth in FIG. 84, it is sufficient to detect the magnetic flux density of 7 of the 14 teeth. The flux density detection of 6 teeth is also acceptable, since the sum of all fluxes is 0.

Another method of detecting the magnetic flux in each tooth is to wind a search coil for flux detection around each tooth, measure its voltage, and calculate the magnetic flux. 848 in FIG. 84 is an example of a 2[turn] search coil wound to the D2 phase stator poles. The voltage Vscd of the search coil is given by the following equation when the number of turns of the search coil is Nsc and the magnetic flux to be detected is φsd.

$$Vscd = Nsc \times d\varphi sd/dt \quad (203)$$

The magnetic flux φd can be obtained as the integral of the voltage, but since the integration constant is not constant, it is necessary to devise a new method. Above a certain number of revolutions, the integration constant can be specified so that the average value is zero. It can also be detected in combination with other measurement methods, since it is more difficult to identify the integral constant at low rotational speeds. Alternatively, at low speeds, control could be based primarily on theoretical models and theoretical equations for induction motors. Instead of installing a search coil in each tooth, a variation such as ticketed search coils on multiple teeth can be used, and the magnetic flux of each tooth can be calculated and obtained later.

The chain flux can also be obtained from the voltage of the stator windings of a full-pitch winding. The stator winding in FIG. 84 is the same as the full pitch windings shown in FIG. 1, and each winding voltage can be expressed by equations (22) to (28). Each phase voltage can then be expressed by equations (29) to (35). These equations (29) through (35) are of the same form as equation (203), which represents the search coil voltage described above. Therefore, the magnetic flux [Wb] of the stator poles in each phase can be calculated in the same way that the chain flux is calculated from the search coil voltage. The magnetic flux density [T] can also be calculated.

Note that equations (22) to (28) are simplified and neglect winding resistance and leakage inductance of full pitch winding(s). To obtain the magnetic flux more accurately, for example, the voltage Vad of the AD2 phase winding 1F in FIG. 1 can be corrected from equation (22) to the following equation.

$$Vad = Nws/2 \cdot d(\varphi a + \varphi b + \varphi c + \varphi d - \varphi e - \varphi f - \varphi g)/dt \quad (204)$$
$$+ Iad \times Rst + Lst \times d(Iad)/dt$$

Therefore, the corrected AD2 phase voltage Vadm is following equation.

$$Vadm = Vad - (Iad \times Rst + Lst \times d(Iad)/dt) \quad (205)$$

Here, Iad is the AD2 phase current [A], Rst is the resistance of the full pitch winding [Ω], Nws/2 is the number of turns of the full pitch winding [turns], and Lst is the leakage inductance of the stator full pitch winding [H]. All are known values at the time of measurement. The winding voltages of the other phases in equations (23) through (28) can also be corrected in the same way. Then, substituting the corrected AD 2-phase voltage Vadm as in equation (205) in place of Vad in equation (22), and substituting equations (23) through (28) in the same manner, equations (29) through (35) can be used without any transformation, and the magnetic flux φa, φb, φc, etc. in each phase can be calculated.

The winding voltages Vad, Vbe, etc. of each phase of the stator in FIG. 1 are pulse width modulated PWM voltages applied by the power transistors in the drive circuit, and since the PWM frequency is large, their measurement is not easy. For example, when the PWM frequency is 10 [kHz], the voltage waveform is a fast-changing voltage waveform in which high and low square wave voltage is repeated with a period of about 100 [μsec]. Several methods are possible for measuring the winding voltages Vad, Vbe, etc. of each of these phases. The first method of measuring winding voltage is to use the voltage and current command values before the aforementioned pulse width modulated PWM as measurement predictions during the calculation phase of motor control. Since it is a digital signal before PWM modulation, signal processing is easy, and if necessary, average value calculation, filter processing, or correction calculation based on the control error of the measured current is also possible.

The second method of measuring winding voltages is to use an AD converter to measure the winding voltages Vad, Vbe, etc. for each of these phases. Usually, in such cases, lowering the detection voltage by voltage divider, converting the winding voltage to a voltage convenient for the measurement circuit by differential voltage detection, and reducing the PWM frequency component by a low-frequency filter are effective. The circuit can also be shared with a power supply voltage monitoring circuit or a current detection circuit that measures the current value of each phase, etc. For example, space and cost can be reduced by sharing the measurement power supply and multi-channel AD converters. The first and second measurement methods can also be used together. Shared use of measurement power supplies and multi-channel AD converters can also be used with the aforementioned methods of using Hall elements, search coils, and measuring rotor currents.

Another way to obtain the magnetic flux density of each stator pole, such as in FIG. 1, or the excitation current component Isf of each phase, is to measure each rotor current Ir and obtain it by calculation. If each rotor current Ir can be measured, its stator equivalent current Isr can be calculated. In addition, each phase current Is of the stator's full-pitch winding wire can be easily detected. Therefore, the excitation current component Isf for each of the above phases can be obtained as in the following equation.

$$Isf = Is - Isr \quad (206)$$

Since the magnetomotive force acts on this excitation current component Isf to the air gap section and the soft magnetic material section, the magnetic flux density of the teeth and air gap section can be obtained by calculation. The magnetic properties of the soft magnetic material section are, for example, shown in FIG. 7.

The temperature of the rotor winding, rotor winding resistance, current in the rotor winding, and magnetic flux density of the rotor in the present disclosure are explained next. In the present disclosure, the resistance Rr of the rotor winding is an important parameter in the control of induction motors, as in equation (77) and others. However, copper and aluminum are mainly used as materials for rotor windings, and the temperature variation of their resistivity is as large as about 40 [%/100° C.], making temperature variation of rotor winding resistance a major problem in terms of rotor current control accuracy. Even with Class F insulation, the temperature is 155° C. and varies by more than 100° C. Specifically, since the rotor current Ir is expressed by equation (77), Ir is a problem that varies significantly with the rotor winding temperature. Therefore, the resistance Rr of the rotor winding is an important parameter in controlling the current and torque of an induction motor.

As a method to measure the temperature of the rotor winding, the approximate temperature can be measured from the stator side, which is the fixed side, by measuring the radiant heat from the surface of the rotating rotor. Sensors for radiant heat and other sensors are commercially available. In parallel, the rotor winding temperature can be more accurately estimated from the rotor heat capacity and rotor current history. Since the temperature of other parts of the motor are also related to the temperature of the rotor winding, the rotor winding temperature can be calculated inferentially from their control information.

Figure 85:
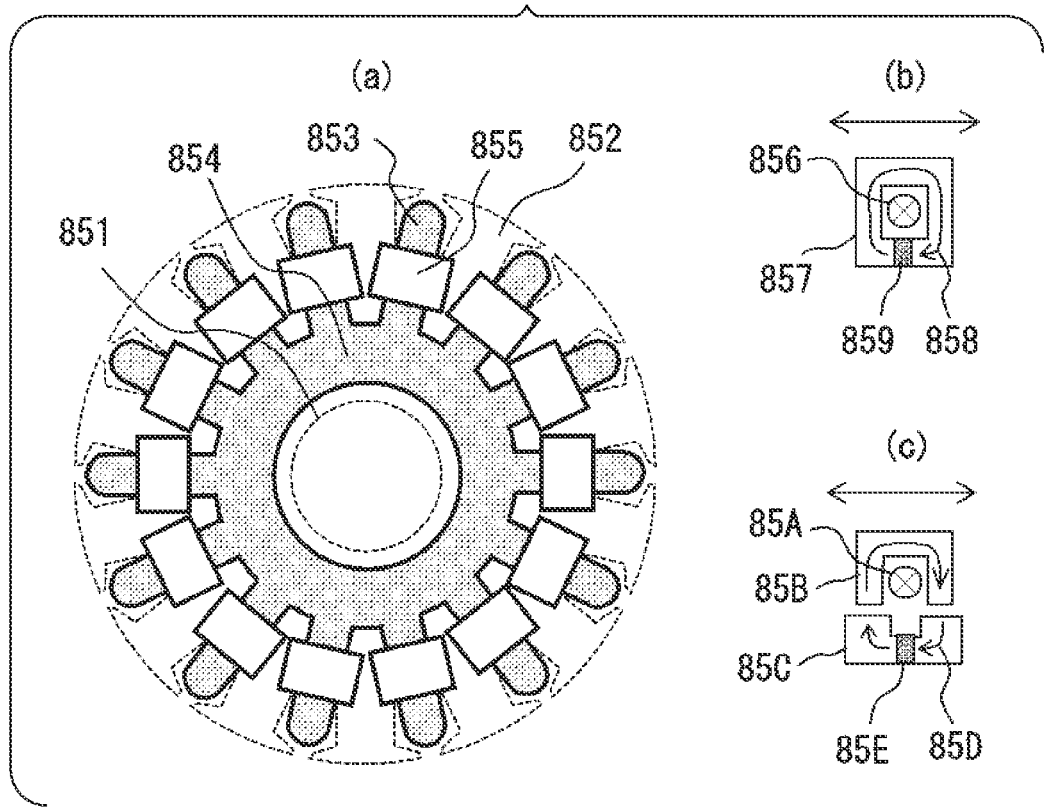
FIG. 85 shows rotor current detection based on a hall element.
Figure 87:
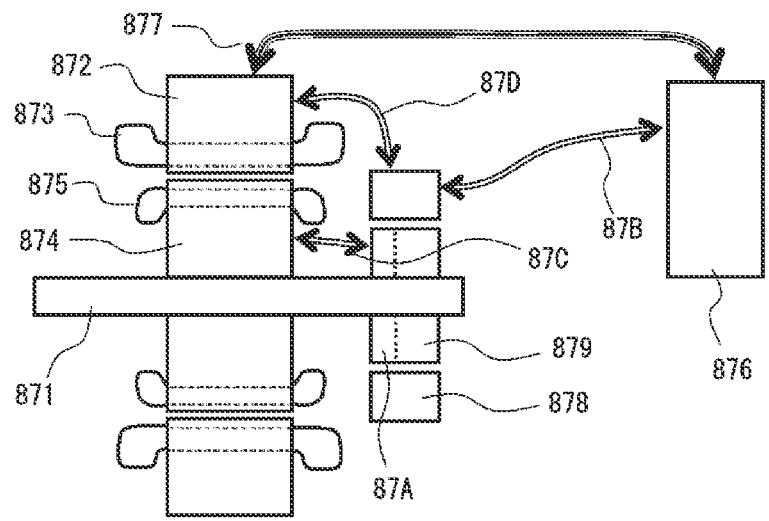
FIG. 87 explains a connection relationship of power and signals between a motor and a controller thereof.

Next, an example of the implementation of a fortieth mode is shown and explained in FIGS. 85 and 87. The torque and speed are controlled by detecting each rotor current in each rotor winding of the induction motor rotor and controlling the magnetic flux, voltage, and current in each phase. Accurate energization and control of the rotor currents is a fundamental technique and is important in this disclosure. Some rotor current detection methods are shown below. Since the rotor is rotating, it is not easy to detect each rotor current in each rotor winding.

The first method of detecting rotor currents is the method shown in FIGS. 85 (a) and (b), which utilizes a Hall element or a magnetoresistive element to measure each rotor current. The first detection method is shown in FIGS. 85 (a) and (b).

FIG. 85 (a) is a side view of the rotor, and the axial end of the rotor shown in the cross-sectional view in FIG. 84 is connected to the rotor current detection unit shown in 85 The rotor current sensing unit is shown at 5. The specific configuration of this 855 is shown in (a) or (b) of FIG. 85. The 851 indicated by the dashed line in (a) of FIG. 85 is the rotor shaft and is the It is the same as 849 in FIG. 84. 852 shown by the dashed line in (a) of FIG. 85 is the rotor teeth, the same as the rotor teeth in FIG. 84. The dashed line in (a) of FIG. 85 is the rotor shaft and is the same as 849 in FIG. 84.

853 is the rotor winding to be placed in the slot of the rotor, and at the axial end of the rotor, it is connected at its connection from the outer to the inner diameter side of the rotor, which is the shorting ring of the rotor winding of each phase 8 54 of the rotor windings of each phase. At this 853 said connection, the current passing through is measured by the 855 rotor current detection unit. The rotor configuration in FIG. 85 (a) is an example of a die-cast aluminum configuration. Each rotor winding has 1 [turn]. Because the rotor windings, their rotor end portions 853, and the shorting rings 854 of each phase of the rotor windings can be made simultaneously using a die or other tool, and thus, productivity is good. Each of the other rotor windings of each rotor slot is similarly connected to the shorting ring 854, and each rotor current is detected by the respective aforementioned rotor current sensing unit.

FIG. 85 (b) shows an example of the above rotor current detection unit 85 5 specific configuration example. The left to right direction on the paper surface of FIG. 85(b) is the rotor rotation direction, and the up and down direction on the paper surface is the rotor axis direction. The direction from the back side of the paper in FIG. 85(b) to the front side of the paper is the direction in which the rotor winding 853 is the direction in which the rotor windings are going. 856 shows the rotor windings with the current symbols and is the direction in which the rotor windings in FIG. 8 857 is a part of rotor winding 853 in (a) of FIG. 5. 856, and is a soft magnetic core configured so that the rotor current in the rotor winding 856 is interlinked, and the rotor current flowing in the rotor winding 856 858 magnetic flux is generated. The core 857 of soft magnetic material has a Hall element of 859 placed in its magnetic path, and the rotor windings 8 53 and 856, and detects the rotor current flowing in the rotor windings 857.

The 855 in FIG. 85 (a) and the 855 in FIG. 85 (b) The rotor current sensing unit in FIG. 85(a) is located on the side of the rotating rotor, so it is necessary to supply its control power and communicate output signals such as the detected current value to the induction motor's control circuit. Although this can be done in various ways, a smaller, more reliable, and lower cost is desirable for practical use. FIG. 87 shows an example of a path for control power, signal communication, etc. 871 is the rotor shaft of the induction motor, 8 72 is the stator core, 873 is the stator winding, 874 is the rotor core, and 875 is the rotor winding. 875 is the rotor winding; 876 is the control circuit of the induction motor; 87 7 is the power line from the control circuit 876 to the induction motor, which supplies voltage and current to drive the induction motor. 87 8 is the stator of the position detector that detects the rotor rotation position θr, and 879 is the rotor. 87 A is a control circuit power supply that is located and shared by some of the position detectors, or an interface for a current detection circuit such as a Hall element.

87C in FIG. 87 is the connection line to the Hall element in (b) of FIG. 85, etc. It supplies control power to various detection circuits in the vicinity of the rotor core 874 and communicates various signals. For example, 87A is a rotary transformer, which supplies power between the stator 878 and the rotor 87 9 and can also superimpose various digital signals. 87D, for example, is a control line that detects the magnetic flux density of each tooth of the stator. 87B is a control line that connects the stator 878 78 and control circuit 876, control power supply, and various communication lines. As described above, various connection lines are required, but the burden of connection lines can be reduced by grouping together or sharing the input/output lines around the motor, as in connection line 87B. In addition to wired communication, wireless, optical fiber, and optical communication between the stator and rotor can also be used as communication means.

When each rotor winding in FIG. 85(*a*) is full pitch winding(s), there is no shorting ring 854 as shown in FIG. 60. The connection is made by the coil end windings from 601 to 607, as shown in the rotor of FIG. 60. The windings are connected by the coil end windings 601 to 607 as shown in the rotor in FIG. 60. Each of these windings is then passed through to the soft magnetic core 857 of FIG. 85 (*b*), and the rotor current is measured. In this case, there are seven current detectors 855 shown in (b) of FIG. 85. Similarly, in the case of the rotor with the configuration of the short-circuit ring 854 shown in (a) of FIG. 85, some rotor currents can be inferred from the symmetry of the motor, etc. Therefore, it is not necessary to detect all of the rotor currents. Although the rotor current is detected using a Hall element in (b) of FIG. 85, the rotor current may be obtained from the voltage drop across a magnetoresistive element or a shunt resistor inserted into the rotor winding. If the rotor has a control power supply and communication means are prepared, as shown in FIG. 85, it is also relatively easy to detect the temperature in the vicinity, the temperature of the rotor winding, and the magnetic flux density of each part of the rotor. For example, a temperature detector can be placed alongside the aforementioned rotor current detection unit 855.

Next, the second detection method of rotor current is shown and described in (c) of FIG. 85. FIG. 85 (*c*) shows the rotor current detection unit, the configuration of which differs from that of FIG. 85 (*b*) in that it is divided into its rotor side part and stator side, i.e. It is divided into two parts, one on the rotor side and the other on the stator side, i.e., the fixed side. The aim of the configuration in FIG. 85(*c*) is to place the Hall element 85E, which requires input/output wires, on the stator side. The left and right directions on the paper face of FIG. 85(*c*) are the rotor rotation direction, and the up and down directions on the paper face are the rotor axis direction. The direction from the back side of the paper to the front side of the paper in FIG. 85(*c*) is the direction of the rotor winding from the exterior side to the interior side in FIG. 85(*a*). 85A shows the rotor windings with current symbols, and FIG. 8 85B is a part of rotor winding 853 in (a) of FIG. 5. 85B is the soft magnetic core on the rotor side, configured to interlink the rotor current in 85A. 85C is the soft magnetic core on the fixed side, configured to interlink the rotor current in 85B through the air gap. 85B on the rotor side through a gap, and when 85B on the rotor side rotates and reaches a certain specific section, the mutually opposed 85D magnetic flux is generated. The 85C soft magnetic core has a 85E Hall element in its magnetic path. The Hall element 85E then detects the aforementioned magnetic flux 8D generated by the rotor current flowing in the rotor winding 85A 5D is detected.

When the rotor rotates in the configuration of the rotor current detection unit in (c) of FIG. 85, only once per rotation and within the limited range of the rotor rotation angle, the Hall element 85E can detect the rotor current flowing in winding 85A. The circumferential width of the soft magnetic material core 85C is the same as the core in (b) of FIG. 85 to increase the detectable rotor angle range. An example of a slightly wider core than 857 is shown in the figure. Also, the direction in which core 85B in (c) of FIG. 85 faces core 85 C is twisted 90° from the state of (c) in FIG. 85, and each tooth of core 85B is facing the direction of rotation of the rotor, then the core 85B can be detected. If it is oriented in the direction of rotation, the detectable rotor angle width can be increased. the core shapes of 85B and 85C can also be deformed.

Hall element 85E can also detect the rotor currents of other rotor windings in the same way. The information of the rotor rotation position θr can be used to determine which rotor winding's current is the current of which rotor winding. On the other hand, the combination of (a) in FIG. 85 and (c) in FIG. 85 allows the rotor current detection unit 8 55 can be arranged in a number of circumferential directions. The configuration of the rotor-side units and stator-side units in (c) of FIG. 85 can be devised and transformed in terms of the position, number of units, and double arrangement of the units in the circumferential direction. As a result, the current value of each rotor winding can be detected with high frequency from the value of each rotor current detection unit and the information of the rotor rotation position θr. Furthermore, it is also possible to detect continuously.

On the other hand, in the control circuit of an induction motor, the current value of each rotor winding is always estimated and calculated based on the control state of the motor. Therefore, even if there is a timing when the rotor current cannot be detected, it can be compensated by the guessed value of the rotor current value, and the error component of the guessed value can be corrected the next time it can be detected. If each rotor current can be detected, the value of the resistance Rr of the rotor winding can also be calibrated by recognizing that the value of Rr varies with temperature. Similarly, other parameters can be calibrated.

Figure 86:
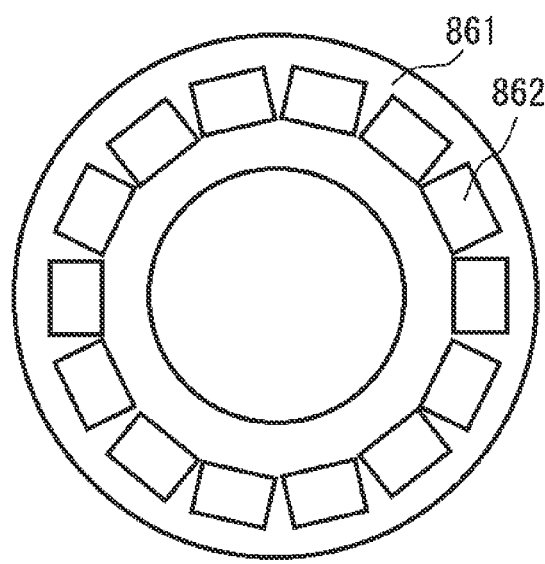
FIG. 86 shows a printed board on which hole elements and current detection elements.

In addition, since these cores 85C, Hall elements 85 E, etc., are on the fixed side, they can be arranged on the 861 doughnut-shaped printed circuit board as shown in FIG. 86, and many of them can be arranged on the circumference of the board. The current sensing unit can be made to excel in performance, functions, productivity, etc., by precisely arranging many rotor current sensing units, and by installing digital input/output-like interfaces, etc. 862 is the core 85C of FIG. 85 (*c*). (c) of 85, core 85C, Hall element 85E, etc. in FIG. 85. This doughnut-shaped printed circuit board 861 is used to connect the rotor winding 8 5A, core 85B, etc., facing each other through a small air gap. The rotor side rotates and the PCB 861 is fixed to the stator since it is the fixed side. The 861 is not limited to a printed circuit board, but can be resin or other material, as long as many components and wiring can be accurately fixed. The cores of 85B, 85C, etc. can also be simplified. At the extreme end, even without these cores, since weak magnetic flux is generated in the vicinity of the rotor windings 853, etc. in FIG. 85, each rotor current value can be measured from the weak magnetic flux. The rotor current values can also be measured from the weak magnetic flux. Many magnetoresistive elements that respond with high sensitivity to weak magnetic flux density are commercially available. In such cases, electromagnetic shielding can also be used as necessary. As an example of (c) in FIG. 85, many cores 85C, Hall elements 85E, etc. are arranged on a doughnut-shaped printed circuit board at the rotor pole direction end in (a) in FIG. 85. However, the arrangement technique can be modified to place them on the radial, external, oblique, or inner diameter side of the rotor. To detect the rotor current, the rotor length can be made longer than the stator length.

The present disclosure has been described as above, but various variations, applications, and combinations are possible. The number of phases of the induction motor can be changed to 5 or 7 phases, and the number of magnetic poles can be selected. The stator winding can be configured as concentrated windings, or distributed windings, short-pitch windings, toroidal windings, etc. Motor geometries such as outer rotor motors, axial gap motors, or linear motors can be selected. A composite motor can be configured with two motor elements in the inner and outer radial directions or in the rotor axial direction. The motor described above can also be combined with other types of motor elements. Various materials can be used as soft magnetic materials for motor magnetic circuits, such as pressure-separated magnetic cores, amorphous metal cores, and permendur, in addition to ordinary electromagnetic steel sheets. It is also possible to utilize sensorless position detection technology that utilizes the fact that the induced voltage and magnetic characteristics of each winding change with the rotation of the rotor. Any application or variation of these techniques to the present disclosure configuration is included in the present disclosure.

INDUSTRIAL AVAILABILITY

The motor and its controller can make the drive of electric vehicles more powerful, and the motor and its inverter section can be smaller, lighter, and less costly. In addition, the high response and high power output of electric drive can be expected to make airplanes and other devices more responsive, faster, and more stable, as well as lighter and less expensive. There are many applications in the industrial machinery field, for example, presses, machine tools, and construction machinery, which require extremely large forces for short periods of time.

DESCRIPTIONS OF PARTIAL REFERENTIAL SIGNS 21 induction motor
22 angular frequency command ωrc
23 control mode command CRM
24 PWM controller
25 drive circuit
26 current information means IDET
27 magnetic flux density information means φDET
271 exciting-current generating means IFG
28 positional information means PORD
29,2E,2L,2N adder
2A proportional-integral compensator PI
2B current command generating means IAG
2BD memory DATA
2C exciting-current generating means IFG
2D MN coordinate converter NMNC of concentrated winding current
2H rotor current generator IRG
2J stator current converter RSC
2K full-pitch winding converter IFPC
2M MN coordinate converter NMNC of full-pitch winding current
2R feedforward voltage generating means FF
2X current detector
2Y magnetic flux detector
2Z position detector

The invention claimed is:

1. An induction motor and control device thereof, comprising:
    stator windings SW1, SW2, SW, . . . , SW(N1) arranged for each of phases within an electrical angle of 360 degrees in a circumferential direction of a stator;
    magnetic sections G1, MG2, MG3 . . . MG(N2) which are circumferential sections located close to an air gap between the stator and a rotor, which are located within an electrical range of 360 degrees, and which shows stator teeth each arranged between the stator windings of each of the phases or circumferential widths corresponding to the stator tooth;
    a plurality of rotor windings RW arranged closely on a surface of a rotor in the rotor, induced currents flowing due to magnetic excitation in the stator;
    a drive circuit DTR which drives voltage and current of the phases supplied to the respective stator windings; and
    a motor control means MCM which obtains values including current command values, and drives the stator windings with the drive circuit DTR,
    wherein
        the control is performed in a state in which a field flux φm near the air gap for each of the magnetic sections, an electromotive force to excite a magnetic flux density of the field flux φm, or excitation current components for excitation including a field magnetic flux excitation are given as individual values for each of the magnetic sections, and
        a rotor current component superposed to each of the stator windings is supplied to the rotor windings of the rotor,
        wherein the number N1 is an integer greater than or equal to 6 and the number N2 is an integer greater than or equal to 6.

2. The induction motor and control device thereof according to claim 1, wherein
    a current control is performed by
    setting a magnetic flux density near the air gap of the field flux φm of the stator as a function Dist1 of a target distribution state of arbitrary shape in the circumferential direction,
    changing the function Dist1 to a function Dist2 of circumferentially discrete distribution state, constrained to the magnetic section such as stator tooth of the stator, such that an average value of the magnetic flux density near the air gap in the magnetic section is approximately equal, in rotation control of the field flux φm, and
    controlling the induction motor according to the distribution shape Dist2.

3. The induction motor and control device thereof according to claim 1, wherein
    a compensation flux is added adjacently to a leading portion of the field flux φm in the direction of travel in the air gap of the induction motor to compensate for a delay of the rotor current.

4. The induction motor and control device thereof according to claim 1, wherein
    a rotor current command value Irc is substituted into a voltage equation for the rotor current to obtain the voltage Vrc of the rotor windings, a magnetic flux density Bgap that is allowed to generate a rotor voltage Vrc is determined, and the magnetic flux density Bgap is controlled based on the function Dist1 of the target distribution state of the magnetic flux density in the air gap.

5. The induction motor and control device thereof according to claim 1, wherein the function Dist1 of the circumferential target magnetic flux density distribution state in the vicinity of the air gap of the field flux φm of the stator is controlled by varying values of the rotor rotational angular velocity ωr or the torque command Tc.

6. The induction motor and control device thereof according to claim 1, wherein each of excitation current components of the filed magnetic flux φm and torque current components is defined N3-phase currents, and a coordinate that rotates with respect to a circumferential rotation position θmn of the field magnetic flux φm is an MN coordinate;

a real coordinate is defined as a real axis coordinate, wherein each of excitation current components of the filed magnetic flux φm and torque current components are fixed as the N3-phase currents; and a coordinate conversion is performed between the MN coordinate and the real axis coordinate such that various or flexibly changeable distribution shape of the N3 phase are controlled, wherein the N3 is an integer of 6 or more.

7. The induction motor and control device thereof according to claim 1, wherein the excitation current components or the torque current components are expressed as full-pitch winding current components of the full-pitch windings;

the excitation current components or the torque current components are expressed as concentrated winding current components of hypothetical concentrated windings, if necessary; and the excitation current components or the torque current components are used for the control by converting the full-pitch winding current components and the concentrated winding current components to each other, as required.

8. The induction motor and control device thereof according to claim 1, wherein the induction motor comprises:

stator windings SW1, SW2, SW3 . . . SW(N4) of the full pitch winding(s) to be placed at each phase within a circumferential electrical angle of 360° of the stator;

each of magnetic sections such that the magnetic section MG1 is between the stator windings SW1 and SW2 of each phase, the magnetic section MG2 is between the stator windings SW2 and SW3, and the magnetic section MG(N4) is between the stator windings SW(N4) and SW1; and a slot SL1 located between the magnetic sections MG (N4) and MG (1), a slot SL1 located between the magnetic section MG (1) and MG (2), a slot SL3 located between the magnetic section MG (2) and MG (3), and a slot SL (N4) located between the magnetic section MG (N4−1) and MG (N4), N4 being an integer of 6 or more;

wherein when a current in the full pitch windings in the slot SL (1) where the stator winding SW1 is would is Iax, a portion of the stator winding SW1 is also located in a slot (N4/2+1) 180° away at an electrical angle, and a reverse direction current (−Iax) is energized in the portion of the winding;

hypothetical concentrated windings CW1, CW2, CW3 . . . CW(N4) are assumed, which form an equivalent function to the full pitch windings, wound on each of the magnetic sections MG1, MG2, MG3 . . . MG(N4), and the number of turns of the full-pitch windings and the hypothetical concentrated winding windings is Nws/2, and when obtaining the equivalent full pitch winding current values by converting from each current value of the hypothetical concentrated winding to each equivalent full pitch winding current value, the current values of two hypothetical concentrated winding windings placed in the same slot as the full pitch windings are set to be positive if the direction of the magnetomotive force of the hypothetical concentrated winding coincides with the direction of the magnetomotive force of the full pitch windings and to be negative if the direction of the magnetomotive force of the two windings is opposite, and a sum of the current values of the two concentrated winding windings is obtained, and similarly, the current value for each full pitch windings is obtained; and when the current values of each of the equivalent hypothetical concentrated winding windings are obtained by converting from the current values of each of the full pitch windings, the direction of the magnetomotive force generated by the current in the full pitch windings coincides with the direction of the magnetomotive force acting on the magnetic section around the hypothetical concentrated winding, in which the currents are assumed to be positive, and in the opposite direction, the currents are assumed to be negative, and the currents of all the full-pitch windings are added together to obtain ½ of a sum of the currents acting as an equivalent current value of the hypothetical concentrated windings, and similarly, the equivalent current values of the respective hypothetical concentrated windings.

9. The induction motor and control device thereof according to claim 1, wherein when voltage values of each equivalent full pitch windings are obtained by converting from the voltage values of each of the hypothetical concentrated winding windings, if a direction of the magnetomotive force acting on the magnetic section of the hypothetical concentrated winding coincides with the direction of the magnetomotive force acting on the current in the full pitch windings, the value is set to be positive, and if the direction of the magnetomotive force is opposite, the value is set to be negative, the voltage values of the concentrated winding windings are added together and ½ of the sum is the equivalent voltage of the full pitch windings, and similarly, the equivalent voltage for each full pitch windings is obtained; and when the voltage values of each of the equivalent hypothetical concentrated winding windings are obtained by converting from the voltage values of each of the full pitch windings, if the direction of the magnetomotive force exerted by the current in the full pitch windings corresponds to the direction of the magnetomotive force exerted by the current in the hypothetical concentrated winding, the voltages of the two full pitch windings wound in the slots located circumferentially on both sides of the magnetic section related to the hypothetical concentrated winding are assumed to be positive and if a relationship where the direction of the magnetomotive force is in the opposite direction, the voltages are assumed to be negative, the voltage values are added together so as to set an equivalent voltage value of the hypothetical concentrated winding, and similarly, the equivalent voltage values for each hypothetical concentrated winding is obtained.

10. The induction motor and control device thereof according to claim 1, wherein a torque command Tc and rotor rotational angular velocity ωr are used as inputs, the slip angular frequency ωs and the distribution shape Dist1 of an arbitrary shape of the magnetic flux density in the air gap section is obtained, or the distribution shape Dist1 of an arbitrary shape of the excitation current component corresponding to said magnetic flux density to control the induction motor current.

11. The induction motor and control device thereof according to claim 1, wherein the command values B1c, B2c, B3c, B4c . . . of the magnetic flux density of each stator tooth are obtained from the aforementioned arbitrarily shaped distribution shape Dist1 of the magnetic flux density of the air gap section, and the excitation current component commands Isf1Cc, Isf2Cc, Isf3Cc, Isf4Cc . . . of the aforementioned virtual concentrated winding windings CW1, CW2, CW3, CW4 . . . of the stator are calculated, which excite these magnetic flux densities.

12. The induction motor and control device thereof according to claim 1, wherein the detected excitation current components Isf1Cd, Isf2Cd, Isf3Cd, Isf4Cd . . . of the hypothetical concentrated winding required to excite each magnetic section are calculated from the magnetic flux density B1d, B2d, B3d, B4d . . . of the air gap section of each magnetic section, and for each phase, the detected excitation current component values Isf1Cd, Isf2Cd, Isf3Cd, and Isf4Cd . . . are subtracted from the field flux excitation current component command values Isf1Cc, Isf2Cc, Isf3Cc, and Isf4Cc . . . to obtain the excitation current component error for each phase (Isf1Cc-Isf1Cd), (Isf2C-Isf2Cd), (Isf3Cc-Isf3Cd), (Isf4Cc-Isf4Cd) . . . for feedback control.

13. The induction motor and control device thereof according to claim 1, wherein virtual rotor windings RW11, RW12, RW13, and RW14 . . . are placed on the circumference of the rotor, the values of the rotor currents Ir11, Ir12, Ir13, Ir14 . . . flowing in each of said rotor windings RW are calculated based on the voltage equation including the winding resistance and leakage inductance of each rotor winding RW, and the respective values of each of said rotor currents are continuously determined and controlled.

14. The induction motor and control device thereof according to claim 1, wherein the motor comprises stator windings SW1, SW2, SW3, SW4 . . . , and a rotor provided with rotor windings wound on, wherein virtual rotor windings RW11, RW12, RW13, RW14 . . . are placed on the circumference of the rotor, and rotor currents Ir11, Ir12, Ir13, Ir14 . . . flowing in said hypothetical rotor windings are continuously obtained over time, the circumferential distribution IsrDist of the rotor current component of the stator is determined so that the product of the rotor current Ir11, Ir12, Ir13, Ir14 . . . and the number of turns of the current is negative and of the same magnitude, and rotor current components of windings wound on a stator are controlled based on the circumferential distribution IsrDist.

15. The induction motor and control device thereof according to claim 1, wherein the control device comprises stator current detection means MCDM to detect each phase current of the stator windings SW1, SW2, SW3, SW4 . . . , wherein the current values for each of the stator windings are detected as Is1Fd, Is2Fd, Is3Fd, Is4Fd . . . , excitation current components Isf1Fd, Isf2Fd, Isf3Fd, Isf4Fd . . . required for excitation of each magnetic section are obtained from the magnetic flux density B1d, B2d, B3d, B4d . . . of the air gap section of each magnetic section, and the excitation current component are subtracted from each of the current values of the stator winding, each rotor current component (Is1Fd-Isf1Fd), (Is2Fd-Isf2Fd), (Is3Fd-Isf3Fd), and (Is4Fd-Isf4Fd) . . . are obtained, and the detected value of rotor current component are applied to the control.

16. The induction motor and control device thereof according to claim 14, wherein the detected values Isr1Fd, Isr2Fd, Isr3Fd, Isr4Fd of the rotor current of each phase are subtracted from the commands Isr1Fc, Isr2Fc, Isr3Fc, Isr4Fc . . . of the rotor current component of each phase of the stator for the feedback control.

17. The induction motor and control device thereof according to claim 1, wherein place virtual rotor windings RW11, RW12, RW13, and RW14 . . . on the circumference of the rotor, and calculate the values of the rotor currents Ir11, Ir12, Ir13, Ir14 . . . flowing in each of said rotor windings RW based on the voltage equations including the winding resistance and leakage inductance of each rotor winding RW, and subtract the calculated torque values generated by the rotor currents Ir11, Ir12, Ir13, Ir14 . . . from the torque command Tc to obtain the torque error Ter and the torque error correction ωster to correct the sliding angular frequency ωs.

18. The induction motor and control device thereof according to claim 1, wherein the rotor windings are located near the surface of the rotor facing the stator, and the rotor windings of each phase are arranged in a circumferential line.

19. The induction motor and control device thereof according to claim 18, wherein the motor comprises a soft magnetic material is provided between the circumferential direction of each rotor winding of the rotor to reduce the magnetic resistance from the back yoke of the rotor to the air gap section.

20. The induction motor and control device thereof according to claim 1, wherein
the rotor windings RW are partly or wholly composed of a superconducting wires, and
a resistive element is connected to the superconducting wires of the rotor windings RW.

* * * * *